United States Patent
Snydacker et al.

(10) Patent No.: US 12,162,773 B2
(45) Date of Patent: Dec. 10, 2024

(54) EXTRACTION OF LITHIUM WITH CHEMICAL ADDITIVES

(71) Applicant: Lilac Solutions, Inc., Oakland, CA (US)

(72) Inventors: David Henry Snydacker, San Francisco, CA (US); Nicolás Andrés Grosso Giordano, Oakland, CA (US); Sophia Patricia Mock, Berkeley, CA (US); Christina Fleming, Naperville, IL (US); Tejal Sawant, Oakland, CA (US); Mustafa Juzer Bootwala, Oakland, CA (US); Amos Indranada, Emeryville, CA (US); Alysia Lukito, Emeryville, CA (US); Kathryn Jean Sciamanna, Oakland, CA (US); Madeline Paige Cooke, Oakland, CA (US); Venkatganesh Subramanian, Oakland, CA (US); Edson Barton Packer, Oakland, CA (US)

(73) Assignee: LILAC SOLUTIONS, INC., Oakland, CA (US)

( * ) Notice: Subject to any disclaimer, the term of this patent is extended or adjusted under 35 U.S.C. 154(b) by 0 days.

(21) Appl. No.: 18/476,180

(22) Filed: Sep. 27, 2023

(65) Prior Publication Data

US 2024/0018008 A1   Jan. 18, 2024

Related U.S. Application Data

(63) Continuation of application No. PCT/US2023/017172, filed on Mar. 31, 2023.

(60) Provisional application No. 63/326,734, filed on Apr. 1, 2022.

(51) Int. Cl.
*C01D 15/00*   (2006.01)
*C02F 1/42*   (2023.01)

(52) U.S. Cl.
CPC ............... *C01D 15/00* (2013.01); *C02F 1/42* (2013.01)

(58) Field of Classification Search
CPC .................. C01D 15/00; C02F 1/42
USPC ..................................... 423/179.5
See application file for complete search history.

(56) References Cited

U.S. PATENT DOCUMENTS

| | | |
|---|---|---|
| 2,608,465 A | 8/1952 | Henderson |
| 2,609,341 A | 9/1952 | Walter |
| 3,207,577 A | 9/1965 | Mizuma |
| 3,793,433 A | 2/1974 | Seeley et al. |
| 3,920,544 A | 11/1975 | Weiss |
| 4,058,585 A | 11/1977 | MacKay et al. |
| 4,116,858 A | 9/1978 | Lee et al. |
| 4,159,311 A | 6/1979 | Bauman et al. |
| 4,291,001 A | 9/1981 | Repsher et al. |
| 4,347,327 A | 8/1982 | Lee et al. |
| 4,382,124 A | 5/1983 | Meitzner et al. |
| 4,665,049 A | 5/1987 | Miyai et al. |
| 4,747,949 A | 5/1988 | Barkey |
| 5,039,382 A | 8/1991 | Suzuki et al. |
| 5,242,119 A | 9/1993 | Jariyasunant |
| 5,626,750 A | 5/1997 | Chinn |
| 5,639,861 A | 6/1997 | Steffier |
| 6,048,507 A | 4/2000 | Amouzegar et al. |
| 6,171,489 B1 | 1/2001 | Ballard et al. |
| 6,207,126 B1 | 3/2001 | Boryta et al. |
| 6,325,976 B1 | 12/2001 | Small et al. |
| 6,749,648 B1 | 6/2004 | Kumar et al. |
| 7,390,466 B2 | 6/2008 | Boryta et al. |
| 7,435,477 B2 | 10/2008 | Adachi et al. |
| 7,541,016 B2 | 6/2009 | Gorshkov et al. |
| 7,820,327 B2 | 10/2010 | Yumoto et al. |
| 8,454,816 B1 | 6/2013 | Harrison et al. |
| 8,506,851 B2 | 8/2013 | Ravet et al. |
| 8,574,519 B2 | 11/2013 | Harrison et al. |
| 8,641,992 B2 | 2/2014 | Galli et al. |
| 8,679,224 B2 | 3/2014 | Brown et al. |
| 8,741,150 B2 | 6/2014 | Chung et al. |
| 8,778,289 B2 | 7/2014 | Chon et al. |
| 8,926,874 B2 | 1/2015 | Chung et al. |
| 9,034,294 B1 | 5/2015 | Harrison |
| 9,598,291 B2 | 3/2017 | Chon et al. |
| 9,677,181 B2 | 6/2017 | Bourassa et al. |
| 9,795,943 B2 | 10/2017 | Chung et al. |
| 9,994,931 B2 | 6/2018 | Chon et al. |
| 10,017,838 B2 | 7/2018 | Chon et al. |

(Continued)

FOREIGN PATENT DOCUMENTS

| | | |
|---|---|---|
| AR | 092617 A1 | 4/2015 |
| CN | 87103431 A | 11/1987 |

(Continued)

OTHER PUBLICATIONS

Alberti et al. Crystalline insoluble acid salts of tetravalent metals—IX: Thorium arsenate, a new inorganic ion exchanger specific for lithium. Journal of Inorganic and Nuclear Chemistry 32:1719-1727 (1970).

An et al., Recovery of lithium from Uyuni salar brine. Hydrometallurgy 117-118:64-70 (2012).

Anisimov et al., Band theory and Mott insulators: Hubbard U instead of Stoner I Phys. Rev. B. 44:943-954 (1991).

Anisimov et al., Density-functional theory and NiO photoemission spectra. Phys. Rev. B. 48:16929-16934 (1993).

Belharouak et al. Synthesis and electrochemical analysis of vapor-deposited carbon-coated LiFePO4. Electrochemistry Communications 7(10):983-988 (2005).

(Continued)

*Primary Examiner* — Edward M Johnson
(74) *Attorney, Agent, or Firm* — WILSON SONSINI GOODRICH & ROSATI

(57) ABSTRACT

Lithium is an essential element for high-energy rechargeable batteries and other technologies. Disclosed herein are systems and processes for the extraction of lithium from liquid resources. The aforementioned systems and processes utilize ion exchange materials that selectively and reversibly bind lithium. The performance of the ion exchange materials is enhanced by the use of a chemical additive.

28 Claims, 6 Drawing Sheets

(56) References Cited

U.S. PATENT DOCUMENTS

| | | |
|---|---|---|
| 10,056,656 B2 | 8/2018 | Song |
| 10,150,056 B2 | 12/2018 | Snydacker |
| 10,322,950 B2 | 6/2019 | Snydacker et al. |
| 10,336,624 B2 | 7/2019 | Song |
| 10,392,258 B2 | 8/2019 | Song |
| 10,439,200 B2 | 10/2019 | Snydacker et al. |
| 10,450,633 B2 | 10/2019 | Lien |
| 10,478,751 B2 | 11/2019 | Chung et al. |
| 10,505,178 B2 | 12/2019 | Snydacker et al. |
| 10,604,414 B2 | 3/2020 | Featherstone et al. |
| 10,648,090 B2 | 5/2020 | Snydacker et al. |
| 10,695,694 B2 | 6/2020 | Snydacker |
| 11,253,848 B2 | 2/2022 | Snydacker |
| 11,339,457 B2 | 5/2022 | Snydacker |
| 11,358,875 B2 | 6/2022 | Snydacker et al. |
| 11,365,128 B2 | 6/2022 | Marston et al. |
| 11,377,362 B2 | 7/2022 | Snydacker et al. |
| 11,583,830 B2 | 2/2023 | Brown |
| 11,638,916 B1 | 5/2023 | Jones |
| 11,964,876 B2 | 4/2024 | Snydacker et al. |
| 11,975,317 B2 | 5/2024 | Snydacker et al. |
| 11,986,816 B2 | 5/2024 | Snydacker et al. |
| 2003/0231996 A1 | 12/2003 | Shiu et al. |
| 2004/0005267 A1 | 1/2004 | Boryta et al. |
| 2005/0139549 A1 | 6/2005 | Yoshida et al. |
| 2005/0196370 A1 | 9/2005 | Yu et al. |
| 2007/0138020 A1 | 6/2007 | Balagopal et al. |
| 2009/0013829 A1 | 1/2009 | Harris et al. |
| 2010/0116748 A1 | 5/2010 | Rasmussen et al. |
| 2011/0044882 A1 | 2/2011 | Buckley et al. |
| 2011/0067230 A1 | 3/2011 | Tan et al. |
| 2011/0174739 A1 | 7/2011 | Chung et al. |
| 2011/0203929 A1 | 8/2011 | Buckley et al. |
| 2013/0001168 A1 | 1/2013 | Kim et al. |
| 2013/0306565 A1 | 11/2013 | Davis |
| 2014/0113197 A1 | 4/2014 | Xiao et al. |
| 2014/0239221 A1 | 8/2014 | Harrison et al. |
| 2015/0013499 A1 | 1/2015 | Asano et al. |
| 2015/0083667 A1 | 3/2015 | Stouffer |
| 2015/0152523 A1 | 6/2015 | Sharma |
| 2015/0197830 A1 | 7/2015 | Chon et al. |
| 2015/0203542 A1 | 7/2015 | Bagnoli et al. |
| 2015/0258501 A1 | 9/2015 | Chung et al. |
| 2016/0115040 A1 | 4/2016 | Yi et al. |
| 2016/0161453 A1 | 6/2016 | De |
| 2016/0230250 A1 | 8/2016 | Chung et al. |
| 2016/0289154 A1 | 10/2016 | Scates et al. |
| 2017/0022617 A1 | 1/2017 | Magnan et al. |
| 2017/0028395 A1 | 2/2017 | Bewsey |
| 2017/0175228 A1 | 6/2017 | Hunwick |
| 2017/0189855 A1 | 7/2017 | Xiang et al. |
| 2017/0217796 A1 | 8/2017 | Snydacker et al. |
| 2017/0233261 A1 | 8/2017 | Sharma |
| 2017/0339286 A1 | 11/2017 | Kogure |
| 2018/0016153 A1 | 1/2018 | Sharma |
| 2018/0080133 A1 | 3/2018 | Smith |
| 2018/0133619 A1 | 5/2018 | Snydacker |
| 2018/0222760 A1 | 8/2018 | Reed |
| 2018/0245180 A1 | 8/2018 | Cheng et al. |
| 2018/0304202 A1 | 10/2018 | Kariveti |
| 2018/0318755 A1 | 11/2018 | Aines et al. |
| 2018/0339286 A1 | 11/2018 | Bazzi et al. |
| 2019/0024212 A1 | 1/2019 | Lien |
| 2019/0044126 A1 | 2/2019 | Snydacker et al. |
| 2019/0062207 A1 | 2/2019 | Jin |
| 2019/0225854 A1 | 7/2019 | Harrison et al. |
| 2019/0233297 A1 | 8/2019 | Kim et al. |
| 2019/0248667 A1 | 8/2019 | Featherstone et al. |
| 2019/0256987 A1 | 8/2019 | Snydacker et al. |
| 2019/0273245 A1 | 9/2019 | Snydacker et al. |
| 2019/0276327 A1 | 9/2019 | Brown |
| 2020/0165699 A1 | 5/2020 | Snydacker et al. |
| 2020/0189925 A1 | 6/2020 | Featherstone et al. |
| 2020/0232105 A1 | 7/2020 | Snydacker et al. |
| 2020/0289958 A1 | 9/2020 | Snydacker |
| 2020/0298207 A1 | 9/2020 | Brown |
| 2020/0399137 A1 | 12/2020 | Harrison |
| 2021/0077990 A1 | 3/2021 | Snydacker et al. |
| 2021/0206651 A1 | 7/2021 | Napier et al. |
| 2021/0222270 A1 | 7/2021 | Napier et al. |
| 2021/0300774 A1 | 9/2021 | Kim et al. |
| 2021/0346822 A1 | 11/2021 | Ireland |
| 2021/0380429 A1 | 12/2021 | Snydacker et al. |
| 2022/0055910 A1 | 2/2022 | Jariwala et al. |
| 2022/0121470 A1 | 4/2022 | Saxena et al. |
| 2022/0194796 A1 | 6/2022 | Kim et al. |
| 2022/0212184 A1 | 7/2022 | Snydacker |
| 2022/0235436 A1 | 7/2022 | Snydacker |
| 2022/0290272 A1 | 9/2022 | Kölbel et al. |
| 2022/0340440 A1 | 10/2022 | Wang |
| 2022/0348475 A1 | 11/2022 | Snydacker et al. |
| 2022/0349027 A1 | 11/2022 | Snydacker et al. |
| 2022/0372594 A1 | 11/2022 | Chon |
| 2023/0019776 A1 | 1/2023 | Bishkin |
| 2023/0047281 A1 | 2/2023 | Bhattacharyya et al. |
| 2023/0064968 A1 | 3/2023 | Smith et al. |
| 2023/0079295 A1 | 3/2023 | Matsumoto et al. |
| 2023/0381687 A1 | 11/2023 | Grosso et al. |
| 2023/0405492 A1 | 12/2023 | Snydacker |
| 2024/0017250 A1 | 1/2024 | Snydacker et al. |
| 2024/0026495 A1 | 1/2024 | Snydacker et al. |
| 2024/0216905 A1 | 7/2024 | Snydacker et al. |
| 2024/0217832 A1 | 7/2024 | Snydacker et al. |

FOREIGN PATENT DOCUMENTS

| | | |
|---|---|---|
| CN | 101764209 A | 6/2010 |
| CN | 101961634 A | 2/2011 |
| CN | 102872792 A | 1/2013 |
| CN | 103276406 A | 9/2013 |
| CN | 103794779 A | 5/2014 |
| CN | 104577243 A | 4/2015 |
| CN | 105238927 A | 1/2016 |
| CN | 105251436 A | 1/2016 |
| CN | 105289455 A | 2/2016 |
| CN | 205151853 U | 4/2016 |
| CN | 105555978 A | 5/2016 |
| CN | 106311190 A | 1/2017 |
| CN | 106622103 A | 5/2017 |
| CN | 106673023 A | 5/2017 |
| CN | 107043116 A | 8/2017 |
| CN | 107915239 A | 4/2018 |
| CN | 107949541 A | 4/2018 |
| CN | 209123481 U | 7/2019 |
| DE | 102016212048 A1 | 1/2018 |
| EP | 0551002 A1 | 7/1993 |
| EP | 2945211 B1 | 11/2018 |
| FR | 3034781 A1 | 10/2016 |
| JP | H0626661 B2 | 4/1994 |
| JP | H08236114 A | 9/1996 |
| JP | 2002167626 A | 6/2002 |
| JP | 2003500318 A | 1/2003 |
| JP | 2004230215 A | 8/2004 |
| JP | 2005078800 A | 3/2005 |
| JP | 2005296811 A | 10/2005 |
| JP | 2006159039 A | 6/2006 |
| JP | 2009507839 A | 2/2009 |
| JP | 2010042395 A | 2/2010 |
| JP | 2014055312 A | 3/2014 |
| JP | 2015020090 A | 2/2015 |
| JP | 5898021 B2 | 4/2016 |
| JP | 2017131863 A | 8/2017 |
| JP | 2018535309 A | 11/2018 |
| JP | 2019099874 A | 6/2019 |
| KR | 20120015658 A | 2/2012 |
| KR | 20120063069 A | 6/2012 |
| KR | 20120063424 A | 6/2012 |
| KR | 20140082065 A | 7/2014 |
| KR | 20160126314 A | 11/2016 |
| WO | WO-2010035956 A2 | 4/2010 |
| WO | WO-2010056322 A1 | 5/2010 |
| WO | WO-2010103173 A1 | 9/2010 |
| WO | WO-2011133165 A1 | 10/2011 |
| WO | WO-2012005545 A2 | 1/2012 |

(56) References Cited

FOREIGN PATENT DOCUMENTS

| | | |
|---|---|---|
| WO | WO-2014047347 A1 | 3/2014 |
| WO | WO-2015121684 A1 | 8/2015 |
| WO | WO-2015123762 A1 | 8/2015 |
| WO | WO-2015171109 A1 | 11/2015 |
| WO | WO-2016064689 A2 | 4/2016 |
| WO | WO-2016172017 A1 | 10/2016 |
| WO | WO-2017005113 A1 | 1/2017 |
| WO | WO-2017020090 A1 | 2/2017 |
| WO | WO-2017039724 A1 | 3/2017 |
| WO | WO-2017136328 A1 | 8/2017 |
| WO | WO-2017137885 A1 | 8/2017 |
| WO | WO-2018089932 A1 | 5/2018 |
| WO | WO-2018129949 A1 | 7/2018 |
| WO | WO-2019000095 A1 | 1/2019 |
| WO | WO-2019028148 A1 | 2/2019 |
| WO | WO-2019028174 A2 | 2/2019 |
| WO | WO-2019126862 A1 | 7/2019 |
| WO | WO-2019160982 A1 | 8/2019 |
| WO | WO-2019168941 A1 | 9/2019 |
| WO | WO-2019221932 | 11/2019 |
| WO | WO-2021142147 A1 | 7/2021 |
| WO | WO-2021204375 A1 | 10/2021 |
| WO | WO-2021212214 A1 | 10/2021 |
| WO | WO-2021252381 A1 | 12/2021 |
| WO | WO-2022084145 A1 | 4/2022 |
| WO | WO-2022109156 A1 | 5/2022 |
| WO | WO-2022226219 A1 | 10/2022 |
| WO | WO-2022260542 A1 | 12/2022 |
| WO | WO-2023019184 A1 | 2/2023 |
| WO | WO-2023081448 A1 | 5/2023 |
| WO | WO-2023192192 A1 | 10/2023 |
| WO | WO-2023192195 A1 | 10/2023 |
| WO | WO-2023192623 A2 | 10/2023 |
| WO | WO-2023205073 A1 | 10/2023 |
| WO | WO-2023215313 A1 | 11/2023 |
| WO | WO-2024077269 A2 | 4/2024 |
| WO | WO-2024112604 A2 | 5/2024 |

OTHER PUBLICATIONS

Blochl., Projector augmented-wave method. Phys. Rev. B 50:17953 (1994).

Bretti et al., SIT parameters for 1: 1 electrolytes and correlation with Pitzer coefficients. J Solution Chem 35:1401-1415 (2006).

Chitrakar et al., A New Type of Manganese Oxide (MnO2.0.5H2O) Derived from Li1.6Mn1.6O4 and Its Lithium Ion-Sieve Properties. Chem. Mater. 12:3151-3157 (2000).

Chitrakar et al. Lithium recovery from salt lake brine by H2TiO3. Dalton Trans 43:8933-8939 (2014).

Chitrakar et al. Selective Uptake of Lithium Ion from Brine by H1.33Mn1.67O4 and H1.6Mn1.6O4. Chem Lett 41:1647-1649 (2012).

Cho et al. High-Performance ZrO2-Coated LiNiO2 Cathode Material. Electrochem Solid-State Lett 4(10):A159-A161 (2001).

Co-pending U.S. Appl. No. 18/199,494, inventor Snydacker; David Henry, filed May 19, 2023.

Co-pending U.S. Appl. No. 18/200,306, inventor Snydacker; David Henry, filed May 22, 2023.

Co-pending U.S. Appl. No. 18/365,090, inventors Grosso; Giordano Nicolas Andres et al., filed Aug. 3, 2023.

Co-pending U.S. Appl. No. 18/476,195, inventors Snydacker; David Henry et al., filed Sep. 27, 2023.

Co-pending U.S. Appl. No. 18/477,278, inventors Snydacker; David Henry et al., filed Sep. 28, 2023.

Department of Energy. Ion Exchange Materials for Lithium Extraction (Topic: 15, Subtopic: e)—Abstract. Available at https://www.sbir.gov/sbirsearch/detail/1307793 (3 pgs.) (2017).

Dlamini et al. Polymeric ion exchanger supported ferric oxide nanoparticles as adsorbents for toxic metal ions from aqueous solutions and acid mine drainage. J Environ Health Sci Eng 17(2):719-730 (2019).

Doan et al. Preparation of carbon coated LiMnPO"4 powders by a combination of spray pyrolysis with dry ball-milling followed by heat treatment. Advanced Powder Technology 21(2):187-196 (2010).

Dudarev et al., Electron-energy-loss spectra and the structural stability of nickel oxide: An LSDA+U study. Phys. Rev. B. 57:1505-1509 (1998).

Endres et al., Extraction of lithium from spinel phases of the system Li1+xMn2-xO4-d. Journal of Power Sources 69:145-156 (1997).

Grindy et al., Approaching chemical accuracy with density functional calculations: Diatomic energy corrections. Phys. Rev. B. 87:075150 (2013).

Hoshino., Innovative lithium recovery technique from seawater by using world-first dialysis with a lithium ionic superconductor. Desalination 359:59-63 (2014).

Hoshino., Lithium Recovery Technology for Stably Supplying Fuel to Fusion Reactors: World-First Dialysis Technique for Lithium Recovery from Seawater, JAEA R&D Review (pp. 116) (2015).

Hui et al., Preparation of new lithium adsorbents. Inorganic Chemicals Industry, Feb. 2014 (English abstract).

Jain et al. Commentary: The Materials Project: A materials genome approach to accelerating materials innovation. APL Mater. 1:011002-11 (2013).

Jain et al. Formation enthalpies by mixing GGA and GGA + U calculations. Phys. Rev. B 84:045115 (2011).

Jiang. Synthesis of Spinel Li2MnO3 and Its Ion-exchange Property for Li+. Advanced Materials Research 554-556:860-863 (Jul. 2012).

Kesler et al. Global lithium resources: Relative importance of pegmatite, brine and other deposits. Ore Geology Reviews 48:55-69 (2012).

Kirklin et al., The Open Quantum Materials Databse (OQMD): assessing the accuracy of DFT formation energies. Nature Publishing Group 1:1-15 (2015).

Kresse et al., Ab Initio Molecular Dynamics for Liquid Metals. Phys. Rev. B 7:558-561 (1993).

Kresse et al., Ab initio molecular-dynamics simulation of the liquid-metal-amorphous-semiconductor transition in germanium. Phys. Rev. B. 49:14251-14269 (1994).

Kresse et al., Efficiency of ab-initio total energy calculations for metals and semiconductors using a plane-wave basis set. Computational Materials Science 6(1):15-50(1996).

Kresse et al., Efficient iterative schemes for ab initio total-energy calculations using a plane-wave basis set. Phys Rev B Condens Matter 54(16):11169-11186 (1996).

Kresse et al., From ultrasoft pseudopotentials to the projector augmented-wave method. Phys. Rev. B. 59:1758-1774 (1999).

Larumbe et al. Effect of a SiO2 coating on the magnetic properties of Fe3O4 nanoparticles. J Phys Condens Matter 24(26):266007 (2012).

Liechtenstein et al., Density-functional theory and strong interactions: Orbital ordering in Mott-Hubbard insulators. Phys. Rev. B 52:5467-5470 (1995).

Liu et al. Recent developments in electrolytic devices for ion chromatography. J Biochem Biophys Methods 60(3):205-232 (2004).

Lu et al. Soft chemical synthesis and adsorption properties of MnO2 center dot 0.5H(2)O, a high performance ion sieve for lithium. Acta Chimica Sinica 65(12):1135-1139 (2007).

Meshram et al., Extraction of lithium from primary and secondary sources by pre-treatment, leaching and separation: A comprehensive review. Hydrometallurgy 150:192-208 (2014).

Miyai et al. Bench scale studies on lithium recovery from sea water. Nippon Kaisui Gakkai-Shi—Bulletin Of The Society Of Sea Waterscience, Japan 49(4):226-230 (1995) (English Abstract).

Nishihama et al. Selective recovery process of lithium from seawater using integrated ion exchange methods. Solvent Extraction and Ion Exchange 29:421-431 (2011).

Oh et al. Double Carbon Coating of LifePO4 as High Rate Electrode for Rechargeable Lithium Batteries. Adv. Mater. 22:4842-4845 (2010).

Ong et al., Li—Fe—P—O2 phase diagram from first principles calculations. Chem. Mater., 20:1798-1807 (2008).

Onodera et al., Preparation method and lithium adsorption propety of LAMBDA.-MnO2-silica composite. Chem. Lett., 19(10):1801-1804 (1990).

(56) References Cited

OTHER PUBLICATIONS

Ooi et al., Mechanism of lithium (1+) insertion in spinel-type manganese oxide. Redox and ion-exchange reactions. Langmuir 7:1167-1171 (1991).
Pareja et al. Corrosion behaviour of zirconia barrier coatings on galvanized steel. Surface and Coatings Technology 200(22-23):6606-6610 (2006).
Patel et al. Ionic and electronic conductivities of atomic layer deposition thin film coated lithium ion battery cathode particles. RSC Advances 6:98768-98776 (2016).
PCT/US2017/015790 International Search Report and Written Opinion dated Apr. 20, 2017.
PCT/US2017/061384 International Search Report and Written Opinion dated Feb. 14, 2018.
PCT/US2018/044821 International Search Report and Written Opinion dated Oct. 12, 2018.
PCT/US2018/044868 International Search Report and Written Opinion dated Mar. 6, 2019.
PCT/US2019/017885 International Search Report and Written Opinion dated Jun. 14, 2019.
PCT/US2019/019780 International Search Report and Written Opinion dated Jun. 14, 2019.
PCT/US2021/012534 International Search Report and Written Opinion dated Apr. 27, 2021.
PCT/US2021/036227 International Search Report and Written Opinion dated Nov. 2, 2021.
PCT/US2021/059921 International Search Report and Written Opinion dated Mar. 14, 2022.
PCT/US2022/025810 International Search Report and Written Opinion dated Sep. 30, 2022.
PCT/US2022/025810 Invitation to Pay Additional Fees dated Jul. 5, 2022.
PCT/US2023/016438 International Search Report and Written Opinion dated Jun. 27, 2023.
PCT/US2023/016443 International Search Report and Written Opinion dated Jul. 25, 2023.
PCT/US2023/017172 International Search Report and Written Opinion dated Sep. 19, 2023.
PCT/US2023/018806 International Search Report and Written Opinion dated Jun. 30, 2023.
PCT/US2023/020726 International Search Report and Written Opinion dated Aug. 25, 2023.
Perdew et al. Generalized gradient approximation made simple. Phys. Rev. Lett. 77:3865-3868 (1996).
Reichel et al. Lithium recovery from lithium-containing micas using sulfur oxidizing microorganisms. Minerals Engineering 106:18-21 (2017).
Rioyo et al. Lithium Extraction from Spodumene by the Traditional Sulfuric Acid Process: A Review. Mineral Processing and Extractive Metallurgy Review 43(1):97-106 (2020).
Saal et al., Materials Design and Discovery with High-Throughput Density Functional Theory: The Open Quantum Materials Database (OQMD). JOM 65:1501-1509 (2013).
Schultze et al. Recovering Lithium Chloride From a Geothermal Brine. US Department of the Interior, Bureau of Mines. vol. 8883 (18 pgs) (1984).
Swain., Recovery and recycling of lithium: A review, Separation and Purification Technology 172:388-40 (2016).
Tarakina et al. Defect crystal structure of new TiO(OH)2 hydroxide and related lithium salt Li2TiO3. Dalton Trans 39:8168-8176 (2010).
Thackeray et al., Li 2 MnO 3-stabilized LiMO 2 (M=Mn, Ni, Co) electrodes for lithium-ion batteries. J Mat Chem., 17:3112 (2007).
Umeno et al. Preparation and Adsorptive Properties of Membrane-Type Adsorbents for Lithium Recovery from Seawater. Ind Eng Chem Res 41(17):4281-4287 (2002).
Xiao et al. Adsorption and desorption behavior of lithium ion in spherical PVC-MnO2 ion sieve. Industrial & engineering chemistry research, 51(33):10921-10929 (2012).
Xiao et al. Lithium ion recovery from brine using granulated polyacrylamide-MnO 2 ion-sieve. Chemical Engineering Journal 279:659-666 (2015).
Xie et al. Preparation and Lithium Extraction of Li1.6Mn1.6O4/PVDF Porous Film. Chinese Journal of Chemical Engineering pp. 1-3 2014) Retrieved from the Internet: URL:https://d.wanfangdata.com.cn/periodical/ChIQZXJpb2RpY2FsQ0hJTmV3UzlwMjlwND E1Eg1oZ3hiMjAxNDAxMDMxG ghva3phOTI2ZQ°/O3D°/O3D.
Xu et al. Extraction of lithium with functionalized lithium ion-sieves. Progress in Materials Science 84:276-313 (2016).
Yang et al., TiO2 Coating Modification for Lithium Ion Sieve. Material Reports 31:435-438 (2017) (English Abstract).
Zaghib et al. Safe and fast-charging Li-ion battery with long shelf life for power applications. J Power Sources 196:3949-3954 (2011).
Zandvakili et al. Preparation and characterisation of lithium ion exchange composite for the recovery of lithium from brine. Mineral Processing and Extractive Metallurgy 127(3):176-181 (2017).
Zhang et al. Li2SnO3 derived secondary Li—Sn alloy electrode for lithium-ion batteries. J. Alloys Compd. 415:229-233 (2006).
Zhu et al. Adsorption and desorption properties of Li+ on PVC-H1.6Mn1.6O4 lithium ion-sieve membrane. Chemical Engineering Journal 235:340-348 (2014).
Co-pending U.S. Appl. No. 18/484,213, inventors Snydacker; David Henry et al., filed Oct. 10, 2023.
Co-pending U.S. Appl. No. 18/484,217, inventors Snydacker; David Henry et al., filed Oct. 10, 2023.
Anonymous. Pure Energy Minerals Reports High Lithium Recoveries From Successful Mini-Pilot Testing Campaign. (Dec. 13, 2016) Retrieved from the Internet: URL:https://pureenergyminerals.com/pure-energy-minerals-reports-high-lithium-recoveries-from-successful-mini-pilot/.
Molnar et al. Preliminary Economic Assessment (Rev. 1) of the Clayton Valley Lithium Project. (Jan. 28, 2019) Retrieved from the Internet: URL:https://wp-pureenergyminerals-2023.s3.ca-central-I.amazonaws.com/media/2018/04/PureEnergy_ClaytonValleyPEA_Rev1_23March2018.pdf.
PCT/US2023/080369 International Invitation to Pay Additional Fees dated Jan. 26, 2024.
Renew et al. Geothermal Thermoelectric Generation (G-TEG) with Integrated Temperature Driven Membrane Distillation and Novel Manganese Oxide for Lithium Extraction. (Jun. 1, 2017) Retrieved from the Internet: URL:https://www.osti.gov/servlets/purl/1360976.
Co-pending U.S. Appl. No. 18/410,549, inventor Snydacker; David Henry, filed Jan. 11, 2024.
Co-pending U.S. Appl. No. 18/441,779, inventors Snydacker; David Henry et al., filed Feb. 14, 2024.
Herrmann, Laura., et al., Lithium recovery from geothermal brine—an investigation into the desorption of lithium ions using manganese oxide adsorbents. Energy Adv 1: 877-885 (2022).
PCT/US2023/076285 International Search Report and Written Opinion dated Mar. 13, 2024.
Song et al. Lithium extraction from Chinese salt-lake brines: opportunities, challenges, and future outlook. Environ. Sci.: Water Res. Technol., 3:593-597 (2017).
AAT Bioquest. Sodium Borate Buffer (1 M, pH 8.5) Preparation and Recipe :pp. 1-4 (2018). Retrieved from Internet URL: https://www.aatbio.com/resources/buffer-preparations-and-recipes/sodium-borate-buffer-ph-8-5. Retrieved from the Internet on Jun. 7, 2024.
PCT/US2023/080369 International Search Report and Written Opinion dated May 3, 2024.
PCT/US2024/025420 International Search Report and Written Opinion dated Jul. 26, 2024.
Shin, Junho et al. Preparation of lithium carbonate from waste lithium solution through precipitation and wet conversion methods. Hydrometallurgy 210:105863 (pp. 1-9) (2022).

EXTRACTION OF LITHIUM WITH CHEMICAL ADDITIVES

CROSS-REFERENCE

This application is a continuation of International Application No. PCT/US2023/017172, filed on Mar. 31, 2023, which claims the benefit of U.S. Provisional Application Ser. No. 63/326,734 filed Apr. 1, 2022, each of which is incorporated herein by reference in their entirety.

BACKGROUND OF THE DISCLOSURE

Lithium is an essential element for high-energy rechargeable batteries and other technologies. Lithium can be found in a variety of liquid solutions, including natural and synthetic brines and leachate solutions from minerals and recycled products.

SUMMARY OF THE DISCLOSURE

In an aspect, disclosed herein is a process for extracting lithium from a liquid resource, comprising: contacting a chemical additive with said liquid resource, a wash solution, an acidic solution, an ion exchange material, or any combination thereof, wherein the chemical additive adjusts the oxidation-reduction potential of said liquid resource, said wash solution, said acidic solution, said ion exchange material, or any combination thereof, to a value that is about −500 mV to about 1,300 mV versus standard hydrogen electrode; contacting said ion exchange material to said liquid resource, wherein said ion exchange material absorbs lithium ions from said liquid resource; and contacting said acidic solution to said ion exchange material, wherein said ion exchange material releases the absorbed lithium into the acidic solution to yield a lithium eluate.

In another aspect, disclosed herein is a system for extracting lithium from a liquid resource, comprising: a first subsystem configured to contact an ion exchange material to a liquid resource, wherein said ion exchange material absorbs lithium ions from said liquid resource; a second subsystem configured to contact an acidic solution to said ion exchange material, wherein said ion exchange material releases the absorbed lithium into the acidic solution to yield a lithium eluate; and a third subsystem configured to contact a chemical additive with said liquid resource, a wash solution, said acidic solution, said ion exchange material, or any combination thereof, wherein the chemical additive adjusts the oxidation-reduction potential of said liquid resource, said wash solution, said acidic solution, said ion exchange material, or any combination thereof, to a value that is about −500 mV to about 1,300 mV versus standard hydrogen electrode.

In another aspect, disclosed herein is use of a system disclosed herein for the extraction of lithium ions from a liquid resource.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 16A illustrates a filter press comprising filter plates stacked together; FIG. 16B illustrates the face of a filter bank; and FIG. 16C illustrates the interior of the filter banks.

DETAILED DESCRIPTION OF THE DISCLOSURE

Figure 1:
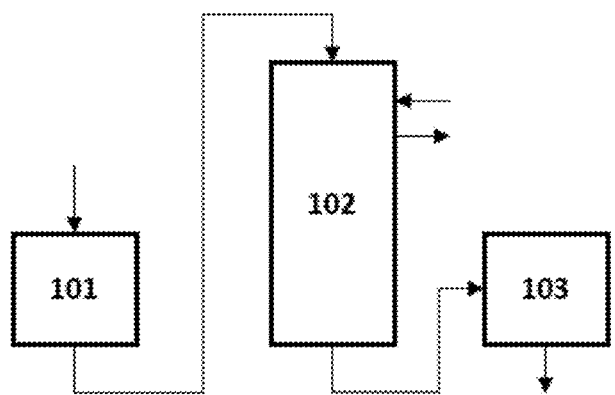
FIG. 1 illustrates a lithium extraction system, wherein a liquid resource comprising lithium is treated with sodium metabisulfite.

The terms "lithium", "lithium ion", and "$Li^+$" are used interchangeably in the present specification and these terms are synonymous unless specifically noted to the contrary. The terms "hydrogen", "hydrogen ion", "proton", and "H$^+$" are used interchangeably in the present specification and these terms are synonymous unless specifically noted to the contrary.

As used herein, the words "column" and "vessel" are used interchangeably. In some embodiments described herein referring to a "vessel", the vessel is a column. In some embodiments described herein referring to a "column", the column is a vessel.

The term "the pH of the system" or "the pH of" a component of a system, for example one or more tanks, vessels, columns, pH modulating setups, or pipes used to establish fluid communication between one or more tanks, vessels, columns, or pH modulating setups, refers to the pH of the liquid medium contained or present in the system, or contained or present in one or more components thereof. In some embodiments, the liquid medium contained in the system, or one or more components thereof, is a liquid resource. In some embodiments, the liquid medium contained in the system, or one or more components thereof, is a brine. In some embodiments, the liquid medium contained in the system, or one or more components thereof, is an acid solution, an aqueous solution, a wash solution, a salt solution, a salt solution comprising lithium ions, or a lithium-enriched solution.

The term "mother liquor," as used herein, is a liquid byproduct of a process for the generation of solid lithium carbonate from a lithium-containing solution. Mother liquor as described herein is an aqueous solution that comprises lithium and additional salts.

Lithium is an essential element for batteries and other technologies. Lithium is found in a variety of liquid resources, including natural and synthetic brines and leachate solutions from minerals, clays, and recycled products. Lithium is optionally extracted from such liquid resources using an ion exchange process based on inorganic ion exchange materials. These inorganic ion exchange materials absorb lithium from a liquid resource while releasing hydrogen, and then elute lithium in acid while absorbing hydrogen. This ion exchange process is optionally repeated to extract lithium from a liquid resource and yield a concentrated lithium solution. The concentrated lithium solution is optionally further processed into chemicals for the battery industry or other industries.

In some embodiments of the systems and methods and processes disclosed herein, an ion exchange material is contacted with a liquid resource comprising lithium. The lithium in the liquid resource is absorbed by the ion exchange material to yield an enriched ion exchange material. In some embodiments, the enriched ion exchange material contains a higher lithium content then the ion exchange material. In some embodiments, the ion exchange material is a protonated ion exchange material. In some embodiments, the protonated ion exchange material is contacted with a liquid resource comprising lithium. The lithium in the liquid resource is absorbed via an ion exchange process to yield a lithiated ion exchange material. In some cases, the terms "enriched ion exchange material" and "lithiated ion exchange material" are used interchangeably.

In some embodiments, the chemical formula of the ion exchange material may vary throughout the ion exchange systems and processes described herein in terms of hydrogen and lithium stoichiometries, as the ion exchange materials readily exchange lithium and hydrogen depending on the aqueous solutions and gases that the ion exchange material is exposed to. In addition, fully lithiated or fully protonated ion exchange materials may not be the most stable form of the material, and is therefore commercially sold as another form. For example, many commercially available ion exchange materials benefit from an activation step or an initial treatment in which the material is wetted and activated with an acid wash to produce an ion exchange material that is in an ideal state for lithium absorption (termed pre-activated ion exchange materials herein). In some embodiments, the term "protonated ion exchange material" refers to material that has been activated and is capable of absorbing lithium. In some embodiments, the protonated ion exchange material is at least partially protonated. In some embodiments, the protonated ion exchange material is fully protonated. Following exposure to a liquid resource comprising lithium, the protonated ion exchange material absorbs lithium and releases hydrogen to form the lithiated ion exchange material. The stoichiometries of the ion exchange material and the lithiated ion exchange material may vary with both the lithium concentration of the liquid resource and the pH of the acidic solution. Therefore, in some embodiments, the material is in part best described by the solution or alternate phase the material has been exposed to most recently. As such, the term "ion exchange material" is meant to include the various states that the material may exist as throughout the ion exchange and preparatory process. In some embodiments, an ion exchange material comprises a protonated ion exchange material, a lithiated ion exchange material, and a pre-activated ion exchange material.

In some embodiments, the ion exchange material may benefit from an activation process. An ion exchange material that benefits from an activation process is termed "pre-activated ion exchange material." In some embodiments, the pre-activated ion exchange material is selected from an oxide, a phosphate, an oxyfluoride, a fluorophosphate, and combinations thereof. In some embodiments, the pre-activated ion exchange material is selected $Li_4Mn_5O_{12}$, $Li_4Ti_5O_{12}$, $Li_2MO_3$ (M=Ti, Mn, Sn), $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl \cdot xAl(OH)_3 \cdot yH_2O$, $SnO_2 \cdot xSb_2O_5 \cdot yH_2O$, $TiO_2 \cdot xSb_2O_5 \cdot yH_2O$, solid solutions thereof, and combinations thereof. In some embodiments, the pre-activated ion exchange material is selected from the following list: $Li_4Mn_5O_{12}$, $Li_4Ti_5O_{12}$, $Li_{1.6}Mn_{1.6}O_4$, $Li_2MO_3$ (M=Ti, Mn, Sn), $LiFePO_4$, solid solutions thereof, or combinations thereof.

In some embodiments, the processes described herein utilize ion exchange materials that are exposed to a liquid resource and an acidic solution over the course of two or more cycles. The ion exchange material may be protonated ion exchange material following exposure to an acidic solution and subsequently yield a lithiated ion exchange material following exposure to a liquid resource. Although the ion exchange materials described herein are expressed as compounds with discrete stoichiometries, it should be understood that variable amounts of lithium ions and hydrogen ions are envisioned in each ion exchange material during the cyclic ion exchange processes described herein. For example, the ion exchange material $Li_4Ti_5O_{12}$ may be $Li_4Ti_5O_{12}$, $Li_3HTi_5O_{12}$, $Li_2H_2Ti_5O_{12}$, $LiH_3Ti_5O_{12}$, or $H_4Ti_5O_{12}$. Combinations of such states are also envisioned, and may be expressed as averages, for example $Li_{2.1}H_{1.9}Ti_5O_{12}$, $Li_{2.2}H_{1.8}Ti_5O_{12}$, $Li_{2.3}H_{1.7}Ti_5O_{12}$, $Li_{2.4}H_{1.6}Ti_5O_{12}$, etc. Applicant envisions that the ion exchange materials listed below comprise the chemical entity listed, each compound that replaces one lithium ion for one hydrogen ion, and any combination of such states: $Li_4Mn_5O_{12}$, $Li_4Ti_5O_{12}$, $Li_2MO_3$ (M=Ti, Mn, Sn), $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $LiFePO_4$, $LiMnPO_4$, and $Li_2CuP_2O_7$.

In some embodiments, ion exchange material comprises a chemical compound capable of exchanging lithium and hydrogen ions. In some embodiments, ion exchange material comprises a chemical compound capable of ion exchange of lithium and hydrogen, wherein the ion exchange material will uptake lithium selectively as opposed to uptaking other metals or metal ions (e.g., sodium, potassium, magnesium, other metal ions present in liquid resources). In some embodiments, ion exchange material is in the form of ion exchange particles. In some embodiments, ion exchange material or ion exchange beads comprise a coating material. In some embodiments, ion exchange material or ion exchange beads do not comprise a coating material. In some embodiments, ion exchange material is in the form of ion exchange beads. In some embodiments, ion exchange beads are porous. Embodiments of the present disclosure directed to "ion exchange beads" shall be understood to also be directed to "ion exchange material" unless specified otherwise. Embodiments of the present disclosure that specify use of "ion exchange beads" may also operably use "ion exchange material" unless specified otherwise.

Ion exchange beads, including ion exchange particles, ion exchange material, ion exchange media, porous ion exchange beads, and/or coated ion exchange particles, are loaded into ion exchange vessels. Alternating flows of brine (e.g., a liquid resource), acid, and other solutions are optionally flowed through an ion exchange column or vessel to extract lithium from the brine and produce a lithium concentrate, which is eluted from the column or vessel using the acid. As brine flows through the ion exchange column or vessel, the beads absorb lithium while releasing hydrogen, where both the lithium and hydrogen are cations. After the beads have absorbed lithium, acid is used to elute the lithium from the ion exchange beads to produce an eluate or lithium-enriched solution.

In some embodiments, ion exchange material comprises a chemical compound capable of ion exchange of lithium and hydrogen. In some embodiments, ion exchange material comprises a chemical compound capable of ion exchange of lithium and hydrogen, wherein the ion exchange material will uptake lithium selectively as opposed to uptaking other metals or metal ions (e.g., sodium, potassium, magnesium, other metal ions present in liquid resources). In some embodiments, ion exchange material comprises a lithium selective ion exchange material. In some embodiments, ion exchange material is in the form of ion exchange particles. In some embodiments, ion exchange material is in the form of ion exchange beads. In some embodiments, ion exchange beads are porous. In some embodiments, ion exchange particles or ion exchange beads comprise a coating material. In some embodiments, ion exchange particles or ion exchange beads do not comprise a coating material.

Ion exchange beads may have small diameters less than about one millimeter causing a high pressure difference across a packed bed of the beads during pumping of the liquid resource and other fluids through the bed. To minimize pressure across the packed bed and to minimize associated pumping energy, vessels with optimized geometries can be used to reduce the flow distance through the packed bed of ion exchange beads. These vessels may be networked with pH modulation units to achieve adequate control of the pH of the liquid resource.

In some embodiments a network of vessels loaded with ion exchange materials may comprise two vessels, three vessels, four vessels, five vessels, six vessels, seven vessels, eight vessels, nine vessels, 10 vessels, 11 vessels, 12 vessels, 13-14 vessels, 15-20 vessels, 20-30 vessels, 30-50 vessels, 50-70 vessels, 70-100 vessels, or more than 100 vessels.

The concentrated lithium solution is an aqueous solution comprising lithium and other dissolved ions. Said concentrated lithium solution is produced by treatment of an ion exchange material that has absorbed lithium with an acidic eluent to produce an eluent. Said eluent is acidic and contains lithium in combination with other cations and anions that are present in the liquid resource from which lithium is extracted. Said eluent is contacted with ion exchange material in one or more of the aforementioned ion exchange vessels to produce an eluate. Said eluate is stored in one or more different vessels that are part of an ion exchange network.

The type and concentration of lithium and other ions in solution vary depending on the liquid resource from which lithium is extracted. The pH of the eluate can be adjusted following elution by treatment with other acidic or basic substances. The eluate can be further treated and subjected to other separation processes to result in a changed relative concentration of lithium and other ions. The eluate can further be diluted or concentrated to result in varying concentrations of lithium and other ions.

The performance of the ion exchange process and associated ion exchange material can be measured by the durability, service life, cycle life, or combinations thereof of the ion exchange material used for lithium extraction by ion exchange. This durability, service life, or cycle life is quantified by the total service time, total amount of lithium carbonate equivalents produced per amount of ion exchange material over said service life, total number of lithium absorption-desorption ion exchange cycles that the ion exchange material can undergo before replacements, or combinations thereof. The performance of the ion exchange process and associated ion exchange material can also be measured by the cation purity of the synthetic lithium eluate produced by the ion exchange material. The performance of the ion exchange process and associated ion exchange material can also be measured by amount of lithium that is absorbed by the ion exchange material in each cycle. The performance of the ion exchange process and associated ion exchange material can also be measured by quantity of ion exchange material dissolved in the synthetic lithium eluate. The performance of the ion exchange process and associated ion exchange material can also be measured by quantity of ion exchange material present in the solid phase that is most active phase. In the embodiments of the disclosure provided herein, one or more of these metrics are used to assess the performance of the ion exchange system and associated process.

Maximizing the performance of the ion exchange is advantageous for lithium production by ion exchange. Disclosed herein is a system, and associated methods and processes, for maximizing the performance of ion exchange by use of a chemical additive. In some embodiments, said chemical additive is contacted with an ion exchange material, a lithiated ion exchange material, a liquid resource from which lithium is extracted, a acidic eluate used to elute lithium, water used for washing of the ion exchange material, or a combination thereof. In some embodiments, the use of said chemical additive results in an improved ion exchange performance, as compared to the case when said chemical additive is not used.

In some embodiments, said chemical additive is a redox agent, which adjusts the oxidation-reduction potential of a liquid. As used herein, the terms "oxidation-reduction potential", "redox potential", and "ORP" are used interchangeably. As used herein, the oxidation-reduction potential refers to the potential measured in volts (V) or millivolts (mV) with reference to a reference electrode. As used herein, values of oxidation-reduction potential are referenced to the standard hydrogen electrode. In some embodiments, oxidation-reduction potential is a measure of the tendency for chemical species to acquire or lose electrons. In some embodiments, oxidation-reduction potential is a measure of the tendency for chemical species to acquire or lose electrons in the measured chemical environments. In some embodiments, oxidation-reduction potential is a local property located on the surface of a chemical species, different from its bulk properties. In some embodiments, the chemical additive is an oxidant or a reductant. In some embodiments, an oxidant increases the oxidation-reduction potential. In some embodiments, a reductant decreases the oxidation-reduction potential.

Exemplary embodiments of the present disclosure include devices and methods for using a chemical additive, such as a redox agent, for improving and maximizing the performance of an ion exchange material to produce lithium via ion exchange.

The Liquid Resource

In some embodiments, the liquid resource is selected from the following list: a natural brine, a dissolved salt flat, a geothermal brine, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from sediments, leachate from recycled products, leachate from recycled materials, or combinations thereof. In some embodiments, a liquid resource is selected from the following list: a natural brine, a dissolved salt flat, a concentrated brine, a processed brine, a synthetic brine, a geothermal brine, liquid from an ion exchange process, liquid from a solvent extraction process, leachate from minerals, leachate from clays, leachate from recycled products, leachate from recycled materials, or combinations thereof. Accordingly, embodiments of the disclosure directed to "brine" are also operably directed to "liquid resource" as defined herein unless specified otherwise. In some embodiments, the liquid resource is optionally pre-treated prior to entering the ion exchange reactor to remove suspended solids, hydrocarbons, organic molecules, iron, certain metals, or other chemical or ionic species. In some embodiments, the liquid resource is optionally fed into the ion exchange reactor without any pre-treatment following from its source. In some embodiments, the liquid resource is injected into a reservoir, salt lake, salt flat, basin, or other geologic deposit after lithium has been removed from the liquid resource. In some embodiments, other species are recovered from the liquid resource before or after lithium recovery. In some embodiments, the pH of the liquid resource is adjusted before, during, or after lithium recovery.

In one embodiment, the liquid resource is a natural brine, a dissolved salt flat, seawater, concentrated seawater, a geothermal brine, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

In one embodiment, the brine is at a temperature of −20 to 20 degrees Celsius, 20 to 50 degrees Celsius, 50 to 100 degrees Celsius, 100 to 200 degrees Celsius, or 200 to 400 degrees Celsius. In one embodiment, the brine is heated or cooled to precipitate or dissolve species in the brine, or to facilitate removal of metals from the brine.

In one embodiment, the brine contains lithium at a concentration of less than 1 mg/L, 1 to 50 mg/L, 50 to 200 mg/L, 200 to 500 mg/L, 500 to 2,000 mg/L, 2,000 to 5,000 mg/L, 5,000 to 10,000 mg/L, 10,000 to 20,000 mg/L, 20,000 to 80,000 mg/L, or greater than 80,000 mg/L.

In one embodiment, the brine contains magnesium at a concentration of 0.01 to 0.1 mg/L, 0.1 to 1 mg/L, 1 to 10 mg/L, 10 to 100 mg/L, 100 to 1,000 mg/L, 1,000 to 10,000 mg/L, 10,000 to 50,000 mg/L, 50,000 to 100,000 mg/L, 100,000 to 150,000 mg/L, or greater than 150,000 mg/L. In one embodiment, the brine contains calcium at a concentration of 0.01 to 0.1 mg/L, 0.1 to 1 mg/L, 1 to 10 mg/L, 10 to 100 mg/L, 100 to 1,000 mg/L, 1,000 to 10,000 mg/L, 10,000 to 50,000 mg/L, 50,000 to 100,000 mg/L, 100,000 to 150,000 mg/L, or greater than 150,000 mg/L. In one embodiment, the brine contains strontium at a concentration of 0.01 to 0.1 mg/L, 0.1 to 1 mg/L, 1 to 10 mg/L, 10 to 100 mg/L, 100 to 1,000 mg/L, 1,000 to 10,000 mg/L, 10,000 to 50,000 mg/L, 50,000 to 100,000 mg/L, 100,000 to 150,000 mg/L, or greater than 150,000 mg/L. In one embodiment, the brine contains barium at a concentration of 0.01 to 0.1 mg/L, 0.1 to 1 mg/L, 1 to 10 mg/L, 10 to 100 mg/L, 100 to 1,000 mg/L, 1,000 to 10,000 mg/L, 10,000 to 50,000 mg/L, 50,000 to 100,000 mg/L, 100,000 to 150,000 mg/L, or greater than 150,000 mg/L.

In one embodiment, the brine contains multivalent cations at a concentration of 0.01 to 0.1 mg/L, 0.1 to 1 mg/L, 1 to 10 mg/L, 10 to 100 mg/L, 100 to 1,000 mg/L, 1,000 to 10,000 mg/L, 10,000 to 50,000 mg/L, 50,000 to 100,000 mg/L, 100,000 to 150,000 mg/L, or greater than 150,000 mg/L. In one embodiment, the brine contains multivalent ions at a concentration of 0.01 to 0.1 mg/L, 0.1 to 1 mg/L, 1 to 10 mg/L, 10 to 100 mg/L, 100 to 1,000 mg/L, 1,000 to 10,000 mg/L, 10,000 to 50,000 mg/L, 50,000 to 100,000 mg/L, 100,000 to 150,000 mg/L, or greater than 150,000 mg/L. In one embodiment, the brine contains non-lithium impurities at a concentration of 0.01 to 0.1 mg/L, 0.1 to 1 mg/L, 1 to 10 mg/L, 10 to 100 mg/L, 100 to 1,000 mg/L, 1,000 to 10,000 mg/L, 10,000 to 50,000 mg/L, 50,000 to 100,000 mg/L, 100,000 to 150,000 mg/L, or greater than 150,000 mg/L. In one embodiment, the brine contains transition metals at a concentration of 0.01 to 0.1 mg/L, 0.1 to 1 mg/L, 1 to 10 mg/L, 10 to 100 mg/L, 100 to 1,000 mg/L, 1,000 to 10,000 mg/L, 10,000 to 50,000 mg/L, 50,000 to 100,000 mg/L, 100,000 to 150,000 mg/L, or greater than 150,000 mg/L. In one embodiment, the brine contains iron at a concentration of 0.01 to 0.1 mg/L, 0.1 to 1 mg/L, 1 to 10 mg/L, 10 to 100 mg/L, 100 to 1,000 mg/L, 1,000 to 10,000 mg/L, 10,000 to 50,000 mg/L, 50,000 to 100,000 mg/L, 100,000 to 150,000 mg/L, or greater than 150,000 mg/L. In one embodiment, the brine contains manganese at a concentration of 0.01 to 0.1 mg/L, 0.1 to 1 mg/L, 1 to 10 mg/L, 10 to 100 mg/L, 100 to 1,000 mg/L, 1,000 to 10,000 mg/L, 10,000 to 50,000 mg/L, 50,000 to 100,000 mg/L, 100,000 to 150,000 mg/L, or greater than 150,000 mg/L.

In one embodiment, the brine is treated to produce a feed brine which has certain metals removed. In one embodiment, the feed brine contains iron at a concentration of less than 0.01, 0.01 to 0.1 mg/L, mg/L, 0.1 to 1.0 mg/L, 1.0 to 10 mg/L, 10 to 100 mg/L, or 100 to 1,000 mg/L. In one embodiment, the feed brine contains manganese at a concentration of less than 0.01, 0.01 to 0.1 mg/L, mg/L, 0.1 to 1.0 mg/L, 1.0 to 10 mg/L, 10 to 100 mg/L, or 100 to 1,000 mg/L. In one embodiment, the feed brine contains lead at a concentration of less than 0.01, 0.01 to 0.1 mg/L, mg/L, 0.1 to 1.0 mg/L, 1.0 to 10 mg/L, 10 to 100 mg/L, or 100 to 1,000 mg/L. In one embodiment, the feed brine contains zinc at a concentration of less than 0.01, 0.01 to 0.1 mg/L, mg/L, 0.1 to 1.0 mg/L, 1.0 to 10 mg/L, 10 to 100 mg/L, or 100 to 1,000 mg/L. In one embodiment, the feed brine contains lithium at a concentration of 1 to 50 mg/L, 50 to 200 mg/L, 200 to 500 mg/L, 500 to 2,000 mg/L, or greater than 2,000 mg/L.

In one embodiment, the feed brine is processed to recover metals such as lithium and yield a spent brine or raffinate. In one embodiment, the raffinate contains residual quantities of the recovered metals at a concentration of less than 0.01, 0.01 to 0.1 mg/L, mg/L, 0.1 to 1.0 mg/L, 1.0 to 10 mg/L, 10 to 100 mg/L, 100 to 1,000 mg/L, or 1,000 to 10,000 mg/L.

In one embodiment, the pH of the brine is corrected to less than 0, 0 to 1, 1 to 2, 2 to 4, 4 to 6, 6 to 8, 4 to 8, 8 to 9, 9 to 10, 9 to 11, or 10 to 12. In one embodiment, the pH of the brine is corrected to 2 to 4, 4 to 6, 6 to 8, 4 to 8, 8 to 9, 9 to 10, 9 to 11, or 10 to 12. In one embodiment, the pH of the brine is corrected to precipitate or dissolve metals.

In one embodiment, metals are precipitated from the brine to form precipitates. In one embodiment, precipitates include transition metal hydroxides, oxy-hydroxides, sulfide, flocculants, aggregate, agglomerates, or combinations thereof. In one embodiment, the precipitates include Li, Na, K, Rb, Cs, Fr, Be, Mg, Ca, Sr, Ba, Ra, Sc, Y, Ti, Zr, Hf, V, Nb, Ta, Cr, Mo, W, Mn, Tc, Fe, Fe, Ru, Os, Co, Rh, Ir, Ni, Pd Pt, Cu, Ag, Au, Zn, Cd, Hg, B, Al, Ga, In, Si, Ge, Sn, Pb, As, Sb, Bi, Se, Te, Po, Br, I, At, other metals, or a combination thereof. In one embodiment, the precipitates may be concentrated into a slurry, a filter cake, a wet filter cake, a dry filter cake, a dense slurry, or a dilute slurry.

In one embodiment, the precipitates contain iron at a concentration of less than 0.01 mg/kg, 0.01 to 1 mg/kg, 1 to 100 mg/kg, 100 to 10,000 mg/kg, or 10,000 to 800,000 mg/kg. In one embodiment, the precipitates contain manganese at a concentration of less than 0.01 mg/kg, 0.01 to 1 mg/kg, 1 to 100 mg/kg, 100 to 10,000 mg/kg, or 10,000 to 800,000 mg/kg. In one embodiment, the precipitates contain lead at a concentration of less than 0.01 mg/kg, 0.01 to 1 mg/kg, 1 to 100 mg/kg, 100 to 10,000 mg/kg, or 10,000 to 800,000 mg/kg. In one embodiment, the precipitates contain arsenic at a concentration of less than 0.01 mg/kg, 0.01 to 1 mg/kg, 1 to 100 mg/kg, 100 to 10,000 mg/kg, or 10,000 to 800,000 mg/kg. In one embodiment, the precipitates contain magnesium at a concentration of less than 0.01 mg/kg, 0.01 to 1 mg/kg, 1 to 100 mg/kg, 100 to 10,000 mg/kg, or 10,000 to 800,000 mg/kg. In one embodiment, the precipitates contain Li, Na, K, Rb, Cs, Fr, Be, Mg, Ca, Sr, Ba, Ra, Sc, Y, Ti, Zr, Hf, V, Nb, Ta, Cr, Mo, W, Mn, Tc, Fe, Fe, Ru, Os, Co, Rh, Ir, Ni, Pd Pt, Cu, Ag, Au, Zn, Cd, Hg, B, Al, Ga, In, Si, Ge, Sn, Pb, As, Sb, Bi, Se, Te, Po, Br, I, At, or other metals at a concentration of less than 0.01 mg/kg, 0.01 to 1 mg/kg, 1 to 100 mg/kg, 100 to 10,000 mg/kg, or 10,000 to 800,000 mg/kg. In one embodiment, the precipitates are toxic and/or radioactive.

In one embodiment, precipitates are redissolved by combining the precipitates with acid. In one embodiment, precipitates are redissolved by combining the precipitates with acid in a mixing apparatus. In one embodiment, precipitates are redissolved by combining the precipitates with acid using a high-shear mixer.

Lithium is an essential element for batteries and other technologies. Lithium is found in a variety of liquid resources, including natural and synthetic brines and leachate solutions from minerals, clays, and recycled products. Lithium is optionally extracted from such liquid resources using an ion exchange process based on inorganic ion exchange materials. These inorganic ion exchange materials absorb lithium from a liquid resource while releasing hydrogen, and then elute lithium into an acidic solution while absorbing hydrogen. This ion exchange process is optionally repeated to extract lithium from a liquid resource and yield a concentrated lithium solution. The concentrated lithium solution is optionally further processed into chemicals for the battery industry or other industries.

Ion exchange materials are optionally formed into beads and the beads are optionally loaded into ion exchange columns, stirred tank reactors, other reactors, or other systems for lithium extraction. Alternating flows or aliquots of brine, acidic solution, and optionally other solutions are flowed through or flowed into an ion exchange column, reactors, or reactor system to extract lithium from the brine and produce a lithium concentrate, which is eluted from the column using the acidic solution. As brine flows through the ion exchange column, reactors, or reactor system, the ion exchange material absorbs lithium while releasing hydrogen, where both the lithium and hydrogen are cations. The release of hydrogen during lithium uptake will acidify the brine and limit lithium uptake unless the pH of the brine is optionally maintained in a suitable range to facilitate thermodynamically favorable lithium uptake and concomitant hydrogen release. In one embodiment, pH of the liquid resource is maintained near a set-point through addition of base to neutralized protons released from the ion exchange material into the liquid resource.

Treatment of the Liquid Resource

In some embodiments, the pH of the liquid resource is adjusted before, during and/or after contact with the lithium-selective ion exchange material to maintain the pH in range that is suitable for lithium uptake.

To control the pH of the brine and maintain the pH in a range that is suitable for lithium uptake in an ion exchange column (e.g., by ion exchange material), bases such as NaOH, $Ca(OH)_2$, CaO, KOH, or $NH_3$ are optionally added to the brine as solids, aqueous solutions, or in other forms. For brines that contain divalent ions such as Mg, Ca, Sr, or Ba, addition of base to the brine can cause precipitation of solids, such as $Mg(OH)_2$ or $Ca(OH)_2$, which can cause problems for the ion exchange reaction. These precipitates cause problems in at least three ways. First, precipitation can remove base from solution, leaving less base available in solution to neutralize protons and maintain pH in a suitable range for lithium uptake in the ion exchange column. Second, precipitates that form due to base addition can clog the ion exchange column, including clogging the surfaces and pores of ion exchange beads and the voids between ion exchange beads. This clogging can prevent lithium from entering the beads and being absorbed by the ion exchange material. The clogging can also cause large pressure heads in the column. Third, precipitates in the column dissolve during acid elution and thereby contaminate the lithium concentrate produced by the ion exchange system. For ion exchange beads to absorb lithium from brine, an ideal pH range for the brine is optionally 5 to 7, a preferred pH range is optionally 4 to 8, and an acceptable pH range is optionally 1 to 9. In one embodiment, an pH range for the brine is optionally about 1 to about 14, about 2 to about 13, about 3 to about 12, about 4 to about 12, about 4.5 to about 11, about 5 to about 10, about 5 to about 9, about 2 to about 5, about 2 to about 4, about 2 to about 3, about 3 to about 8, about 3 to about 7, about 3 to about 6, about 3 to about 5, about 3 to about 4, about 4 to about 10, about 4 to about 9, about 4 to about 8, about 4 to about 7, about 4 to about 6, about 4 to about 5, about 5 to about 6, about 5 to about 7, about 5 to about 8, about 6 to about 7, about 6 to about 8, or about 7 to about 8.

In one embodiment, the liquid resource is subjected to treatment prior to ion exchange. In some embodiments, said treatment comprises filtration, gravity sedimentation, centrifugal sedimentation, magnetic fields, other methods of solid-liquid separation, or combinations thereof. In some embodiments, precipitated metals are removed from the brine using a filter. In some embodiments, the filter is a belt filter, plate-and-frame filter press, pressure vessel containing filter elements, rotary drum filter, rotary disc filter, cartridge filter, a centrifugal filter with a fixed or moving bed, a metal screen, a perforate basket centrifuge, a three-point centrifuge, a peeler type centrifuge, or a pusher centrifuge. In some embodiments, the filter may use a scroll or a vibrating device. In some embodiments, the filter is horizontal, vertical, or may use a siphon.

In some embodiments, a filter cake is prevented, limited, or removed by using gravity, centrifugal force, an electric field, vibration, brushes, liquid jets, scrapers, intermittent reverse flow, vibration, crow-flow filtration, or pumping suspensions across the surface of the filter. In some embodiments, the precipitated metals and a liquid is moved tangentially to the filter to limit cake growth. In some embodiments, gravitational, magnetic, centrifugal sedimentation, or other means of solid-liquid separation are used before, during, or after filtering to prevent cake formation.

In some embodiments, a filter comprises a screen, a metal screen, a sieve, a sieve bend, a bent sieve, a high frequency electromagnetic screen, a resonance screen, or combinations thereof. In some embodiments, one or more particle traps are a solid-liquid separation apparatus.

In some embodiments, one or more solid-liquid separation apparatuses may be used in series or parallel. In some embodiments, a dilute slurry is removed from the tank, transferred to an external solid-liquid separation apparatus, and separated into a concentrated slurry and a solution with low or no suspended solids. In some embodiments, the concentrated slurry is returned to the tank or transferred to a different tank. In some embodiments, precipitate metals are transferred from a brine tank to another brine tank, from an acid tank to another acid tank, from a washing tank to another washing tank, from a brine tank to a washing tank, from a washing tank to an acid tank, from an acid tank to a washing tank, or from an acid tank to a brine tank.

In some embodiments, solid-liquid separation apparatuses may use gravitational sedimentation. In some embodiments, solid-liquid separation apparatuses may include a settling tank, a thickener, a clarifier, a gravity thickener. In some embodiments, solid-liquid separation apparatuses are operated in batch mode, semi-batch mode, semi-continuous mode, or continuous mode. In some embodiments, solid-liquid separation apparatuses include a circular basin thickener with slurry entering through a central inlet such that the slurry is dispersed into the thickener with one or more raking components that rotate and concentrate the ion exchange particles into a zone where the particles can leave through the bottom of the thickener.

In some embodiments, solid-liquid separation apparatuses include a deep cone, a deep cone tank, a deep cone compression tank, or a tank wherein the slurry is compacted by weight. In some embodiments, solid-liquid separation apparatuses include a tray thickener with a series of thickeners oriented vertically with a center axle and raking components. In some embodiments, solid-liquid separation apparatuses include a lamella type thickener with inclined plates or tubes that may be smooth, flat, rough, or corrugated. In some embodiments, solid-liquid separation apparatuses include a gravity clarifier that may be a rectangular basin with feed at one end and overflow at the opposite end optionally with paddles and/or a chain mechanism to move particles. In some embodiments, the solid-liquid separation apparatuses may be a particle trap.

In some embodiments, the solid-liquid separation apparatuses use centrifugal sedimentation. In some embodiments, solid-liquid separation apparatuses may include a tubular centrifuge, a multi-chamber centrifuge, a conical basket centrifuge, a scroll-type centrifuge, a sedimenting centrifuge, or a disc centrifuge. In some embodiments, precipitated metals are discharged continuously or intermittently from the centrifuge. In some embodiments, the solid-liquid separation apparatus is a hydrocyclone. In some embodiments, solid-liquid separation apparatus is an array of hydrocyclones or centrifuges in series and/or in parallel. In some embodiments, sumps are used to reslurry the precipitated metals. In some embodiments, the hydrocyclones may have multiple feed points. In some embodiments, a hydrocyclone is used upside down. In some embodiments, liquid is injected near the apex of the cone of a hydrocyclone to improve sharpness of cut. In some embodiments, a weir rotates in the center of the particle trap with a feed of slurried precipitated metals entering near the middle of the apparatus, and precipitated metals get trapped at the bottom and center of the apparatus due to a "teacup effect".

Treatment of the Ion Exchange Material with Chemical Additives

In an aspect, described herein is a system for contacting the ion exchange material with chemical additives. In some embodiments, a system for extracting lithium from a liquid resource comprises the system for contacting the ion exchange material with chemical additives. In some embodiments, a method for extracting lithium from a liquid resource comprises contacting the ion exchange material with chemical additives. In some embodiments, a method for extracting lithium from a liquid resource comprises contacting the liquid resource, the wash solution, or the acidic solution with chemical additives prior to contacting the liquid resource, the wash solution, or the acidic solution with the ion exchange material. In some embodiments, the process of producing lithium by ion exchange makes use of said system to add chemical additives. In some embodiments, the ion exchange material is contacted with a chemical additive by directly treating the ion exchange material with the chemical additive. In some embodiments, the ion exchange material is contacted with a chemical additive by treating the liquid resource with one or more chemical additives, and then contacting said liquid resource containing chemical additives with the ion exchange material to absorb the lithium in the liquid resource. In some embodiments, the ion exchange material is contacted with a chemical additive by treating the process water with one or more chemical additives, and then contacting said process water containing chemical additives with the ion exchange material to wash the ion exchange material. In some embodiments, the ion exchange material is contacted with a chemical additive by treating an acid with one or more chemical additives, and then contacting said acid with the ion exchange material to elute lithium. In some embodiments, the ion exchange material is contacted with a chemical additive by treating a base with one or more chemical additives, and then contacting said base with the ion exchange material to adjust the pH of the liquid resource.

In some embodiments, the ion exchange material is contacted with one or more chemical additives before lithium is absorbed from a liquid resource thereby. In some embodiments, the ion exchange material is contacted with one or more chemical additives while lithium is absorbed from a liquid resource thereby. In some embodiments, the ion exchange material is contacted with one or more chemical additives after lithium is absorbed from a liquid resource thereby. In some embodiments, the ion exchange material is contacted with one or more chemical additives before entrained brine is removed from the ion exchange beads by washing, direct application, or other methods. In some embodiments, the ion exchange material is contacted with one or more chemical additives while entrained brine is removed from the ion exchange beads by washing or other methods. In some embodiments, the ion exchange material is contacted with one or more chemical additives after entrained brine is removed from the ion exchange beads by washing or other methods. In some embodiments, the brine is removed from the ion exchange beads by treatment with a stream comprising one or more chemical additives. In some embodiments, said stream comprising one or more chemical additives comprises water, brine, a liquid resource, an aqueous solution, or a gas. In some embodiments, the ion exchange material is contacted with one or more chemical additives before said ion exchange beads are contacted with an acid to elute lithium. In some embodiments, the ion exchange material is contacted with one or more chemical additives while said ion exchange beads are contacted with an acid to elute lithium. In some embodiments, the ion exchange material is contacted with one or more chemical additives after said ion exchange beads are contacted with an acid to elute lithium. In some embodiments, the ion exchange material is contacted with chemical additives before and after each of steps (lithium absorption, removal of entrained brine, and elution) described above. In some embodiments, the ion exchange material is contacted with chemical additives before and/or after some of each of steps (lithium absorption, removal of entrained brine, and elution) described above.

In some embodiments, the ion exchange material is contacted with chemical additives during each ion exchange cycle wherein each cycle comprises lithium absorption and lithium elution. In some embodiments, the ion exchange material is contacted with chemical additives during each ion exchange cycle or every other ion exchange cycle wherein each cycle comprises lithium absorption and lithium elution. In some embodiments, the ion exchange material is contacted with chemical additives every second ion exchange cycle wherein each cycle comprises lithium absorption and lithium elution. In some embodiments, the ion exchange material is contacted with chemical additives during every third ion exchange cycle wherein each cycle comprises lithium absorption and lithium elution. In some embodiments, the ion exchange material is contacted with chemical additives during every fourth ion exchange cycle wherein each cycle comprises lithium absorption and lithium elution. In some embodiments, the ion exchange material is contacted with chemical additives during every fifth ion exchange cycle wherein each cycle comprises lithium absorption and lithium elution. In some embodiments, the ion exchange material is contacted with chemical additives during every sixth ion exchange cycle wherein each cycle comprises lithium absorption and lithium elution. In some embodiments, the ion exchange material is contacted with chemical additives during every seventh ion exchange cycle wherein each cycle comprises lithium absorption and lithium elution. In some embodiments, the ion exchange material is contacted with chemical additives during every eighth ion exchange cycle wherein each cycle comprises lithium absorption and lithium elution. In some embodiments, the ion exchange material is contacted with chemical additives during every ninth ion exchange cycle wherein each cycle comprises lithium absorption and lithium elution. In some embodiments, the ion exchange material is contacted with chemical additives during every tenth ion exchange cycle wherein each cycle comprises lithium absorption and lithium elution.

In some embodiments, the ion exchange material is contacted with one or more chemical additives during continuous cycles, wherein each cycle comprises lithium absorption and lithium elution. In some embodiments, the ion exchange material is contacted with one or more chemical additives during a single cycle, or a series of selected cycles. In some embodiments, the exposure of the ion exchange material to the one or more chemical additives during a period of cycles is paused or omitted. In some embodiments, the ion exchange material is contacted with one or more chemical additives during one cycle, and subsequently not contacted with one or more chemical additives during another cycle, each cycle comprising lithium absorption and lithium elution. In some embodiments, the ion exchange material is contacted with one or more chemical additives during two or more cycles and not contacted with one or more chemical additives during one cycle, each cycle comprising lithium absorption and lithium elution. In some embodiments, the ion exchange material is contacted with one or more chemical additives during one cycle and not contacted with one or more chemical additives during two or more cycles wherein each cycle comprises lithium absorption and lithium elution. In some embodiments, the ion exchange material is contacted with one or more chemical additives during one cycle, about one to about 5 cycles, about 5 to about 10 cycles, about 10 to about 20 cycles, about 20 to about 30 cycles, about 30 to about 40 cycles, about 40 to about 50 cycles, about 50 to about 60 cycles, about 60 to about 70 cycles, about 70 to about 80 cycles, about 80 to about 90 cycles, or about 90 to about 100 cycles, and subsequently not contacted with one or more chemical additives during one cycle, about one to about 5 cycles, about 5 to about 10 cycles, about 10 to about 20 cycles, about 20 to about 30 cycles, about 30 to about 40 cycles, about 40 to about 50 cycles, about 50 to about 60 cycles, about 60 to about 70 cycles, about 70 to about 80 cycles, about 80 to about 90 cycles, or about 90 to about 100 cycles.

In some embodiments, one or more chemical additives is contacted with the ion exchange material for 1 second during the ion exchange cycle. In some embodiments, during an ion exchange cycle the ion exchange material is contacted with one or more chemical additives for 1 second to 60 seconds. In some embodiments, during an ion exchange cycle the ion exchange material is contacted with one or more chemical additives for 1 second to 2 seconds, 1 second to 3 seconds, 1 second to 5 seconds, 1 second to 10 seconds, 1 second to 15 seconds, 1 second to 20 seconds, 1 second to 30 seconds, 1 second to 40 seconds, 1 second to 50 seconds, 1 second to 60 seconds, 2 seconds to 3 seconds, 2 seconds to 5 seconds, 2 seconds to 10 seconds, 2 seconds to 15 seconds, 2 seconds to 20 seconds, 2 seconds to 30 seconds, 2 seconds to 40 seconds, 2 seconds to 50 seconds, 2 seconds to 60 seconds, 3 seconds to 5 seconds, 3 seconds to 10 seconds, 3 seconds to 15 seconds, 3 seconds to 20 seconds, 3 seconds to 30 seconds, 3 seconds to 40 seconds, 3 seconds to 50 seconds, 3 seconds to 60 seconds, 5 seconds to 10 seconds, 5 seconds to 15 seconds, 5 seconds to 20 seconds, 5 seconds to 30 seconds, 5 seconds to 40 seconds, 5 seconds to 50 seconds, 5 seconds to 60 seconds, 10 seconds to 15 seconds, 10 seconds to 20 seconds, 10 seconds to 30 seconds, 10 seconds to 40 seconds, 10 seconds to 50 seconds, 10 seconds to 60 seconds, 15 seconds to 20 seconds, 15 seconds to 30 seconds, 15 seconds to 40 seconds, 15 seconds to 50 seconds, 15 seconds to 60 seconds, 20 seconds to 30 seconds, 20 seconds to 40 seconds, 20 seconds to 50 seconds, 20 seconds to 60 seconds, 30 seconds to 40 seconds, 30 seconds to 50 seconds, 30 seconds to 60 seconds, 40 seconds to 50 seconds, 40 seconds to 60 seconds, or 50 seconds to 60 seconds. In some embodiments, during an ion exchange cycle the ion exchange material is contacted with one or more chemical additives for 1 second, 2 seconds, 3 seconds, 5 seconds, 10 seconds, 15 seconds, 20 seconds, 30 seconds, 40 seconds, 50 seconds, or 60 seconds. In some embodiments, during an ion exchange cycle the ion exchange material is contacted with one or more chemical additives for at least 1 second, 2 seconds, 3 seconds, 5 seconds, 10 seconds, 15 seconds, 20 seconds, 30 seconds, 40 seconds, or 50 seconds. In some embodiments, during an ion exchange cycle the ion exchange material is contacted with one or more chemical additives for at most 2 seconds, 3 seconds, 5 seconds, 10 seconds, 15 seconds, 20 seconds, 30 seconds, 40 seconds, 50 seconds, or 60 seconds. In some embodiments, during an ion exchange cycle the ion exchange material is contacted with one or more chemical additives for about 1 second to about 60 seconds. In some embodiments, during an ion exchange cycle the ion exchange material is contacted with one or more chemical additives for about 1 second to about 2 seconds, about 1 second to about 3 seconds, about 1 second to about 5 seconds, about 1 second to about 10 seconds, about 1 second to about 15 seconds, about 1 second to about 20 seconds, about 1 second to about 30 seconds, about 1 second to about 40 seconds, about 1 second to about 50 seconds, about 1 second to about 60 seconds, about 2 seconds to about 3 seconds, about 2 seconds to about 5 seconds, about 2 seconds to about 10 seconds, about 2 seconds to about 15 seconds, about 2 seconds to about 20 seconds, about 2 seconds to about 30 seconds, about 2 seconds to about 40 seconds, about 2 seconds to about 50 seconds, about 2 seconds to about 60 seconds, about 3 seconds to about 5 seconds, about 3 seconds to about 10 seconds, about 3 seconds to about 15 seconds, about 3 seconds to about 20 seconds, about 3 seconds to about 30 seconds, about 3 seconds to about 40 seconds, about 3 seconds to about 50 seconds, about 3 seconds to about 60 seconds, about 5 seconds to about 10 seconds, about 5 seconds to about 15 seconds, about 5 seconds to about 20 seconds, about 5 seconds to about 30 seconds, about 5 seconds to about 40 seconds, about 5 seconds to about 50 seconds, about 5 seconds to about 60 seconds, about 10 seconds to about 15 seconds, about 10 seconds to about 20 seconds, about 10 seconds to about 30 seconds, about 10 seconds to about 40 seconds, about 10 seconds to about 50 seconds, about 10 seconds to about 60 seconds, about 15 seconds to about 20 seconds, about 15 seconds to about 30 seconds, about 15 seconds to about 40 seconds, about 15 seconds to about 50 seconds, about 15 seconds to about 60 seconds, about 20 seconds to about 30 seconds, about 20 seconds to about 40 seconds, about 20 seconds to about 50 seconds, about 20 seconds to about 60 seconds, about 30 seconds to about 40 seconds, about 30 seconds to about 50 seconds, about 30 seconds to about 60 seconds, about 40 seconds to about 50 seconds, about 40 seconds to about 60 seconds, or about 50 seconds to about 60 seconds. In some embodiments, during an ion exchange cycle the ion exchange material is contacted with one or more chemical additives for about 1 second, about 2 seconds, about 3 seconds, about 5 seconds, about 10 seconds, about 15 seconds, about 20 seconds, about 30 seconds, about 40 seconds, about 50 seconds, or about 60 seconds. In some embodiments, during an ion exchange cycle the ion exchange material is contacted with one or more chemical additives for at least about 1 second, about 2 seconds, about 3 seconds, about 5 seconds, about 10 seconds, about 15 seconds, about 20 seconds, about 30 seconds, about 40 seconds, or about 50 seconds. In some embodiments, during an ion exchange cycle the ion exchange material is contacted with one or more chemical additives for at most about 2 seconds, about 3 seconds, about 5 seconds, about 10 seconds, about 15 seconds, about 20 seconds, about 30 seconds, about 40 seconds, about 50 seconds, or about 60 seconds.

In some embodiments, during an ion exchange cycle the ion exchange material is contacted with one or more chemical additives for 1 minute to 60 minutes. In some embodiments, during an ion exchange cycle the ion exchange material is contacted with one or more chemical additives for 1 minute to 2 minutes, 1 minute to 3 minutes, 1 minute to 5 minutes, 1 minute to 10 minutes, 1 minute to 15 minutes, 1 minute to 20 minutes, 1 minute to 30 minutes, 1 minute to 40 minutes, 1 minute to 50 minutes, 1 minute to 60 minutes, 2 minutes to 3 minutes, 2 minutes to 5 minutes, 2 minutes to 10 minutes, 2 minutes to 15 minutes, 2 minutes to 20 minutes, 2 minutes to 30 minutes, 2 minutes to 40 minutes, 2 minutes to 50 minutes, 2 minutes to 60 minutes, 3 minutes to 5 minutes, 3 minutes to 10 minutes, 3 minutes to 15 minutes, 3 minutes to 20 minutes, 3 minutes to 30 minutes, 3 minutes to 40 minutes, 3 minutes to 50 minutes, 3 minutes to 60 minutes, 5 minutes to 10 minutes, 5 minutes to 15 minutes, 5 minutes to 20 minutes, 5 minutes to 30 minutes, 5 minutes to 40 minutes, 5 minutes to 50 minutes, 5 minutes to 60 minutes, 10 minutes to 15 minutes, 10 minutes to 20 minutes, 10 minutes to 30 minutes, 10 minutes to 40 minutes, 10 minutes to 50 minutes, 10 minutes to 60 minutes, 15 minutes to 20 minutes, 15 minutes to 30 minutes, 15 minutes to 40 minutes, 15 minutes to 50 minutes, 15 minutes to 60 minutes, 20 minutes to 30 minutes, 20 minutes to 40 minutes, 20 minutes to 50 minutes, 20 minutes to 60 minutes, 30 minutes to 40 minutes, 30 minutes to 50 minutes, 30 minutes to 60 minutes, 40 minutes to 50 minutes, 40 minutes to 60 minutes, or 50 minutes to 60 minutes. In some embodiments, during an ion exchange cycle the ion exchange material is contacted with one or more chemical additives for 1 minute, 2 minutes, 3 minutes, 5 minutes, 10 minutes, 15 minutes, 20 minutes, 30 minutes, 40 minutes, 50 minutes, or 60 minutes. In some embodiments, during an ion exchange cycle the ion exchange material is contacted with one or more chemical additives for at least 1 minute, 2 minutes, 3 minutes, 5 minutes, 10 minutes, 15 minutes, 20 minutes, 30 minutes, 40 minutes, or 50 minutes. In some embodiments, during an ion exchange cycle the ion exchange material is contacted with one or more chemical additives for at most 2 minutes, 3 minutes, 5 minutes, 10 minutes, 15 minutes, 20 minutes, 30 minutes, 40 minutes, 50 minutes, or 60 minutes. In some embodiments, during an ion exchange cycle the ion exchange material is contacted with one or more chemical additives for about 1 minute to about 60 minutes. In some embodiments, during an ion exchange cycle the ion exchange material is contacted with one or more chemical additives for about 1 minute to about 2 minutes, about 1 minute to about 3 minutes, about 1 minute to about 5 minutes, about 1 minute to about 10 minutes, about 1 minute to about 15 minutes, about 1 minute to about 20 minutes, about 1 minute to about 30 minutes, about 1 minute to about 40 minutes, about 1 minute to about 50 minutes, about 1 minute to about 60 minutes, about 2 minutes to about 3 minutes, about 2 minutes to about 5 minutes, about 2 minutes to about 10 minutes, about 2 minutes to about 15 minutes, about 2 minutes to about 20 minutes, about 2 minutes to about 30 minutes, about 2 minutes to about 40 minutes, about 2 minutes to about 50 minutes, about 2 minutes to about 60 minutes, about 3 minutes to about 5 minutes, about 3 minutes to about 10 minutes, about 3 minutes to about 15 minutes, about 3 minutes to about 20 minutes, about 3 minutes to about 30 minutes, about 3 minutes to about 40 minutes, about 3 minutes to about 50 minutes, about 3 minutes to about 60 minutes, about 5 minutes to about 10 minutes, about 5 minutes to about 15 minutes, about 5 minutes to about 20 minutes, about 5 minutes to about 30 minutes, about 5 minutes to about 40 minutes, about 5 minutes to about 50 minutes, about 5 minutes to about 60 minutes, about 10 minutes to about 15 minutes, about 10 minutes to about 20 minutes, about 10 minutes to about 30 minutes, about 10 minutes to about 40 minutes, about 10 minutes to about 50 minutes, about 10 minutes to about 60 minutes, about 15 minutes to about 20 minutes, about 15 minutes to about 30 minutes, about 15 minutes to about 40 minutes, about 15 minutes to about 50 minutes, about 15 minutes to about 60 minutes, about 20 minutes to about 30 minutes, about 20 minutes to about 40 minutes, about 20 minutes to about 50 minutes, about 20 minutes to about 60 minutes, about 30 minutes to about 40 minutes, about 30 minutes to about 50 minutes, about 30 minutes to about 60 minutes, about 40 minutes to about 50 minutes, about 40 minutes to about 60 minutes, or about 50 minutes to about 60 minutes. In some embodiments, during an ion exchange cycle the ion exchange material is contacted with one or more chemical additives for about 1 minute, about 2 minutes, about 3 minutes, about 5 minutes, about 10 minutes, about 15 minutes, about 20 minutes, about 30 minutes, about 40 minutes, about 50 minutes, or about 60 minutes. In some embodiments, during an ion exchange cycle the ion exchange material is contacted with one or more chemical additives for at least about 1 minute, about 2 minutes, about 3 minutes, about 5 minutes, about 10 minutes, about 15 minutes, about 20 minutes, about 30 minutes, about 40 minutes, or about 50 minutes. In some embodiments, during an ion exchange cycle the ion exchange material is contacted with one or more chemical additives for at most about 2 minutes, about 3 minutes, about 5 minutes, about 10 minutes, about 15 minutes, about 20 minutes, about 30 minutes, about 40 minutes, about 50 minutes, or about 60 minutes.

In some embodiments, during an ion exchange cycle the ion exchange material is contacted with one or more chemical additives for 1 hour to 24 hours. In some embodiments, during an ion exchange cycle the ion exchange material is contacted with one or more chemical additives for 1 hour to 2 hours, 1 hour to 3 hours, 1 hour to 5 hours, 1 hour to 8 hours, 1 hour to 10 hours, 1 hour to 12 hours, 1 hour to 15 hours, 1 hour to 18 hours, 1 hour to 20 hours, 1 hour to 22 hours, 1 hour to 24 hours, 2 hours to 3 hours, 2 hours to 5 hours, 2 hours to 8 hours, 2 hours to 10 hours, 2 hours to 12 hours, 2 hours to 15 hours, 2 hours to 18 hours, 2 hours to 20 hours, 2 hours to 22 hours, 2 hours to 24 hours, 3 hours to 5 hours, 3 hours to 8 hours, 3 hours to 10 hours, 3 hours to 12 hours, 3 hours to 15 hours, 3 hours to 18 hours, 3 hours to 20 hours, 3 hours to 22 hours, 3 hours to 24 hours, 5 hours to 8 hours, 5 hours to 10 hours, 5 hours to 12 hours, 5 hours to 15 hours, 5 hours to 18 hours, 5 hours to 20 hours, 5 hours to 22 hours, 5 hours to 24 hours, 8 hours to 10 hours, 8 hours to 12 hours, 8 hours to 15 hours, 8 hours to 18 hours, 8 hours to 20 hours, 8 hours to 22 hours, 8 hours to 24 hours, 10 hours to 12 hours, 10 hours to 15 hours, 10 hours to 18 hours, 10 hours to 20 hours, 10 hours to 22 hours, 10 hours to 24 hours, 12 hours to 15 hours, 12 hours to 18 hours, 12 hours to 20 hours, 12 hours to 22 hours, 12 hours to 24 hours, 15 hours to 18 hours, 15 hours to 20 hours, 15 hours to 22 hours, 15 hours to 24 hours, 18 hours to 20 hours, 18 hours to 22 hours, 18 hours to 24 hours, 20 hours to 22 hours, 20 hours to 24 hours, or 22 hours to 24 hours. In some embodiments, during an ion exchange cycle the ion exchange material is contacted with one or more chemical additives for 1 hour, 2 hours, 3 hours, 5 hours, 8 hours, 10 hours, 12 hours, 15 hours, 18 hours, 20 hours, 22 hours, or 24 hours. In some embodiments, during an ion exchange cycle the ion exchange material is contacted with one or more chemical additives for at least 1 hour, 2 hours, 3 hours, 5 hours, 8 hours, 10 hours, 12 hours, 15 hours, 18 hours, 20 hours, or 22 hours. In some embodiments, during an ion exchange cycle the ion exchange material is contacted with one or more chemical additives for at most 2 hours, 3 hours, 5 hours, 8 hours, 10 hours, 12 hours, 15 hours, 18 hours, 20 hours, 22 hours, or 24 hours. In some embodiments, during an ion exchange cycle the ion exchange material is contacted with one or more chemical additives for about 1 hour to about 24 hours. In some embodiments, during an ion exchange cycle the ion exchange material is contacted with one or more chemical additives for about 1 hour to about 2 hours, about 1 hour to about 3 hours, about 1 hour to about 5 hours, about 1 hour to about 8 hours, about 1 hour to about 10 hours, about 1 hour to about 12 hours, about 1 hour to about 15 hours, about 1 hour to about 18 hours, about 1 hour to about 20 hours, about 1 hour to about 22 hours, about 1 hour to about 24 hours, about 2 hours to about 3 hours, about 2 hours to about 5 hours, about 2 hours to about 8 hours, about 2 hours to about 10 hours, about 2 hours to about 12 hours, about 2 hours to about 15 hours, about 2 hours to about 18 hours, about 2 hours to about 20 hours, about 2 hours to about 22 hours, about 2 hours to about 24 hours, about 3 hours to about 5 hours, about 3 hours to about 8 hours, about 3 hours to about 10 hours, about 3 hours to about 12 hours, about 3 hours to about 15 hours, about 3 hours to about 18 hours, about 3 hours to about 20 hours, about 3 hours to about 22 hours, about 3 hours to about 24 hours, about 5 hours to about 8 hours, about 5 hours to about 10 hours, about 5 hours to about 12 hours, about 5 hours to about 15 hours, about 5 hours to about 18 hours, about 5 hours to about 20 hours, about 5 hours to about 22 hours, about 5 hours to about 24 hours, about 8 hours to about 10 hours, about 8 hours to about 12 hours, about 8 hours to about 15 hours, about 8 hours to about 18 hours, about 8 hours to about 20 hours, about 8 hours to about 22 hours, about 8 hours to about 24 hours, about 10 hours to about 12 hours, about 10 hours to about 15 hours, about 10 hours to about 18 hours, about 10 hours to about 20 hours, about 10 hours to about 22 hours, about 10 hours to about 24 hours, about 12 hours to about 15 hours, about 12 hours to about 18 hours, about 12 hours to about 20 hours, about 12 hours to about 22 hours, about 12 hours to about 24 hours, about 15 hours to about 18 hours, about 15 hours to about 20 hours, about 15 hours to about 22 hours, about 15 hours to about 24 hours, about 18 hours to about 20 hours, about 18 hours to about 22 hours, about 18 hours to about 24 hours, about 20 hours to about 22 hours, about 20 hours to about 24 hours, or about 22 hours to about 24 hours. In some embodiments, during an ion exchange cycle the ion exchange material is contacted with one or more chemical additives for about 1 hour, about 2 hours, about 3 hours, about 5 hours, about 8 hours, about 10 hours, about 12 hours, about 15 hours, about 18 hours, about 20 hours, about 22 hours, or about 24 hours. In some embodiments, during an ion exchange cycle the ion exchange material is contacted with one or more chemical additives for at least about 1 hour, about 2 hours, about 3 hours, about 5 hours, about 8 hours, about 10 hours, about 12 hours, about 15 hours, about 18 hours, about 20 hours, or about 22 hours. In some embodiments, during an ion exchange cycle the ion exchange material is contacted with one or more chemical additives for at most about 2 hours, about 3 hours, about 5 hours, about 8 hours, about 10 hours, about 12 hours, about 15 hours, about 18 hours, about 20 hours, about 22 hours, or about 24 hours.

In some embodiments, one or more chemical additives are independently added (e.g., to the liquid resource, the washing solution, the acid solution, the ion exchange material, the raffinate, the lithium eluate) in discrete quantities at regular intervals throughout an ion exchange cycle. In some embodiments, one or more chemical additives are independently added in varying quantities at regular intervals throughout an ion exchange cycle. In some embodiments, one or more chemical additives are independently added in discrete quantities at irregular intervals throughout an ion exchange cycle. In some embodiments, one or more chemical additives are independently added in varying quantities at irregular intervals throughout an ion exchange cycle. Accordingly, one or more chemical additives can be independently added one or more times during an ion exchange cycle. In some embodiments, during an ion exchange cycle one or more chemical additives are independently added (e.g., to the liquid resource, the washing solution, the acid solution, the ion exchange material, the raffinate, the lithium eluate) 1 time to 10 times. In some embodiments, during an ion exchange cycle one or more chemical additives are independently added 1 time to 2 times, 1 time to 3 times, 1 time to 4 times, 1 time to 5 times, 1 time to 6 times, 1 time to 7 times, 1 time to 8 times, 1 time to 9 times, 1 time to 10 times, 2 times to 3 times, 2 times to 4 times, 2 times to 5 times, 2 times to 6 times, 2 times to 7 times, 2 times to 8 times, 2 times to 9 times, 2 times to 10 times, 3 times to 4 times, 3 times to 5 times, 3 times to 6 times, 3 times to 7 times, 3 times to 8 times, 3 times to 9 times, 3 times to 10 times, 4 times to 5 times, 4 times to 6 times, 4 times to 7 times, 4 times to 8 times, 4 times to 9 times, 4 times to 10 times, 5 times to 6 times, 5 times to 7 times, 5 times to 8 times, 5 times to 9 times, 5 times to 10 times, 6 times to 7 times, 6 times to 8 times, 6 times to 9 times, 6 times to 10 times, 7 times to 8 times, 7 times to 9 times, 7 times to 10 times, 8 times to 9 times, 8 times to 10 times, or 9 times to 10 times. In some embodiments, during an ion exchange cycle one or more chemical additives are independently added 1 time, 2 times, 3 times, 4 times, 5 times, 6 times, 7 times, 8 times, 9 times, or 10 times. In some embodiments, during an ion exchange cycle one or more chemical additives are independently added at least 1 time, 2 times, 3 times, 4 times, 5 times, 6 times, 7 times, 8 times, or 9 times.

In some embodiments, during an ion exchange cycle one or more chemical additives are independently added at most 2 times, 3 times, 4 times, 5 times, 6 times, 7 times, 8 times, 9 times, or 10 times. In some embodiments, during an ion exchange cycle one or more chemical additives are independently added 1 time to 100 times. In some embodiments, during an ion exchange cycle one or more chemical additives are independently added 1 time to 5 times, 1 time to 10 times, 1 time to 20 times, 1 time to 30 times, 1 time to 40 times, 1 time to 50 times, 1 time to 60 times, 1 time to 70 times, 1 time to 80 times, 1 time to 90 times, 1 time to 100 times, 5 times to 10 times, 5 times to 20 times, 5 times to 30 times, 5 times to 40 times, 5 times to 50 times, 5 times to 60 times, 5 times to 70 times, 5 times to 80 times, 5 times to 90 times, 5 times to 100 times, 10 times to 20 times, 10 times to 30 times, 10 times to 40 times, 10 times to 50 times, 10 times to 60 times, 10 times to 70 times, 10 times to 80 times, 10 times to 90 times, 10 times to 100 times, 20 times to 30 times, 20 times to 40 times, 20 times to 50 times, 20 times to 60 times, 20 times to 70 times, 20 times to 80 times, 20 times to 90 times, 20 times to 100 times, 30 times to 40 times, 30 times to 50 times, 30 times to 60 times, 30 times to 70 times, 30 times to 80 times, 30 times to 90 times, 30 times to 100 times, 40 times to 50 times, 40 times to 60 times, 40 times to 70 times, 40 times to 80 times, 40 times to 90 times, 40 times to 100 times, 50 times to 60 times, 50 times to 70 times, 50 times to 80 times, 50 times to 90 times, 50 times to 100 times, 60 times to 70 times, 60 times to 80 times, 60 times to 90 times, 60 times to 100 times, 70 times to 80 times, 70 times to 90 times, 70 times to 100 times, 80 times to 90 times, 80 times to 100 times, or 90 times to 100 times. In some embodiments, during an ion exchange cycle one or more chemical additives are independently added 1 time, 5 times, 10 times, 20 times, 30 times, 40 times, 50 times, 60 times, 70 times, 80 times, 90 times, or 100 times. In some embodiments, during an ion exchange cycle one or more chemical additives are independently added at least 1 time, 5 times, 10 times, 20 times, 30 times, 40 times, 50 times, 60 times, 70 times, 80 times, or 90 times. In some embodiments, during an ion exchange cycle one or more chemical additives are independently added at most 5 times, 10 times, 20 times, 30 times, 40 times, 50 times, 60 times, 70 times, 80 times, 90 times, or 100 times.

In some embodiments, the ion exchange material is contacted with a chemical additive during absorption of lithium from a liquid resource. In some embodiments, the ion exchange material is contacted with a chemical additive during washing with a washing solution. In some embodiments, the ion exchange material is contacted with a chemical additive during washing with a washing process water. In some embodiments, the ion exchange material is contacted with a chemical additive during elution of absorbed lithium with an acid. In some embodiments, the ion exchange material is contacted with a chemical additive during one or more of the steps of ion exchange: absorption of lithium from a liquid resource, washing with a washing solution, or elution with an acid.

In some embodiments, treatment of the liquid resource, wash water, or acid with the chemical additive occurs in a mixing tank. In some embodiments, treatment of the liquid resource, wash water, or acid with the chemical additive occurs in a mixing tank fitted with an agitator, an eductor, a nozzle, or a combination thereof. In some embodiments, treatment of the liquid resource, wash water, or acid with the chemical additive occurs in an inline mixer. In some embodiments, treatment of the liquid resource, wash water, or acid with the chemical additive occurs in an electrochemical cell.

In some embodiments, treatment of the ion exchange material with a chemical additive adjusts the oxidation-reduction potential of the liquid resource, the process water, the acid, the base, the ion-exchange material or combinations thereof. In some embodiments, treatment of the ion exchange material with a chemical additive increases or decreases the oxidation-reduction potential of the liquid resource, the process water, the acid, the base, the ion-exchange material or combinations thereof.

In some embodiments, treatment with a chemical additive is performed in conjunction with pH adjustment. In some embodiments, said pH adjustment is performed by addition of an acid or a base. In some embodiments, pH adjustment is performed to maintain the pH of the solution comprising said chemical additive at a value of about 1, about 2, about 3, about 4, about 5, about 6, about 7, about 8, about 9, about 10, about 11, about 12, about 13, or about 14. In some embodiments, pH adjustment is performed to maintain the pH of the solution comprising said chemical additive at a value of about 1 to about 14. In some embodiments, pH adjustment is performed to maintain the pH of the solution comprising said chemical additive at a value of about 1 to about 2, about 1 to about 3, about 1 to about 4, about 1 to about 5, about 1 to about 6, about 1 to about 7, about 1 to about 8, about 1 to about 9, about 1 to about 10, about 1 to about 11, about 1 to about 12, about 1 to about 13, about 1 to about 14, about 2 to about 3, about 2 to about 4, about 2 to about 5, about 2 to about 6, about 2 to about 7, about 2 to about 8, about 2 to about 9, about 2 to about 10, about 2 to about 11, about 2 to about 12, about 2 to about 13, about 2 to about 14, about 3 to about 4, about 3 to about 5, about 3 to about 6, about 3 to about 7, about 3 to about 8, about 3 to about 9, about 3 to about 10, about 3 to about 11, about 3 to about 12, about 3 to about 13, about 3 to about 14, about 4 to about 5, about 4 to about 6, about 4 to about 7, about 4 to about 8, about 4 to about 9, about 4 to about 10, about 4 to about 11, about 4 to about 12, about 4 to about 13, about 4 to about 14, about 5 to about 6, about 5 to about 7, about 5 to about 8, about 5 to about 9, about 5 to about 10, about 5 to about 11, about 5 to about 12, about 5 to about 13, about 5 to about 14, about 6 to about 7, about 6 to about 8, about 6 to about 9, about 6 to about 10, about 6 to about 11, about 6 to about 12, about 6 to about 13, about 6 to about 14, about 7 to about 8, about 7 to about 9, about 7 to about 10, about 7 to about 11, about 7 to about 12, about 7 to about 13, about 7 to about 14, about 8 to about 9, about 8 to about 10, about 8 to about 11, about 8 to about 12, about 8 to about 13, about 8 to about 14, about 9 to about 10, about 9 to about 11, about 9 to about 12, about 9 to about 13, about 9 to about 14, about 10 to about 11, about 10 to about 12, about 10 to about 13, about 10 to about 14, about 11 to about 12, about 11 to about 13, about 11 to about 14, about 12 to about 13, about 12 to about 14, or about 13 to about 14. In some embodiments, pH adjustment is performed to maintain the pH of the solution comprising said chemical additive at a value of about 1, about 2, about 3, about 4, about 5, about 6, about 7, about 8, about 9, about 10, about 11, about 12, about 13, or about 14. In some embodiments, pH adjustment is performed to maintain the pH of the solution comprising said chemical additive at a value of at least about 1, about 2, about 3, about 4, about 5, about 6, about 7, about 8, about 9, about 10, about 11, about 12, or about 13. In some embodiments, pH adjustment is performed to maintain the pH of the solution comprising said chemical additive at a value of at most about 2, about 3, about 4, about 5, about 6, about 7, about 8, about 9, about 10, about 11, about 12, about 13, or about 14.

In some embodiments, treatment of the ion exchange material with a chemical additive increases the oxidation state of the elements that the ion exchange material is comprised of. In some embodiments, treatment of the ion exchange material with a chemical additive decreases the oxidation state of the elements that the ion exchange material is comprised of. In some embodiments, treatment of the ion exchange material with a chemical additive increases the oxidation state of the elements that the ion exchange material is comprised of at the surface of the ion-exchange particles. In some embodiments, treatment of the ion exchange material with a chemical additive decreases the oxidation state of the elements that the ion exchange material is comprised of at the surface of the ion-exchange particles.

In some embodiments, treatment of the ion exchange material with a chemical additive decreases the oxidation-reduction potential of the ion exchange material. In some embodiments, treatment of the ion exchange material with a chemical additive increases the oxidation-reduction potential of the ion exchange material. In some embodiments, treatment of the ion exchange material with a chemical additive decreases the oxidation-reduction potential at the surface of the ion-exchange material. In some embodiments, treatment of the ion exchange material with a chemical additive increases the oxidation-reduction potential at the surface of the ion-exchange material.

In some embodiments, treatment of the ion exchange material with a chemical additive prevents a change in the crystal structure of the ion exchange material. In some embodiments, treatment of the ion exchange material with a chemical additive slows the change in the crystal structure of the ion exchange material. In some embodiments, treatment of the ion exchange material with a chemical additive prevents the decay of the ion exchange material. In some embodiments, treatment of the ion exchange material with a chemical additive prevents the decay of the oxide in the ion exchange material. In some embodiments, treatment of the ion exchange material with a chemical additive prevents the decay of the polymer matrix in the ion exchange material. In some embodiments, treatment of the ion exchange material with a chemical additive preserves the textural properties of the ion exchange material. In some embodiments, treatment of the ion exchange material with a chemical additive prevents the dissolution of the ion exchange material in the liquid resource, wash solution, acid, or combinations thereof. In some embodiments, treatment of the ion exchange material with a chemical additive increases the lifetime of the ion exchange material results in an increased production of lithium carbonate equivalents per kilogram of ion exchange material during the lifetime of said ion exchange material. In some embodiments, treatment of the ion exchange material with a chemical additive increases the purity of the lithium eluted from the ion exchange material. Exemplary embodiments in the examples section illustrate these types of effects of chemical additives on the ion exchange material.

In some embodiments, contact of the ion exchange material with a chemical additive increases the lifetime of the ion exchange beads from about 100 cycles to about 1000 cycles of ion exchange, from about 10 cycles to about 100 cycles, from about 50 cycles to about 100 cycles, from about 100 cycles to about 200 cycles, from about 100 cycles to about 500 cycles, from about 100 cycles to about 1000 cycles, from about 200 cycles to about 500 cycles, from about 200 cycles to about 1000 cycles, from about 500 cycles to about 1000 cycles.

In some embodiments, contact of the chemical additive results in an increase of the lifetime of the ion exchange beads by about 50 cycles to about 2,000 cycles. In some embodiments, contact of the chemical additive results in an increase of the lifetime of the ion exchange beads by about 50 cycles to about 100 cycles, about 50 cycles to about 150 cycles, about 50 cycles to about 200 cycles, about 50 cycles to about 250 cycles, about 50 cycles to about 300 cycles, about 50 cycles to about 400 cycles, about 50 cycles to about 500 cycles, about 50 cycles to about 750 cycles, about 50 cycles to about 1,000 cycles, about 50 cycles to about 1,500 cycles, about 50 cycles to about 2,000 cycles, about 100 cycles to about 150 cycles, about 100 cycles to about 200 cycles, about 100 cycles to about 250 cycles, about 100 cycles to about 300 cycles, about 100 cycles to about 400 cycles, about 100 cycles to about 500 cycles, about 100 cycles to about 750 cycles, about 100 cycles to about 1,000 cycles, about 100 cycles to about 1,500 cycles, about 100 cycles to about 2,000 cycles, about 150 cycles to about 200 cycles, about 150 cycles to about 250 cycles, about 150 cycles to about 300 cycles, about 150 cycles to about 400 cycles, about 150 cycles to about 500 cycles, about 150 cycles to about 750 cycles, about 150 cycles to about 1,000 cycles, about 150 cycles to about 1,500 cycles, about 150 cycles to about 2,000 cycles, about 200 cycles to about 250 cycles, about 200 cycles to about 300 cycles, about 200 cycles to about 400 cycles, about 200 cycles to about 500 cycles, about 200 cycles to about 750 cycles, about 200 cycles to about 1,000 cycles, about 200 cycles to about 1,500 cycles, about 200 cycles to about 2,000 cycles, about 250 cycles to about 300 cycles, about 250 cycles to about 400 cycles, about 250 cycles to about 500 cycles, about 250 cycles to about 750 cycles, about 250 cycles to about 1,000 cycles, about 250 cycles to about 1,500 cycles, about 250 cycles to about 2,000 cycles, about 300 cycles to about 400 cycles, about 300 cycles to about 500 cycles, about 300 cycles to about 750 cycles, about 300 cycles to about 1,000 cycles, about 300 cycles to about 1,500 cycles, about 300 cycles to about 2,000 cycles, about 400 cycles to about 500 cycles, about 400 cycles to about 750 cycles, about 400 cycles to about 1,000 cycles, about 400 cycles to about 1,500 cycles, about 400 cycles to about 2,000 cycles, about 500 cycles to about 750 cycles, about 500 cycles to about 1,000 cycles, about 500 cycles to about 1,500 cycles, about 500 cycles to about 2,000 cycles, about 750 cycles to about 1,000 cycles, about 750 cycles to about 1,500 cycles, about 750 cycles to about 2,000 cycles, about 1,000 cycles to about 1,500 cycles, about 1,000 cycles to about 2,000 cycles, or about 1,500 cycles to about 2,000 cycles. In some embodiments, contact of the chemical additive results in an increase of the lifetime of the ion exchange beads by about 50 cycles, about 100 cycles, about 150 cycles, about 200 cycles, about 250 cycles, about 300 cycles, about 400 cycles, about 500 cycles, about 750 cycles, about 1,000 cycles, about 1,500 cycles, or about 2,000 cycles. In some embodiments, contact of the chemical additive results in an increase of the lifetime of the ion exchange beads by at least about 50 cycles, about 100 cycles, about 150 cycles, about 200 cycles, about 250 cycles, about 300 cycles, about 400 cycles, about 500 cycles, about 750 cycles, about 1,000 cycles, or about 1,500 cycles. In some embodiments, contact of the chemical additive results in an increase of the lifetime of the ion exchange beads by at most about 100 cycles, about 150 cycles, about 200 cycles, about 250 cycles, about 300 cycles, about 400 cycles, about 500 cycles, about 750 cycles, about 1,000 cycles, about 1,500 cycles, or about 2,000 cycles.

In some embodiments, contact of the ion exchange material with a chemical additive increases the amount of lithium carbonate equivalents produced by the ion exchange beads from about 1 kg of lithium carbonate equivalents per kg of ion exchange material to about 100 kg of lithium carbonate equivalents per kg of ion exchange material, from about 10 kg of lithium carbonate equivalents per kg of ion exchange material to about 100 kg of lithium carbonate equivalents per kg of ion exchange material, from about 50 kg of lithium carbonate equivalents per kg of ion exchange material to about 100 kg of lithium carbonate equivalents per kg of ion exchange material, from about 10 kg of lithium carbonate equivalents per kg of ion exchange material to about 20 kg of lithium carbonate equivalents per kg of ion exchange material, from about 10 kg of lithium carbonate equivalents per kg of ion exchange material to about 30 kg of lithium carbonate equivalents per kg of ion exchange material, from about 10 kg of lithium carbonate equivalents per kg of ion exchange material to about 50 kg of lithium carbonate equivalents per kg of ion exchange material, from about 5 kg of lithium carbonate equivalents per kg of ion exchange material to about 10 kg of lithium carbonate equivalents per kg of ion exchange material, from about 5 kg of lithium carbonate equivalents per kg of ion exchange material to about 20 kg of lithium carbonate equivalents per kg of ion exchange material, from about 5 kg of lithium carbonate equivalents per kg of ion exchange material to about 50 kg of lithium carbonate equivalents per kg of ion exchange material.

In some embodiments, contact of the ion exchange material with a chemical additive decreases the dissolution of the ion exchange material per cycle of ion exchange from about 1% to about 0.01% by mass, from about 1% to about 0.1% by mass, from about 1% to about 0.5% by mass, from about 10% to about 0.01% by mass, from about 10% to about 0.1% by mass, from about 10% to about 1% by mass, from about 0.5% to about 0.01% by mass, from about 0.5% to about 0.1% by mass, from about 0.1% to about 0.01% by mass.

In some embodiments, contact of the ion exchange material with a chemical additive decreases the dissolution of the ion exchange material per cycle to about 0.001% to about 0.02% by mass. In some embodiments, contact of the ion exchange material with a chemical additive decreases the dissolution of the ion exchange material per cycle to about 0.001% to about 0.002%, about 0.001% to about 0.003%, about 0.001% to about 0.004%, about 0.001% to about 0.005%, about 0.001% to about 0.01%, about 0.001% to about 0.02%, about 0.002% to about 0.003%, about 0.002% to about 0.004%, about 0.002% to about 0.005%, about 0.002% to about 0.01%, about 0.002% to about 0.02%, about 0.003% to about 0.004%, about 0.003% to about 0.005%, about 0.003% to about 0.01%, about 0.003% to about 0.02%, about 0.004% to about 0.005%, about 0.004% to about 0.01%, about 0.004% to about 0.02%, about 0.005% to about 0.01%, about 0.005% to about 0.02%, or about 0.01% to about 0.02%. In some embodiments, contact of the ion exchange material with a chemical additive decreases the dissolution of the ion exchange material per cycle to about 0.001%, about 0.002%, about 0.003%, about 0.004%, about 0.005%, about 0.01%, or about 0.02%. In some embodiments, contact of the ion exchange material with a chemical additive decreases the dissolution of the ion exchange material per cycle to at least about 0.001%, about 0.002%, about 0.003%, about 0.004%, about 0.005%, or about 0.01%. In some embodiments, contact of the ion exchange material with a chemical additive decreases the dissolution of the ion exchange material per cycle to at most about 0.002%, about 0.003%, about 0.004%, about 0.005%, about 0.01% or about 0.02%.

In some embodiments, contact of the ion exchange material with a chemical additive increases the molar purity of the lithium in the eluent from approximately 75% to approximately 95%, from approximately 75% to approximately 90%, from approximately 75% to approximately 85%, from approximately 75% to approximately 80%, from approximately 80% to approximately 95%, from approximately 80% to approximately 90% from approximately 80% to approximately 85%, from approximately 85% to approximately 95%, from approximately 85% to approximately 90%.

In some embodiments, the molar purity of the lithium in the lithium eluate is increased to about 70% to about 99%. In some embodiments, the molar purity of the lithium in the lithium eluate is increased to about 70% to about 75%, about 70% to about 80%, about 70% to about 82%, about 70% to about 84%, about 70% to about 85%, about 70% to about 86%, about 70% to about 88%, about 70% to about 90%, about 70% to about 95%, about 70% to about 99%, about 75% to about 80%, about 75% to about 82%, about 75% to about 84%, about 75% to about 85%, about 75% to about 86%, about 75% to about 88%, about 75% to about 90%, about 75% to about 95%, about 75% to about 99%, about 80% to about 82%, about 80% to about 84%, about 80% to about 85%, about 80% to about 86%, about 80% to about 88%, about 80% to about 90%, about 80% to about 95%, about 80% to about 99%, about 82% to about 84%, about 82% to about 85%, about 82% to about 86%, about 82% to about 88%, about 82% to about 90%, about 82% to about 95%, about 82% to about 99%, about 84% to about 85%, about 84% to about 86%, about 84% to about 88%, about 84% to about 90%, about 84% to about 95%, about 84% to about 99%, about 85% to about 86%, about 85% to about 88%, about 85% to about 90%, about 85% to about 95%, about 85% to about 99%, about 86% to about 88%, about 86% to about 90%, about 86% to about 95%, about 86% to about 99%, about 88% to about 90%, about 88% to about 95%, about 88% to about 99%, about 90% to about 95%, about 90% to about 99%, or about 95% to about 99%. In some embodiments, the molar purity of the lithium in the lithium eluate is increased to about 70%, about 75%, about 80%, about 82%, about 84%, about 85%, about 86%, about 88%, about 90%, about 95%, or about 99%. In some embodiments, the molar purity of the lithium in the lithium eluate is increased to at least about 70%, about 75%, about 80%, about 82%, about 84%, about 85%, about 86%, about 88%, about 90%, or about 95%. In some embodiments, the molar purity of the lithium in the lithium eluate is increased to at most about 75%, about 80%, about 82%, about 84%, about 85%, about 86%, about 88%, about 90%, about 95%, or about 99%.

In some embodiments, the chemical additive comprises a redox agent. A redox agent is a chemical agent that adjusts the oxidation-reduction potential of a liquid when dosed and mixed into said liquid. In some embodiments, the redox agent comprises a gas. In some embodiments, the redox agent comprises a liquid. In some embodiments, the redox agent comprises a solid. In some embodiments, the redox agent comprises a solution. In some embodiments, the redox agent comprises an aqueous solution. In some embodiments, the redox agent comprises a nonaqueous solution.

In some embodiments, the chemical additive comprises an oxidant. An oxidant is a chemical agent that adjusts the oxidation-reduction potential of a liquid to a higher value, leading to a chemical environment that is more oxidizing. For example, an oxidant such as sodium hypochlorite adjusts the oxidation-reduction potential of water from a value of about 350 mV to a value of about 600 mV, when dosed at about 600 mg/L. The resulting oxidizing chemical environment may cause species in contact in said environments to undergo oxidation reactions. Such oxidation reactions involve the loss of electrons of those species, resulting in them acquiring a higher oxidation state or valence state. In some embodiments, the resulting oxidizing environments prevent species in contact with said environment from undergoing reduction reactions. In some embodiments, said oxidant comprises one of more of oxygen, air, ozone, hydrogen peroxide, fluorine, chlorine, bromine, iodine, nitric acid, a nitrate compound, sodium hypochlorite, bleach, a chlorite, a chlorate, a perchlorate, potassium permanganate, a permanganate, sodium perborate, a perborate, mixtures thereof or combinations thereof. In some embodiments, said oxidant comprises one of more of oxygen, air, ozone, hydrogen peroxide, fluorine, chlorine, bromine, iodine, nitric acid, a nitrate compound, sodium hypochlorite, bleach, potassium permanganate, a permanganate (e.g., a permanganate compound, a permanganate salt, a solution comprising permanganate), sodium perborate, a perborate (e.g., a perborate compound, a perborate salt, a solution comprising perborate), hypochlorous acid, lithium hypochlorite, sodium hypochlorite, potassium hypochlorite, magnesium hypochlorite, calcium hypochlorite, strontium hypochlorite, a persulfate (e.g., a persulfate compound, a persulfate salt, a solution comprising persulfate), hexavalent chromium compounds (e.g., a compound comprising chromium in a 6+ oxidation state, a solution comprising chromium in a 6+ oxidation state), nitrous oxide, sodium bismuthate, potassium peroxymonosulfate, sulfuric acid, peroxydisulfuric acid, peroxymonosulfuric acid, combinations thereof, or mixtures thereof. In some embodiments, the chemical additive does not comprise air. In some embodiments, the chemical additive is not air.

In some embodiments, oxidants comprising bromine include bromine, hypobromite, hypobromous acid, bromite, bromate, tribromide, and perbromate, including salts thereof with countercations comprising lithium, sodium, potassium, magnesium, calcium, or strontium, and including solutions thereof. In some embodiments, oxidants comprising fluorine include fluorine, hypofluorous acid, hypoflurite, fluorite, fluorate, and perfluorate, including salts thereof with countercations comprising lithium, sodium, potassium, magnesium, calcium, or strontium, and including solutions thereof. In some embodiments, oxidants comprising iodine include iodine, hypoiodous acid, hypoiodite, iodiite, iodate, periodate, and triiodine, including salts thereof with countercations comprising lithium, sodium, potassium, magnesium, calcium, or strontium, and including solutions thereof. In some embodiments, oxidants comprising chlorine include chlorine, hypochlorite, chlorite, chlorate, and perchlorate, including salts thereof with countercations comprising lithium, sodium, potassium, magnesium, calcium, or strontium, and including solutions thereof.

In some embodiments, the chemical additive does not include air, ozone, or hydrogen sulfide scavengers.

In some embodiments, the chemical additive comprises a reductant. A reductant is a chemical agent that adjusts the oxidation-reduction potential of a liquid to a lower value, leading to a chemical environment that is more reducing. For example, a reductant such as hydrogen adjusts the oxidation-reduction potential of water from a value of about 350 mV to a value of about 0 mV, when bubbled through water. The resulting reducing chemical environment may cause species in contact in said environments to undergo reduction reactions. Such reduction reactions involve the gain of electrons of those species, resulting in them acquiring a lower oxidation state or valence state. In some embodiments, the resulting reducing environments prevent species in contact with said environment from undergoing oxidation reactions. In some embodiments, said reductant comprises one of more of sodium bisulfite, sodium metabisulfite, sodium borohydride, formic acid, ascorbic acid, oxalic acid, potassium iodide, hydrogen, other reducing species, mixtures thereof, or combinations thereof. In some embodiments, one or more of the chemical additives are contacted with the ion exchange material as a pure gas, as a pure liquid, a mixture thereof, or a solution thereof.

In some embodiments, a chemical additive is added (e.g., to the liquid resource, the washing solution, the acid solution, the ion exchange material, the raffinate, the lithium eluate) at a temperature (or within a temperature range) that is pre-determined, wherein the temperature (or temperature range) is the temperature (or temperature range) of the liquid or material to which the chemical additive is being added. In some embodiments, a chemical additive is added (e.g., to the liquid resource, the washing solution, the acid solution, the ion exchange material, the raffinate, the lithium eluate) at a temperature in the range of about −20 degrees Celsius to about 200 degrees Celsius, wherein the temperature is the temperature of the liquid or material to which the chemical additive is being added. In some embodiments, the temperature is about −20 degrees Celsius to about 200 degrees Celsius. In some embodiments, the temperature is about −20 degrees Celsius to about 0 degrees Celsius, about −20 degrees Celsius to about 20 degrees Celsius, about −20 degrees Celsius to about 40 degrees Celsius, about −20 degrees Celsius to about 60 degrees Celsius, about −20 degrees Celsius to about 80 degrees Celsius, about −20 degrees Celsius to about 100 degrees Celsius, about −20 degrees Celsius to about 120 degrees Celsius, about −20 degrees Celsius to about 140 degrees Celsius, about −20 degrees Celsius to about 160 degrees Celsius, about −20 degrees Celsius to about 180 degrees Celsius, about −20 degrees Celsius to about 200 degrees Celsius, about 0 degrees Celsius to about 20 degrees Celsius, about 0 degrees Celsius to about 40 degrees Celsius, about 0 degrees Celsius to about 60 degrees Celsius, about 0 degrees Celsius to about 80 degrees Celsius, about 0 degrees Celsius to about 100 degrees Celsius, about 0 degrees Celsius to about 120 degrees Celsius, about 0 degrees Celsius to about 140 degrees Celsius, about 0 degrees Celsius to about 160 degrees Celsius, about 0 degrees Celsius to about 180 degrees Celsius, about 0 degrees Celsius to about 200 degrees Celsius, about 20 degrees Celsius to about 40 degrees Celsius, about 20 degrees Celsius to about 60 degrees Celsius, about 20 degrees Celsius to about 80 degrees Celsius, about 20 degrees Celsius to about 100 degrees Celsius, about 20 degrees Celsius to about 120 degrees Celsius, about 20 degrees Celsius to about 140 degrees Celsius, about 20 degrees Celsius to about 160 degrees Celsius, about 20 degrees Celsius to about 180 degrees Celsius, about 20 degrees Celsius to about 200 degrees Celsius, about 40 degrees Celsius to about 60 degrees Celsius, about 40 degrees Celsius to about 80 degrees Celsius, about 40 degrees Celsius to about 100 degrees Celsius, about 40 degrees Celsius to about 120 degrees Celsius, about 40 degrees Celsius to about 140 degrees Celsius, about 40 degrees Celsius to about 160 degrees Celsius, about 40 degrees Celsius to about 180 degrees Celsius, about 40 degrees Celsius to about 200 degrees Celsius, about 60 degrees Celsius to about 80 degrees Celsius, about 60 degrees Celsius to about 100 degrees Celsius, about 60 degrees Celsius to about 120 degrees Celsius, about 60 degrees Celsius to about 140 degrees Celsius, about 60 degrees Celsius to about 160 degrees Celsius, about 60 degrees Celsius to about 180 degrees Celsius, about 60 degrees Celsius to about 200 degrees Celsius, about 80 degrees Celsius to about 100 degrees Celsius, about 80 degrees Celsius to about 120 degrees Celsius, about 80 degrees Celsius to about 140 degrees Celsius, about 80 degrees Celsius to about 160 degrees Celsius, about 80 degrees Celsius to about 180 degrees Celsius, about 80 degrees Celsius to about 200 degrees Celsius, about 100 degrees Celsius to about 120 degrees Celsius, about 100 degrees Celsius to about 140 degrees Celsius, about 100 degrees Celsius to about 160 degrees Celsius, about 100 degrees Celsius to about 180 degrees Celsius, about 100 degrees Celsius to about 200 degrees Celsius, about 120 degrees Celsius to about 140 degrees Celsius, about 120 degrees Celsius to about 160 degrees Celsius, about 120 degrees Celsius to about 180 degrees Celsius, about 120 degrees Celsius to about 200 degrees Celsius, about 140 degrees Celsius to about 160 degrees Celsius, about 140 degrees Celsius to about 180 degrees Celsius, about 140 degrees Celsius to about 200 degrees Celsius, about 160 degrees Celsius to about 180 degrees Celsius, about 160 degrees Celsius to about 200 degrees Celsius, or about 180 degrees Celsius to about 200 degrees Celsius. In some embodiments, the temperature is about −20 degrees Celsius, about 0 degrees Celsius, about 20 degrees Celsius, about 40 degrees Celsius, about 60 degrees Celsius, about 80 degrees Celsius, about 100 degrees Celsius, about 120 degrees Celsius, about 140 degrees Celsius, about 160 degrees Celsius, about 180 degrees Celsius, or about 200 degrees Celsius. In some embodiments, the temperature is at least about −20 degrees Celsius, about 0 degrees Celsius, about 20 degrees Celsius, about 40 degrees Celsius, about 60 degrees Celsius, about 80 degrees Celsius, about 100 degrees Celsius, about 120 degrees Celsius, about 140 degrees Celsius, about 160 degrees Celsius, or about 180 degrees Celsius. In some embodiments, the temperature is at most about 0 degrees Celsius, about 20 degrees Celsius, about 40 degrees Celsius, about 60 degrees Celsius, about 80 degrees Celsius, about 100 degrees Celsius, about 120 degrees Celsius, about 140 degrees Celsius, about 160 degrees Celsius, about 180 degrees Celsius, or about 200 degrees Celsius.

In some embodiments, the chemical additive is dosed into the liquid resource, wash solution, or acidic eluent at a specific concentration chosen to optimize the performance of the system. In some embodiments, the chemical additive is dosed into the liquid resource, wash solution, or acidic eluent at a specific concentration chosen to optimize the performance of the method. In some embodiments, the concentration of the chemical additive in said liquid resource, wash solution, or acidic eluent is greater than about 0.1 milligrams per liter and less than about 10,000 milligrams per liter. In some embodiments, said concentration is greater than about 1 milligram per liter and less than about 50 milligrams per liter. In some embodiments, said concentration is greater than about 50 milligrams per liter and less than about 100 milligrams per liter. In some embodiments, said concentration is greater than about 100 milligrams per liter and less than about 200 milligrams per liter. In some embodiments, said concentration is greater than about 200 milligrams per liter and less than about 300 milligrams per liter. In some embodiments, said concentration is greater than about 300 milligrams per liter and less than about 400 milligrams per liter. In some embodiments, said concentration is greater than about 400.0 milligrams per liter and less than about 500.0 milligrams per liter. In some embodiments, said concentration is greater than about 500.0 milligrams per liter and less than about 600.0 milligrams per liter. In some embodiments, said concentration is greater than about 600.0 milligrams per liter and less than about 700.0 milligrams per liter. In some embodiments, said concentration is greater than about 700.0 milligrams per liter and less than about 800.0 milligrams per liter. In some embodiments, said concentration is greater than about 800.0 milligrams per liter and less than about 1200.0 milligrams per liter. In some embodiments, said concentration is greater than about 1000.0 milligrams per liter and less than about 4000.0 milligrams per liter. In some embodiments, said concentration is greater than about 4000.0 milligrams per liter and less than about 10,000.0 milligrams per liter. In some embodiments, said concentration is greater than about 9000.0 milligrams per liter and less than about 100,000.0 milligrams per liter.

In some embodiments, ozone is dosed into the liquid resource at a specific concentration chosen to optimize the performance of the system. In some embodiments, ozone is dosed into the liquid resource at a specific concentration chosen to optimize the performance of the method. In some embodiments, the concentration of the ozone in said liquid resource is greater than about 0.1 milligrams per liter and less than about 1,000 milligrams per liter. In some embodiments, said concentration is greater than about 1 milligram per liter and less than about 50 milligrams per liter. In some embodiments, said concentration is greater than about 50 milligrams per liter and less than about 100 milligrams per liter. In some embodiments, said concentration is greater than about 100 milligrams per liter and less than about 200 milligrams per liter. In some embodiments, said concentration is greater than about 200 milligrams per liter and less than about 300 milligrams per liter. In some embodiments, said concentration is greater than about 300 milligrams per liter and less than about 400 milligrams per liter. In some embodiments, said concentration is greater than about 400.0 milligrams per liter and less than about 500.0 milligrams per liter. In some embodiments, said concentration is greater than about 500.0 milligrams per liter and less than about 600.0 milligrams per liter. In some embodiments, said concentration is greater than about 600.0 milligrams per liter and less than about 700.0 milligrams per liter. In some embodiments, said concentration is greater than about 700.0 milligrams per liter and less than about 800.0 milligrams per liter. In some embodiments, said concentration is greater than about 800.0 milligrams per liter and less than about 1,000.0 milligrams per liter.

In some embodiments, sodium hypochlorite is dosed into the liquid resource at a specific concentration chosen to optimize the performance of the system. In some embodiments, sodium hypochlorite is dosed into the liquid resource at a specific concentration chosen to optimize the performance of the method. In some embodiments, the concentration of the sodium hypochlorite in said liquid resource is greater than about 0.1 milligrams per liter and less than about 1,000 milligrams per liter. In some embodiments, said concentration is greater than about 1 milligram per liter and less than about 50 milligrams per liter. In some embodiments, said concentration is greater than about 50 milligrams per liter and less than about 100 milligrams per liter.

In some embodiments, said concentration is greater than about 100 milligrams per liter and less than about 200 milligrams per liter. In some embodiments, said concentration is greater than about 200 milligrams per liter and less than about 300 milligrams per liter. In some embodiments, said concentration is greater than about 300 milligrams per liter and less than about 400 milligrams per liter. In some embodiments, said concentration is greater than about 400.0 milligrams per liter and less than about 500.0 milligrams per liter. In some embodiments, said concentration is greater than about 500.0 milligrams per liter and less than about 600.0 milligrams per liter. In some embodiments, said concentration is greater than about 600.0 milligrams per liter and less than about 700.0 milligrams per liter. In some embodiments, said concentration is greater than about 700.0 milligrams per liter and less than about 800.0 milligrams per liter. In some embodiments, said concentration is greater than about 800.0 milligrams per liter and less than about 1,000.0 milligrams per liter. In some embodiments, said concentration is greater than about 1000.0 milligrams per liter and less than about 3,000.0 milligrams per liter. In some embodiments, said concentration is greater than about 21000.0 milligrams per liter and less than about 5,000.0 milligrams per liter. In some embodiments, said concentration is greater than about 4000.0 milligrams per liter and less than about 10,000.0 milligrams per liter. In some embodiments, said concentration is greater than about 9000.0 milligrams per liter and less than about 50,000.0 milligrams per liter. In some embodiments, said concentration is greater than about 40,000.0 milligrams per liter and less than about 100,000.0 milligrams per liter.

In some embodiments, hydrogen peroxide is dosed into the liquid resource at a specific concentration chosen to optimize the performance of the system. In some embodiments, hydrogen peroxide is dosed into the liquid resource at a specific concentration chosen to optimize the performance of the method. In some embodiments, the concentration of the hydrogen peroxide in said liquid resource is greater than about 0.1 milligrams per liter and less than about 1,000 milligrams per liter. In some embodiments, said concentration is greater than about 1 milligram per liter and less than about 50 milligrams per liter. In some embodiments, said concentration is greater than about 50 milligrams per liter and less than about 100 milligrams per liter. In some embodiments, said concentration is greater than about 100 milligrams per liter and less than about 200 milligrams per liter. In some embodiments, said concentration is greater than about 200 milligrams per liter and less than about 300 milligrams per liter. In some embodiments, said concentration is greater than about 300 milligrams per liter and less than about 400 milligrams per liter. In some embodiments, said concentration is greater than about 400.0 milligrams per liter and less than about 500.0 milligrams per liter. In some embodiments, said concentration is greater than about 500.0 milligrams per liter and less than about 600.0 milligrams per liter. In some embodiments, said concentration is greater than about 600.0 milligrams per liter and less than about 700.0 milligrams per liter. In some embodiments, said concentration is greater than about 700.0 milligrams per liter and less than about 800.0 milligrams per liter. In some embodiments, said concentration is greater than about 800.0 milligrams per liter and less than about 1,000.0 milligrams per liter. In some embodiments, said concentration is greater than about 1000.0 milligrams per liter and less than about 3,000.0 milligrams per liter. In some embodiments, said concentration is greater than about 21000.0 milligrams per liter and less than about 5,000.0 milligrams per liter. In some embodiments, said concentration is greater than about 4000.0 milligrams per liter and less than about 10,000.0 milligrams per liter. In some embodiments, said concentration is greater than about 9000.0 milligrams per liter and less than about 50,000.0 milligrams per liter. In some embodiments, said concentration is greater than about 40,000.0 milligrams per liter and less than about 100,000.0 milligrams per liter.

In some embodiments, sodium metabisulfite is dosed into the liquid resource at a specific concentration chosen to optimize the performance of the system. In some embodiments, sodium metabisulfite is dosed into the liquid resource at a specific concentration chosen to optimize the performance of the method. In some embodiments, the concentration of the sodium metabisulfite in said liquid resource is greater than about 0.1 milligrams per liter and less than about 1,000 milligrams per liter. In some embodiments, said concentration is greater than about 1 milligram per liter and less than about 50 milligrams per liter. In some embodiments, said concentration is greater than about 50 milligrams per liter and less than about 100 milligrams per liter. In some embodiments, said concentration is greater than about 100 milligrams per liter and less than about 200 milligrams per liter. In some embodiments, said concentration is greater than about 200 milligrams per liter and less than about 300 milligrams per liter. In some embodiments, said concentration is greater than about 300 milligrams per liter and less than about 400 milligrams per liter. In some embodiments, said concentration is greater than about 400.0 milligrams per liter and less than about 500.0 milligrams per liter. In some embodiments, said concentration is greater than about 500.0 milligrams per liter and less than about 600.0 milligrams per liter. In some embodiments, said concentration is greater than about 600.0 milligrams per liter and less than about 700.0 milligrams per liter. In some embodiments, said concentration is greater than about 700.0 milligrams per liter and less than about 800.0 milligrams per liter. In some embodiments, said concentration is greater than about 800.0 milligrams per liter and less than about 1,000.0 milligrams per liter. In some embodiments, said concentration is greater than about 1000.0 milligrams per liter and less than about 3,000.0 milligrams per liter. In some embodiments, said concentration is greater than about 21000.0 milligrams per liter and less than about 5,000.0 milligrams per liter. In some embodiments, said concentration is greater than about 4000.0 milligrams per liter and less than about 10,000.0 milligrams per liter. In some embodiments, said concentration is greater than about 9000.0 milligrams per liter and less than about 50,000.0 milligrams per liter. In some embodiments, said concentration is greater than about 40,000.0 milligrams per liter and less than about 100,000.0 milligrams per liter.

In some embodiments, ozone is dosed into the wash solution at a specific concentration chosen to optimize the performance of the system. In some embodiments, ozone is dosed into the wash solution at a specific concentration chosen to optimize the performance of the method. In some embodiments, the concentration of the ozone in said wash solution is greater than about 0.1 milligrams per liter and less than about 1,000 milligrams per liter. In some embodiments, said concentration is greater than about 1 milligram per liter and less than about 50 milligrams per liter. In some embodiments, said concentration is greater than about 50 milligrams per liter and less than about 100 milligrams per liter. In some embodiments, said concentration is greater than about 100 milligrams per liter and less than about 200 milligrams per liter. In some embodiments, said concentration is greater than about 200 milligrams per liter and less than about 300 milligrams per liter. In some embodiments, said concentration is greater than about 300 milligrams per liter and less than about 400 milligrams per liter. In some embodiments, said concentration is greater than about 400.0 milligrams per liter and less than about 500.0 milligrams per liter. In some embodiments, said concentration is greater than about 500.0 milligrams per liter and less than about 600.0 milligrams per liter. In some embodiments, said concentration is greater than about 600.0 milligrams per liter and less than about 700.0 milligrams per liter. In some embodiments, said concentration is greater than about 700.0 milligrams per liter and less than about 800.0 milligrams per liter. In some embodiments, said concentration is greater than about 800.0 milligrams per liter and less than about 1,000.0 milligrams per liter. In some embodiments, said concentration is greater than about 1000.0 milligrams per liter and less than about 3,000.0 milligrams per liter. In some embodiments, said concentration is greater than about 21000.0 milligrams per liter and less than about 5,000.0 milligrams per liter. In some embodiments, said concentration is greater than about 4000.0 milligrams per liter and less than about 10,000.0 milligrams per liter. In some embodi- In some embodiments, sodium hypochlorite is dosed into the wash solution at a specific concentration chosen to optimize the performance of the system. In some embodiments, sodium hypochlorite is dosed into the wash solution at a specific concentration chosen to optimize the performance of the method. In some embodiments, the concentration of the sodium hypochlorite in said wash solution is greater than about 0.1 milligrams per liter and less than about 1,000 milligrams per liter. In some embodiments, said concentration is greater than about 1 milligram per liter and less than about 50 milligrams per liter. In some embodiments, said concentration is greater than about 50 milligrams per liter and less than about 100 milligrams per liter. In some embodiments, said concentration is greater than about 100 milligrams per liter and less than about 200 milligrams per liter. In some embodiments, said concentration is greater than about 200 milligrams per liter and less than about 300 milligrams per liter. In some embodiments, said concentration is greater than about 300 milligrams per liter and less than about 400 milligrams per liter. In some embodiments, said concentration is greater than about 400.0 milligrams per liter and less than about 500.0 milligrams per liter. In some embodiments, said concentration is greater than about 500.0 milligrams per liter and less than about 600.0 milligrams per liter. In some embodiments, said concentration is greater than about 600.0 milligrams per liter and less than about 700.0 milligrams per liter. In some embodiments, said concentration is greater than about 700.0 milligrams per liter and less than about 800.0 milligrams per liter. In some embodiments, said concentration is greater than about 800.0 milligrams per liter and less than about 1,000.0 milligrams per liter. In some embodiments, said concentration is greater than about 1000.0 milligrams per liter and less than about 3,000.0 milligrams per liter. In some embodiments, said concentration is greater than about 21000.0 milligrams per liter and less than about 5,000.0 milligrams per liter. In some embodiments, said concentration is greater than about 4000.0 milligrams per liter and less than about 10,000.0 milligrams per liter. In some embodiments, said concentration is greater than about 9000.0 milligrams per liter and less than about 50,000.0 milligrams per liter. In some embodiments, said concentration is greater than about 40,000.0 milligrams per liter and less than about 100,000.0 milligrams per liter.

In some embodiments, hydrogen peroxide is dosed into the wash solution at a specific concentration chosen to optimize the performance of the system. In some embodiments, hydrogen peroxide is dosed into the wash solution at a specific concentration chosen to optimize the performance of the method. In some embodiments, the concentration of the hydrogen peroxide in said wash solution is greater than about 0.1 milligrams per liter and less than about 1,000 milligrams per liter. In some embodiments, said concentration is greater than about 1 milligram per liter and less than about 50 milligrams per liter. In some embodiments, said concentration is greater than about 50 milligrams per liter and less than about 100 milligrams per liter. In some embodiments, said concentration is greater than about 100 milligrams per liter and less than about 200 milligrams per liter. In some embodiments, said concentration is greater than about 200 milligrams per liter and less than about 300 milligrams per liter. In some embodiments, said concentration is greater than about 300 milligrams per liter and less than about 400 milligrams per liter. In some embodiments, said concentration is greater than about 400.0 milligrams per liter and less than about 500.0 milligrams per liter. In some embodiments, said concentration is greater than about 500.0 milligrams per liter and less than about 600.0 milligrams per liter. In some embodiments, said concentration is greater than about 600.0 milligrams per liter and less than about 700.0 milligrams per liter. In some embodiments, said concentration is greater than about 700.0 milligrams per liter and less than about 800.0 milligrams per liter. In some embodiments, said concentration is greater than about 800.0 milligrams per liter and less than about 1,000.0 milligrams per liter. In some embodiments, said concentration is greater than about 1000.0 milligrams per liter and less than about 3,000.0 milligrams per liter. In some embodiments, said concentration is greater than about 21000.0 milligrams per liter and less than about 5,000.0 milligrams per liter. In some embodiments, said concentration is greater than about 4000.0 milligrams per liter and less than about 10,000.0 milligrams per liter. In some embodiments, said concentration is greater than about 9000.0 milligrams per liter and less than about 50,000.0 milligrams per liter. In some embodiments, said concentration is greater than about 40,000.0 milligrams per liter and less than about 100,000.0 milligrams per liter.

In some embodiments, sodium metabisulfite is dosed into the wash solution at a specific concentration chosen to optimize the performance of the system. In some embodiments, sodium metabisulfite is dosed into the wash solution at a specific concentration chosen to optimize the performance of the method. In some embodiments, the concentration of the sodium metabisulfite in said wash solution is greater than about 0.1 milligrams per liter and less than about 1,000 milligrams per liter. In some embodiments, said concentration is greater than about 1 milligram per liter and less than about 50 milligrams per liter. In some embodiments, said concentration is greater than about 50 milligrams per liter and less than about 100 milligrams per liter. In some embodiments, said concentration is greater than about 100 milligrams per liter and less than about 200 milligrams per liter. In some embodiments, said concentration is greater than about 200 milligrams per liter and less than about 300 milligrams per liter. In some embodiments, said concentration is greater than about 300 milligrams per liter and less than about 400 milligrams per liter. In some embodiments, said concentration is greater than about 400.0 milligrams per liter and less than about 500.0 milligrams per liter. In some embodiments, said concentration is greater than about 500.0 milligrams per liter and less than about 600.0 milligrams per liter. In some embodiments, said concentration is greater than about 600.0 milligrams per liter and less than about 700.0 milligrams per liter. In some embodiments, said concentration is greater than about 700.0 milligrams per liter and less than about 800.0 milligrams per liter. In some embodiments, said concentration is greater than about 800.0 milligrams per liter and less than about 1,000.0 milligrams per liter. In some embodiments, said concentration is greater than about 1000.0 milligrams per liter and less than about 3,000.0 milligrams per liter. In some embodiments, said concentration is greater than about 21000.0 milligrams per liter and less than about 5,000.0 milligrams per liter. In some embodiments, said concentration is greater than about 4000.0 milligrams per liter and less than about 10,000.0 milligrams per liter. In some embodiments, said concentration is greater than about 9000.0 milligrams per liter and less than about 50,000.0 milligrams per liter. In some embodiments, said concentration is greater than about 40,000.0 milligrams per liter and less than about 100,000.0 milligrams per liter.

In some embodiments, the value of oxidation-reduction potential of the liquid resource is greater than about 50.0 mV and less than about 800.0 mV. In some embodiments, the value of oxidation-reduction potential is greater than about 100.0 mV and less than about 500.0 mV. In some embodiments, the value of oxidation-reduction potential is greater than about 200.0 mV and less than about 400.0 mV. In some embodiments, the value of oxidation-reduction potential is greater than about −450.0 mV and less than about 0.0 mV. In some embodiments, the value of oxidation-reduction potential is greater than about −200.0 mV and less than about 50.0 mV. In some embodiments, the value of oxidation-reduction potential is greater than about −50.0 mV and less than about 100.0 mV. In some embodiments, the value of oxidation-reduction potential is greater than about 50.0 mV and less than about 300.0 mV. In some embodiments, the value of oxidation-reduction potential is greater than about 100.0 mV and less than about 400.0 mV. In some embodiments, the value of oxidation-reduction potential is greater than about 200.0 mV and less than about 600.0 mV. In some embodiments, the value of oxidation-reduction potential is greater than about 300.0 mV and less than about 800.0 mV. In some embodiments, the value of oxidation-reduction potential is greater than about 500.0 mV and less than about 1000.0 mV. In some embodiments, the value of oxidation-reduction potential is greater than about 750.0 mV and less than about 1100.0 mV.

In some embodiments, treatment of the liquid resource with a chemical additive adjusts the oxidation-reduction potential of the liquid resource. In some embodiments, the value of oxidation-reduction potential of the treated liquid resource is greater than about 50.0 mV and less than about 800.0 mV. In some embodiments, the value of oxidation-reduction potential of the treated liquid resource is greater than about 100.0 mV and less than about 500.0 mV. In some embodiments, the value of oxidation-reduction potential of the treated liquid resource is greater than about 200.0 mV and less than about 400.0 mV. In some embodiments, the value of oxidation-reduction potential of the treated liquid resource is greater than about −450.0 mV and less than about 0.0 mV. In some embodiments, the value of oxidation-reduction potential of the treated liquid resource is greater than about −200.0 mV and less than about 50.0 mV. In some embodiments, the value of oxidation-reduction potential of the treated liquid resource is greater than about −50.0 mV and less than about 100.0 mV. In some embodiments, the value of oxidation-reduction potential of the treated liquid resource is greater than about 50.0 mV and less than about 300.0 mV. In some embodiments, the value of oxidation-reduction potential of the treated liquid resource is greater than about 100.0 mV and less than about 400.0 mV. In some embodiments, the value of oxidation-reduction potential of the treated liquid resource is greater than about 200.0 mV and less than about 600.0 mV. In some embodiments, the value of oxidation-reduction potential of the treated liquid resource is greater than about 300.0 mV and less than about 800.0 mV. In some embodiments, the value of oxidation-reduction potential of the treated liquid resource is greater than about 500.0 mV and less than about 1000.0 mV. In some embodiments, the value of oxidation-reduction potential of the treated liquid resource is greater than about 750.0 mV and less than about 1100.0 mV.

In some embodiments, the value of oxidation-reduction potential of the wash solution is greater than about 50.0 mV and less than about 800.0 mV. In some embodiments, the value of oxidation-reduction potential is greater than about 100.0 mV and less than about 500.0 mV. In some embodiments, the value of oxidation-reduction potential is greater than about 200.0 mV and less than about 400.0 mV. In some embodiments, the value of oxidation-reduction potential is greater than about −450.0 mV and less than about 0.0 mV. In some embodiments, the value of oxidation-reduction potential is greater than about −200.0 mV and less than about 50.0 mV. In some embodiments, the value of oxidation-reduction potential is greater than about −50.0 mV and less than about 100.0 mV. In some embodiments, the value of oxidation-reduction potential is greater than about 50.0 mV and less than about 300.0 mV. In some embodiments, the value of oxidation-reduction potential is greater than about 100.0 mV and less than about 400.0 mV. In some embodiments, the value of oxidation-reduction potential is greater than about 200.0 mV and less than about 600.0 mV. In some embodiments, the value of oxidation-reduction potential is greater than about 300.0 mV and less than about 800.0 mV. In some embodiments, the value of oxidation-reduction potential is greater than about 500.0 mV and less than about 1000.0 mV. In some embodiments, the value of oxidation-reduction potential is greater than about 750.0 mV and less than about 1100.0 mV.

In some embodiments, the value of oxidation-reduction potential of the liquid resource is about −500 mV to about 1,300 mV. In some embodiments, the value of oxidation-reduction potential of the liquid resource is about −500 mV to about −250 mV, about −500 mV to about 0 mV, about −500 mV to about 100 mV, about −500 mV to about 200 mV, about −500 mV to about 300 mV, about −500 mV to about 400 mV, about −500 mV to about 500 mV, about −500 mV to about 700 mV, about −500 mV to about 900 mV, about −500 mV to about 1,100 mV, about −500 mV to about 1,300 mV, about −250 mV to about 0 mV, about −250 mV to about 100 mV, about −250 mV to about 200 mV, about −250 mV to about 300 mV, about −250 mV to about 400 mV, about −250 mV to about 500 mV, about −250 mV to about 700 mV, about −250 mV to about 900 mV, about −250 mV to about 1,100 mV, about −250 mV to about 1,300 mV, about 0 mV to about 100 mV, about 0 mV to about 200 mV, about 0 mV to about 300 mV, about 0 mV to about 400 mV, about 0 mV to about 500 mV, about 0 mV to about 700 mV, about 0 mV to about 900 mV, about 0 mV to about 1,100 mV, about 0 mV to about 1,300 mV, about 100 mV to about 200 mV, about 100 mV to about 300 mV, about 100 mV to about 400 mV, about 100 mV to about 500 mV, about 100 mV to about 700 mV, about 100 mV to about 900 mV, about 100 mV to about 1,100 mV, about 100 mV to about 1,300 mV, about 200 mV to about 300 mV, about 200 mV to about 400 mV, about 200 mV to about 500 mV, about 200 mV to about 700 mV, about 200 mV to about 900 mV, about 200 mV to about 1,100 mV, about 200 mV to about 1,300 mV, about 300 mV to about 400 mV, about 300 mV to about 500 mV, about 300 mV to about 700 mV, about 300 mV to about 900 mV, about 300 mV to about 1,100 mV, about 300 mV to about 1,300 mV, about 400 mV to about 500 mV, about 400 mV to about 700 mV, about 400 mV to about 900 mV, about 400 mV to about 1,100 mV, about 400 mV to about 1,300 mV, about 500 mV to about 700 mV, about 500 mV to about 900 mV, about 500 mV to about 1,100 mV, about 500 mV to about 1,300 mV, about 700 mV to about 900 mV, about 700 mV to about 1,100 mV, about 700 mV to about 1,300 mV, about 900 mV to about 1,100 mV, about 900 mV to about 1,300 mV, or about 1,100 mV to about 1,300 mV. In some embodiments, the value of oxidation-reduction potential of the liquid resource is about −500 mV, about −250 mV, about 0 mV, about 100 mV, about 200 mV, about 300 mV, about 400 mV, about 500 mV, about 700 mV, about 900 mV, about 1,100 mV, or about 1,300 mV. In some embodiments, the value of oxidation-reduction potential of the liquid resource is at least about −500 mV, about −250 mV, about 0 mV, about 100 mV, about 200 mV, about 300 mV, about 400 mV, about 500 mV, about 700 mV, about 900 mV, or about 1,100 mV. In some embodiments, the value of oxidation-reduction potential of the liquid resource is at most about −250 mV, about 0 mV, about 100 mV, about 200 mV, about 300 mV, about 400 mV, about 500 mV, about 700 mV, about 900 mV, about 1,100 mV, or about 1,300 mV.

In some embodiments, treatment of the wash solution with a chemical additive adjusts the oxidation-reduction potential of the wash water solution. In some embodiments, the value of oxidation-reduction potential of the treated wash solution is greater than about 50.0 mV and less than about 800.0 mV. In some embodiments, the value of oxidation-reduction potential of the treated wash solution is greater than about 100.0 mV and less than about 500.0 mV. In some embodiments, the value of oxidation-reduction potential of the treated wash solution is greater than about 200.0 mV and less than about 400.0 mV. In some embodiments, the value of oxidation-reduction potential of the treated wash solution is greater than about −450.0 mV and less than about 0.0 mV. In some embodiments, the value of oxidation-reduction potential of the treated wash solution is greater than about −200.0 mV and less than about 50.0 mV. In some embodiments, the value of oxidation-reduction potential of the treated wash solution is greater than about −50.0 mV and less than about 100.0 mV. In some embodiments, the value of oxidation-reduction potential of the treated wash solution is greater than about 50.0 mV and less than about 300.0 mV. In some embodiments, the value of oxidation-reduction potential of the treated wash solution is greater than about 100.0 mV and less than about 400.0 mV. In some embodiments, the value of oxidation-reduction potential of the treated wash solution is greater than about 200.0 mV and less than about 600.0 mV. In some embodiments, the value of oxidation-reduction potential of the treated wash solution is greater than about 300.0 mV and less than about 800.0 mV. In some embodiments, the value of oxidation-reduction potential of the treated wash solution is greater than about 500.0 mV and less than about 1000.0 mV. In some embodiments, the value of oxidation-reduction potential of the treated wash solution is greater than about 750.0 mV and less than about 1100.0 mV.

In some embodiments, the value of oxidation-reduction potential of the wash solution is about −500 mV to about 1,300 mV. In some embodiments, the value of oxidation-reduction potential of the wash solution is about −500 mV to about −250 mV, about −500 mV to about 0 mV, about −500 mV to about 100 mV, about −500 mV to about 200 mV, about −500 mV to about 300 mV, about −500 mV to about 400 mV, about −500 mV to about 500 mV, about −500 mV to about 700 mV, about −500 mV to about 900 mV, about −500 mV to about 1,100 mV, about −500 mV to about 1,300 mV, about −250 mV to about 0 mV, about −250 mV to about 100 mV, about −250 mV to about 200 mV, about −250 mV to about 300 mV, about −250 mV to about 400 mV, about −250 mV to about 500 mV, about −250 mV to about 700 mV, about −250 mV to about 900 mV, about −250 mV to about 1,100 mV, about −250 mV to about 1,300 mV, about 0 mV to about 100 mV, about 0 mV to about 200 mV, about 0 mV to about 300 mV, about 0 mV to about 400 mV, about 0 mV to about 500 mV, about 0 mV to about 700 mV, about 0 mV to about 900 mV, about 0 mV to about 1,100 mV, about 0 mV to about 1,300 mV, about 100 mV to about 200 mV, about 100 mV to about 300 mV, about 100 mV to about 400 mV, about 100 mV to about 500 mV, about 100 mV to about 700 mV, about 100 mV to about 900 mV, about 100 mV to about 1,100 mV, about 100 mV to about 1,300 mV, about 200 mV to about 300 mV, about 200 mV to about 400 mV, about 200 mV to about 500 mV, about 200 mV to about 700 mV, about 200 mV to about 900 mV, about 200 mV to about 1,100 mV, about 200 mV to about 1,300 mV, about 300 mV to about 400 mV, about 300 mV to about 500 mV, about 300 mV to about 700 mV, about 300 mV to about 900 mV, about 300 mV to about 1,100 mV, about 300 mV to about 1,300 mV, about 400 mV to about 500 mV, about 400 mV to about 700 mV, about 400 mV to about 900 mV, about 400 mV to about 1,100 mV, about 400 mV to about 1,300 mV, about 500 mV to about 700 mV, about 500 mV to about 900 mV, about 500 mV to about 1,100 mV, about 500 mV to about 1,300 mV, about 700 mV to about 900 mV, about 700 mV to about 1,100 mV, about 700 mV to about 1,300 mV, about 900 mV to about 1,100 mV, about 900 mV to about 1,300 mV, or about 1,100 mV to about 1,300 mV. In some embodiments, the value of oxidation-reduction potential of the wash solution is about −500 mV, about −250 mV, about 0 mV, about 100 mV, about 200 mV, about 300 mV, about 400 mV, about 500 mV, about 700 mV, about 900 mV, about 1,100 mV, or about 1,300 mV. In some embodiments, the value of oxidation-reduction potential of the wash solution is at least about −500 mV, about −250 mV, about 0 mV, about 100 mV, about 200 mV, about 300 mV, about 400 mV, about 500 mV, about 700 mV, about 900 mV, or about 1,100 mV. In some embodiments, the value of oxidation-reduction potential of the wash solution is at most about −250 mV, about 0 mV, about 100 mV, about 200 mV, about 300 mV, about 400 mV, about 500 mV, about 700 mV, about 900 mV, about 1,100 mV, or about 1,300 mV.

In some embodiments, treatment of the acidic solution with a chemical additive adjusts the oxidation-reduction potential of the acidic solution. In some embodiments, the value of oxidation-reduction potential of the acidic solution is greater than about 50.0 mV and less than about 800.0 mV. In some embodiments, the value of oxidation-reduction potential of the acidic solution is greater than about 100.0 mV and less than about 500.0 mV. In some embodiments, the value of oxidation-reduction potential of the acidic solution is greater than about 200.0 mV and less than about 400.0 mV. In some embodiments, the value of oxidation-reduction potential of the acidic solution is greater than about −450.0 mV and less than about 0.0 mV. In some embodiments, the value of oxidation-reduction potential of the acidic solution is greater than about −200.0 mV and less than about 50.0 mV. In some embodiments, the value of oxidation-reduction potential of the acidic solution is greater than about −50.0 mV and less than about 100.0 mV. In some embodiments, the value of oxidation-reduction potential of the acidic solution is greater than about 50.0 mV and less than about 300.0 mV. In some embodiments, the value of oxidation-reduction potential of the acidic solution is greater than about 100.0 mV and less than about 400.0 mV. In some embodiments, the value of oxidation-reduction potential of the acidic solution is greater than about 200.0 mV and less than about 600.0 mV. In some embodiments, the value of oxidation-reduction potential of the acidic solution is greater than about 300.0 mV and less than about 800.0 mV. In some embodiments, the value of oxidation-reduction potential of the acidic solution is greater than about 500.0 mV and less than about 1000.0 mV. In some embodiments, the value of oxidation-reduction potential of the acidic solution is greater than about 750.0 mV and less than about 1100.0 mV.

In some embodiments, the value of oxidation-reduction potential of the acidic solution is about −500 mV to about 1,300 mV. In some embodiments, the value of oxidation-reduction potential of the acidic solution is about −500 mV to about −250 mV, about −500 mV to about 0 mV, about −500 mV to about 100 mV, about −500 mV to about 200 mV, about −500 mV to about 300 mV, about −500 mV to about 400 mV, about −500 mV to about 500 mV, about −500 mV to about 700 mV, about −500 mV to about 900 mV, about −500 mV to about 1,100 mV, about −500 mV to about 1,300 mV, about −250 mV to about 0 mV, about −250 mV to about 100 mV, about −250 mV to about 200 mV, about −250 mV to about 300 mV, about −250 mV to about 400 mV, about −250 mV to about 500 mV, about −250 mV to about 700 mV, about −250 mV to about 900 mV, about −250 mV to about 1,100 mV, about −250 mV to about 1,300 mV, about 0 mV to about 100 mV, about 0 mV to about 200 mV, about 0 mV to about 300 mV, about 0 mV to about 400 mV, about 0 mV to about 500 mV, about 0 mV to about 700 mV, about 0 mV to about 900 mV, about 0 mV to about 1,100 mV, about 0 mV to about 1,300 mV, about 100 mV to about 200 mV, about 100 mV to about 300 mV, about 100 mV to about 400 mV, about 100 mV to about 500 mV, about 100 mV to about 700 mV, about 100 mV to about 900 mV, about 100 mV to about 1,100 mV, about 100 mV to about 1,300 mV, about 200 mV to about 300 mV, about 200 mV to about 400 mV, about 200 mV to about 500 mV, about 200 mV to about 700 mV, about 200 mV to about 900 mV, about 200 mV to about 1,100 mV, about 200 mV to about 1,300 mV, about 300 mV to about 400 mV, about 300 mV to about 500 mV, about 300 mV to about 700 mV, about 300 mV to about 900 mV, about 300 mV to about 1,100 mV, about 300 mV to about 1,300 mV, about 400 mV to about 500 mV, about 400 mV to about 700 mV, about 400 mV to about 900 mV, about 400 mV to about 1,100 mV, about 400 mV to about 1,300 mV, about 500 mV to about 700 mV, about 500 mV to about 900 mV, about 500 mV to about 1,100 mV, about 500 mV to about 1,300 mV, about 700 mV to about 900 mV, about 700 mV to about 1,100 mV, about 700 mV to about 1,300 mV, about 900 mV to about 1,100 mV, about 900 mV to about 1,300 mV, or about 1,100 mV to about 1,300 mV. In some embodiments, the value of oxidation-reduction potential of the acidic solution is about −500 mV, about −250 mV, about 0 mV, about 100 mV, about 200 mV, about 300 mV, about 400 mV, about 500 mV, about 700 mV, about 900 mV, about 1,100 mV, or about 1,300 mV. In some embodiments, the value of oxidation-reduction potential of the acidic solution is at least about −500 mV, about −250 mV, about 0 mV, about 100 mV, about 200 mV, about 300 mV, about 400 mV, about 500 mV, about 700 mV, about 900 mV, or about 1,100 mV. In some embodiments, the value of oxidation-reduction potential of the acidic solution is at most about −250 mV, about 0 mV, about 100 mV, about 200 mV, about 300 mV, about 400 mV, about 500 mV, about 700 mV, about 900 mV, about 1,100 mV, or about 1,300 mV.

In some embodiments, treatment of the ion exchange material with a chemical additive adjusts the oxidation-reduction potential of the ion exchange material. In some embodiments, the value of oxidation-reduction potential of the ion exchange material is greater than about 50.0 mV and less than about 800.0 mV. In some embodiments, the value of oxidation-reduction potential of the ion exchange material is greater than about 100.0 mV and less than about 500.0 mV. In some embodiments, the value of oxidation-reduction potential of the ion exchange material is greater than about 200.0 mV and less than about 400.0 mV. In some embodiments, the value of oxidation-reduction potential of the ion exchange material is greater than about −450.0 mV and less than about 0.0 mV. In some embodiments, the value of oxidation-reduction potential of the ion exchange material is greater than about −200.0 mV and less than about 50.0 mV. In some embodiments, the value of oxidation-reduction potential of the ion exchange material is greater than about −50.0 mV and less than about 100.0 mV. In some embodiments, the value of oxidation-reduction potential of the ion exchange material is greater than about 50.0 mV and less than about 300.0 mV. In some embodiments, the value of oxidation-reduction potential of the ion exchange material is greater than about 100.0 mV and less than about 400.0 mV. In some embodiments, the value of oxidation-reduction potential of the ion exchange material is greater than about 200.0 mV and less than about 600.0 mV. In some embodiments, the value of oxidation-reduction potential of the ion exchange material is greater than about 300.0 mV and less than about 800.0 mV. In some embodiments, the value of oxidation-reduction potential of the ion exchange material is greater than about 500.0 mV and less than about 1000.0 mV. In some embodiments, the value of oxidation-reduction potential of the ion exchange material is greater than about 750.0 mV and less than about 1100.0 mV.

In some embodiments, the value of oxidation-reduction potential of the ion exchange material is about −500 mV to about 1,300 mV. In some embodiments, the value of oxidation-reduction potential of the ion exchange material is about −500 mV to about −250 mV, about −500 mV to about 0 mV, about −500 mV to about 100 mV, about −500 mV to about 200 mV, about −500 mV to about 300 mV, about −500 mV to about 400 mV, about −500 mV to about 500 mV, about −500 mV to about 700 mV, about −500 mV to about 900 mV, about −500 mV to about 1,100 mV, about −500 mV to about 1,300 mV, about −250 mV to about 0 mV, about −250 mV to about 100 mV, about −250 mV to about 200 mV, about −250 mV to about 300 mV, about −250 mV to about 400 mV, about −250 mV to about 500 mV, about −250 mV to about 700 mV, about −250 mV to about 900 mV, about −250 mV to about 1,100 mV, about −250 mV to about 1,300 mV, about 0 mV to about 100 mV, about 0 mV to about 200 mV, about 0 mV to about 300 mV, about 0 mV to about 400 mV, about 0 mV to about 500 mV, about 0 mV to about 700 mV, about 0 mV to about 900 mV, about 0 mV to about 1,100 mV, about 0 mV to about 1,300 mV, about 100 mV to about 200 mV, about 100 mV to about 300 mV, about 100 mV to about 400 mV, about 100 mV to about 500 mV, about 100 mV to about 700 mV, about 100 mV to about 900 mV, about 100 mV to about 1,100 mV, about 100 mV to about 1,300 mV, about 200 mV to about 300 mV, about 200 mV to about 400 mV, about 200 mV to about 500 mV, about 200 mV to about 700 mV, about 200 mV to about 900 mV, about 200 mV to about 1,100 mV, about 200 mV to about 1,300 mV, about 300 mV to about 400 mV, about 300 mV to about 500 mV, about 300 mV to about 700 mV, about 300 mV to about 900 mV, about 300 mV to about 1,100 mV, about 300 mV to about 1,300 mV, about 400 mV to about 500 mV, about 400 mV to about 700 mV, about 400 mV to about 900 mV, about 400 mV to about 1,100 mV, about 400 mV to about 1,300 mV, about 500 mV to about 700 mV, about 500 mV to about 900 mV, about 500 mV to about 1,100 mV, about 500 mV to about 1,300 mV, about 700 mV to about 900 mV, about 700 mV to about 1,100 mV, about 700 mV to about 1,300 mV, about 900 mV to about 1,100 mV, about 900 mV to about 1,300 mV, or about 1,100 mV to about 1,300 mV. In some embodiments, the value of oxidation-reduction potential of the ion exchange material is about −500 mV, about −250 mV, about 0 mV, about 100 mV, about 200 mV, about 300 mV, about 400 mV, about 500 mV, about 700 mV, about 900 mV, about 1,100 mV, or about 1,300 mV. In some embodiments, the value of oxidation-reduction potential of the ion exchange material is at least about −500 mV, about −250 mV, about 0 mV, about 100 mV, about 200 mV, about 300 mV, about 400 mV, about 500 mV, about 700 mV, about 900 mV, or about 1,100 mV. In some embodiments, the value of oxidation-reduction potential of the ion exchange material is at most about −250 mV, about 0 mV, about 100 mV, about 200 mV, about 300 mV, about 400 mV, about 500 mV, about 700 mV, about 900 mV, about 1,100 mV, or about 1,300 mV.

Effect of Chemical Additives

In some embodiments, contacting a chemical additive with the ion exchange material results in a change in the oxidation state of one or more cations within said ion exchange material. In some embodiments, said change in the oxidation state of one or more cations within said ion exchange material has an absolute value of 1, 2, 3, 4, 5, 6, or 7. In some embodiments, said change in the oxidation state of one or more cations within said ion exchange material has an absolute value of 1 or 2. In some embodiments, said change in the oxidation state of one or more cations within said ion exchange material has an absolute value of 1. In some embodiments, said change in the oxidation state of one or more cations within said ion exchange material has an absolute value of 2. In some embodiments, contact of a chemical additive with the ion exchange material results in an increase in the oxidation state of one or more cations within said ion exchange material. In some embodiments, contact of a chemical additive with the ion exchange material results in a change in the oxidation state of one or more cations within said ion exchange material from 1 to 2, from 2 to 3, from 2 to 4, from 3 to 4, from 4 to 5, from 5 to 6, and/or from 6 to 7. In some embodiments, contact of a chemical additive with the ion exchange material results in a decrease in the oxidation state of one or more cations within said ion exchange material. In some embodiments, contact of a chemical additive with the ion exchange material results in a change in the oxidation state of one or more cations within said ion exchange material from 7 to 6, from 6 to 5, from 5 to 4, from 4 to 3, from 4 to 2, from 3 to 2, and/or from 2 to 1. In some embodiments, the oxidation state of one or more cations within the ion exchange material prior to contacting a chemical additive is 1, 2, 3, 4, 5, 6, or 7. In some embodiments, the oxidation state of one or more cations within the ion exchange material prior to contacting a chemical additive is 2 or 3. In some embodiments, the oxidation state of one or more cations within the ion exchange material prior to contacting a chemical additive is 1. In some embodiments, the oxidation state of one or more cations within the ion exchange material after contacting a chemical additive is 1, 2, 3, 4, 5, 6, or 7. In some embodiments, the oxidation state of one or more cations within the ion exchange material after contacting a chemical additive is 3 or 4. In some embodiments, the oxidation state of one or more cations within the ion exchange material after contacting a chemical additive is 1. In some embodiments, the one or more cations within the ion exchange material comprises manganese. In some embodiments, the one or more cations within the ion exchange material comprises titanium. In some embodiments, the one or more cations within the ion exchange material comprises lithium. In some embodiments, the one or more cations within the ion exchange material comprises hydrogen.

In some embodiments, contacting a chemical additive with the ion exchange material results in a change (e.g., an increase, a decrease) in the average oxidation state of the cations within said ion exchange material (e.g., the number average oxidation state of all cations within the ion exchange material or an aliquot or a particle thereof).

In some embodiments, contacting a chemical additive with the ion exchange material results in a change in the average oxidation state of the cations within said ion exchange material, wherein the absolute value of said change in the average oxidation state is in the range of about 0.1 to about 1.0. In some embodiments, the change is a decrease. In some embodiments, the change is an increase. In some embodiments, said change in the average oxidation state of the cations within said ion exchange material has an absolute value of about 0.1, about 0.2, about 0.3, about 0.4, about 0.5, about 0.6, about 0.7, about 0.8, about 0.9, or about 1.0.

In some embodiments, the average oxidation state of the cations within the ion exchange material prior to contacting a chemical additive is about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4.8, about 4.9, about 5.0, about 5.1, about 5.2, about 5.3, about 5.4, about 5.5, about 5.6, about 5.7, about 5.8, about 5.9, about 6.0, about 6.1, about 6.2, about 6.3, about 6.4, about 6.5, about 6.6, about 6.7, about 6.8, about 6.9, or about 7.0. In some embodiments, the average oxidation state of the cations within the ion exchange material prior to contacting a chemical additive is about 1.4, about 1.5, about 1.6, about 1.7, about 1.8, about 1.9, about 2.0, about 2.1, about 2.2, about 2.3, about 2.4, about 2.5, or about 2.6.

In some embodiments, the average oxidation state of the cations within the ion exchange material after contacting a chemical additive is about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4.8, about 4.9, about 5.0, about 5.1, about 5.2, about 5.3, about 5.4, about 5.5, about 5.6, about 5.7, about 5.8, about 5.9, about 6.0, about 6.1, about 6.2, about 6.3, about 6.4, about 6.5, about 6.6, about 6.7, about 6.8, about 6.9, or about 7.0. In some embodiments, the average oxidation state of the cations within the ion exchange material after contacting a chemical additive is about 1.6, about 1.7, about 1.8, about 1.9, about 2.0, about 2.1, about 2.2, about 2.3, about 2.4, about 2.5, about 2.6, or about 2.7.

In some embodiments, treatment of the liquid resource, wash solution, or acidic eluent solution with a chemical additive results in the destruction of a soluble chemical species. In some embodiments, said soluble chemical species that is destroyed interferes with the performance of the lithium extraction process. In some embodiments, if not destroyed, said soluble chemical species degrades the ion exchange material. In some embodiments, if not destroyed, said soluble chemical species results in decreased usable cycle life for the ion exchange material. In some embodiments, if not destroyed, said soluble chemical species results in a lower lithium selectivity for lithium. In some embodiments, if not destroyed, said soluble chemical species results in an undesirable change in oxidation state of the cations comprising the ion exchange material. In some embodiments, if not destroyed, said soluble chemical species results in an increase in the average oxidation state of the cations in the ion exchange material. In some embodiments, if not destroyed, said soluble chemical species results in an decrease in the average oxidation state of the cations in the ion exchange material.

In some embodiments, said soluble chemical species is a reductant. In some embodiments, said soluble chemical species is an oxidant. In some embodiments, said soluble chemical species is a redox modulator. In some embodiments, said soluble chemical species comprises hydrogen sulfide. In some embodiments, a chemical additive oxidizes hydrogen sulfide to sulfuric dioxide, sulfuric acid, or a mixture thereof. In some embodiments, a chemical additive volatilizes hydrogen sulfide so it is removed from solution as a gas. In some embodiments, a chemical additive converts hydrogen sulfide into more volatile species which are removed from solution as a gas. In some embodiments, hydrogen sulfide and species derived therefrom are recovered. In some embodiments, said recovered species are converted into sulfuric acid. In some embodiments, said sulfuric acid is used in the lithium production process (e.g., as an eluant, as an acid solution). In some embodiments, said soluble chemical species comprises volatile organic carbon compounds. In some embodiments, said soluble chemical species comprises iodine and compounds thereof. In some embodiments, said soluble chemical species comprises bromine and compounds thereof. In some embodiments, said soluble chemical species comprises fluorine and compounds thereof. In some embodiments, said soluble chemical species comprises a carbonate, a hydrogencarbonate, a bicarbonate, or a compound thereof. In some embodiments, said soluble chemical species comprises iron or a compound thereof. In some embodiments, said soluble chemical species comprises manganese or a compound thereof. In some embodiments, said soluble chemical species comprises arsenic or a compound thereof. In some embodiments, said soluble chemical species comprises lead or a compound thereof. In some embodiments, said soluble chemical species comprises zinc or a compound thereof. In some embodiments, said soluble chemical species comprises silicon or a compound thereof. In some embodiments, said soluble chemical species comprises one or more transition metals, or compound thereof.

In some embodiments, a chemical additive oxidizes hydrogen sulfide to sulfuric dioxide, sulfuric acid, sulfite, thiosulfate, mixtures or combinations thereof. In some embodiments, hydrogen sulfide is converted into more oxidized species, by treating the liquid in which it is dissolved with air. In some embodiments, the hydrogen sulfide is converted into non-reducing sulfur species by contacting the liquid in which is dissolved with air for about 1 min to about 60 mins. In some embodiments, the hydrogen sulfide is converted into non-reducing sulfur species by contacting the liquid in which is dissolved with air for about 1 min to about 5 mins, about 1 min to about 10 mins, about 1 min to about 15 mins, about 1 min to about 30 mins, about 1 min to about 45 mins, about 1 min to about 60 mins, about 5 mins to about 10 mins, about 5 mins to about 15 mins, about 5 mins to about 30 mins, about 5 mins to about 45 mins, about 5 mins to about 60 mins, about 10 mins to about 15 mins, about 10 mins to about 30 mins, about 10 mins to about 45 mins, about 10 mins to about 60 mins, about 15 mins to about 30 mins, about 15 mins to about 45 mins, about 15 mins to about 60 mins, about 30 mins to about 45 mins, about 30 mins to about 60 mins, or about 45 mins to about 60 mins. In some embodiments, the hydrogen sulfide is converted into non-reducing sulfur species by contacting the liquid in which is dissolved with air for about 1 min, about 5 mins, about 10 mins, about 15 mins, about 30 mins, about 45 mins, or about 60 mins. In some embodiments, the hydrogen sulfide is converted into non-reducing sulfur species by contacting the liquid in which is dissolved with air for at least about 1 min, about 5 mins, about 10 mins, about 15 mins, about 30 mins, or about 45 mins. In some embodiments, the hydrogen sulfide is converted into non-reducing sulfur species by contacting the liquid in which is dissolved with air for at most about 5 mins, about 10 mins, about 15 mins, about 30 mins, about 45 mins, or about 60 mins. In some embodiments, the hydrogen sulfide is converted into non-reducing sulfur species by contacting the liquid in which is dissolved with air for about 1 hour to about 168 hour. In some embodiments, the hydrogen sulfide is converted into non-reducing sulfur species by contacting the liquid in which is dissolved with air for about 1 hour to about 2 hour, about 1 hour to about 3 hour, about 1 hour to about 6 hour, about 1 hour to about 12 hour, about 1 hour to about 24 hour, about 1 hour to about 48 hour, about 1 hour to about 72 hour, about 1 hour to about 96 hour, about 1 hour to about 120 hour, about 1 hour to about 144 hour, about 1 hour to about 168 hour, about 2 hour to about 3 hour, about 2 hour to about 6 hour, about 2 hour to about 12 hour, about 2 hour to about 24 hour, about 2 hour to about 48 hour, about 2 hour to about 72 hour, about 2 hour to about 96 hour, about 2 hour to about 120 hour, about 2 hour to about 144 hour, about 2 hour to about 168 hour, about 3 hour to about 6 hour, about 3 hour to about 12 hour, about 3 hour to about 24 hour, about 3 hour to about 48 hour, about 3 hour to about 72 hour, about 3 hour to about 96 hour, about 3 hour to about 120 hour, about 3 hour to about 144 hour, about 3 hour to about 168 hour, about 6 hour to about 12 hour, about 6 hour to about 24 hour, about 6 hour to about 48 hour, about 6 hour to about 72 hour, about 6 hour to about 96 hour, about 6 hour to about 120 hour, about 6 hour to about 144 hour, about 6 hour to about 168 hour, about 12 hour to about 24 hour, about 12 hour to about 48 hour, about 12 hour to about 72 hour, about 12 hour to about 96 hour, about 12 hour to about 120 hour, about 12 hour to about 144 hour, about 12 hour to about 168 hour, about 24 hour to about 48 hour, about 24 hour to about 72 hour, about 24 hour to about 96 hour, about 24 hour to about 120 hour, about 24 hour to about 144 hour, about 24 hour to about 168 hour, about 48 hour to about 72 hour, about 48 hour to about 96 hour, about 48 hour to about 120 hour, about 48 hour to about 144 hour, about 48 hour to about 168 hour, about 72 hour to about 96 hour, about 72 hour to about 120 hour, about 72 hour to about 144 hour, about 72 hour to about 168 hour, about 96 hour to about 120 hour, about 96 hour to about 144 hour, about 96 hour to about 168 hour, about 120 hour to about 144 hour, about 120 hour to about 168 hour, or about 144 hour to about 168 hour. In some embodiments, the hydrogen sulfide is converted into non-reducing sulfur species by contacting the liquid in which is dissolved with air for about 1 hour, about 2 hour, about 3 hour, about 6 hour, about 12 hour, about 24 hour, about 48 hour, about 72 hour, about 96 hour, about 120 hour, about 144 hour, or about 168 hour. In some embodiments, the hydrogen sulfide is converted into non-reducing sulfur species by contacting the liquid in which is dissolved with air for at least about 1 hour, about 2 hour, about 3 hour, about 6 hour, about 12 hour, about 24 hour, about 48 hour, about 72 hour, about 96 hour, about 120 hour, or about 144 hour. In some embodiments, the hydrogen sulfide is converted into non-reducing sulfur species by contacting the liquid in which is dissolved with air for at most about 2 hour, about 3 hour, about 6 hour, about 12 hour, about 24 hour, about 48 hour, about 72 hour, about 96 hour, about 120 hour, about 144 hour, or about 168 hour.

In some embodiments, a non-reducing sulfur species is a compound that comprises sulfur that does not affect a reduction in oxidation state of an ion exchange material or constituent cation thereof when contacted therewith.

In some embodiments, a chemical additive converts bromine compounds into bromide. In some embodiments, a chemical additive converts fluorine compounds into fluoride. In some embodiments, a chemical additive converts chlorine compounds into chloride. In some embodiments, a chemical additive converts iodine compounds into iodide. In some embodiments, a chemical additive converts carbonate compounds into carbon dioxide. In some embodiments, a chemical additive converts volatile organic compounds into carbon dioxide.

In some embodiments, treatment of the liquid resource, wash water, or acidic eluent solution with a chemical additive results in the destruction of a soluble chemical species. In some embodiments, the treated liquid resource, wash water, or acidic eluent solution has a different pH than before treatment. In some embodiments, the pH of said treated liquid resource, wash water, or acidic eluent solution is adjusted prior to contact with the ion exchange material. In some embodiments, the treated liquid resource, wash water, or acidic eluent solution has a different oxidation-reduction potential than before treatment. In some embodiments, the oxidation-reduction potential of said treated liquid resource, wash water, or acidic eluent solution is adjusted prior to contact with the ion exchange material.

Production of Chemical Additives

In some embodiments, treatment of the ion exchange material with a chemical additive is performed in-situ, within one or more sub-systems integrated into the ion-exchange system or the associated ion-exchange process. In some embodiments, the chemical additive is generated in-situ, within one or more sub-systems integrated into the ion-exchange system or the associated ion-exchange process.

In some embodiments, the chemical additive is generated within the liquid resource, by means of an electrochemical treatment whereby said liquid resource is treated in an electrochemical cell comprised of two or more electrodes that receive electrical power. In some embodiments, the chemical additive is generated within the wash solution, by means of an electrochemical treatment whereby said wash solution is treated in an electrochemical cell comprised of two or more electrodes that receive electrical power. In some embodiments, the chemical additive is generated within the wash solution, by means of an electrochemical treatment whereby said wash solution is treated in an electrochemical cell comprised of two or more electrodes that receive electrical power. In some embodiments, the chemical additive is generated within the acidic eluent, by means of an electrochemical treatment whereby said acidic eluent is treated in an electrochemical cell comprised of two or more electrodes that receive electrical power. In some embodiments, the chemical additive is generated within acidic eluent, by means of an electrochemical treatment whereby said acidic eluent is treated in an electrochemical cell comprised of two or more electrodes that receive electrical power. In some embodiments, the electrochemical treatment comprises use of an electrochlorination system.

In some embodiments, the liquid resource or wash water solution are treated in an electrochlorination system prior to being contacted with the ion exchange material. In some embodiments, said electrochlorination system is comprised of an electrochemical cell with two or more electrodes. In some embodiments, said electrochlorination system is powered by a direct current source. In some embodiments, said electrochlorination system is powered by an alternating current source. In some embodiments, said electrochlorination system produces sodium hypochlorite and hydrogen. In some embodiments, said electrochlorination system produces hypochlorite. In some embodiments, said electrochlorination system produces a hypochlorite. In some embodiments, said electrochlorination system produces hypochlorous acid, lithium hypochlorite, sodium hypochlorite, potassium hypochlorite, magnesium hypochlorite, calcium hypochlorite, strontium hypochlorite, mixtures thereof, solutions thereof, or combinations thereof.

In some embodiments, the salt solution required for electrochlorination is the liquid resource from which lithium is extracted by ion exchange. In some embodiments, said electrochlorination system has a venting tank to remove hydrogen therefrom. In some embodiments, said electrochlorination system contains two or more electrodes comprised of copper, graphite, titanium, brass, silver, platinum, palladium, mixed metal oxides, a mixture thereof, or a combination thereof.

In some embodiments, the liquid resource or wash water solution are treated in an ozone generation system prior to being contacted with the ion exchange material. In some embodiments, said ozone generation system is comprised of an electrochemical cell with two or more electrodes, a dielectric, a discharge gap, and a gas. In some embodiments, said gas is oxygen. In some embodiments, said ozone generation system is powered by a direct current source. In some embodiments, said ozone generation system is powered by an alternating current source. In some embodiments, said ozone generation system produces sodium hypochlorite and hydrogen. In some embodiments, said ozone generation system has a venting system. In some embodiments, said ozone generation system contains two or more electrodes comprised of copper, graphite, titanium, brass, silver, platinum, palladium, mixed metal oxides, a mixture thereof, or a combination thereof. In some embodiments, said ozone is continuously dosed into the liquid resource of wash water solution.

Removal of Chemical Additives

In an aspect, described herein are methods comprising the removal of the chemical additive from the de-lithiated liquid resource after contact of said liquid resource with the ion exchange material to lithiate the ion exchange material. In an aspect, described herein are methods comprising the removal of the chemical additive from the liquid resource after contact of said liquid resource with the ion exchange material. In an aspect, described herein are methods comprising the removal of the chemical additive from a washing solution after contact of said washing solution with the ion exchange material. In an aspect, described herein are methods comprising the removal of the chemical additive from an eluent solution after contact of said eluent solution with the ion exchange material. In an aspect, described herein are methods comprising the removal of the chemical additive from an eluent solution after contact of said eluent solution with the ion exchange material to elute lithium. In an aspect, described herein are methods comprising the removal of the chemical additive from any liquid stream that contacted the ion exchange material. An aspect of the present disclosure is the removal of the chemical additive from any gas stream that contacted the ion exchange material.

In some embodiments, the chemical additive that is removed is a redox agent. In some embodiments, the chemical additive being removed comprises a redox agent. In some embodiments, the chemical additive being removed comprises an oxidant. In some embodiments, said oxidant comprises one of more of oxygen, air, ozone, hydrogen peroxide, fluorine, chlorine, bromine, iodine, nitric acid, a nitrate compound, sodium hypochlorite, bleach, a chlorite, a chlorate, a perchlorate, potassium permanganate, a permanganate, sodium perborate, a perborate, mixtures thereof or combinations thereof. In some embodiments, the chemical additive being removed comprises a reductant. In some embodiments, said reductant comprises one of more of sodium bisulfite, sodium metabisulfite, sodium borohydride, formic acid, ascorbic acid, oxalic acid, potassium iodide, hydrogen, other reducing species, mixtures thereof, or combinations thereof.

In some embodiments, removal of the chemical additive is achieved by contacting the liquid resource, wash water solution, or acidic eluent with an ion exchange material. In some embodiments, removal of the chemical additive is achieved by aging the liquid resource, wash water solution, or acidic eluent in a holding tank, agitated vessel, recirculating tank, or storage pond. In some embodiments, removal of the chemical additive is achieved by treating the liquid resource, wash water solution, or acidic eluent in a holding tank with granular activated carbon. In some embodiments, removal of the sodium hypochlorite is achieved by treating the liquid resource, wash water solution, or acidic eluent in a holding tank with granular activated carbon. In some embodiments, removal of the chemical additive is achieved by absorbing said chemical additive into an absorbent. In some embodiments, removal of the chemical additive is achieved by chemically destroying the chemical additives into soluble salts, insoluble salts, liquids, or gases. In some embodiments, removal of the chemical additive is achieved by chemically destroying the chemical additives with ultraviolet radiation.

In some embodiments, treatment of the delithiated liquid resource or wash water solution to remove chemical additive occurs in a mixing tank. In some embodiments, treatment of the delithiated liquid resource or wash water solution to remove chemical additive occurs in a mixing tank fitted with an agitator, an eductor, a nozzle, or a combination thereof. In some embodiments, treatment of the delithiated liquid resource or wash water solution to remove chemical additive occurs in an inline mixer. In some embodiments, treatment of the delithiated liquid resource or wash water solution to remove chemical additive occurs in an electrochemical cell. In some embodiments, treatment of the delithiated liquid resource or wash water solution to remove chemical additive occurs in pressure vessel. In some embodiments, treatment of the delithiated liquid resource or wash water solution to remove chemical additive occurs in a pressure filter.

In some embodiments, removal of the chemical additive is achieved by contacting the liquid resource, wash water solution, or acidic eluent with a catalyst. In some embodiments, said catalyst comprises a transition metal. In some embodiments, said catalyst comprises a transition metal oxide. In some embodiments, said catalyst is homogeneous. In some embodiments, said catalyst is heterogeneous. In some embodiments, said catalyst subsequently taken out of contact with the liquid resource, wash water solution, or acidic eluent following removal of the chemical additive therefrom. In some embodiments, removal of the chemical additive is achieved by treating the liquid resource, wash water solution, or acidic eluent in a holding tank with a transition metal catalyst. In some embodiments, said catalyst comprises cobalt, nickel, manganese, iron, copper, palladium, platinum, rubidium, lead, or a combination thereof. In some embodiments, said catalysts comprises an oxide of cobalt, nickel, manganese, iron, copper, palladium, platinum, rubidium, lead, or a combination thereof. In some embodiments, said catalyst is a soluble solid. In some embodiments, said catalyst is an insoluble solid. In some embodiments, contact with said transition metal catalyst produces a gas.

In some embodiments, an oxidant chemical additive is destroyed by treating it with a reductant. In some embodiments, said reductant comprises sodium metabisulfite, sodium sulfite, sodium thiosulfate, a sulfite, a thiosulfate, boron borohydride, a different reductant, or a mixture thereof. In some embodiments, a reductant chemical additive is destroyed by treating it with an oxidant. In some embodiments, sodium hypochlorite is destroyed by treating it with sodium metabisulfite. In some embodiments, sodium hypochlorite is destroyed by treating it with sodium sulfite. In some embodiments, sodium hypochlorite is destroyed by treating it with hydrogen peroxide. In some embodiments, sodium hypochlorite is destroyed by treating it with sodium bisulfite. In some embodiments, sodium hypochlorite is destroyed by treating it with sodium metabisulfite. In some embodiments, hydrogen peroxide is destroyed by treating it with sodium bisulfite, sodium metabisulfite, sodium sulfite, or subjecting it to ultraviolet radiation. In some embodiments, ozone is destroyed by treating it with sodium bisulfite, sodium metabisulfite, or subjecting it to ultraviolet radiation. In some embodiments, sodium sulfite is destroyed by treating it with ozone, hydrogen peroxide, or subjecting it to ultraviolet radiation. In some embodiments, sodium metabisulfite is destroyed by treating it with ozone, hydrogen peroxide, or subjecting it to ultraviolet radiation.

In some embodiments, an oxidant chemical additive is destroyed by treating it with a reductant. In some embodiments, a reductant chemical additive is destroyed by treating it with an oxidant. In some embodiments, the contact of an oxidant with a reductant has a characteristic duration of about 1 hour to about 2 hour, about 1 hour to about 3 hour, about 1 hour to about 6 hour, about 1 hour to about 12 hour, about 1 hour to about 24 hour, about 1 hour to about 48 hour, about 1 hour to about 72 hour, about 1 hour to about 96 hour, about 1 hour to about 120 hour, about 1 hour to about 144 hour, about 1 hour to about 168 hour, about 2 hour to about 3 hour, about 2 hour to about 6 hour, about 2 hour to about 12 hour, about 2 hour to about 24 hour, about 2 hour to about 48 hour, about 2 hour to about 72 hour, about 2 hour to about 96 hour, about 2 hour to about 120 hour, about 2 hour to about 144 hour, about 2 hour to about 168 hour, about 3 hour to about 6 hour, about 3 hour to about 12 hour, about 3 hour to about 24 hour, about 3 hour to about 48 hour, about 3 hour to about 72 hour, about 3 hour to about 96 hour, about 3 hour to about 120 hour, about 3 hour to about 144 hour, about 3 hour to about 168 hour, about 6 hour to about 12 hour, about 6 hour to about 24 hour, about 6 hour to about 48 hour, about 6 hour to about 72 hour, about 6 hour to about 96 hour, about 6 hour to about 120 hour, about 6 hour to about 144 hour, about 6 hour to about 168 hour, about 12 hour to about 24 hour, about 12 hour to about 48 hour, about 12 hour to about 72 hour, about 12 hour to about 96 hour, about 12 hour to about 120 hour, about 12 hour to about 144 hour, about 12 hour to about 168 hour, about 24 hour to about 48 hour, about 24 hour to about 72 hour, about 24 hour to about 96 hour, about 24 hour to about 120 hour, about 24 hour to about 144 hour, about 24 hour to about 168 hour, about 48 hour to about 72 hour, about 48 hour to about 96 hour, about 48 hour to about 120 hour, about 48 hour to about 144 hour, about 48 hour to about 168 hour, about 72 hour to about 96 hour, about 72 hour to about 120 hour, about 72 hour to about 144 hour, about 72 hour to about 168 hour, about 96 hour to about 120 hour, about 96 hour to about 144 hour, about 96 hour to about 168 hour, about 120 hour to about 144 hour, about 120 hour to about 168 hour, or about 144 hour to about 168 hour. In some embodiments, the contact of an oxidant with a reductant has a characteristic duration of about 1 hour, about 2 hour, about 3 hour, about 6 hour, about 12 hour, about 24 hour, about 48 hour, about 72 hour, about 96 hour, about 120 hour, about 144 hour, or about 168 hour. In some embodiments, the contact of an oxidant with a reductant has a characteristic duration of at least about 1 hour, about 2 hour, about 3 hour, about 6 hour, about 12 hour, about 24 hour, about 48 hour, about 72 hour, about 96 hour, about 120 hour, or about 144 hour. In some embodiments, the contact of an oxidant with a reductant has a characteristic duration of at most about 2 hour, about 3 hour, about 6 hour, about 12 hour, about 24 hour, about 48 hour, about 72 hour, about 96 hour, about 120 hour, about 144 hour, or about 168 hour.

In some embodiments, contact of an oxidant with a reductant is performed in conjunction with pH adjustment. In some embodiments, said pH adjustment is performed by addition of an acid or a base. In some embodiments, pH adjustment is performed to maintain the pH of the solution at a value of about 1, about 2, about 3, about 4, about 5, about 6, about 7, about 8, about 9, about 10, about 11, about 12, about 13, or about 14. In some embodiments, pH adjustment is performed to maintain the pH of the solution at a value of about 1 to about 14. In some embodiments, pH adjustment is performed to maintain the pH of the solution at a value of about 1 to about 2, about 1 to about 3, about 1 to about 4, about 1 to about 5, about 1 to about 6, about 1 to about 7, about 1 to about 8, about 1 to about 9, about 1 to about 10, about 1 to about 11, about 1 to about 12, about 1 to about 13, about 1 to about 14, about 2 to about 3, about 2 to about 4, about 2 to about 5, about 2 to about 6, about 2 to about 7, about 2 to about 8, about 2 to about 9, about 2 to about 10, about 2 to about 11, about 2 to about 12, about 2 to about 13, about 2 to about 14, about 3 to about 4, about 3 to about 5, about 3 to about 6, about 3 to about 7, about 3 to about 8, about 3 to about 9, about 3 to about 10, about 3 to about 11, about 3 to about 12, about 3 to about 13, about 3 to about 14, about 4 to about 5, about 4 to about 6, about 4 to about 7, about 4 to about 8, about 4 to about 9, about 4 to about 10, about 4 to about 11, about 4 to about 12, about 4 to about 13, about 4 to about 14, about 5 to about 6, about 5 to about 7, about 5 to about 8, about 5 to about 9, about 5 to about 10, about 5 to about 11, about 5 to about 12, about 5 to about 13, about 5 to about 14, about 6 to about 7, about 6 to about 8, about 6 to about 9, about 6 to about 10, about 6 to about 11, about 6 to about 12, about 6 to about 13, about 6 to about 14, about 7 to about 8, about 7 to about 9, about 7 to about 10, about 7 to about 11, about 7 to about 12, about 7 to about 13, about 7 to about 14, about 8 to about 9, about 8 to about 10, about 8 to about 11, about 8 to about 12, about 8 to about 13, about 8 to about 14, about 9 to about 10, about 9 to about 11, about 9 to about 12, about 9 to about 13, about 9 to about 14, about 10 to about 11, about 10 to about 12, about 10 to about 13, about 10 to about 14, about 11 to about 12, about 11 to about 13, about 11 to about 14, about 12 to about 13, about 12 to about 14, or about 13 to about 14. In some embodiments, pH adjustment is performed to maintain the pH of the solution at a value of about 1, about 2, about 3, about 4, about 5, about 6, about 7, about 8, about 9, about 10, about 11, about 12, about 13, or about 14. In some embodiments, pH adjustment is performed to maintain the pH of the solution comprising said chemical additive at a value of at least about 1, about 2, about 3, about 4, about 5, about 6, about 7, about 8, about 9, about 10, about 11, about 12, or about 13. In some embodiments, pH adjustment is performed to maintain the pH of the solution at a value of at most about 2, about 3, about 4, about 5, about 6, about 7, about 8, about 9, about 10, about 11, about 12, about 13, or about 14.

In some embodiments, a mixing device is used to contact said oxidant with said reductant. In some embodiments, a mixing device is used to contact said reductant with said oxidant. In some embodiments, said mixing device comprises a tank, a baffled tank, an agitated tank, a baffled agitated tank, an in-line mixing device, a pump associated with an in-line mixing device, a pump with a dosing port, a pump with a dosing port and an in-line mixing device, a stirred tank reactor, another mixing unit, or combinations thereof.

In some embodiments, removal of the chemical additive from the wash solution adjusts the oxidation-reduction potential of said wash solution to a value more than about 50.0 mV and less than about 800.0 mV. In some embodiments, the value of oxidation-reduction potential is greater than about 100.0 mV and less than about 500.0 mV. In some embodiments, the value of oxidation-reduction potential is greater than about 200.0 mV and less than about 400.0 mV. In some embodiments, the value of oxidation-reduction potential is greater than about −450.0 mV and less than about 0.0 mV. In some embodiments, the value of oxidation-reduction potential is greater than about −200.0 mV and less than about 50.0 mV. In some embodiments, the value of oxidation-reduction potential is greater than about −50.0 mV and less than about 100.0 mV. In some embodiments, the value of oxidation-reduction potential is greater than about 50.0 mV and less than about 300.0 mV. In some embodiments, the value of oxidation-reduction potential is greater than about 100.0 mV and less than about 400.0 mV. In some embodiments, the value of oxidation-reduction potential is greater than about 200.0 mV and less than about 600.0 mV. In some embodiments, the value of oxidation-reduction potential is greater than about 300.0 mV and less than about 800.0 mV. In some embodiments, the value of oxidation-reduction potential is greater than about 500.0 mV and less than about 1000.0 mV. In some embodiments, the value of oxidation-reduction potential is greater than about 750.0 mV and less than about 1100.0 mV.

In some embodiments, removal of the chemical additive from the wash solution adjusts the oxidation-reduction potential of said wash solution to a value of about −500 mV to about 1,300 mV. In some embodiments, removal of the chemical additive from the wash solution adjusts the oxidation-reduction potential of said wash solution to a value of about −500 mV to about −250 mV, about −500 mV to about 0 mV, about −500 mV to about 100 mV, about −500 mV to about 200 mV, about −500 mV to about 300 mV, about −500 mV to about 400 mV, about −500 mV to about 500 mV, about −500 mV to about 700 mV, about −500 mV to about 900 mV, about −500 mV to about 1,100 mV, about −500 mV to about 1,300 mV, about −250 mV to about 0 mV, about −250 mV to about 100 mV, about −250 mV to about 200 mV, about −250 mV to about 300 mV, about −250 mV to about 400 mV, about −250 mV to about 500 mV, about −250 mV to about 700 mV, about −250 mV to about 900 mV, about −250 mV to about 1,100 mV, about −250 mV to about 1,300 mV, about 0 mV to about 100 mV, about 0 mV to about 200 mV, about 0 mV to about 300 mV, about 0 mV to about 400 mV, about 0 mV to about 500 mV, about 0 mV to about 700 mV, about 0 mV to about 900 mV, about 0 mV to about 1,100 mV, about 0 mV to about 1,300 mV, about 100 mV to about 200 mV, about 100 mV to about 300 mV, about 100 mV to about 400 mV, about 100 mV to about 500 mV, about 100 mV to about 700 mV, about 100 mV to about 900 mV, about 100 mV to about 1,100 mV, about 100 mV to about 1,300 mV, about 200 mV to about 300 mV, about 200 mV to about 400 mV, about 200 mV to about 500 mV, about 200 mV to about 700 mV, about 200 mV to about 900 mV, about 200 mV to about 1,100 mV, about 200 mV to about 1,300 mV, about 300 mV to about 400 mV, about 300 mV to about 500 mV, about 300 mV to about 700 mV, about 300 mV to about 900 mV, about 300 mV to about 1,100 mV, about 300 mV to about 1,300 mV, about 400 mV to about 500 mV, about 400 mV to about 700 mV, about 400 mV to about 900 mV, about 400 mV to about 1,100 mV, about 400 mV to about 1,300 mV, about 500 mV to about 700 mV, about 500 mV to about 900 mV, about 500 mV to about 1,100 mV, about 500 mV to about 1,300 mV, about 700 mV to about 900 mV, about 700 mV to about 1,100 mV, about 700 mV to about 1,300 mV, about 900 mV to about 1,100 mV, about 900 mV to about 1,300 mV, or about 1,100 mV to about 1,300 mV. In some embodiments, removal of the chemical additive from the wash solution adjusts the oxidation-reduction potential of said wash solution to a value of about −500 mV, about −250 mV, about 0 mV, about 100 mV, about 200 mV, about 300 mV, about 400 mV, about 500 mV, about 700 mV, about 900 mV, about 1,100 mV, or about 1,300 mV. In some embodiments, removal of the chemical additive from the wash solution adjusts the oxidation-reduction potential of said wash solution to a value of at least about −500 mV, about −250 mV, about 0 mV, about 100 mV, about 200 mV, about 300 mV, about 400 mV, about 500 mV, about 700 mV, about 900 mV, or about 1,100 mV. In some embodiments, removal of the chemical additive from the wash solution adjusts the oxidation-reduction potential of said wash solution to a value of at most about −250 mV, about 0 mV, about 100 mV, about 200 mV, about 300 mV, about 400 mV, about 500 mV, about 700 mV, about 900 mV, about 1,100 mV, or about 1,300 mV.

In some embodiments, removal of the chemical additive from the liquid resource adjusts the oxidation-reduction potential of said liquid resource to a value more than about 50.0 mV and less than about 800.0 mV. In some embodiments, the value of oxidation-reduction potential is greater than about 100.0 mV and less than about 500.0 mV. In some embodiments, the value of oxidation-reduction potential is greater than about 200.0 mV and less than about 400.0 mV. In some embodiments, the value of oxidation-reduction potential is greater than about −450.0 mV and less than about 0.0 mV. In some embodiments, the value of oxidation-reduction potential is greater than about −200.0 mV and less than about 50.0 mV. In some embodiments, the value of oxidation-reduction potential is greater than about −50.0 mV and less than about 100.0 mV. In some embodiments, the value of oxidation-reduction potential is greater than about 50.0 mV and less than about 300.0 mV. In some embodiments, the value of oxidation-reduction potential is greater than about 100.0 mV and less than about 400.0 mV. In some embodiments, the value of oxidation-reduction potential is greater than about 200.0 mV and less than about 600.0 mV. In some embodiments, the value of oxidation-reduction potential is greater than about 300.0 mV and less than about 800.0 mV. In some embodiments, the value of oxidation-reduction potential is greater than about 500.0 mV and less than about 1000.0 mV. In some embodiments, the value of oxidation-reduction potential is greater than about 750.0 mV and less than about 1100.0 mV.

In some embodiments, removal of the chemical additive from the liquid resource adjusts the oxidation-reduction potential of said liquid resource to a value of about −500 mV to about 1,300 mV. In some embodiments, removal of the chemical additive from the liquid resource adjusts the oxidation-reduction potential of said liquid resource to a value of about −500 mV to about −250 mV, about −500 mV to about 0 mV, about −500 mV to about 100 mV, about −500 mV to about 200 mV, about −500 mV to about 300 mV, about −500 mV to about 400 mV, about −500 mV to about 500 mV, about −500 mV to about 700 mV, about −500 mV to about 900 mV, about −500 mV to about 1,100 mV, about −500 mV to about 1,300 mV, about −250 mV to about 0 mV, about −250 mV to about 100 mV, about −250 mV to about 200 mV, about −250 mV to about 300 mV, about −250 mV to about 400 mV, about −250 mV to about 500 mV, about −250 mV to about 700 mV, about −250 mV to about 900 mV, about −250 mV to about 1,100 mV, about −250 mV to about 1,300 mV, about 0 mV to about 100 mV, about 0 mV to about 200 mV, about 0 mV to about 300 mV, about 0 mV to about 400 mV, about 0 mV to about 500 mV, about 0 mV to about 700 mV, about 0 mV to about 900 mV, about 0 mV to about 1,100 mV, about 0 mV to about 1,300 mV, about 100 mV to about 200 mV, about 100 mV to about 300 mV, about 100 mV to about 400 mV, about 100 mV to about 500 mV, about 100 mV to about 700 mV, about 100 mV to about 900 mV, about 100 mV to about 1,100 mV, about 100 mV to about 1,300 mV, about 200 mV to about 300 mV, about 200 mV to about 400 mV, about 200 mV to about 500 mV, about 200 mV to about 700 mV, about 200 mV to about 900 mV, about 200 mV to about 1,100 mV, about 200 mV to about 1,300 mV, about 300 mV to about 400 mV, about 300 mV to about 500 mV, about 300 mV to about 700 mV, about 300 mV to about 900 mV, about 300 mV to about 1,100 mV, about 300 mV to about 1,300 mV, about 400 mV to about 500 mV, about 400 mV to about 700 mV, about 400 mV to about 900 mV, about 400 mV to about 1,100 mV, about 400 mV to about 1,300 mV, about 500 mV to about 700 mV, about 500 mV to about 900 mV, about 500 mV to about 1,100 mV, about 500 mV to about 1,300 mV, about 700 mV to about 900 mV, about 700 mV to about 1,100 mV, about 700 mV to about 1,300 mV, about 900 mV to about 1,100 mV, about 900 mV to about 1,300 mV, or about 1,100 mV to about 1,300 mV. In some embodiments, removal of the chemical additive from the liquid resource adjusts the oxidation-reduction potential of said liquid resource to a value of about −500 mV, about −250 mV, about 0 mV, about 100 mV, about 200 mV, about 300 mV, about 400 mV, about 500 mV, about 700 mV, about 900 mV, about 1,100 mV, or about 1,300 mV. In some embodiments, removal of the chemical additive from the liquid resource adjusts the oxidation-reduction potential of said liquid resource to a value of at least about −500 mV, about −250 mV, about 0 mV, about 100 mV, about 200 mV, about 300 mV, about 400 mV, about 500 mV, about 700 mV, about 900 mV, or about 1,100 mV. In some embodiments, removal of the chemical additive from the liquid resource adjusts the oxidation-reduction potential of said liquid resource to a value of at most about −250 mV, about 0 mV, about 100 mV, about 200 mV, about 300 mV, about 400 mV, about 500 mV, about 700 mV, about 900 mV, about 1,100 mV, or about 1,300 mV.

In some embodiments, treatment to remove the chemical additive results in a chemical additive concentration that is not detectable by standard analytical methods. In some embodiments, the concentration of the chemical additive is less than about 0.1 milligrams per liter, less than about 0.01 milligrams per liter, less than about 1 milligrams per liter, less than about 10 milligrams per liter, or less than about 100 milligrams per liter. In some embodiments, the concentration of the chemical additive is less than about 0.1 milligrams per liter. In some embodiments, the concentration of the chemical additive is less than about 0.01 milligrams per liter. In some embodiments, the concentration of the chemical additive is less than about 1 milligram per liter. In some embodiments, the concentration of the chemical additive is less than about 10 milligrams per liter. In some embodiments, the concentration of the chemical additive is less than about 100 milligrams per liter. In some embodiments, the concentration of the chemical additive is less than about 1000 milligrams per liter.

In some embodiments, the methods described for removal of chemical additives are applied for the destruction of a soluble chemical species in the liquid resource, wash water, or acidic eluent solution. In some embodiments, said soluble chemical species that is destroyed interferes with the performance of the lithium-hydrogen ion exchange process. In some embodiments, if not destroyed, said soluble chemical species degrades the ion exchange material. In some embodiments, if not destroyed, said soluble chemical species results in decreased usable cycle life for the ion exchange material. In some embodiments, if not destroyed, said soluble chemical species results in a lower lithium selectivity for lithium. In some embodiments, if not destroyed, said soluble chemical species results in an undesirable change in oxidation state of the cations comprising the ion exchange material. In some embodiments, if not destroyed, said soluble chemical species results in an increase in the average oxidation state of the cations in the ion exchange material. In some embodiments, if not destroyed, said soluble chemical species results in a decrease in the average oxidation state of the cations in the ion exchange material.

In some embodiments, said soluble chemical species is a reductant. In some embodiments, said soluble chemical species is an oxidant. In some embodiments, said soluble chemical species is a redox modulator. In some embodiments, said soluble chemical species comprises hydrogen sulfide. In some embodiments, a chemical additive oxidizes hydrogen sulfide to sulfuric dioxide, sulfuric acid, or a mixture thereof. In some embodiments, said soluble chemical species comprises volatile organic carbon compounds. In some embodiments, said soluble chemical species comprises iodine and compounds thereof. In some embodiments, said soluble chemical species comprises bromine and compounds thereof. In some embodiments, said soluble chemical species comprises fluorine and compounds thereof. In some embodiments, said soluble chemical species comprises a carbonate, a hydrogencarbonate, a bicarbonate, or a compound thereof. In some embodiments, said soluble chemical species comprises iron or a compound thereof. In some embodiments, said soluble chemical species comprises manganese or a compound thereof. In some embodiments, said soluble chemical species comprises arsenic or a compound thereof. In some embodiments, said soluble chemical species comprises lead or a compound thereof. In some embodiments, said soluble chemical species comprises zinc or a compound thereof. In some embodiments, said soluble chemical species comprises silicon or a compound thereof. In some embodiments, said soluble chemical species comprises one or more transition metals, or compound thereof.

In some embodiments, a chemical additive oxidizes hydrogen sulfide to form sulfur dioxide, sulfuric acid, or a mixture thereof. In some embodiments, a chemical additive converts chemical species comprising bromine compounds into bromide. In some embodiments, a chemical additive converts chemical species comprising fluorine into fluoride. In some embodiments, a chemical additive converts chemical species comprising chlorine into chloride. In some embodiments, a chemical additive converts chemical species comprising iodine into iodide. In some embodiments, a chemical additive converts chemical species comprising carbonate into carbon dioxide. In some embodiments, a chemical additive converts volatile organic compounds into carbon dioxide.

In some embodiments, a chemical additive is converted into a different chemical species. In some embodiments, said different chemical species is more easily removed from the fluid being treated than is the chemical additive. In some embodiments, the removal of said different chemical species form said liquid results in improved performance of ion exchange (e.g., one or more ion exchange cycles). In some embodiments, the different chemical species that is more easily removed than is the chemical additive comprises a chemical species that is more volatile than is the chemical additive. In some embodiments, said chemical species that is more volatile than is the chemical additive can be removed by sparging the liquid with air, applying vacuum to the liquid, heating the liquid, or any other method commonly employed to remove a gas from a liquid. In some embodiments, a chemical additive converts a chemical species comprising fluorine into elemental fluorine, and said fluorine is removed as gas from the liquid. In some embodiments, a chemical additive converts a chemical species comprising chlorine into elemental chlorine, and said chlorine is removed as gas from the liquid. In some embodiments, a chemical additive converts a chemical species comprising bromine into elemental bromine, and said bromine is removed as gas from the liquid.

Ion Exchange Material

In an aspect, described herein is a system wherein the ion exchange material comprises a plurality of ion exchange particles. In an embodiment, the plurality of ion exchange particles in the ion exchange material is selected from uncoated ion exchange particles, coated ion exchange particles and combinations thereof. In an embodiment, the ion exchange material is a porous ion exchange material. In an embodiment, the porous ion exchange material comprises a network of pores that allows liquids to move quickly from the surface of the porous ion exchange material to the plurality of ion exchange particles. In an embodiment, the ion exchange material is in the form of porous ion exchange beads. Accordingly, embodiments and aspects of the present disclosure directed to "ion exchange beads" and embodiments thereof are also operably directed to "ion exchange material" and embodiments thereof unless specified otherwise. In an embodiment, the liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. Accordingly, embodiments and aspects of the present disclosure directed to "brine" are also operably directed to "liquid resource" unless specified otherwise.

In some embodiments, ion exchange materials are typically small particles, which together constitute a fine powder. In some embodiments small particle size minimizes the diffusion distance that lithium must travel into the core of the ion exchange particles. In some cases, these particles are optionally coated with protective surface coatings to minimize dissolution of the ion exchange materials while allowing efficient transfer of lithium and hydrogen to and from the particles.

In an embodiment, the coated ion exchange particles are comprised of an ion exchange material and a coating material wherein the ion exchange material comprises $Li_4Mn_5O_{12}$, $Li_{1.6}Mn_{1.6}O_4$, $Li_2MO_3$ (M=Ti, Mn, Sn), $LiFePO_4$, solid solutions thereof, or combinations thereof and the coating material comprises $TiO_2$, $ZrO_2$, $MoO_2$, $Li_2TiO_3$, $Li_2ZrO_3$, $LiNbO_3$, $AlF_3$, SiC, $Si_3N_4$, graphitic carbon, amorphous carbon, diamond-like carbon, or combinations thereof. In some embodiments, the coated ion exchange particles have an average diameter less than about 100 nm, less than about 1,000 nm, or less than about 10,000 nm, and the coating thickness is less than about 1 nm, less than about 10 nm, or less than about 100 nm. In some embodiments, the particles are created by first synthesizing the ion exchange material using a method such as hydrothermal, solid state, or microwave. In some embodiments, the coating material is then deposited on the surface of the ion exchange material using a method such as chemical vapor deposition, hydrothermal, solvothermal, sol-gel, precipitation, or microwave. In some embodiments, the coated ion exchange particles are treated with an acid solution prepared with hydrochloric acid, sulfuric acid, nitric acid, or combinations thereof wherein the concentration of the acid solution is greater than about 0.1 M, greater than about 1.0 M, greater than about 5 M, greater than about 10 M, or combinations thereof. In some embodiments, during acid treatment, the particles absorb hydrogen while releasing lithium. In some embodiments, the ion exchange material is converted to a hydrated state with a hydrogen-rich composition. In some embodiments, the coating material allows diffusion of hydrogen and lithium respectively to and from the ion exchange material while providing a protective barrier that limits dissolution of the ion exchange material. In some embodiments, after treatment in acid, the hydrated coated ion exchange particles are treated with a liquid resource wherein the liquid resource is a natural brine, a dissolved salt flat, a concentrated brine, a processed brine, a synthetic brine, liquid from an ion exchange process, liquid from a solvent extraction process, leachate from minerals, leachate from clays, leachate from recycled products, leachate from recycled materials, or combinations thereof. In some embodiments, the coated ion exchange particles absorb lithium while releasing hydrogen. The lithium salt solution is then collected. In some embodiments, the coated ion exchange particles are then capable to perform the ion exchange reaction repeatedly over a number of cycles greater than about 10 cycles, greater than about 30 cycles, greater than about 100 cycles, or greater than about 300 cycles.

In some embodiments, one major challenge for lithium extraction using inorganic ion exchange particles is the loading of the particles into an ion exchange column in such a way that brine and acid are optionally pumped efficiently through the column with minimal clogging. The materials are optionally formed into beads, and the beads are optionally loaded into the column. This bead loading creates void spaces between the beads, and these void spaces facilitate pumping through the column. The beads hold the ion exchange particles in place and prevent free movement of the particles throughout the column. When the materials are formed into beads, the penetration of brine and acid solutions into the beads become slow and challenging. A slow rate of convection and diffusion of the acid and brine solutions into the bead slows the kinetics of lithium absorption and release. Such slow kinetics can create problems for column operation. Slow kinetics can require slow pumping rates through the column. Slow kinetics can also lead to low lithium recovery from the brine and inefficient use of acid to elute the lithium.

In some embodiments, the ion exchange beads are porous ion exchange beads with networks of pores that facilitate the transport into the beads of solutions that are pumped through an ion exchange column. Pore networks are optionally strategically controlled to provide fast and distributed access for the brine and acid solutions to penetrate into the bead and deliver lithium and hydrogen to the ion exchange particles.

In some embodiments, the ion exchange beads are formed by mixing ion exchange particles, a matrix material, and a filler material. In some embodiments, these components are mixed and formed into a bead. In some embodiments, the filler material is removed from the bead to leave behind pores. In some embodiments, the filler material is dispersed in the bead in such a way to leave behind a pore structure that enables transport of lithium and hydrogen with fast kinetics. This method optionally involves multiple ion exchange materials, multiple polymer (e.g., matrix) materials, and multiple filler materials.

In some embodiments, another major challenge for lithium extraction using inorganic ion exchange materials is dissolution and degradation of the materials, especially during lithium elution in acid but also during lithium uptake in liquid resources. In some embodiments, to yield a concentrated lithium solution from the ion exchange process, it is desirable to use a concentrated acid solution to elute the lithium. However, concentrated acid solutions dissolve and degrade inorganic ion exchange materials, which decrease the performance and lifespan of the materials. Therefore, the porous ion exchange beads optionally contain coated ion exchange particle for lithium extraction that are comprised of an ion exchange material and a coating material protecting the particle surface. In some embodiments, the coating protects the ion exchange material from dissolution and degradation during lithium elution in acid, during lithium uptake from a liquid resource, and during other aspects of an ion exchange process. In some embodiments, this coated particle enables the use of concentrated acids in the ion exchange process to yield concentrated lithium solutions.

In some embodiments, the ion exchange material is selected for high lithium absorption capacity, high selectivity for lithium uptake from a liquid resource relative to uptake of other ions such as sodium and magnesium, strong lithium uptake in liquid resources including those with low concentrations of lithium, facile elution of lithium with a small excess of acid, and fast ionic diffusion. A coating material is optionally selected to protect the particle from dissolution and chemical degradation during lithium recovery in acid and also during lithium uptake in various liquid resources. A coating material optionally is also selected to facilitate diffusion of lithium and hydrogen between the particles and the liquid resources, to enable adherence of the particles to a structural support, and to suppress structural and mechanical degradation of the particles.

In some embodiments, when the porous ion exchange beads are used in an ion exchange column, the liquid resource containing lithium is pumped through the ion exchange column so that the ion exchange particles absorb lithium from the liquid resource while releasing hydrogen. In some embodiments, after the beads have absorbed lithium, an acid solution is pumped through the column so that the particles release lithium into the acid solution while absorbing hydrogen. The column is optionally operated in co-flow mode with the liquid resource and acid solution alternately flowing through the column in the same direction, or the column is optionally operated in counter-flow mode with a liquid resource and acid solution alternately flowing through the column in opposite directions. Between flows of the liquid resource and the acid solution, the column is optionally treated or washed with water or other solutions for purposes such as adjusting pH in the column or removing potential contaminants. The beads optionally form a fixed or moving bed, and the moving bed optionally moves in counter-current to the brine and acid flows. The beads are optionally moved between multiple columns with moving beds where different columns are used for brine, acid, water, or other flows. Before or after the liquid resource flows through the column, the pH of the liquid is optionally adjusted with NaOH or other chemicals to facilitate the ion exchange reaction as well as handling or disposal of the spent liquid resource. Before or after the liquid resource flows through the column, the liquid resource is optionally subjected to other processes including other ion exchange processes, solvent extraction, evaporation, chemical treatment, or precipitation to remove lithium, to remove other chemical species, or to otherwise treat the brine.

In some embodiments, when the ion exchange particles are treated with acid, a lithium solution is produced. This lithium solution is optionally further processed to produce lithium chemicals. These lithium chemicals are optionally supplied for an industrial application. In some embodiments, an ion exchange material is selected from the following list:

an oxide, a phosphate, an oxyfluoride, a fluorophosphate, or combinations thereof. In some embodiments, an ion exchange material is selected from the following list: $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, $Al(OH)_3$, $LiCl \cdot xAl(OH)_3 \cdot yH_2O$, $SnO_2 \cdot xSb_2O_5 \cdot yH_2O$, $TiO_2 \cdot xSb_2O_5 \cdot yH_2O$, solid solutions thereof, or combinations thereof. In a further aspect, an ion exchange material comprises $LiFePO_4$, $Li_2SnO_3$, $Li_2MnO_3$, $Li_2TiO_3$, $Li_4Ti_5O_{12}$, $Li_4Mn_5O_{12}$, $Li_{1.6}Mn_{1.6}O_4$, solid solutions thereof, or combinations thereof.

In a further aspect described herein, the coating material allows diffusion to and from the ion exchange material. In some embodiments, the coating material facilitates diffusion of lithium and hydrogen between the particles and the liquid resources, enables adherence of the particles to a structural support, and suppresses structural and mechanical degradation of the particles. In a further aspect described herein, the coating material comprises a carbide, a nitride, an oxide, a phosphate, a fluoride, a polymer, carbon, a carbonaceous material, or combinations thereof. In a further aspect, the coating material comprises polyvinylidene difluoride, polyvinyl chloride, a fluoro-polymer, a chloro-polymer, or a fluoro-chloro-polymer. In a further aspect, a coating material comprises $Nb_2O_5$, $Ta_2O_5$, $MoO_2$, $TiO_2$, $ZrO_2$, $SnO_2$, $SiO_2$, $Li_2O$, $Li_2TiO_3$, $Li_2ZrO_3$, $Li_2MoO_3$, $LiNbO_3$, $LiTaO_3$, $Li_2SiO_3$, $Li_2Si_2O_5$, $Li_2MnO_3$, $ZrSiO_4$, $AlPO_4$, $LaPO_4$, $ZrP_2O_7$, $MoP_2O_7$, $MO_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or combinations thereof. In a further aspect, a coating material comprises $TiO_2$, $ZrO_2$, $SiO_2$, $Li_2TiO_3$, $Li_2ZrO_3$, $Li_2MnO_3$, $ZrSiO_4$, or $LiNbO_3$. In a further aspect, a coating material comprises a chloro-polymer, a fluoro-polymer, a chloro-fluoro-polymer, a hydrophilic polymer, a hydrophobic polymer, co-polymers thereof, mixtures thereof, or combinations thereof. In a further aspect, a coating material comprises a co-polymer, a block co-polymer, a linear polymer, a branched polymer, a cross-linked polymer, a heat-treated polymer, a solution processed polymer, co-polymers thereof, mixtures thereof, or combinations thereof. In a further aspect, a coating material comprises low density polyethylene, high density polyethylene, polypropylene, polyester, polytetrafluoroethylene (PTFE), types of polyamide, polyether ether ketone (PEEK), polysulfone, polyvinylidene fluoride (PVDF), poly(4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chloro-trifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly(ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly(4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In a further aspect, a coating is deposited onto an ion exchange particle by dry mixing, mixing in solvent, emulsion, extrusion, bubbling one solvent into another, casting, heating, evaporating, vacuum evaporation, spray drying, vapor deposition, chemical vapor deposition, microwaving, hydrothermal synthesis, polymerization, co-polymerization, cross-linking, irradiation, catalysis, foaming, other deposition methods, or combinations thereof. In a further aspect, a coating is deposited using a solvent comprising N-methyl-2-pyrrolidone, dimethyl sulfoxide, tetrahydrofuran, dimethylformamide, dimethylacetamide, methyl ethyl ketone, ethanol, acetone, other solvents, or combinations thereof. In a further aspect, a coating is deposited using a solvent comprising N-methyl-2-pyrrolidone, dimethyl sulfoxide, tetrahydrofuran, dimethylformamide, dimethylacetamide, methyl ethyl ketone, ethanol, acetone, or combinations thereof.

In a further aspect described herein, the coated ion exchange particles have an average diameter less than about 10 nm, less than about 100 nm, less than about 1,000 nm, less than about 10,000 nm, or less than about 100,000 nm. In a further aspect, the coated ion exchange particles have an average size less than about 100 nm, less than about 1,000 nm, or less than about 10,000 nm. In a further aspect, the coated ion exchange particles are optionally secondary particles comprised of smaller primary particles that have an average diameter less than about 10 nm, less than about 100 nm, less than about 1,000 nm, less than about 10,000 nm, or less than about 100,000 nm. In a further aspect, the coating optionally coats the primary ion exchange particles. In a further aspect, the coating optionally coats the secondary ion exchange particles. In a further aspect, the coating optionally coats the secondary ion exchange particles. In a further aspect, the coating optionally coats both the primary ion exchange particles and the secondary ion exchange particles. In a further aspect, the primary ion exchange particles optionally have a first coating and the secondary ion exchange particles optionally have a second coating that is optionally identical, similar, or different in composition to the first coating. It is recognized that measurements of average particle diameter can vary according to the method of determination utilized. Determination of said average particle diameter according to one method to obtain one or more values shall be understood to inherently encompass all other values that may be obtained using other methods. The average particle diameter can be determined using sieve analysis. The average particle diameter can be determined using optical microscopy. The average particle diameter can be determined using electron microscopy. The average particle diameter can be determined using laser diffraction. In some embodiments, the average particle diameter is determined using laser diffraction, wherein a Bettersizer ST instrument is used. In some embodiments, the average particle diameter is determined using a Bettersizer ST instrument. In some embodiments, the average particle diameter is determined using laser diffraction, wherein an Anton-Parr particle size analyzer (PSA) instrument is used. In some embodiments, the average particle diameter is determined using an Anton-Parr PSA instrument. The average particle diameter can be determined using dynamic light scattering. The average particle diameter can be determined using static image analysis. The average particle diameter can be determined using dynamic image analysis.

In some embodiments described herein, the coating material has a thickness less than about 1 nm, less than about 10 nm, less than about 100 nm, less than about 1,000 nm, or less than about 10,000 nm. In further embodiments, the coating material has a thickness less than about 5 nm, less than about 50 nm, or less than about 500 nm. In some embodiments, the ion exchange particles have a coating material with a thickness selected from the following list: less than 1 nm, less than 10 nm, less than 100 nm, or less than 1,000 nm. In some embodiments, the coating material has a thickness selected from the following list: less than 1 nm, less than 10 nm, or less than 100 nm. In certain embodiments, the coating material has a thickness between about 0.5 nm to about 1000 nm. In some embodiments, the coating material has a thickness between about 1 nm to about 100 nm.

In some embodiments, coating thickness may be measured by any one or more of electron microscopy, optical microscopy, couloscopy, nanoindentation, atomic force microscopy, and X-ray fluorescence. In some embodiments, coating thickness may be inferred or extrapolated from data obtained according to an analytical method that indicates the bulk composition of the coated ion exchange particle, or the ion exchange material that further comprises the coating material. In some embodiments, coating thickness may be inferred by differential analysis of data obtained by analysis of ion exchange material that further comprises a coating material and data obtained by analysis ion exchange material that does not further comprise a coating material. In some embodiments, coating thickness may be inferred by differential analysis of data obtained by analysis of one or more coated ion exchange particles and data obtained by analysis of one or more uncoated ion exchange particles.

In a further aspect described herein, the ion exchange material and the coating material form one or more concentration gradients where the chemical composition of the particle ranges between two or more compositions. In a further aspect, the chemical composition optionally varies between the ion exchange materials and the coating in a manner that is continuous, discontinuous, or continuous and discontinuous in different regions of the particle. In a further aspect, the ion exchange materials and the coating materials form a concentration gradient that extends over a thickness less than about 1 nm, less than about 10 nm, less than about 100 nm, less than about 1,000 nm, less than about 10,000 nm, or less than about 100,000 nm. In a further aspect, the ion exchange materials and the coating materials form a concentration gradient that extends over a thickness of about 1 nm to about 1,000 nm.

In a further aspect described herein, the ion exchange material is synthesized by a method such as hydrothermal, solvothermal, sol-gel, solid state, molten salt flux, ion exchange, microwave, ball milling, chemical precipitation, co-precipitation, vapor deposition, or combinations thereof. In a further aspect, the ion exchange material is synthesized by a method such as chemical precipitation, hydrothermal, solid state, or combinations thereof.

In a further aspect described herein, the coating material is deposited by a method such as chemical vapor deposition, atomic layer deposition, physical vapor deposition, hydrothermal, solvothermal, sol-gel, solid state, molten salt flux, ion exchange, microwave, chemical precipitation, co-precipitation, ball milling, pyrolysis, or combinations thereof. In a further aspect, the coating material is deposited by a method such as sol-gel, chemical precipitation, or combinations thereof. In a further aspect, the coating materials is deposited in a reactor that is optionally a batch tank reactor, a continuous tank reactor, a batch furnace, a continuous furnace, a tube furnace, a rotary tube furnace, or combinations thereof.

In some embodiments, a coating material is deposited with physical characteristics selected from the following list: crystalline, amorphous, full coverage, partial coverage, uniform, non-uniform, or combinations thereof.

In some embodiments, multiple coatings are optionally deposited on the ion exchange material in an arrangement selected from the following list: concentric, patchwork, or combinations thereof.

In some embodiments, the matrix material is selected from the following list: a polymer, an oxide, a phosphate, or combinations thereof. In some embodiments, a structural support (e.g., a structural support to which ion exchange material can be adhered, a support structure within which an ion exchange material can be embedded) is selected from the following list: polyvinyl fluoride, polyvinylidene fluoride, polyvinyl chloride, polyvinylidene chloride, polyethylene, polypropylene, polyphenylene sulfide, polytetrafluoroethylene, polytetrofluoroethylene, sulfonated polytetrofluoroethylene, polystyrene, polydivinylbenzene, polybutadiene, sulfonated polymer, carboxylated polymer, Nafion, copolymers thereof, and combinations thereof. In some embodiments, a structural support is selected from the following list: polyvinylidene difluoride, polyvinyl chloride, sulfonated polytetrofluoroethylene, polystyrene, polydivinylbenzene, copolymers thereof, or combinations thereof. In some embodiments, a structural support is selected from the following list: titanium dioxide, zirconium dioxide, silicon dioxide, solid solutions thereof, or combinations thereof. In some embodiments, the matrix material is selected for thermal resistance, acid resistance, and/or other chemical resistance.

In some embodiments, the porous ion exchange bead is formed by mixing the ion exchange particles, the matrix material, and the filler material together at once. In some embodiments, the porous ion exchange bead is formed by first mixing the ion exchange particles and the matrix material, and then mixing with the filler material. In some embodiments, the porous ion exchange bead is formed by first mixing the ion exchange particles and the filler material, and then mixing with the matrix material. In some embodiments, the porous ion exchange bead is formed by first mixing the matrix material and the filler material, and then mixing with the ion exchange particles.

In some embodiments, the porous ion exchange bead is formed by mixing the ion exchange particles, the matrix material, and/or the filler material with a solvent that dissolves once or more of the components. In some embodiments, the porous ion exchange bead is formed by mixing the ion exchange particles, the matrix material, and/or the filler material as dry powders in a mixer or ball mill. In some embodiments, the porous ion exchange bead is formed by mixing the ion exchange particles, the matrix material, and/or the filler material in a spray drier.

In some embodiments, the matrix material is a polymer that is dissolved and mixed with the ion exchange particles and/or filler material using a solvent from the following list: n-methyl-2-pyrrolidone, dimethyl sulfoxide, tetrahydrofuran, dimethylformamide, dimethylacetamide, methyl ethyl ketone, or combinations thereof. In some embodiments, the filler material is a salt that is dissolved and mixed with the ion exchange particles and/or matrix material using a solvent from the following list: water, ethanol, iso-propyl alcohol, acetone, or combinations thereof.

In some embodiments, the filler material is a salt that is dissolved out of the bead to form pores using a solution selected from the following list: water, ethanol, iso-propyl alcohol, a surfactant mixture, an acid, a base, or combinations thereof. In some embodiments, the filler material is a material that thermally decomposes to form a gas at high temperature so that the gas can leave the bead to form pores, where the gas is selected from the following list: water vapor, oxygen, nitrogen, chlorine, carbon dioxide, nitrogen oxides, organic vapors, or combinations thereof.

In some embodiments, the porous ion exchange bead is formed from dry powder using a mechanical press, a pellet press, a tablet press, a pill press, a rotary press, or combinations thereof. In some embodiments, the porous ion exchange bead is formed from a solvent slurry by dripping the slurry into a different liquid solution. The solvent slurry is optionally formed using a solvent of n-methyl-2-pyrrolidone, dimethyl sulfoxide, tetrahydrofuran, dimethylformamide, dimethylacetamide, methyl ethyl ketone, or combinations thereof. The different liquid solution is optionally formed using water, ethanol, iso-propyl alcohol, acetone, or combinations thereof.

In some embodiments, the porous ion exchange bead is approximately spherical with an average diameter selected from the following list: less than 10 µm, less than 100 µm, less than 1 mm, less than 1 cm, or less than 10 cm. In some embodiments, the porous ion exchange bead is approximately spherical with an average diameter selected from the following list: less than 200 µm, less than 2 mm, or less than 20 mm. In certain embodiments, the porous ion exchange bead is approximately spherical with an average diameter between 10 µm and 2 mm.

In some embodiments, the porous ion exchange bead is tablet-shaped with a diameter of less than 1 mm, less than 2 mm, less than 4 mm, less than 8 mm, or less than 20 mm and with a height of less than 1 mm, less than 2 mm, less than 4 mm, less than 8 mm, or less than 20 mm. In certain embodiments, the porous ion exchange bead is tablet-shaped with a diameter between 500 µm and 10 mm.

In some embodiments, the porous ion exchange bead is embedded in a support structure, which is optionally a membrane, a spiral-wound membrane, a hollow fiber membrane, or a mesh. In some embodiments, the porous ion exchange bead is embedded on a support structure comprised of a polymer, a ceramic, or combinations thereof. In some embodiments, the porous ion exchange bead is loaded directly into an ion exchange column with no additional support structure.

In some embodiments, the liquid resource is selected from the following list: a natural brine, a dissolved salt flat, a geothermal brine, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from recycled products, leachate from recycled materials, or combinations thereof. In some embodiments, a liquid resource is selected from the following list: a natural brine, a dissolved salt flat, a concentrated brine, a processed brine, a synthetic brine, a geothermal brine, liquid from an ion exchange process, liquid from a solvent extraction process, leachate from minerals, leachate from clays, leachate from recycled products, leachate from recycled materials, or combinations thereof. In some embodiments, the liquid resource is optionally pre-treated prior to entering the ion exchange reactor to remove suspended solids, hydrocarbons, or organic molecules. In some embodiments, the liquid resource enters the ion exchange reactor without any pre-treatment following removal from its source.

In some embodiments, the liquid resource is selected with a lithium concentration selected from the following list: less than 100,000 ppm, less than 10,000 ppm, less than 1,000 ppm, less than 100 ppm, less than 10 ppm, or combinations thereof. In some embodiments, a liquid resource is selected with a lithium concentration selected from the following list: less than 5,000 ppm, less than 500 ppm, less than 50 ppm, or combinations thereof.

System for Extracting Lithium from a Liquid Resource

In one aspect described herein, is a system for lithium extraction from a liquid resource comprising one or more vessels independently configured to simultaneously accommodate porous ion exchange beads moving in one direction and alternately acid, brine, and optionally other solutions moving in the net opposite direction. This lithium extraction system produces an eluate which is concentrated in lithium and optionally contains other ions.

In one aspect described herein, there is a device for lithium extraction from a liquid resource comprising a stirred rank reactor, an ion exchange material, and a pH modulating setup for increasing the pH of the liquid resource in the stirred tank reactor.

In one aspect described herein, is a device for lithium extraction from a liquid resource comprising a stirred rank reactor, an ion exchange material, a pH modulating setup for increasing the pH of the liquid resource in the stirred tank reactor, and a compartment for containing the ion exchange material in the stirred tank reactor while allowing for removal of liquid resource, washing fluid, and acid solutions from the stirred tank reactor.

In one embodiment, at least one of the one or more vessels are fitted with a conveyer system suitably outfitted to move porous ion exchange beads upward and simultaneously allow a net flow of acid, brine, and optionally other solutions, downward. In one embodiment, the conveyor system comprises fins with holes. In one embodiment, wherein the fins slide upward over a sliding surface that is fixed in place. In one embodiment, the fins slide upward over a sliding surface that is fixed in place. In one embodiment, all of the one or more vessels are fitted with a conveyor system suitably outfitted to move porous ion exchange beads upward and simultaneously allow a net flow of acid, brine, and optionally other solutions, downward. In one embodiment, there are an even number of vessels. In one embodiment, there are an odd number of vessels. In one embodiment, the vessels are columns.

In some embodiments, structures with holes are used to move the ion exchange material through one or more vessels. In some embodiments, the holes in the structures may be less than 10 microns, less than 100 microns, less than 1,000 microns, or less than 10,000 microns. In some embodiments, the structures may be attached to a conveyer system. In some embodiments, the structures may comprise a porous compartment, porous partition, or other porous structure. In some embodiments, the structures may contain a bed of fixed or fluidized ion exchange material. In some embodiments, the structures may contain ion exchange material while allowing brine, aqueous solution, or acid solution to pass through the structures.

In one embodiment, the porous ion exchange beads comprise ion exchange particles that reversibly exchange lithium and hydrogen and a structural matrix material and having a pore network. In one embodiment, the liquid resource comprises a natural brine, a dissolve salt flat, a concentrated brine, a processed brine, a filtered brine, a liquid from an ion exchange process, a liquid from a solvent extraction process, a synthetic brine, leachate from ores, leachate from minerals, leachate from clays, leachate from recycled products, leachate from recycled materials, or combinations thereof.

Activating Treatments of the Ion Exchange Material

In some embodiments, the ion exchange material is subject to an initial treatment prior to lithium extraction (e.g., cycles, lithium extraction cycles, the practice of any method disclosed herein). In some embodiments, the ion exchange particles are subject to an initial treatment prior to lithium extraction. In some embodiments, the coated ion exchange particles are subject to an initial treatment prior to lithium extraction. In some embodiments, the ion exchange beads are subject to an initial treatment prior to lithium extraction.

In some embodiments, said initial treatment comprises treating said ion exchange material with a treatment solution. In some embodiments, said treatment solution comprises an acid. In some embodiments, said acid comprises hydrochloric acid. In some embodiments, said acid comprises nitric acid. In some embodiments, said acid comprises hydrochloric acid, nitric acid, sulfuric acid, phosphoric acid, acetic acid, a mineral acid, an organic acid, or a mixture thereof.

In some embodiments, said initial treatment comprises treatment of the ion exchange material (e.g., particle, bead) with an acid solution prepared with hydrochloric acid, sulfuric acid, nitric acid, or combinations thereof wherein the concentration of the acid solution is greater than about 0.1 M, greater than about 1.0 M, greater than about 5 M, greater than about 10 M, or combinations thereof. In some embodiments, said initial treatment comprises treatment with an acid solution prepared with hydrochloric acid, sulfuric acid, nitric acid, or combinations thereof wherein the concentration of the acid solution is less than about 0.1 M, less than about 1.0 M, less than about 5 M, less than about 10 M, or combinations thereof. In some embodiments, said initial treatment comprises treatment with an acid solution prepared with hydrochloric acid, sulfuric acid, nitric acid, or combinations thereof wherein the concentration of the acid solution is from about 0.01 M to about 0.1 M, from about 0.1 M to about 1.0 M, from about 1.0 M to about 5 M, from about 5 M to about 10 M, or combinations thereof.

In some embodiments, during initial treatment, the ion exchange material absorbs hydrogen while releasing lithium. In some embodiments, the ion exchange material is converted to a hydrated state with a hydrogen-rich composition during the initial treatment. In some embodiments, the coating material that may be present on the ion exchange material allows diffusion of hydrogen and lithium respectively to and from the ion exchange material while providing a protective barrier that limits dissolution of the ion exchange material. In some embodiments, during initial treatment, the lithium is released from the ion exchange material. In some embodiments, less than about 5%, less than about 10%, less than about 25%, less than about 50%, less than about 75%, or less than about 99% of the lithium is released. In some embodiments, more than about 5%, more than about 10%, more than about 25%, more than about 50%, more than about 75%, or more than about 99% of the lithium is released.

In some embodiments, after initial treatment in acid, the ion exchange material (e.g., bead, particles) is treated with a liquid resource wherein the liquid resource is a natural brine, a dissolved salt flat, a concentrated brine, a processed brine, a synthetic brine, liquid from an ion exchange process, liquid from a solvent extraction process, leachate from minerals, leachate from clays, leachate from recycled products, leachate from recycled materials, or combinations thereof. In some embodiments, the ion exchange material absorbs lithium while releasing hydrogen.

In some embodiments, the ion exchange beads are fluidized inside said vessel during the initial treatment described above. In some embodiments, the ion exchange beads are stirred inside said vessel during the initial treatment described above. In some embodiments, the ion exchange beads are stirred by a mixer. In some embodiments, the ion exchange beads are stirred by one or more agitators. In some embodiments, said agitators comprise one or more impellers. In some embodiments, said one or more impellers comprise propellers, anchor impellers, hydrofoils, pitched blade turbines, curved blade turbines, spiral turbine, flat blade turbines, radial blades, or a combination thereof. In some embodiments, said impellers contain one or more blades. In some embodiments, the shaft and impellers are comprised of carbon steel, stainless steel, titanium, Hastelloy, or a combination thereof. In some embodiments, the shaft and impellers are coated with glass, epoxy, rubber, a polymer coating, or combinations thereof.

In some embodiments, the fluidization of the ion exchange material (e.g., beads, particles) by means of said agitator is aided by baffles mounted inside of said tank. Said fluidization may be configured to take place or may be desirable at any stage or point of any method disclosed herein. In some embodiments, said baffles comprise flat rectangular structures mounted onto the side of the tank. In some embodiments said baffles are oriented perpendicular to the plane of agitator of the impeller. In some embodiment, the presence of one or more baffles aid with the fluidization of the ion exchange material inside the vessel. In some embodiments, the presence of one or more baffles reduce the swirling and vortexing associated with fluidization of the particles with an impeller. In some embodiments, the presence of said baffles results in more uniform suspension of ion exchange material. In some embodiments, the presence of said baffles results in reduce attrition of ion exchange material being fluidized. In some embodiments, said baffles are constructed to span the entire vertical length of the vessel. In some embodiments, the baffles are constructed to span from about the height of the settled bed of ion exchange material to the top of the vessel. In some embodiments, the baffles are constructed to span from about 6" from the bottom of the vessel to the top of the vessel. In some embodiments, there is a gap between the wall of the vessel and the baffle. In some embodiments, said gap measures less than ⅛", less than ¼", less than ½", or less than 1". In some embodiments, said baffles measure a width that is equivalent to approximately one twelfth of the width of the vessel. In some embodiments, said baffles measure a width that is equivalent to approximately less than one tenth of the width of the vessel. In some embodiments, said baffles measure a width that is equivalent to more than approximately one fifteenth of the width of the vessel. In some embodiments, all baffles are of equivalent dimensions. In some embodiments, baffles are not of the same dimensions. In some embodiments, the tank contains two baffles. In some embodiments, the tank contains three baffles. In some embodiments, the tank contains four baffles. In some embodiments, the tank contains more than four baffles.

In some embodiments, the ion exchange beads are fluidized by pumping solution into the tank near the bottom of the tank. In some embodiments, the ion exchange beads are fluidized by pumping solution from the tank back into the tank near the bottom of the tank. In some embodiments, the ion exchange beads are fluidized by pumping a slurry of the ion exchange beads from near the bottom of the tank to a higher level in the tank.

In some embodiments, the ion exchange beads are loaded into an ion exchange device during the initial treatment described above. In some embodiments, the ion exchange beads are immobilized in said device, such that the treatment solution enters and exits the ion exchange vessel, while the treatment solution contacts said ion exchange beads. In some embodiments, the treatment solution is recirculated through the ion exchange device.

In some embodiments, the duration of the initial treatment of the ion exchange material with the treatment solution is less than about 5 minutes, less than about 15 minutes, less than about 30 minutes, less than about 60 minutes, less than about 2 hours, less than about 4 hours, less than about 12 hours, or less than about 24 hours. In some embodiments, the duration of the initial treatment of the ion exchange material with the treatment solution is more than about 5 minutes, more than about 15 minutes, more than about 30 minutes, more than about 60 minutes, more than about 2 hours, more than about 4 hours, more than about 12 hours, or more than about 24 hours.

In some embodiments, during initial treatment, the ion exchange material (e.g., particles, beads) absorbs hydrogen while releasing lithium. In some embodiments, the ion exchange material is converted to a hydrated state with a hydrogen-rich composition. In some embodiments, acid treatment causes changes to the morphology of the ion exchange material. In some embodiments, acid treatment causes changes to the crystal structure of the material. In some embodiments, acid treatment causes dissolution of a cationic species in the material into the acidic solution. In some embodiments, acid treatment causes dissolution of a metallic species in the material into the acidic solution. In some embodiments, the dissolved species comprises one or more of: Ti, Sn, Mn, Al, Cu, V, or Si. In some embodiments, the dissolution of said species impacts the lithium extraction performance of the ion exchange material that has undergone the initial treatment. In some embodiments, the dissolution of said species impacts the durability of the ion exchange material that has undergone the initial treatment. In some embodiments, the dissolution of said species impacts the lifetime of the ion exchange material that has undergone the initial treatment.

In some embodiments, the ion exchange material is contacted with a chemical additive as part of the initial treatment process. In some embodiments, the ion exchange material is contacted with a chemical additive before the initial treatment process. In some embodiments, the ion exchange material is contacted with a chemical additive during the initial treatment process. In some embodiments, the ion exchange material is contacted with a chemical additive after the initial treatment process. In some embodiments, the ion exchange material is contacted with one or more chemical additives. In some embodiments, the ion exchange material is contacted with a chemical additive during the lithium extraction process.

In some embodiments, the initial treatment is carried out before or between ion exchange cycles, wherein each cycle comprises lithium extraction and lithium elution.

In some embodiments, a system for extracting lithium from a liquid resource comprises a system for contacting the ion exchange material with chemical additives before, during, or after the initial treatment. In some embodiments, a method for extracting lithium from a liquid resource comprises contacting the ion exchange material with chemical additives before, during, or after the initial treatment process. In some embodiments, contact with said one or more chemical additives results in improved performance of the ion exchange material in the context of lithium extraction. In some embodiments, contact with said one or more chemical additives results in a prolonged shelf life of the ion exchange material.

In some embodiments, the ion exchange material is subject to an initial treatment and stored for a storage period prior to its use in the context of an ion exchange process. In some embodiments, said storage period is less than about 1 hour, less than about 2 hours, less than about 4 hours, less than about 12 hours less than about 24 hours, less than about 5 days, less than about 10 days, less than about 30 days, less than about 100 days, or less than about 300 days. In some embodiments, said storage period is more than about 1 hour, more than about 2 hours, more than about 4 hours, more than about 12 hours more than about 24 hours, more than about 5 days, more than about 10 days, more than about 30 days, more than about 100 days, or more than about 300 days. In some embodiments, said storage period is from about 1 hour to about 2 hours, from about 4 hours to about 12 hours, from about 12 hours to about 24 hours, from about 1 day to about 5 days, from about 5 days to about 10 days, from about 10 days to about 30 days. In some embodiments, the performance of the ion exchange material in the context of lithium extraction is diminished after said storage period, relative to the performance of ion exchange material used immediately following the initial treatment. In some embodiments, said diminished performance comprises one or more of diminished lithium recovery, diminished lithium selectivity, diminished lithium eluate purity, diminished ion exchange material lifetime, diminished ion exchange material shelf life, diminished total ion-exchange cycles that can be achieved the ion-exchange material needs to be replaced, and increased consumption of reagents necessary to drive ion exchange.

In some embodiments, the initial treatment comprises contacting a chemical additive with the ion exchange material before, during, or after the contacting the ion exchange material with an acidic solution as described above, and before said ion exchange material is utilized to extract lithium from a liquid resource.

In some embodiments, contact of the ion exchange material with a chemical additive as an aspect of the initial treatment increases the shelf life of the ion exchange material. In some embodiments, contact of the ion exchange material with a chemical additive as an aspect of the initial treatment before, during, or after contacting the ion exchange material with an acidic solution increases the shelf life of the ion exchange material. In some embodiments, contact of the ion exchange material with a chemical additive as an aspect of the initial treatment increases the time that the ion exchange material can be stored without diminishing its performance in the context of lithium extraction. In some embodiments, contact of the ion exchange material with a chemical additive as an aspect of the initial treatment results in a higher performance for the ion exchange process once the ion material is stored and subsequently utilized for lithium extraction, relative to the performance of the same ion exchange material that is not contacted with a chemical additive as an aspect of the initial treatment before storage.

In some embodiments, the duration of the initial treatment of the ion exchange material with a chemical additive is less than about 5 minutes, less than about 15 minutes, less than about 30 minutes, less than about 60 minutes, less than about 2 hours, less than about 4 hours, less than about 12 hours, or less than about 24 hours. In some embodiments, the duration of the initial treatment of the ion exchange material with a chemical additive is more than about 5 minutes, more than about 15 minutes, more than about 30 minutes, more than about 60 minutes, more than about 2 hours, more than about 4 hours, more than about 12 hours, or more than about 24 hours.

In some embodiments, a system for extracting lithium from a liquid resource comprises a subsystem for an initial treatment of an ion exchange material, followed by a subsystem for contacting the liquid resource, the wash solution, or the acidic solution with chemical additives prior to contacting the liquid resource, the wash solution, or the acidic solution with the ion exchange material. In some embodiments, a method for extracting lithium from a liquid resource comprises an initial treatment of the ion exchange material, followed by contacting the liquid resource, the wash solution, or the acidic solution with chemical additives prior to contacting the liquid resource, the wash solution, or the acidic solution with the ion exchange material. In some embodiments, the process of producing lithium by ion exchange makes use of said system to add chemical additives. In some embodiments, the ion exchange material is contacted with a chemical additive by directly treating the ion exchange material with the chemical additive. In some embodiments, the ion exchange material is contacted with a chemical additive by treating the liquid resource with one or more chemical additives, and then contacting said liquid resource containing chemical additives with the ion exchange material to absorb the lithium in the liquid resource. In some embodiments, the ion exchange material is contacted with a chemical additive by treating the process water with one or more chemical additives, and then contacting said process water containing chemical additives with the ion exchange material to wash the ion exchange material. In some embodiments, the ion exchange material is contacted with a chemical additive by treating an acid with one or more chemical additives, and then contacting said acid with the ion exchange material to elute lithium. In some embodiments, the ion exchange material is contacted with a chemical additive by treating a base with one or more chemical additives, and then contacting said base with the ion exchange material to adjust the pH of the liquid resource.

In some embodiments, treatment of the ion exchange material with a chemical additive prevents a change in the crystal structure of the ion exchange material. In some embodiments, treatment of the ion exchange material with a chemical additive slows the change in the crystal structure of the ion exchange material. In some embodiments, treatment of the ion exchange material with a chemical additive prevents the degradation or dissolution of the ion exchange material. In some embodiments, treatment of the ion exchange material with a chemical additive prevents the degradation or dissolution of the oxide in the ion exchange material. In some embodiments, treatment of the ion exchange material with a chemical additive prevents the degradation or dissolution of the polymer matrix in the ion exchange material. In some embodiments, treatment of the ion exchange material with a chemical additive preserves the textural properties of the ion exchange material. In some embodiments, treatment of the ion exchange material with a chemical additive prevents the dissolution of the ion exchange material in the liquid resource, wash solution, acid, or combinations thereof. In some embodiments, treatment of the ion exchange material with a chemical additive increases the lifetime of the ion exchange material results in an increased production of lithium carbonate equivalents per kilogram of ion exchange material during the lifetime of said ion exchange material. In some embodiments, treatment of the ion exchange material with a chemical additive increases the purity of the lithium eluted from the ion exchange material. Exemplary embodiments in the examples section illustrate these types of effects of chemical additives on the ion exchange material.

In some embodiments, contact of the ion exchange material with a chemical additive increases the lifetime of the ion exchange beads from about 100 cycles to about 1000 cycles of ion exchange, from about 10 cycles to about 100 cycles, from about 50 cycles to about 100 cycles, from about 100 cycles to about 200 cycles, from about 100 cycles to about 500 cycles, from about 100 cycles to about 1000 cycles, from about 200 cycles to about 500 cycles, from about 200 cycles to about 1000 cycles, from about 500 cycles to about 1000 cycles.

In some embodiments, contact of the chemical additive results in an increase of the lifetime of the ion exchange beads by about 50 cycles to about 2,000 cycles. In some embodiments, contact of the chemical additive results in an increase of the lifetime of the ion exchange beads by about 50 cycles to about 100 cycles, about 50 cycles to about 150 cycles, about 50 cycles to about 200 cycles, about 50 cycles to about 250 cycles, about 50 cycles to about 300 cycles, about 50 cycles to about 400 cycles, about 50 cycles to about 500 cycles, about 50 cycles to about 750 cycles, about 50 cycles to about 1,000 cycles, about 50 cycles to about 1,500 cycles, about 50 cycles to about 2,000 cycles, about 100 cycles to about 150 cycles, about 100 cycles to about 200 cycles, about 100 cycles to about 250 cycles, about 100 cycles to about 300 cycles, about 100 cycles to about 400 cycles, about 100 cycles to about 500 cycles, about 100 cycles to about 750 cycles, about 100 cycles to about 1,000 cycles, about 100 cycles to about 1,500 cycles, about 100 cycles to about 2,000 cycles, about 150 cycles to about 200 cycles, about 150 cycles to about 250 cycles, about 150 cycles to about 300 cycles, about 150 cycles to about 400 cycles, about 150 cycles to about 500 cycles, about 150 cycles to about 750 cycles, about 150 cycles to about 1,000 cycles, about 150 cycles to about 1,500 cycles, about 150 cycles to about 2,000 cycles, about 200 cycles to about 250 cycles, about 200 cycles to about 300 cycles, about 200 cycles to about 400 cycles, about 200 cycles to about 500 cycles, about 200 cycles to about 750 cycles, about 200 cycles to about 1,000 cycles, about 200 cycles to about 1,500 cycles, about 200 cycles to about 2,000 cycles, about 250 cycles to about 300 cycles, about 250 cycles to about 400 cycles, about 250 cycles to about 500 cycles, about 250 cycles to about 750 cycles, about 250 cycles to about 1,000 cycles, about 250 cycles to about 1,500 cycles, about 250 cycles to about 2,000 cycles, about 300 cycles to about 400 cycles, about 300 cycles to about 500 cycles, about 300 cycles to about 750 cycles, about 300 cycles to about 1,000 cycles, about 300 cycles to about 1,500 cycles, about 300 cycles to about 2,000 cycles, about 400 cycles to about 500 cycles, about 400 cycles to about 750 cycles, about 400 cycles to about 1,000 cycles, about 400 cycles to about 1,500 cycles, about 400 cycles to about 2,000 cycles, about 500 cycles to about 750 cycles, about 500 cycles to about 1,000 cycles, about 500 cycles to about 1,500 cycles, about 500 cycles to about 2,000 cycles, about 750 cycles to about 1,000 cycles, about 750 cycles to about 1,500 cycles, about 750 cycles to about 2,000 cycles, about 1,000 cycles to about 1,500 cycles, about 1,000 cycles to about 2,000 cycles, or about 1,500 cycles to about 2,000 cycles. In some embodiments, contact of the chemical additive results in an increase of the lifetime of the ion exchange beads by about 50 cycles, about 100 cycles, about 150 cycles, about 200 cycles, about 250 cycles, about 300 cycles, about 400 cycles, about 500 cycles, about 750 cycles, about 1,000 cycles, about 1,500 cycles, or about 2,000 cycles. In some embodiments, contact of the chemical additive results in an increase of the lifetime of the ion exchange beads by at least about 50 cycles, about 100 cycles, about 150 cycles, about 200 cycles, about 250 cycles, about 300 cycles, about 400 cycles, about 500 cycles, about 750 cycles, about 1,000 cycles, or about 1,500 cycles. In some embodiments, contact of the chemical additive results in an increase of the lifetime of the ion exchange beads by at most about 100 cycles, about 150 cycles, about 200 cycles, about 250 cycles, about 300 cycles, about 400 cycles, about 500 cycles, about 750 cycles, about 1,000 cycles, about 1,500 cycles, or about 2,000 cycles.

In some embodiments, contact of the ion exchange material with a chemical additive increases the amount of lithium carbonate equivalents produced by the ion exchange beads from about 1 kg of lithium carbonate equivalents per kg of ion exchange material to about 100 kg of lithium carbonate equivalents per kg of ion exchange material, from about 10 kg of lithium carbonate equivalents per kg of ion exchange material to about 100 kg of lithium carbonate equivalents per kg of ion exchange material, from about 50 kg of lithium carbonate equivalents per kg of ion exchange material to about 100 kg of lithium carbonate equivalents per kg of ion exchange material, from about 10 kg of lithium carbonate equivalents per kg of ion exchange material to about 20 kg of lithium carbonate equivalents per kg of ion exchange material, from about 10 kg of lithium carbonate equivalents per kg of ion exchange material to about 30 kg of lithium carbonate equivalents per kg of ion exchange material, from about 10 kg of lithium carbonate equivalents per kg of ion exchange material to about 50 kg of lithium carbonate equivalents per kg of ion exchange material, from about 5 kg of lithium carbonate equivalents per kg of ion exchange material to about 10 kg of lithium carbonate equivalents per kg of ion exchange material, from about 5 kg of lithium carbonate equivalents per kg of ion exchange material to about 20 kg of lithium carbonate equivalents per kg of ion exchange material, from about 5 kg of lithium carbonate equivalents per kg of ion exchange material to about 50 kg of lithium carbonate equivalents per kg of ion exchange material.

In some embodiments, contact of the ion exchange material with a chemical additive decreases the dissolution of the ion exchange material per cycle of ion exchange from about 1% to about 0.01% by mass, from about 1% to about 0.1% by mass, from about 1% to about 0.5% by mass, from about 10% to about 0.01% by mass, from about 10% to about 0.1% by mass, from about 10% to about 1% by mass, from about 0.5% to about 0.01% by mass, from about 0.5% to about 0.1% by mass, from about 0.1% to about 0.01% by mass.

In some embodiments, contact of the ion exchange material with a chemical additive decreases the dissolution of the ion exchange material per cycle to about 0.001% to about 0.02% by mass. In some embodiments, contact of the ion exchange material with a chemical additive decreases the dissolution of the ion exchange material per cycle to about 0.001% to about 0.002%, about 0.001% to about 0.003%, about 0.001% to about 0.004%, about 0.001% to about 0.005%, about 0.001% to about 0.01%, about 0.001% to about 0.02%, about 0.002% to about 0.003%, about 0.002% to about 0.004%, about 0.002% to about 0.005%, about 0.002% to about 0.01%, about 0.002% to about 0.02%, about 0.003% to about 0.004%, about 0.003% to about 0.005%, about 0.003% to about 0.01%, about 0.003% to about 0.02%, about 0.004% to about 0.005%, about 0.004% to about 0.01%, about 0.004% to about 0.02%, about 0.005% to about 0.01%, about 0.005% to about 0.02%, or about 0.01% to about 0.02%. In some embodiments, contact of the ion exchange material with a chemical additive decreases the dissolution of the ion exchange material per cycle to about 0.001%, about 0.002%, about 0.003%, about 0.004%, about 0.005%, about 0.01%, or about 0.02%. In some embodiments, contact of the ion exchange material with a chemical additive decreases the dissolution of the ion exchange material per cycle to at least about 0.001%, about 0.002%, about 0.003%, about 0.004%, about 0.005%, or about 0.01%. In some embodiments, contact of the ion exchange material with a chemical additive decreases the dissolution of the ion exchange material per cycle to at most about 0.002%, about 0.003%, about 0.004%, about 0.005%, about 0.01%, or about 0.02%.

Pressure Modulation of Vessels Containing Ion Exchange Material

In some embodiments, the ion exchange beads are in contact with a liquid. In some embodiments, said liquid is a liquid resource, washing fluid, water, an acid solution, and/or an eluent solution. In some embodiments, a treatment is performed to ensure efficient surface contact of the ion exchange beads with a liquid. In some embodiments, said efficient contact leads to improved performance of the method for lithium extraction from a liquid resource. In some embodiments, said improved performance is due to enhanced surface contact between the liquid and the ion exchange beads.

In some embodiments, a treatment is performed to ensure efficient contact of the ion exchange beads with a liquid. In some embodiments, said treatment involves the modulation of the pressure inside of the ion exchange vessel (e.g., a tank, vessel, or column that contains ion exchange material, wherein said tank, vessel, or column may be a component of a system disclosed herein or utilized in the practice of a method disclosed herein). In some embodiments, the pressure of a liquid or a gas in the ion exchange vessel is modulated. In some embodiments, said gas is air. In some embodiments, said gas is nitrogen. In some embodiments, said gas is argon. In some embodiments, said gas comprises air. In some embodiments, the gas is introduced into said vessel while the beads are dry. In some embodiments, the gas is introduced into said vessel while the beads are wet (e.g., the beads are coated with or mixed with a liquid). In some embodiments, the gas is introduced into said vessel while the beads are covered by a liquid (e.g., the beads are submerged in a liquid). In some embodiments, the gas is introduced into said vessel while the beads are covered by an aqueous solution (e.g., the beads are submerged in an aqueous solution).

In some embodiments, said aqueous solution comprises water. In some embodiments, said aqueous solution comprises an acid. In some embodiments, said acid is hydrochloric acid, nitric acid, sulfuric acid, or a mixture thereof. In some embodiments, said aqueous solution comprises a liquid resource containing lithium. In some embodiments, said aqueous solution comprises a surfactant. In some embodiments, said surfactant comprises an ionic surfactant. In some embodiments, said surfactant comprises a non-ionic surfactant. In some embodiments, said surfactant comprises an anionic surfactant. In some embodiments, said surfactant comprises a cationic surfactant. In some embodiments, said surfactant comprises a zwitterionic surfactant. In some embodiments, said surfactant comprises sodium lauryl sulfate. In some embodiments, said surfactant comprises an amine. In some embodiments, said surfactant comprises a long alkyl chain (e.g., a linear or branched hydrocarbon substituent comprising between 6 and 20 carbon atoms, between 12 and 18 carbon atoms, or more than 20 carbon atoms). In some embodiments, said surfactant is a pyridinium salt. In some embodiments, said surfactant comprises a fluoride, a chloride, a bromide, an iodide, or a mixture or combination thereof. In some embodiments, said surfactant comprises cetrimonium bromide, cetylpyridinium chloride, benzalkonium chloride, benzethonium chloride, dimethyldioctadecylammonium chloride, dioctadecyldimethylammonium bromide, ammonium lauryl sulfate, sodium laureth sulfate, perfluorooctanesulfonate, dioctyl sodium sulfosuccinate, sodium lauryl ether sulfate, sodium stearate, octenidine dihydrochloride, docusate, perfluorobutanesulfonate, an alkyl-aryl ether phosphate, an alkyl ether phosphate, an ethoxylate, mixtures thereof, or combinations thereof.

In some embodiments of the methods disclosed herein, the method comprises subjecting ion exchange beads to a treatment, wherein the treatment comprises modulating the pressure of the interior of a vessel that contains the ion exchange beads. In some embodiments, the pressure in said vessel is modulated to increase relative to the pressure at which the beads were originally loaded into said vessel. In some embodiments, the pressure in said vessel is modulated to decrease relative to the pressure at which the beads were originally loaded into said vessel.

In some embodiments, the pressure at which the beads were originally loaded into said vessel is ambient atmospheric pressure, and the absolute pressure to which the interior of the vessel is then modulated is 0.0001 to 1000 psi. In some embodiments, the absolute pressure is modulated to be greater than about 1 psi to about 100 psi. In some embodiments, the absolute pressure is modulated to be greater than about 1 psi to about 5 psi, about 1 psi to about 10 psi, about 1 psi to about 20 psi, about 1 psi to about 30 psi, about 1 psi to about 40 psi, about 1 psi to about 50 psi, about 1 psi to about 60 psi, about 1 psi to about 70 psi, about 1 psi to about 80 psi, about 1 psi to about 90 psi, about 1 psi to about 100 psi, about 5 psi to about 10 psi, about 5 psi to about 20 psi, about 5 psi to about 30 psi, about 5 psi to about 40 psi, about 5 psi to about 50 psi, about 5 psi to about 60 psi, about 5 psi to about 70 psi, about 5 psi to about 80 psi, about 5 psi to about 90 psi, about 5 psi to about 100 psi, about 10 psi to about 20 psi, about 10 psi to about 30 psi, about 10 psi to about 40 psi, about 10 psi to about 50 psi, about 10 psi to about 60 psi, about 10 psi to about 70 psi, about 10 psi to about 80 psi, about 10 psi to about 90 psi, about 10 psi to about 100 psi, about 20 psi to about 30 psi, about 20 psi to about 40 psi, about 20 psi to about 50 psi, about 20 psi to about 60 psi, about 20 psi to about 70 psi, about 20 psi to about 80 psi, about 20 psi to about 90 psi, about 20 psi to about 100 psi, about 30 psi to about 40 psi, about 30 psi to about 50 psi, about 30 psi to about 60 psi, about 30 psi to about 70 psi, about 30 psi to about 80 psi, about 30 psi to about 90 psi, about 30 psi to about 100 psi, about 40 psi to about 50 psi, about 40 psi to about 60 psi, about 40 psi to about 70 psi, about 40 psi to about 80 psi, about 40 psi to about 90 psi, about 40 psi to about 100 psi, about 50 psi to about 60 psi, about 50 psi to about 70 psi, about 50 psi to about 80 psi, about 50 psi to about 90 psi, about 50 psi to about 100 psi, about 60 psi to about 70 psi, about 60 psi to about 80 psi, about 60 psi to about 90 psi, about 60 psi to about 100 psi, about 70 psi to about 80 psi, about 70 psi to about 90 psi, about 70 psi to about 100 psi, about 80 psi to about 90 psi, about 80 psi to about 100 psi, or about 90 psi to about 100 psi. In some embodiments, the absolute pressure is modulated to be greater than about 1 psi, about 5 psi, about 10 psi, about 20 psi, about 30 psi, about 40 psi, about 50 psi, about 60 psi, about 70 psi, about 80 psi, about 90 psi, or about 100 psi. In some embodiments, the absolute pressure is modulated to be greater than at least about 1 psi, about 5 psi, about 10 psi, about 20 psi, about 30 psi, about 40 psi, about 50 psi, about 60 psi, about 70 psi, about 80 psi, or about 90 psi. In some embodiments, the absolute pressure is modulated to be greater than at most about 5 psi, about 10 psi, about 20 psi, about 30 psi, about 40 psi, about 50 psi, about 60 psi, about 70 psi, about 80 psi, about 90 psi, or about 100 psi. In some embodiments, the absolute pressure is modulated to be greater than about 5 psi to about 1,000 psi. In some embodiments, the absolute pressure is modulated to be greater than about 5 psi to about 10 psi, about 5 psi to about 25 psi, about 5 psi to about 50 psi, about 5 psi to about 100 psi, about 5 psi to about 250 psi, about 5 psi to about 300 psi, about 5 psi to about 400 psi, about 5 psi to about 500 psi, about 5 psi to about 600 psi, about 5 psi to about 750 psi, about 5 psi to about 1,000 psi, about 10 psi to about 25 psi, about 10 psi to about 50 psi, about 10 psi to about 100 psi, about 10 psi to about 250 psi, about 10 psi to about 300 psi, about 10 psi to about 400 psi, about 10 psi to about 500 psi, about 10 psi to about 600 psi, about 10 psi to about 750 psi, about 10 psi to about 1,000 psi, about 25 psi to about 50 psi, about 25 psi to about 100 psi, about 25 psi to about 250 psi, about 25 psi to about 300 psi, about 25 psi to about 400 psi, about 25 psi to about 500 psi, about 25 psi to about 600 psi, about 25 psi to about 750 psi, about 25 psi to about 1,000 psi, about 50 psi to about 100 psi, about 50 psi to about 250 psi, about 50 psi to about 300 psi, about 50 psi to about 400 psi, about 50 psi to about 500 psi, about 50 psi to about 600 psi, about 50 psi to about 750 psi, about 50 psi to about 1,000 psi, about 100 psi to about 250 psi, about 100 psi to about 300 psi, about 100 psi to about 400 psi, about 100 psi to about 500 psi, about 100 psi to about 600 psi, about 100 psi to about 750 psi, about 100 psi to about 1,000 psi, about 250 psi to about 300 psi, about 250 psi to about 400 psi, about 250 psi to about 500 psi, about 250 psi to about 600 psi, about 250 psi to about 750 psi, about 250 psi to about 1,000 psi, about 300 psi to about 400 psi, about 300 psi to about 500 psi, about 300 psi to about 600 psi, about 300 psi to about 750 psi, about 300 psi to about 1,000 psi, about 400 psi to about 500 psi, about 400 psi to about 600 psi, about 400 psi to about 750 psi, about 400 psi to about 1,000 psi, about 500 psi to about 600 psi, about 500 psi to about 750 psi, about 500 psi to about 1,000 psi, about 600 psi to about 750 psi, about 600 psi to about 1,000 psi, or about 750 psi to about 1,000 psi. In some embodiments, the absolute pressure is modulated to be greater than about 5 psi, about 10 psi, about 25 psi, about 50 psi, about 100 psi, about 250 psi, about 300 psi, about 400 psi, about 500 psi, about 600 psi, about 750 psi, or about 1,000 psi. In some embodiments, the absolute pressure is modulated to be greater than at least about 5 psi, about 10 psi, about 25 psi, about 50 psi, about 100 psi, about 250 psi, about 300 psi, about 400 psi, about 500 psi, about 600 psi, or about 750 psi. In some embodiments, the absolute pressure is modulated to be greater than at most about 10 psi, about 25 psi, about 50 psi, about 100 psi, about 250 psi, about 300 psi, about 400 psi, about 500 psi, about 600 psi, about 750 psi, or about 1,000 psi.

In some embodiments, the pressure at which the beads were originally loaded into said vessel is ambient atmospheric pressure, and the absolute pressure to which the interior of the vessel is then modulated is 0.0001 to 1000 psi. In some embodiments, the absolute pressure is modulated to be less than about 1 psi to about 100 psi. In some embodiments, the absolute pressure is modulated to be less than about 0.0001 psi to about 10 psi. In some embodiments, the absolute pressure is modulated to be less than about 0.0001 psi to about 0.001 psi, about 0.0001 psi to about 0.01 psi, about 0.0001 psi to about 0.1 psi, about 0.0001 psi to about 1 psi, about 0.0001 psi to about 2 psi, about 0.0001 psi to about 3 psi, about 0.0001 psi to about 5 psi, about 0.0001 psi to about 10 psi, about 0.001 psi to about 0.01 psi, about 0.001 psi to about 0.1 psi, about 0.001 psi to about 1 psi, about 0.001 psi to about 2 psi, about 0.001 psi to about 3 psi, about 0.001 psi to about 5 psi, about 0.001 psi to about 10 psi, about 0.01 psi to about 0.1 psi, about 0.01 psi to about 1 psi, about 0.01 psi to about 2 psi, about 0.01 psi to about 3 psi, about 0.01 psi to about 5 psi, about 0.01 psi to about 10 psi, about 0.1 psi to about 1 psi, about 0.1 psi to about 2 psi, about 0.1 psi to about 3 psi, about 0.1 psi to about 5 psi, about 0.1 psi to about 10 psi, about 1 psi to about 2 psi, about 1 psi to about 3 psi, about 1 psi to about 5 psi, about 1 psi to about 10 psi, about 2 psi to about 3 psi, about 2 psi to about 5 psi, about 2 psi to about 10 psi, about 3 psi to about 5 psi, about 3 psi to about 10 psi, or about 5 psi to about 10 psi. In some embodiments, the absolute pressure is modulated to be less than about 0.0001 psi, about 0.001 psi, about 0.01 psi, about 0.1 psi, about 1 psi, about 2 psi, about 3 psi, about 5 psi, or about 10 psi. In some embodiments, the absolute pressure is modulated to be less than at least about 0.0001 psi, about 0.001 psi, about 0.01 psi, about 0.1 psi, about 1 psi, about 2 psi, about 3 psi, or about 5 psi. In some embodiments, the absolute pressure is modulated to be less than at most about 0.001 psi, about 0.01 psi, about 0.1 psi, about 1 psi, about 2 psi, about 3 psi, about 5 psi, or about 10 psi. In some embodiments, the pressure inside the vessel is modulated to ambient atmospheric after the pressure has been modulated above or below this value as described above. In some embodiments, the pressure inside the vessel is modulated to be above ambient atmospheric after the pressure has been modulated above or below this value as described above. In some embodiments, the pressure inside the vessel is modulated to be below ambient atmospheric after the pressure has been modulated above or below this value as described above. In some embodiments, the lowered pressure is less than about 0.0001 psi to about 10 psi. In some embodiments, the lowered pressure is less than about 0.0001 psi to about 0.001 psi, about 0.0001 psi to about 0.01 psi, about 0.0001 psi to about 0.1 psi, about 0.0001 psi to about 1 psi, about 0.0001 psi to about 2 psi, about 0.0001 psi to about 3 psi, about 0.0001 psi to about 5 psi, about 0.0001 psi to about 10 psi, about 0.001 psi to about 0.01 psi, about 0.001 psi to about 0.1 psi, about 0.001 psi to about 1 psi, about 0.001 psi to about 2 psi, about 0.001 psi to about 3 psi, about 0.001 psi to about 5 psi, about 0.001 psi to about 10 psi, about 0.01 psi to about 0.1 psi, about 0.01 psi to about 1 psi, about 0.01 psi to about 2 psi, about 0.01 psi to about 3 psi, about 0.01 psi to about 5 psi, about 0.01 psi to about 10 psi, about 0.1 psi to about 1 psi, about 0.1 psi to about 2 psi, about 0.1 psi to about 3 psi, about 0.1 psi to about 5 psi, about 0.1 psi to about 10 psi, about 1 psi to about 2 psi, about 1 psi to about 3 psi, about 1 psi to about 5 psi, about 1 psi to about 10 psi, about 2 psi to about 3 psi, about 2 psi to about 5 psi, about 2 psi to about 10 psi, about 3 psi to about 5 psi, about 3 psi to about 10 psi, or about 5 psi to about 10 psi. In some embodiments, the lowered pressure is less than about 0.0001 psi, about 0.001 psi, about 0.01 psi, about 0.1 psi, about 1 psi, about 2 psi, about 3 psi, about 5 psi, or about 10 psi. In some embodiments, the lowered pressure is less than at least about 0.0001 psi, about 0.001 psi, about 0.01 psi, about 0.1 psi, about 1 psi, about 2 psi, about 3 psi, or about 5 psi. In some embodiments, the lowered pressure is less than at most about 0.001 psi, about 0.01 psi, about 0.1 psi, about 1 psi, about 2 psi, about 3 psi, about 5 psi, or about 10 psi.

In some embodiments, the treatment comprises modulating the pressure inside the vessel containing the ion exchange beads to more than one pre-determined pressures in a pre-determined sequence. In some embodiments, the pressure inside the vessel is first modulated to increase and then modulated to decrease. In some embodiments, the pressure inside the vessel is first modulated to increase and then modulated to decrease once, at which point the treatment is complete. In some embodiments, the pressure inside the vessel is first modulated to increase and then modulated to decrease in a cycle. In some embodiments, the treatment comprises performing the cycle in the inclusive range of one time to 100 times. In some embodiments, the treatment comprises performing the cycle once. In some embodiments, the treatment comprises performing the cycle twice. In some embodiments, the treatment comprises performing the cycle three times. In some embodiments, the treatment comprises performing the cycle four times. In some embodiments, the treatment comprises performing the cycle five times. In some embodiments, the treatment comprises performing the cycle six times. In some embodiments, the treatment comprises performing the cycle seven times. In some embodiments, the treatment comprises performing the cycle eight times. In some embodiments, the treatment comprises performing the cycle nine times. In some embodiments, the treatment comprises performing the cycle ten times. In some embodiments, the treatment comprises performing the cycle ten to fifteen times. In some embodiments, the treatment comprises performing the cycle ten to twenty times. In some embodiments, the treatment comprises performing the cycle about 20 times. In some embodiments, the treatment comprises performing the cycle about 20 times. In some embodiments, the treatment comprises performing the cycle about 30 times. In some embodiments, the treatment comprises performing the cycle about 40 times. In some embodiments, the treatment comprises performing the cycle about 50 times. In some embodiments, the treatment comprises performing the cycle about 60 times. In some embodiments, the treatment comprises performing the cycle about 70 times. In some embodiments, the treatment comprises performing the cycle about 80 times. In some embodiments, the treatment comprises performing the cycle about 90 times. In some embodiments, the treatment comprises performing the cycle about 100 times.

In some embodiments, the ion exchange beads are fluidized inside said vessel during the treatment described above. In some embodiments, the ion exchange beads are stirred inside said vessel during the treatment described above. In some embodiments, the ion exchange beads are stirred by a mixer. In some embodiments, the ion exchange beads are stirred by one or more agitators. In some embodiments, said agitators comprise one or more impellers. In some embodiments, said one or more impellers comprise propellers, anchor impellers, hydrofoils, pitched blade turbines, curved blade turbines, spiral turbine, flat blade turbines, radial blades, or a combination thereof. In some embodiments, said impellers contain one or more blades. In some embodiments, the shaft and impellers are comprised of carbon steel, stainless steel, titanium, Hastelloy, or a combination thereof.

In some embodiments, the shaft and impellers are coated with glass, epoxy, rubber, a polymer coating, or combinations thereof.

In some embodiments, the fluidization of the particle by means of said agitator is aided by baffles mounted inside of said tank. In some embodiments, said baffles comprise flat rectangular structures mounted onto the side of the tank. In some embodiments said baffles are oriented perpendicular to the plane of agitator of the impeller. In some embodiment, the presence of one or more baffles aid with the fluidization of the ion exchange beads inside the vessel. In some embodiments, the presence of one or more baffles reduce the swirling and vortexing associated with fluidization of the particles with an impeller. In some embodiments, the presence of said baffles results in more uniform suspension of particles. In some embodiments, the presence of said baffles results in reduce attrition of particles being fluidized. In some embodiments, said baffles are constructed to span the entire vertical length of the vessel. In some embodiments, the baffles are constructed to span from about the height of the settled bed of ion exchange beads to the top of the vessel. In some embodiments, the baffles are constructed to span from about 6" from the bottom of the vessel to the top of the vessel. In some embodiments, there is a gap between the wall of the vessel and the baffle. In some embodiments, said gap measures less than ⅛", less than ¼", less than ½", or less than 1". In some embodiments, said baffles measure a width that is equivalent to approximately one twelfth of the width of the vessel. In some embodiments, said baffles measure a width that is equivalent to approximately less than one tenth of the width of the vessel. In some embodiments, said baffles measure a width that is equivalent to more than approximately one fifteenth of the width of the vessel. In some embodiments, all baffles are of equivalent dimensions. In some embodiments, baffles are not of the same dimensions. In some embodiments, the tank contains two baffles. In some embodiments, the tank contains three baffles. In some embodiments, the tank contains four baffles. In some embodiments, the tank contains more than four baffles.

In some embodiments, the ion exchange beads are fluidized by pumping solution into the tank near the bottom of the tank. In some embodiments, the ion exchange beads are fluidized by pumping solution from the tank back into the tank near the bottom of the tank. In some embodiments, the ion exchange beads are fluidized by pumping a slurry of the ion exchange beads from near the bottom of the tank to a higher level in the tank.

Embodiments Comprising Vessels for Multiple Beds of Ion Exchange Beads

In some embodiments, a vessel (e.g., a tank, a column, or another enclosure) containing ion-exchange beads is comprised of multiple and separate ion-exchange compartments arranged within said vessel.

In some embodiments, a liquid resource flows into one side of each ion-exchange compartment, and exits on the other side of exchange compartment, having undergone an ion-exchange process. In some embodiments, the vessel is constructed such that a flow distribution network delivers the liquid resource to each one of these ion-exchange compartments independently. In some embodiments, the vessel is constructed such that a flow distribution network recovers the liquid resource that underwent ion-exchange from each one of these ion-exchange compartments independently. In some embodiments, this allows for multiple simultaneous and concurrent ion exchange processes within the same vessel. In some embodiments, the separation of ion-exchange media into several independent ion-exchange compartments results in minimal flow distance through ion exchange beads.

In some embodiments, such a vessel is constructed by using a series of filter banks wherein the filters contain ion exchange beads. In some embodiments, such a vessel is constructed where multiple ion-exchange compartments are arranged vertically or horizontally. In some embodiments, such filter banks are separated to load and unloaded the ion exchange beads. In some embodiments, the ion exchange beads are conveyed into the filter banks as a slurry to load the ion exchange beads into the ion exchange vessel. In some embodiments, loading of the ion exchange beads occurs in the same direction, opposite direction, orthogonal direction, or other direction relative the normal direction of flow during the ion exchange process. In some embodiments, the tension holding the filter bank together is increased, decreased, or maintained during the ion exchange process.

In one embodiment, there is only one ion-exchange compartment in the vessel for packed beds of ion exchange beads with minimal flow distance. In some embodiments, there is more than one ion-exchange compartments in the vessel for packed beds of ion exchange beads with minimal flow distance. In some embodiments, there are less than about two, less than about three, less than about five, less than about ten, less than about twenty, less than about thirty, less than about fifty, less than about one hundred, more than about two, more than about three, more than about five, more than about ten, more than about twenty, more than about thirty, more than about fifty, more than about one-hundred ion-exchange compartments in the vessel.

In some embodiments, ion-exchange compartments are added or removed from the vessel by mechanical means, such that the number of ion-exchange compartments are adjusted. In some embodiments, ion-exchange compartments and their components are mechanically separated to clean out, replace, and fill in compartments and partitions between compartments.

In some embodiments, the devices, vessels, system, and methods described herein utilize a flow distribution compartment to optimize the flow of various solutions or gases through the devices, vessels, ad systems. In some embodiments, the flow distribution compartment is an inner flow distribution compartment and/or outer flow distribution compartment. In some embodiments, the flow distribution compartment are optionally treated with a lithium containing resource, hydrogen ion-containing acid, water, or other solutions for the purposes of adjusting the concentration, composition, pH, or contaminant level of the fluid flowing through the vessel. This is achieved by means of an optional inlet and outlet flows to and from the flow distribution compartment. In some embodiments, the inlet and outlet flows to and from the flow distribution compartments are located at the top, bottom, or side of said compartments. In some embodiments, the inlet and outlet flows to and from the flow distribution compartments are injected and remove from the internal space of said compartments by means of piping, tubing, or other internal components that protrude into said compartment.

In some embodiments, the compartment containing the ion-exchange beads are optionally treated with water or other solutions for the purposes of adjusting the concentration, composition, pH, or contaminant level of the fluid flowing through the vessel. This is achieved by means of an optional inlet- and outlet-flows to and from said compartment. In some embodiments, such inlet and outlet flows are located at the top, bottom, or side of said compartments. In some embodiments, the inlet- and outlet flows to and from said compartment are injected and remove from the internal space of said compartments by means of piping, tubing, or other internal components that protrude into said compartment.

In one embodiment, the ion exchange compartment within each ion-exchange compartment is partially filled with ion exchange beads, such that ion exchange beads freely move within their containing compartment during contacting with fluid. In some embodiments, the ion exchange compartment is filled to its capacity with ion exchange beads, such that ion exchange beads are fixed in place and cannot freely move within the containing compartment during contacting with fluid. In one embodiment, the ion exchange compartment is partially filled, and becomes completely filled by the change in volume of ion exchange beads that occurs when contacting said beads with certain fluids. In some embodiments, the ion exchange compartment is configured such that ion exchange beads may enter and leave the ion-exchange compartment conveyed by the fluid which they are contacting, in the top-down or down-top direction. In one embodiment, the ion exchange beads may be loaded into and unloaded from said compartments through the top or bottom of the compartments, through the sides, or by mechanically separating and opening the ion-exchange compartment to expose the compartment and subsequently filling said compartment with ion-exchange beads.

In some embodiments, the typical length of the vessel containing the ion-exchange compartments is less than about 10 cm, less than about 20 cm, less than about 40 cm, less than about 60 cm, less than about 80 cm, less than about 100 cm, less than about 200 cm, less than about 400 cm, less than about 600 cm, less than about 800 cm, less than about 1 m, less than about 2 m, less than about 4 m, less than about 6 m, less than about 8 m, less than about 10 m, less than about 20 m, less than about 40 m. In some embodiments, the typical length of the said vessel is more than about 10 cm, more than about 20 cm, more than about 40 cm, more than about 60 cm, more than about 80 cm, more than about 100 cm, more than about 200 cm, more than about 400 cm, more than about 600 cm, more than about 800 cm, more than about 1 m, more than about 2 m, more than about 4 m, more than about 6 m, more than about 8 m, more than about 10 m, more than about 20 m, more than about 40 m. In some embodiments, the typical length of said vessel is from about 10 cm to about 20 cm, from about 20 cm to about 40 cm, from about 40 cm to about 80 cm, from about 80 cm to about 2 m from about 1 m to about 4 m, from about 2 m to about 8 m, from about 4 m to about 10 m, from about 6 m to about 20 m, from about 10 m to about 40 m.

In some embodiments, the height and width of the vessel containing the ion-exchange compartments is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the height and width of the vessel containing the ion-exchange compartments is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the height and width of the vessel containing the ion-exchange compartments is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m, from about 4 m to about 8 m.

In some embodiments, the typical thickness of the distribution compartment within the vessel containing the ion-exchange compartments is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the distribution compartment within the vessel containing the ion-exchange compartments is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the distribution compartment within the vessel containing the ion-exchange compartments is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m.

In some embodiments, the typical thickness of the compartment containing ion-exchange beads within the vessel containing the ion-exchange compartments is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the compartment containing ion-exchange beads within the vessel containing the ion-exchange compartments is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the compartment containing ion-exchange beads within the vessel containing the ion-exchange compartments is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m.

In some embodiments, the devices, vessels, system, processes, and methods described herein utilize a flow distribution compartment to optimize the flow of various solutions or gases through the devices, vessels, and systems. In some embodiments, the flow distribution compartment is an inner flow distribution compartment and/or outer flow distribution compartment. In some embodiments, there is a partition between the flow distribution compartment and the compartment containing the ion-exchange beads. In some embodiments, the partition is a permeable partition. In some embodiments, the permeable partition is a slitted partition that provides support for the ion-exchange bead bed, chemical protection, aids filtration, or a combination thereof. In some embodiments, the permeable partition is a porous partition that provides support for the ion-exchange bead bed, chemical protection, aids filtration, or a combination thereof. In some embodiments, the partition between the flow distribution compartment and the compartment containing the ion-exchange beads consists of a porous partition that provides support for the ion-exchange bead bed, chemical protection, aids filtration, or a combination thereof. In some embodiments, the porous partition is a porous polymer partition. In some embodiments, the porous partition is a mesh or polymer membrane. In some embodiments, the porous partition comprises one or more meshes of similar or different composition, of similar or different aperture sizes, of similar or different percent open area. In some embodiments, the porous partition comprises one or more meshes to provide structural support and/or filtration capabilities. In some embodiments, the porous partition comprises a v-wire screen, a sintered metal screen, a sintered polymer screen, a flat screen, a cylindrical screen, a screen comprised of wire with cylindrical cross section, a screen comprised of wire with square cross section, a screen comprised of wire with rectangular cross section, a screen comprised of wire with rhomboidal cross section, a screen comprised of wire with triangular cross section, a screen comprised of wire with irregular cross section, a slotted wire screen, a mesh, or a combination thereof, wherein said porous partition is coarse, fine, or a combination thereof. In some embodiments, the porous partition comprises polyether ether ketone, polypropylene, polyethylene, polysulfone mesh, polyester mesh, polyamide, polytetrafluoroethylene, ethylene tetrafluoroethylene polymer, stainless steel, stainless steel mesh coated in polymer, stainless steel mesh coated in ceramic, titanium, or a combination thereof. In some embodiments, the porous partition comprises ion exchange particles. In some embodiments, the porous partition comprises porous ion exchange particles. In some embodiments, the porous partition comprises a mixture of ion exchange particles with other polymers described above. In some embodiments, the porous partition comprises multiple layers.

In some embodiments, the porous partition consists of openings in that are of a typical characteristic size of less than about 1 µm, less than about 2 µm, less than about 5 µm, less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm. In some embodiments, the porous partition consists of openings in that are of a typical characteristic size of more than about 1 µm, more than about 2 µm, more than about 5 µm, more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm. In some embodiments, the porous partition consists of openings in that are of a typical characteristic size from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm. In some embodiments, the porous partition consists of openings in that are of a typical characteristic size of from about 1 µm to about 2 µm, from about 2 µm to about 4 µm, from about 4 µm to about 10 µm, from about 10 µm to about 20 µm, from about 20 µm to about 40 µm, from about 40 µm to about 100 µm, from about 100 µm to about 200 µm, from about 200 µm to about 400 µm, from about 400 µm to about 1000 µm, from about 1000 µm to about 2000 µm. In some embodiments, the porous partition consists of openings in that are of a typical characteristic size of from about 1 µm to about 10 µm, from about 10 µm to about 100 µm, from about 100 µm to about 1000 µm, from about 1000 µm to about 10000 µm.

In one embodiment, the flow distribution compartment and/or ion-exchange bead compartment is empty, partially filled, or fully filled with fluid, or a combination thereof. In some embodiments, the flow distribution compartment and/or ion-exchange bead compartment are cylindrical, rectangular, irregular, or a combination thereof. In some embodiments, the flow distribution compartment has a constant cross-sectional area or a varying cross-sectional area.

In one embodiment, the flow distribution compartment and/or ion-exchange bead compartment contains internal beams to provide structural support for the vessel. In some embodiments, internal beams are positioned to optimize flow distribution. In one embodiment, the flow distribution compartment and/or ion-exchange bead compartment contain pipes and tubes that direct flow into individual perforations in the inner- and outer-perforated walls. In one embodiment the flow distribution compartment and/or ion-exchange bead compartment contain trays that direct flow.

In some embodiments, the flow distribution compartment and/or ion-exchange bead compartment contain filler material to provide structural support for the vessel, while also providing more optimal flow distribution. In some embodiments, the filler material is comprised of a polymer, ceramic, metal, ion-exchange beads, or a combination thereof. In some embodiments, the filler material contained within the outer-flow distribution and/or the inner-flow distribution compartments have an average particle diameter of less than about 10 µm, less than about 20 µm, less than about 30 µm, less than about 40 µm, less than about 50 µm, less than about 60 µm, less than about 70 µm, less than about 80 µm, less than about 90 µm, less than about 100 µm, less than about 200 µm, less than about 300 µm, less than about 400 µm, less than about 500 µm, less than about 600 µm, less than about 700 µm, less than about 800 µm, less than about 900 µm, less than about 1000 µm, less than about 2000 µm; more than about 10 µm, more than about 20 µm, more than about 30 µm, more than about 40 µm, more than about 50 µm, more than about 60 µm, more than about 70 µm, more than about 80 µm, more than about 90 µm, more than about 100 µm, more than about 200 µm, more than about 300 µm, more than about 400 µm, more than about 500 µm, more than about 600 µm, more than about 700 µm, more than about 800 µm, more than about 900 µm, more than about 1000 µm, more than about 2000 µm; from about 10 µm to about 20 µm, from about 20 µm to about 40 µm, from about 40 µm to about 80 µm, from about 80 µm to about 200 µm, from about 100 µm to about 400 µm, from about 200 µm to about 800 µm, from about 400 µm to about 1000 µm, from about 600 µm to about 2000 µm, from about 1000 µm to about 2000 µm.

In some embodiments, two or more filter banks are aligned in series to form a filter press. In some embodiments, a filter press comprises (i) lithium selective sorbent that selectively absorbs lithium from the liquid resource; and (ii) one or more filter banks; wherein each of the one or more filter banks comprises: (a) two opposing filter plates that, when placed together, form a compartment; (b) one or more permeable partitions, wherein the one or more permeable partitions line the interior of the compartment and contain the lithium selective sorbent; and (c) one or more inlets and one or more outlets, wherein the one or more inlets and one or more outlets are configured to allow the liquid and alternate phase to pass through the one or more filter banks. In some embodiments, the one or more filter banks are arranged such that the filter banks share a common axis of symmetry. In some embodiments, said axis is oriented parallel, perpendicular, or at an angle relative to the ground foundation onto which said filter press is mounted. In some embodiments, the one or more filter banks are mechanically compressed together. In some embodiments, said mechanical compression is applied at one end of the filter press. In some embodiments, said mechanical compression is applied by a hydraulic system. In some embodiments, the pressure of said compressive force is from about 1 psi to about 10,000 psi. In some embodiments, said lithium selective sorbent is loaded into said filter banks prior to flow of said liquid resource. In some embodiments, the filter press is configured to allow an alternate phase such as gas to flow through the one or more filter banks. In some embodiments, said gas comprises air, oxygen, nitrogen, or combinations thereof.

Recirculating Batch System

In an embodiment of the system, the ion exchange material is loaded in a column. In an embodiment of the system, the pH modulating setup is connected to the column loaded with the ion exchange material. In an embodiment of the system, the pH modulating setup comprises one or more tanks.

In some embodiments of the systems described herein, the ion exchange material is loaded in a vessel. In some embodiments, the pH modulating setup is in fluid communication with the vessel loaded with the ion exchange material. In some embodiments, the pH modulating setup is in fluid communication with the column loaded with the ion exchange material.

In one embodiment of the system, one or more ion exchange columns are loaded with a fixed or fluidized bed of ion exchange beads. In one embodiment of the system, the ion exchange column is a cylindrical construct with entry and exit ports. In a further embodiment, the ion exchange column is optionally a non-cylindrical construct with entry and exit ports. In a further embodiment, the ion exchange column optionally has entry and exit ports for brine pumping, and additional doors or hatches for loading and unloading ion exchange beads to and from the column. In a further embodiment, the ion exchange column is optionally equipped with one or more security devices to decrease the risk of theft of the ion exchange beads. In one embodiment, these beads contain ion exchange material that can reversibly absorb lithium from brine and release lithium in acid. In one embodiment, the ion exchange material is comprised of particles that are optionally protected with coating material such as $SiO_2$, $ZrO_2$, or $TiO_2$ to limit dissolution or degradation of the ion exchange material. In one embodiment, these beads contain a structural component such as an acid-resistant polymer that binds the ion exchange materials. In one embodiment, the beads contain pores that facilitate penetration of brine, acid, aqueous, and other solutions into the beads to deliver lithium and hydrogen to and from the bead or to wash the bead. In one embodiment, the bead pores are structured to form a connected network of pores with a distribution of pore sizes and are structured by incorporating filler materials during bead formation and later removing that filler material in a liquid or gas.

In one embodiment of the system, the system is a recirculating batch system, which comprises an ion exchange column that is connected to one or more tanks for mixing base into the brine (e.g., the liquid resource), settling out any precipitates following base addition, and storing the brine prior to reinjection into the ion exchange column or the other tanks. In one embodiment of the recirculating batch system, the brine is loaded into one or more tanks, pumped through the ion exchange column, pumped through a series of tanks, and then returned to the ion exchange column in a loop. In one embodiment, the brine optionally traverses this loop repeatedly. In one embodiment, the brine is recirculated through the ion exchange column to enable optimal lithium uptake by the beads. In one embodiment, base is added to the brine in such a way that pH is maintained at an adequate level for lithium uptake and in such a way that the amount of base-related precipitates in the ion exchange column is minimized.

In one embodiment, as the brine is pumped through the recirculating batch system, the brine pH drops in the ion exchange column due to hydrogen release from the ion exchange beads during lithium uptake, and the brine pH is adjusted upward by the addition of base as a solid, aqueous solution, or other form. In one embodiment, the ion exchange system drives the ion exchange reaction to near completion, and the pH of the brine leaving the ion exchange column approaches the pH of the brine entering the ion exchange column. In one embodiment, the amount of base added is optionally controlled to neutralize the hydrogen released by the ion exchange beads in such a way that no basic precipitates form. In one embodiment, an excess of base or a transient excess of base is optionally added in such a way that basic precipitates form. In one embodiment, the basic precipitates form transiently and then are redissolved partially or fully by the hydrogen that is released from the ion exchange column. In one embodiment of the system, base is optionally added to the brine flow prior to the ion exchange column, after the ion exchange column, prior to one or more tanks, or after one or more tanks.

In one embodiment of the recirculating batch system, the tanks include a mixing tank where the base is mixed with the brine. In one embodiment, the tanks include a settling tank, where precipitates such as $Mg(OH)_2$ optionally settle to the bottom of the settling tank to avoid injection of the precipitates into the ion exchange column. In one embodiment, the tanks include a storage tank where the brine is stored prior to reinjection into the ion exchange column, mixing tank, settling tank, or other tanks. In one embodiment, the tanks include an acid recirculation tank. In one embodiment, some tanks in the recirculating batch reactor optionally serve a combination of purposes including base mixing tank, settling tank, acid recirculation tank, or storage tank. In any embodiment, a tank optionally does not fulfil two functions at the same time. For example, a tank is not a base mixing tank and a settling tank.

In one embodiment of the recirculating batch system, base is added to a mixing tank, which is optionally a continuous stirred tank system, a confluence of acidified brine flow and base flow followed by a static mixer, a confluence of acidified brine flow and base flow followed by a paddle mixer, a confluence of acidified brine flow and base flow followed by a turbine impeller mixer, or a continuous stirred tank system in the shape of a vertical column which is well mixed at the bottom and settled near the top. In one embodiment, the base is optionally added as a solid or as an aqueous solution. In one embodiment, the base is optionally added continuously at a constant or variable rate. In one embodiment, the base is optionally added discretely in constant or variable aliquots or batches. In one embodiment, the base is optionally added according to one or more pH meters, which optionally samples brine downstream of the ion exchange column or elsewhere in the recirculating batch system. In one embodiment, filters are optionally used to prevent precipitates from leaving the mixing tank. In one embodiment, the filters are optionally plastic mesh screens, small packed columns containing granular media such as sand, silica, or alumina, small packed columns containing porous media filter, or a membrane.

In one embodiment of the recirculating batch system, the settling tank is optionally a settling tank with influent at bottom and effluent at top or a settling tank with influent on one end and effluent on another end. In one embodiment, chambered weirs are used to fully settle precipitates before brine is recirculated into reactor. In one embodiment, solid base precipitates are collected at the bottom of the settling tank and recirculated into the mixer. In one embodiment, precipitates such as $Mg(OH)_2$ optionally settle near the bottom of the tank. In one embodiment, brine is removed from the top of the settling tank, where the amount of suspended precipitates is minimal. In one embodiment, the precipitates optionally settle under forces such as gravity, centrifugal action, or other forces. In one embodiment, filters are optionally used to prevent precipitates from leaving the settling tank. In one embodiment, the filters are optionally plastic mesh screens, small packed columns containing granular media such as sand, silica, or alumina, small packed columns containing porous media filter, or a membrane. In one embodiment, baffles are optionally used to ensure settling of the precipitate and to prevent the precipitate from exiting the settling tank and entering the column.

In one embodiment of the recirculating batch system, basic precipitates are optionally collected from the settling tank and reinjected into the brine in a mixing tank or elsewhere to adjust the pH of the brine.

In one embodiment of the recirculating batch system, one or more ion exchange columns are optionally connected to one or more tanks or set of tanks. In one embodiment of the recirculating batch system, there are optionally multiple ion exchange columns recirculating brine through a shared set of mixing, settling, and storage tanks. In one embodiment of the recirculating batch system, there is optionally one ion exchange column recirculating brine through multiple sets of mixing, settling, and storage tanks.

Column Interchange System

In an aspect, described herein is a system wherein the ion exchange material is loaded in a plurality of columns. In an embodiment, the pH modulating setup comprises a plurality of tanks connected to the plurality of columns, wherein each of the plurality of tanks is immediately connected to one of the plurality of columns. In an embodiment, two or more of the plurality of tanks connected to the plurality of columns forms at least one circuit. In an embodiment, three or more of the plurality of tanks connected to the plurality of columns forms at least two circuits. In an embodiment, three or more of the plurality of tanks connected to the plurality of columns forms at least three circuits. In an embodiment, at least one circuit is a liquid resource circuit. In an embodiment, at least one circuit is a water washing circuit. In an embodiment, at least one circuit is an acid solution circuit. In an embodiment, at least two circuits are water washing circuits.

In one embodiment of the ion exchange system, the system is a column interchange system where a series of ion exchange columns are connected to form a brine circuit, an acid circuit, a water washing circuit, and optionally other circuits. In one embodiment of the brine circuit, brine flows through a first column in the brine circuit, then into a next column in the brine circuit, and so on, such that lithium is removed from the brine as the brine flows through one or more columns. In one embodiment of the brine circuit, base is added to the brine before or after each ion exchange column or certain ion exchange columns in the brine circuit to maintain the pH of the brine in a suitable range for lithium uptake by the ion exchange beads. In one embodiment of the acid circuit, acid flows through a first column in the acid circuit, then into the next column in the acid circuit, and so on, such that lithium is eluted from the columns with acid to produce a lithium concentrate. In one embodiment of the acid circuit, acid flows through a first column in the acid circuit, then optionally into a next column in the acid circuit, and so on, such that lithium is eluted from the columns with acid to produce a lithium concentrate. In one embodiment of the water washing circuit, water flows through a first column in the water washing circuit, then optionally into a next column in the water washing circuit, and so on, such that brine in the void space, pore space, or head space of the columns in the water washing circuit is washed out.

In one embodiment of the column interchange system, ion exchange columns are interchanged between the brine circuit, the water washing circuit, and the acid circuit. In one embodiment, the first column in the brine circuit is loaded with lithium and then interchanged into the water washing circuit to remove brine from the void space, pore space, or head space of the column. In one embodiment, the first column in the water washing circuit is washed to remove brine, and then interchanged to the acid circuit, where lithium is eluted with acid to form a lithium concentrate. In one embodiment, the first column in the acid circuit is eluted with acid and then interchanged into the brine circuit to absorb lithium from the brine. In one embodiment of the column interchange system, two water washing circuits are used to wash the columns after both the brine circuit and the acid circuit. In one embodiment of the column interchange system, only one water washing circuit is used to wash the columns after the brine circuit, whereas excess acid is neutralized with base or washed out of the columns in the brine circuit.

In one embodiment of the column interchange system, the first column in the brine circuit is interchanged to become the last column in the water washing circuit. In one embodiment of the column interchange system, the first column in the water washing circuit is interchanged to become the last column in the acid circuit. In one embodiment of the column interchange system, the first column in the acid circuit is interchanged to become the last column in the brine circuit.

In one embodiment of the column interchange system, each column in the brine circuit contains one or more tanks or junctions for mixing base into the brine and optionally settling any basic precipitates that form following base addition. In one embodiment of the column interchange system, each column in the brine circuit has associated one or more tanks or junctions for removing basic precipitates or other particles via settling or filtration. In one embodiment of the column interchange system, each column or various clusters of columns have associated one or more settling tanks or filters that remove particles including particles that detach from ion exchange beads.

In one embodiment of the column interchange system, the number of the columns in the brine circuit is optionally less than about 3, less than about 10, less than about 30, or less than about 100. In one embodiment of the column interchange system, the number of the columns in the acid circuit is optionally less than about 3, less than about 10, less than about 30, or less than about 100. In one embodiment of the column interchange system, the number of the columns in the water washing circuit is optionally less than about 3, less than about 10, less than about 30, or less than about 100. In certain embodiments, the number of columns in the brine circuit is 1 to 10. In some embodiments, the number of columns in the acid circuit is 1 to 10. In some embodiments, the number of columns in washing circuit is 1 to 10.

In one embodiment of the column interchange system, there is optionally one or more brine circuits, one or more acid circuits, and one or more water washing circuits. In one embodiment of the column interchange system, ion exchange columns are optionally supplied with fresh ion exchange beads without interruption to operating columns. In one embodiment of the column interchange system, ion exchange columns with beads that have been depleted in capacity is optionally replaced with ion exchange columns with fresh ion exchange beads without interruption to operating columns.

In one embodiment of the column interchange system, the columns contain fluidized beds of ion exchange material. In one embodiment of the column interchange system, the columns have means of created a fluidized bed of ion exchange material such as overhead stirrers or pumps. In one embodiment of the column interchange system, the columns contain fluidized beds of ion exchange material. In one embodiment of the ion exchange system, the system is an interchange system and the vessels are stirred tank reactors. In one embodiment of the interchange system, base may be added directly to the columns or other tanks containing the ion exchange material. In one embodiment of the interchange system, base may be added to the brine or another solution in a separate mixing tank and then added to the columns or other tanks containing the ion exchange material.

In one embodiment of the ion exchange system, ion exchange beads are loaded into ion exchange columns and following lithium uptake from brine, lithium is eluted from the ion exchange columns using an acid recirculation loop. In one embodiment of the acid recirculation loop, acid is flowed through an ion exchange column, into a tank, and then recirculated through the ion exchange column to optimize lithium elution. In one embodiment of the ion exchange system, ion exchange beads are loaded into ion exchange columns and following lithium uptake from brine, lithium is eluted from each ion exchange column using a once-through flow of acid. In one embodiment of the ion exchange system, ion exchange beads are loaded into an ion exchange column and following lithium uptake from brine, lithium is eluted from the ion exchange column using a column interchange circuit.

In one embodiment of the ion exchange system, ion exchange columns are loaded with lithium by flowing brine through the columns using a recirculating batch system and then lithium is eluted from the columns using a column interchange system. In one embodiment of the ion exchange system, ion exchange columns are loaded with lithium by flowing brine through the columns using a column interchange system and then lithium is eluted from the columns using a recirculating batch system. In one embodiment of the ion exchange system, ion exchange columns are loaded with lithium by flowing brine through the columns using a recirculating batch system and then lithium is eluted from the columns using a recirculating batch system. In one embodiment of the ion exchange system, ion exchange columns are loaded with lithium by flowing brine through the columns using a column interchange system and then lithium is eluted from the columns using a column interchange system.

Stirred Tank System

In an aspect, described herein is a system wherein the pH modulating setup is a tank comprising: a) one or more compartments; and b) a means for moving the liquid resource through the one or more compartments. In an embodiment, the ion exchange material is loaded in at least one compartment. In an embodiment, the means for moving the liquid resource through the one or more compartments is a pipe. In a further embodiment, the means for moving the liquid resource through the one or more compartments is a pipe and suitably a configured pump. In an embodiment, the tank further comprises a means for circulating the liquid resource throughout the tank. In an embodiment, the means for circulating the liquid resource throughout the tank is a mixing device. In an embodiment, the tank further comprises an injection port.

In some embodiments, the tank further comprises one or more injection ports. In some embodiments, the tank further comprises a plurality of injection ports.

In an aspect, described herein is a system for the extraction of lithium ions from a liquid resource, comprising a tank, wherein the tank further comprises: a) one or more compartments; b) an ion exchange material; c) a mixing device; and d) a pH modulating setup for changing the pH of the system, wherein the ion exchange material is used to extract lithium ions from the liquid resource. In one embodiment, the pH modulating setup changes the pH of the liquid resource in the system.

In some embodiments, the ion exchange material is loaded in at least one of the one or more compartments. In some embodiments, the ion exchange material is fluidized in at least one of the one or more compartments. In some embodiments, the ion exchange material is non-fluidized in at least one of the one or more compartments. In some embodiments, the ion exchange material occupies a fixed position in at least one of the one or more compartments.

In some embodiments, the pH modulating setup comprises a pH measuring device and an inlet for adding base. In some embodiments, the pH measuring device is a pH probe. In some embodiments, the inlet is a pipe. In some embodiments, the inlet is an injection port.

In some embodiments, the tank further comprises a porous partition. In some embodiments, the porous partition is a porous polymer partition. In some embodiments, the porous partition is a mesh or membrane. In some embodiments, the porous partition is a polymer mesh or polymer membrane. In some embodiments, the porous partition comprises one or more layers of mesh, membrane, or other porous structure. In some embodiments, the porous partition comprises one or more coarse meshes that provide structural support and one or more fine meshes and/or membranes that provide filtration. In some embodiments, the porous partition comprises a polyether ether ketone mesh, a polypropylene mesh, a polyethylene mesh, a polysulfone mesh, a polyester mesh, a polyamide mesh, a polytetrafluoroethylene mesh, an ethylene tetrafluoroethylene polymer mesh, a stainless steel mesh, a stainless steel mesh coated in polymer, a stainless steel mesh coated in ceramic, or a combination thereof, wherein the mesh is a course mesh, a fine mesh, or a combination thereof. In some embodiments, the porous polymer partition comprises a mesh comprising one or more blends of two or more of a polyether ether ketone, a polypropylene, a polyethylene, a polysulfone, a polyester, a polyamide, a polytetrafluoroethylene, or an ethylene tetrafluoroethylene polymer. In some embodiments, the porous partition comprises a polyether ether ketone membrane, a polypropylene membrane, a polyethylene membrane, a polysulfone membrane, a polyester membrane, a polyamide membrane, a polytetrafluoroethylene membrane, an ethylene tetrafluoroethylene polymer membrane, or combinations thereof.

In one embodiment of the ion exchange system, the system is a stirred tank system comprised of a tank of brine containing permeable bead compartments such as permeable pallets, cases, boxes, or other containers that are loaded with ion exchange beads, and the brine is stirred through the tank in a batch process. In one embodiment of the stirred tank system, the base is optionally added directly to the tank gradually or all at once as a solid or in an aqueous solution. In one embodiment of the stirred tank system, after a brine uptake stage is complete, the permeable bead containers are optionally moved to another tank for acid elution. In one embodiment of the stirred tank system, the permeable bead compartments are located at the bottom of the stirred tank during the brine stage and after the brine stage is completed, then brine is removed, and the bottom of the stirred tank is filled with acid to elute lithium in such a way that the permeable bead compartments are covered with an optimal volume of acid.

In one embodiment of the stirred tank system, the ion exchange beads are suspended using plastic structural supports in a tank with an internal mixing device. In one embodiment of the stirred tank system, a stream of brine is removed from the tank and passed through a column where hydrogen ions in the brine produced by ion exchange are neutralized using sacrificial base in solution or added as solid, or by an ion exchange resin. This pH-corrected stream is sent back into the system where the lithium can continue to be removed. In one embodiment of the stirred tank system, brine that has passed through the bead compartment is returned to the opposite end of the tank through a pipe that is optionally internal or external to the tank. In one embodiment of the stirred tank system, base is optionally added to the brine inside the tank or in a base addition tank outside the tank.

In one embodiment of the stirred tank system, fresh brine is fed to the system so as to operate in continuous stirred tank system mode instead of batch mode. In one embodiment of the recirculating batch system, fresh brine is fed to the system so as to operate in continuous stirred tank system mode instead of batch mode.

In one embodiment of the ion exchange system, the ion exchange material is mixed with a liquid resource in a stirred tank reactor. In some embodiments, the ion exchange material comprises of coated particles, uncoated particles, porous ion exchange beads, or combinations thereof.

In one embodiment of the ion exchange system, a stirred tank reactor is used to fluidize the ion exchange material in a liquid resource to enable absorption of lithium from the liquid resource into the ion exchange material. In one embodiment, a stirred tank reactor is used to fluidize the ion exchange material in a washing fluid to remove residual brine, acid, or other contaminants from the ion exchange materials. In one embodiment, a stirred tank reactor is used to fluidize the ion exchange material in an acid solution to elute lithium from the ion exchange material while replacing the lithium in the ion exchange material with protons. In one embodiment, a single stirred tank reactor is used to mix ion exchange material with a liquid resource, washing fluid, and acid solution.

In some embodiments, the system for the extraction of lithium ions from a liquid resource, comprising a tank, wherein the tank further comprises: a) one or more compartments; b) an ion exchange material; c) a mixing device; and d) a pH modulating setup for changing the pH of the liquid resource in the system, wherein the ion exchange material is used to extract lithium ions from the liquid resource, further comprises another tank, wherein the other tank further comprises: a) one or more compartments; b) an ion exchange material; c) a mixing device; and d) a pH modulating setup for changing the pH of the liquid resource in the system. In some embodiments, the tank is in fluid communication with the other tank.

In some embodiments, the system for the extraction of lithium ions from a liquid resource, comprising a tank, wherein the system further comprises another tank, wherein the other tank further comprises: a) one or more compartments; b) an ion exchange material; c) a mixing device; and d) an acid inlet for adding acid to the system. In a further embodiment, the ion exchange material is moved between the tank and the other tank.

In some embodiments, the system for the extraction of lithium ions from a liquid resource, comprising a tank, wherein the tank further comprises: a) one or more compartments; b) an ion exchange material; c) a mixing device; and d) a pH modulating setup for changing the pH of the liquid resource in the system, wherein the ion exchange material is used to extract lithium ions from the liquid resource, further comprises a plurality of tanks, each tank further comprising: a) one or more compartments; b) an ion exchange material; c) a mixing device; and d) a pH modulating setup for changing the pH of the liquid resource in the system. In some embodiments, each tank of the system is in fluid communication with each other tank of the system.

In some embodiments, the system further comprises another plurality of tanks, wherein each tank further comprises: a) one or more compartments; b) an ion exchange material; and c) a mixing device.

In some embodiments, the system is configured to operate in a batch mode. In some embodiments, the system is configured to operate in a continuous mode. In some embodiments, the system is configured to operate in a batch mode and a continuous mode. In some embodiments, one or more tanks in the system are configured to operate in a batch mode and one or more tanks in the system are configured to operate in a continuous mode. In some embodiments, one or more tanks in the system are configured to operate in a batch mode and one or more tanks in the system are configured to operate in a semi-continuous mode. In some embodiments, one or more tanks in the system are configured to operate in a semi-continuous mode and one or more tanks in the system are configured to operate in a continuous mode. In some embodiments, one or more tanks in the system are configured to operate in a batch mode, one or more tanks in the system are configured to operate in a semi-continuous mode, and one or more tanks in the system are configured to operate in a continuous mode. In some embodiments, the system is configured to operate in a semi-continuous mode, a batch mode, a continuous mode, or combinations thereof.

In one embodiment of the ion exchange system, a plurality of stirred tank reactors are used to mix ion exchange material with a liquid resource, washing fluid, and acid solution. In one embodiment, the stirred tank reactors may be different sizes and may contain different volumes of a liquid resource, washing fluid, and acid solution. In one embodiment, the stirred tanks may be cylindrical, conical, rectangular, pyramidal, or a combination thereof. In one embodiment of the ion exchange system, the ion exchange material may move through the plurality of stirred tank reactors in the opposite direction of the liquid resource, the washing fluid, or the acid solution.

In one embodiment of the ion exchange system, a plurality of stirred tank reactors may be used where one or more stirred tank reactors mix the ion exchange material with a liquid resource, one or more stirred tank reactors mix the ion exchange material with a washing fluid, and one or more stirred tank reactors mix the ion exchange material with an acid solution.

In one embodiment of the ion exchange system, stirred tank reactors may be operated in a continuous, semi-continuous, or batch mode where a liquid resource flows continuously, semi-continuously, or batch-wise through the stirred tank reactor. In one embodiment of the ion exchange system, stirred tank reactors may be operated in a continuous, semi-continuous, or batch mode where the ion exchange material flows continuously, semi-continuously, or batch-wise through the stirred tank reactor. In one embodiment of the ion exchange system, stirred tank reactors may be operated in a mode where the ion exchange material remains in the tank while flows of liquid resource, washing fluid, or acid solution are flowed through the tank in continuous, semi-continuous, or batch flows.

In one embodiment, ion exchange material is loaded into or removed from the stirred tank reactors through the top, the bottom, or the side of the tank.

In one embodiment of the ion exchange system, stirred tank reactors may comprise one or more compartments. In one embodiment, the compartments may contain ion exchange material in a bed that is fluidized, fixed, partially fluidized, partially fixed, alternatively fluidized, alternatively fixed, or combinations thereof. In one embodiment, the compartments may be comprised of a porous support at the bottom of the compartment, the sizes of the compartment, the top of the compartment, or combinations thereof. In one embodiment, the compartments may be conical, cylindrical, rectangular, pyramidal, other shapes, or combinations thereof. In one embodiment, the compartment may be located at the bottom of the tank. In one embodiment, the shape of the compartment may conform to the shape of the stirred tank reactor. In one embodiment, the compartment may be partially or fully comprised of the tank of the stirred tank reactor.

In one embodiment, the compartment may be comprised of a porous structure. In one embodiment, the compartment may be comprised of a polymer, a ceramic, a metal, or combinations thereof. In one embodiment, the compartment may be comprised be comprised partially or fully of a porous material or a mesh. In one embodiment, the compartment may be at the top of the tank. In one embodiment, the compartment may be separated from the rest of the tank with one or more porous materials. In one embodiment, the compartment may be at the top of the tank. In one embodiment, the compartment may be separated from the rest of the tank with a bilayer mesh comprising one layer of coarse mesh for strength and one layer of fine mesh to contain smaller particles in the compartment. In one embodiment, the compartment may allow liquid to flow freely through the stirred tank reactor and through the compartment. In one embodiment, the compartment may be open on the top. In one embodiment, the compartment may contain the ion exchange material in the tank but allow the ion exchange material to move throughout the tank. In one embodiment, the compartment may comprise a majority or minority of the tank volume. In one embodiment, the compartment may represent a fraction of the volume of the tank that is greater than 1 percent, greater than 10 percent, greater than 50 percent, greater than 90 percent, greater than 99 percent, or greater than 99.9 percent. In one embodiment, one or more devices for stirring, mixing, or pumping may be used to move fluid through the compartment, the stirred tank reactor, or combinations thereof.

In one embodiment of the ion exchange system, stirred tank reactors may be arranged into a network where flows of brine, washing fluid, and acid solutions are directly through different columns. In one embodiment, a network of stirred tank reactors may involve physical movement of the ion exchange material through the various stirred tank reactors. In one embodiment, a network of stirred tank reactors may involve no physical movement of the ion exchange material through the various stirred tank reactors. In one embodiment, a network of stirred tank reactors may involve switching of flows of brine, washing fluid, and acid solutions through the various stirred tank reactors. In one embodiment, brine may into stirred tank reactors in continuous or batch mode. In one embodiment, brine may be mixed with ion exchange material in one or more reactors before exiting the system. In one embodiment, a network of stirred tank reactors may involve a brine circuit with counter-current exposure of ion exchange material to flows of brine. In one embodiment, a network of stirred tank reactors may involve a washing circuit with counter-current exposure of ion exchange material to flows of washing fluid. In one embodiment, a network of stirred tank reactors may involve an acid circuit with counter-current exposure of ion exchange material to flows of acid solution. In one embodiment, the washing fluid may be water, an aqueous solution, or a solution containing an anti-scalant.

In one embodiment of the stirred tank reactor, acid is added at the beginning of elution. In one embodiment of the stirred tank reactor, acid is added at the beginning of elution and again during elution. In one embodiment of the stirred tank reactor, an acid of lower concentration is added at the start of elution and additional acid of high concentration is added to continue elution.

In an aspect, described herein is a system for the extraction of lithium ions from a liquid resource, comprising: a) an ion exchange material; b) a tank comprising one or more compartments; and c) a mixing device, wherein the ion exchange material is used to extract lithium ions from the liquid resource.

In some embodiments, the ion exchange material is loaded in at least one of the one or more compartments. In some embodiments, the ion exchange material is fluidized or partially fluidized in at least one of the one or more compartments. In some embodiments, the ion exchange material occupies a fixed position in at least one of the one or more compartments. In some embodiments, the ion exchange material is mounted in at least one of the one or more compartments.

In an aspect, described herein is a system for the extraction of lithium ions from a liquid resource, comprising: a) a column comprising an ion exchange material; and b) a pH modulating setup for changing the pH of the liquid resource in the system, wherein the pH modulating setup is in fluid communication with the column, wherein the ion exchange material is used to extract lithium ions from the liquid resource.

Other Types of Systems

In an aspect, described herein is a system for the extraction of lithium ions from a liquid resource, comprising: a) a plurality of columns, wherein each of the plurality of columns comprises an ion exchange material; and b) a pH modulating setup for changing the pH of the liquid resource in the system, wherein the pH modulating setup is in fluid communication with each of the plurality of columns, wherein the ion exchange material is used to extract lithium ions from the liquid resource.

In some embodiments, the pH modulating setup comprises a plurality of tanks, wherein each of the plurality of tanks is immediately connected to one of the plurality of columns. In one embodiment, the pH modulating setup comprises a plurality of tanks, wherein each of the plurality of tanks is in immediate liquid communication with one of the plurality of columns. In some embodiments, two or more of the plurality of tanks connected to two or more of the plurality of columns forms at least one circuit. In some embodiments, two or more of the plurality of tanks connected to two or more of the plurality of columns forms at least two circuits. In some embodiments, three or more of the plurality of tanks connected to three or more of the plurality of columns forms at least two circuits. In some embodiments, three or more of the plurality of tanks connected to three or more of the plurality of columns forms at least three circuits.

In some embodiments, the pH modulating setup comprises a plurality of tanks, wherein each of the plurality of tanks is connected to the of the plurality of columns through a filtration system. In some embodiments, two or more of the plurality of tanks are connected to two or more of the plurality of columns through a filter system to form at least one circuit. In some embodiments, two or more of the plurality of tanks are connected to two or more of the plurality of columns through a filter system to form at least two circuits. In some embodiments, three or more of the plurality of tanks are connected to two or more of the plurality of columns through a filter system to form at least two circuits. In some embodiments, three or more of the plurality of tanks are connected to two or more of the plurality of columns through a filter system (e.g., filtration system) to form at least three circuits.

In some embodiments, the filtration system comprises a bag filter, a candle filter, a cartridge filter, a media filter, a depth filter, a sand filter, a membrane filter, an ultrafiltration system, a microfiltration filter, a nanofiltration filter, a cross-flow filter, a dead-end filter, a drum filter, or a combination thereof. In some embodiments, the openings in this filter are of less than about 0.02 µm, less than about 0.1 µm, less than about 0.2 µm, less than about 1 µm, less than about 2 µm, less than about 5 µm, less than about 10 µm, less than about 25 µm, less than about 100 µm, less than about 1000 µm. In some embodiments, the perforated openings in outer-perforated walls are of dimension of more than about 0.02 µm, more than about 0.1 µm, more than about 0.2 µm, more than about 1 µm, more than about 2 µm, more than about 5 µm, more than about 10 µm, more than about 25 µm, more than about 100 µm. In some embodiments, the perforated openings in outer-perforated walls are of dimension of about 0.02 µm to about 0.1 µm, from about 0.1 µm to about 0.2 µm, from about 0.2 µm to about 0.5 µm, from about 0.5 µm to about 1 µm, from about 1 µm to about 5 µm, from about 5 µm to about 10 µm, from about 10 µm to about 25 µm, from about 25 µm to about 100 µm. In some embodiments, the filter martial comprises low density polyethylene, high density polyethylene, polypropylene, polyester, polytetrafluoroethylene (PTFE), types of polyamide, polyether ether ketone (PEEK), polysulfone, polyvinylidene fluoride (PVDF), poly(4-vinyl pyridine-co-styrene) (PVPCS), polystyrene (PS), polybutadiene, acrylonitrile butadiene styrene (ABS), polyvinyl chloride (PVC), ethylene tetrafluoroethylene polymer (ETFE), poly(chlorotrifluoroethylene) (PCTFE), ethylene chlorotrifluoro ethylene (Halar), polyvinylfluoride (PVF), fluorinated ethylene-propylene (FEP), perfluorinated elastomer, chlorotrifluoroethylenevinylidene fluoride (FKM), perfluoropolyether (PFPE), perfluoro-3,6-dioxa-4-methyl-7-octene-sulfonic acid (NAFION® (copolymer of perfluoro-3,6-dioxa-4-methyl-7-octene-sulfonic acid and tetrafluoroethylene)), polyethylene oxide, polyethylene glycol, sodium polyacrylate, polyethylene-block-poly (ethylene glycol), polyacrylonitrile (PAN), polychloroprene (neoprene), polyvinyl butyral (PVB), expanded polystyrene (EPS), polydivinylbenzene, co-polymers thereof, mixtures thereof, or combinations thereof. In a further aspect, a coating material comprises polyvinylidene fluoride (PVDF), polyvinyl chloride (PVC), ethylene chlorotrifluoro ethylene (Halar), poly(4-vinyl pyridine-co-styrene) (PVPCS), polystyrene (PS), acrylonitrile butadiene styrene (ABS), expanded polystyrene (EPS), polyphenylene sulfide, sulfonated polymer, carboxylated polymer, other polymers, co-polymers thereof, mixtures thereof, or combinations thereof. In some embodiments, the filter martial comprises iron, stainless steel, nickel, carbon steel, titanium, Hastelloy, Inconel, zirconium, tantalum, alloys thereof, mixtures thereof, or combinations thereof.

In some embodiments, at least one circuit is a liquid resource circuit. In some embodiments, at least one circuit is a water washing circuit. In some embodiments, at least two circuits are water washing circuits. In some embodiments, at least one circuit is an acid solution circuit.

In an aspect, described herein is a system for the extraction of lithium ions from a liquid resource comprising an ion exchange material and a plurality of vessels, wherein each of the plurality of vessels is configured to transport the ion exchange material along the length of the vessel and the ion exchange material is used to extract lithium ions from the liquid resource. In some embodiments, at least one of the plurality of vessels comprises an acidic solution. In some embodiments, at least one of the plurality of vessels comprises the liquid resource. In some embodiments, each of the plurality of vessels is configured to transport the ion exchange material by a pipe system or an internal conveyer system.

In an aspect, described herein is a system for the extraction of lithium ions from a liquid resource comprising an ion exchange material and a plurality of columns, wherein each of the plurality of columns is configured to transport the ion exchange material along the length of the column and the ion exchange material is used to extract lithium ions from the liquid resource.

In some embodiments, at least one of the plurality of columns comprises an acidic solution. In some embodiments, at least one of the plurality of columns comprises the liquid resource. In some embodiments, each of the plurality of columns is configured to transport the ion exchange material by a pipe system or an internal conveyer system.

In some embodiments, the ion exchange material comprises ion exchange particles. In some embodiments, at least a portion of the ion exchange material is in the form of ion exchange particles. In some embodiments, the ion exchange particles are selected from uncoated ion exchange particles, coated ion exchange particles, and combinations thereof. In some embodiments, the ion exchange particles comprise uncoated ion exchange particles. In some embodiments, the ion exchange particles comprise coated ion exchange particles. In some embodiments, the ion exchange particles comprise a mixture of uncoated and coated ion exchange particles.

In some embodiments, the coated ion exchange particles comprise an ion exchange material and a coating material.

In some embodiments, the coating material of the coated ion exchange particles comprises a carbide, a nitride, an oxide, a phosphate, a fluoride, a polymer, carbon, a carbonaceous material, or combinations thereof. In some embodiments, the coating material of the coated ion exchange particles is selected from the group consisting of $TiO_2$, $ZrO_2$, $MoO_2$, $SnO_2$, $Nb_2O_5$, $Ta_2O_5$, $SiO_2$, $Li_2TiO_3$, $Li_2ZrO_3$, $Li_2SiO_3$, $Li_2MnO_3$, $Li_2MoO_3$, $LiNbO_3$, $LiTaO_3$, $AlPO_4$, $LaPO_4$, $ZrP_2O_7$, $MoP_2O_7$, $MO_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, and combinations thereof.

In some embodiments, the ion exchange material of the coated ion exchange particles comprises an oxide, a phosphate, an oxyfluoride, a fluorophosphate, or combinations thereof. In some embodiments, the ion exchange material of the coated ion exchange particles is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl\cdot xAl(OH)_3\cdot yH_2O$, $SnO_2\cdot xSb_2O_5\cdot yH_2O$, $TiO_2\cdot xSb_2O_5\cdot yH_2O$, solid solutions thereof, and combinations thereof, wherein x is from 0.1-10; and y is from 0.1-10.

In some embodiments, the uncoated ion exchange particles comprise an ion exchange material. In some embodiments, the ion exchange material of the uncoated ion exchange particles comprises an oxide, a phosphate, an oxyfluoride, a fluorophosphate, or combinations thereof. In some embodiments, the ion exchange material of the uncoated ion exchange particles is selected from the group consisting of $Li_4Mn_5O_{12}$, $Li_4Ti_5O_{12}$, $Li_2TiO_3$, $Li_2MnO_3$, $Li_2SnO_3$, $LiMn_2O_4$, $Li_{1.6}Mn_{1.6}O_4$, $LiAlO_2$, $LiCuO_2$, $LiTiO_2$, $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl\cdot xAl(OH)_3\cdot yH_2O$, $SnO_2\cdot xSb_2O_5\cdot yH_2O$, $TiO_2\cdot xSb_2O_5\cdot yH_2O$, solid solutions thereof, and combinations thereof, wherein x is from 0.1-10; and y is from 0.1-10.

In some embodiments, the ion exchange material is porous. In some embodiments, the porous ion exchange material comprises a network of pores that allows liquids to move quickly from the surface of the porous ion exchange material to a plurality of ion exchange particles. In some embodiments, the porous ion exchange material comprises a network of pores that allows a liquid to move from the surface of the porous ion exchange material to a plurality of ion exchange particles. In some embodiments, the porous ion exchange material comprises a network of pores that allows a liquid to move quickly from the surface of the porous ion exchange material to a plurality of ion exchange particles. In some embodiments, the porous ion exchange material is porous ion exchange beads. In some embodiments, the porous ion exchange material is comprised of porous ion exchange beads.

In some embodiments of the systems described herein, the liquid resource is a natural brine, a dissolved salt flat, seawater, concentrated seawater, a desalination effluent, a concentrated brine, a processed brine, waste brine from a bromine-extraction process, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments of the systems described herein, the liquid resource is a brine. In some embodiments of the systems described herein, the liquid resource comprises a natural brine, a synthetic brine, or a mixture of a natural and a synthetic brine. In some embodiments of the systems described herein, the liquid resource is a natural brine, a dissolved salt flat, seawater, concentrated seawater, a desalination effluent, a concentrated brine, a processed brine, waste brine from a bromine-extraction process, an oilfield brine, a liquid from an ion exchange process, or combinations thereof.

In an aspect, described herein is a system, wherein the column further comprises a plurality of injection ports, wherein the plurality of injection ports are used to increase the pH of the liquid resource in the system In one embodiment of the ion exchange system, the system is a mixed base system comprising an ion exchange column and a mixing chamber where base is mixed into the brine (e.g., the liquid resource) immediately prior to injection of the brine into the column.

In one embodiment of the ion exchange system, the system is a ported ion exchange column system with multiple ports for injection of aqueous base spaced at intervals along the direction of brine flow through the column. As brine flows through the column, there is a region of the column where the beads experience the greatest rate of lithium absorption, and this region moves through the column in the direction of brine flow. In the ported ion exchange column system, base is injected near that region to neutralize protons released by the ion exchange reaction. In regions of the columns where the beads have been saturated with lithium and the rate of release of protons has slowed, base injected is decreased or terminated to avoid formation of basic precipitates.

In one embodiment of the ion exchange system, the system has a moving bed of beads that moves in a direction opposite to the flow of brine and base is injected at one or more fixed points in the column in a region near where the ion exchange reaction occurs at a maximum rate in the column to neutralize the protons released from the ion exchange reaction. In one embodiment of the ion exchange system, the base added to the brine (e.g., liquid resource) is optionally NaOH, KOH, $Mg(OH)_2$, $Ca(OH)_2$, CaO, $NH_3$, $Na_2SO_4$, $K_2SO_4$, $NaHSO_4$, $KHSO_4$, NaOCl, KOCl, $NaClO_4$, $KClO_4$, $NaH_2BO_4$, $Na_2HBO_4$, $Na_3BO_4$, $KH_2BO_4$, $K_2HBO_4$, $K_3BO_4$, $MgHBO_4$, $CaHBO_4$, $NaHCO_3$, $KHCO_3$, $NaCO_3$, $KCO_3$, $MgCO_3$, $CaCO_3$, $Na_2O$, $K_2O$, $Na_2CO_3$, $K_2CO_3$, $Na_3PO_4$, $Na_2HPO_4$, $NaH_2PO_4$, $K_3PO_4$, $K_2HPO_4$, $KH_2PO_4$, $CaHPO_4$, $MgHPO_4$, sodium acetate, potassium acetate, magnesium acetate, poly(vinylpyridine), poly(vinylamine), polyacrylonitrile, other bases, or combinations thereof. In one embodiment, the base is optionally added to the brine in its pure form or as an aqueous solution. In one embodiment, the base is optionally added in a gaseous state such as gaseous $NH_3$. In one embodiment, the base is optionally added to the brine in a steady stream, a variable stream, in steady aliquots, or in variable aliquots. In one embodiment, the base is optionally created in the brine by using an electrochemical cell to remove $H_2$ and $Cl_2$ gas, which is optionally combined in a separate system to create HCl acid to be used for eluting lithium from the system or for other purposes.

In some embodiments, a solid base is mixed with a liquid resource to create a basic solution. In some embodiments, a solid base is mixed with a liquid resource to create a basic solution, and the resulting basic solution is added to a second volume of a liquid resource to increase the pH of the second volume of the liquid resource. In some embodiments, solid base is mixed with a liquid resource to create a basic solution, wherein the resulting basic solution is used to adjust or control the pH of a second solution. In some embodiments, a solid base is mixed with a liquid resource to create a basic slurry. In some embodiments, a solid base is mixed with a liquid resource to create a basic slurry, and the resulting basic slurry is added to a second volume of a liquid resource to increase the pH of the second volume of the liquid resource. In some embodiments, solid base is mixed with a liquid resource to create a basic slurry, wherein the resulting basic slurry is used to adjust or control the pH of a second solution. In some embodiments, base may be added to a liquid resource as a mixture or slurry of base and liquid resource.

In one embodiment of the ion exchange system, the brine flows through a pH control column containing solid sacrificial base particles such as NaOH, CaO, or $Ca(OH)_2$, which dissolve into the brine (e.g., the liquid resource) and raise the pH of the brine. In one embodiment of the ion exchange system, the brine flows through a pH control column containing immobilized regeneratable OH-containing ion exchange resins which react with hydrogen ions, or regeneratable base species such as immobilized polypyridine, which conjugate HCl, thereby neutralizing the acidified brine. When the ion exchange resin has been depleted of its OH groups or is saturated with HCl, it is optionally regenerated with a base such as NaOH.

In one embodiment of the ion exchange system, pH meters are optionally installed in tanks, pipes, column, and other components of the system to monitor pH and control the rates and amounts of base addition at various locations throughout the system.

In one embodiment of the ion exchange system, the columns, tanks, pipes, and other components of the system are optionally constructed using plastic, metal with a plastic lining, or other materials that are resistant to corrosion by brine or acid.

In one embodiment of the ion exchange system, the ion exchange columns are optionally washed with water that is mildly acidic, optionally including a buffer, to remove any basic precipitates from the column prior to acid elution.

After the ion exchange column is saturated or nearly saturated with lithium, the lithium is flushed out of the ion exchange column using acid. The acid is optionally flowed through the column one or more times to elute the lithium. In one embodiment, the acid is optionally flowed through the ion exchange column using a recirculating batch system comprised of the ion exchange column connected to a tank. In one embodiment, the tank used for acid flows is optionally the same tank used for the brine flows. In a further embodiment, the tank used for acid flows is optionally a different tank than the one used for brine flows. In a further embodiment, the acid is distributed at the top of the ion exchange column and allowed to percolate through and immediately recirculated into the column with no extra tank. In an embodiment, acid addition optionally occurs without a tank used for acid flows.

In one embodiment of the ion exchange system, the column is optionally washed with water after the brine and/or acid steps, and the effluent water from washing is optionally treated using pH neutralization and reverse osmosis to yield process water.

In one embodiment of the ion exchange system, the ion exchange column is optionally shaped like a cylinder, a rectangle, or another shape. In one embodiment, the ion exchange column optionally has a cylinder shape with a height that is greater or less than its diameter. In one embodiment, the ion exchange column optionally has a cylinder shape with a height that is less than 10 cm, less than 1 meter, or less than 10 meters. In one embodiment, the ion exchange column optionally has a cylinder shape with a diameter that is less than 10 cm, less than 1 meter, or less than 10 meters.

In one embodiment of the ion exchange system, the system is optionally resupplied with fresh ion exchange beads by swapping out an ion exchange column with a new column loaded with fresh ion exchange beads. In one embodiment of the ion exchange system, the system is optionally resupplied with fresh ion exchange beads by removing the beads from the column and loading new beads into the column. In one embodiment of the ion exchange system, new beads are optionally supplied to all columns in the system simultaneously. In one embodiment of the ion exchange system, new beads are optionally supplied to one or more columns at a time. In one embodiment of the ion exchange system, new beads are optionally supplied to one or more columns without interruption to other columns that optionally continue operating.

In one embodiment of the ion exchange system, brine pumping continues until the ion exchange beads approach a point of lithium saturation over a period of time that is less than about 1 hours, less than about 2 hours, less than about 4 hours, less than about 8 hours, less than about 24 hours, less than about 48 hours, or less than about one week. In one embodiment of the ion exchange system, brine pumping continues until the ion exchange beads approach a point of lithium saturation over a period of time that is greater than about one week. In certain embodiments of the ion exchange system, brine pumping continues until the ion exchange beads approach a point of lithium saturation over a period of time that is optionally between 30 minutes and 24 hours. In one embodiment of the ion exchange system, acid pumping continues until the ion exchange beads approach a point of hydrogen saturation over a period of time that is optionally less than about 1 hours, less than about 2 hours, less than about 4 hours, less than about 8 hours, less than about 24 hours, or less than about 48 hours. In one embodiment of the ion exchange system, brine pumping continues until the ion exchange beads approach a point of hydrogen saturation over a period of time that is greater than about one 48 hours. In certain embodiments of the ion exchange system, brine pumping continues until the ion exchange beads approach a point of hydrogen saturation over a period of time that is optionally between 30 minutes and 24 hours.

For commercial production of lithium using ion exchange, it is desirable to construct large-scale ion exchange modules containing large quantities of ion exchange beads. However, most large vessels capable of holding about one tonne or more of ion exchange beads have large fluid flow distances of about one meter or more. These fluid flow distances cause large pressure drops. To reduce the pressure drop across the ion exchange bed, the ion exchange beads can be loaded into vessels facilitating flow across the ion exchange beads with a shorter fluid flow distance. These vessels can be designed to evenly distribute flow of the liquid resource and other fluids through the ion exchange beads.

In some embodiments, ion exchange vessels are designed to facilitate flow across the ion exchange beads with a shorter fluid flow distance. In some embodiments, the vessel can be oriented vertically, horizontally, or at any angle relative to the horizontal axis. In some embodiments, the vessel can be cylindrical, rectangular, spherical, another shape, or a combinations thereof. In some embodiments, the vessel can have a constant cross-sectional area or a varying cross-sectional area.

In some embodiments, the typical thickness of the distribution compartment within the vessel containing the ion-exchange compartments is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the distribution compartment within the vessel containing the ion-exchange compartments is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the distribution compartment within the vessel containing the ion-exchange compartments is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m.

In some embodiments, the typical thickness of the compartment containing ion-exchange beads within the vessel containing the ion-exchange compartments is less than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the compartment containing ion-exchange beads within the vessel containing the ion-exchange compartments is more than about 1 cm, less than about 2 cm, less than about 4 cm, less than about 6 cm, less than about 8 cm, less than about 10 cm, less than about 20 cm, less than about 40 cm, less than about 60 cm, less than about 80 cm, less than about 1 m, less than about 2 m, less than about 4 m. In some embodiments, the typical thickness of the compartment containing ion-exchange beads within the vessel containing the ion-exchange compartments is from about 1 cm to about 2 cm, from about 2 cm to about 4 cm, from about 4 cm to about 8 cm, from about 8 cm to about 20 cm, from about 20 cm to about 40 cm, from about 40 cm to about 80 cm, from about 80 cm to about 120 cm, from about 120 cm to about 2 m, from about 2 m to about 4 m.

In some embodiments, an alternate phase is contacted with the ion exchange material within an ion exchange device. In some embodiments, contact between the ion exchange beads and the alternate phase is maximized and made possible by the design of this ion exchange device.

In some embodiments, the alternate phase improves lithium extraction performance by reducing the time required to absorb hydrogen to generate hydrogen-enriched beads and release lithium to generate a lithium-enriched solution; reducing the time and water required for washing the hydrogen-enriched beads with water to generate hydrogen-enriched beads substantially free of residual acid; reducing the time required for treating the hydrogen-enriched beads with the liquid resource under conditions suitable to absorb lithium to generate lithium-enriched beads; reducing the time and water required for washing the lithium-enriched beads with water to generate lithium-enriched beads substantially free of liquid resource; improving the life-time and total lithium produce by the ion exchange material; improving the speed of pH adjustment using alkali; improving the solid-liquid mixing efficiency; and reducing the time required to drain liquids from the ion exchange vessel.

In some embodiments, the alternate phase is a liquid or gas. In some embodiments, said alternate phase is a non-aqueous liquid. In some embodiments, the alternate phase is non-aqueous liquid. In some embodiments, the alternate phase is a non-aqueous solution. In some embodiments, the alternate phase is an organic liquid such as an alkane, alcohol, oil, bio-organic oil, ester, ether, hydrocarbon, or a combination thereof. In some embodiments, the alternate phase is butane, pentane, hexane, acetone, diethyl ether, butanol, or combinations thereof. In some embodiments, the alternate is a gas such as air, nitrogen, argon, or a combination thereof. In some embodiments, the alternate phase comprises a compressed or pressurized gas.

In some embodiments, the ion exchange bed is a fixed bed that does move during the ion exchange process. In some embodiments, the ion exchange bed is a fluidized bed that is agitated at one or more periods during the ion exchange process.

Methods of Modulating pH for the Extraction of Lithium

In an aspect, described herein is a method of extracting lithium ions from a liquid resource, comprising: flowing the liquid resource through the column of the system described above to produce a lithiated ion exchange material; and treating the resulting lithiated ion exchange material with an acid solution to produce a salt solution comprising lithium ions.

In an aspect, described herein is a method of extracting lithium ions from a liquid resource, comprising: flowing the liquid resource through the plurality of columns of the system described above to produce a lithiated ion exchange material; and treating the resulting lithiated ion exchange material with an acid solution to produce a salt solution comprising lithium ions.

In an aspect, described herein is a method of extracting lithium ions from a liquid resource, comprising: flowing the liquid resource through the tank of the system described above to produce a lithiated ion exchange material; and treating the resulting lithiated ion exchange material with an acid solution to produce a salt solution comprising lithium ions.

In an aspect, described herein is a method of extracting lithium ions from a liquid resource, comprising: flowing the liquid resource through the column of the system described above to produce a lithiated ion exchange material; and treating the resulting lithiated ion exchange material with an acid solution to produce a salt solution comprising lithium ions.

In some embodiments, the liquid resource is selected from the following list: a natural brine, a dissolved salt flat, a geothermal brine, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from recycled products, leachate from recycled materials, or combinations thereof. In some embodiments, a liquid resource is selected from the following list: a natural brine, a dissolved salt flat, a concentrated brine, a processed brine, a synthetic brine, a geothermal brine, liquid from an ion exchange process, liquid from a solvent extraction process, leachate from minerals, leachate from clays, leachate from recycled products, leachate from recycled materials, or combinations thereof. In some embodiments, the liquid resource is pre-treated prior to entering the ion exchange reactor to remove suspended solids, hydrocarbons, or organic molecules. In some embodiments, the liquid resource is entered the ion exchange reactor without any pre-treatment following from its source.

In an embodiment, the liquid resource is a natural brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

In some embodiments, the liquid resource is selected with a lithium concentration selected from the following list: less than 100,000 ppm, less than 10,000 ppm, less than 1,000 ppm, less than 100 ppm, less than 10 ppm, or combinations thereof. In some embodiments, a liquid resource is selected with a lithium concentration selected from the following list: less than 5,000 ppm, less than 500 ppm, less than 50 ppm, or combinations thereof.

In some embodiments, the acid used for recovering lithium from the ion exchange reactor is selected from the following list: hydrochloric acid, sulfuric acid, phosphoric acid, hydrobromic acid, chloric acid, perchloric acid, nitric acid, formic acid, acetic acid, or combinations thereof. In some embodiments, the acid used for recovering lithium from the porous ion exchange beads is selected from the following list: hydrochloric acid, sulfuric acid, nitric acid, or combinations thereof.

In an embodiment, the acid solution comprises hydrochloric acid, sulfuric acid, phosphoric acid, hydrobromic acid, chloric acid, perchloric acid, nitric acid, formic acid, acetic acid, or combinations thereof.

In some embodiments, the acid used for recovering lithium from the ion exchange system has a concentration selected from the following list: less than 0.1 M, less than 1.0 M, less than 5 M, less than 10 M, or combinations thereof. In some embodiments, the acid used for recovering lithium from the porous ion exchange beads has a concentration greater than 10 M.

In an embodiment, acids with distinct concentrations are used during the elution process. In an embodiment, acid with a lower concentration is first added to elute lithium from the ion exchange material and then additional acid of a greater concentration is added to elute more lithium into the solution and increase the concentration of lithium in the eluate.

In some embodiments, the ion exchange beads perform the ion exchange reaction repeatedly while maintaining adequate lithium uptake capacity over a number of cycles selected from the following list: greater than 10 cycles, greater than 30 cycles, greater than 100 cycles, greater than 300 cycles, or greater than 1,000 cycles. In some embodiments, the porous ion exchange beads perform the ion exchange reaction repeatedly over a number of cycles selected from the following list: greater than 50 cycles, greater than 100 cycles, or greater than 200 cycles. In some embodiments, adequate lithium uptake capacity is optionally defined as a percentage of initial uptake capacity selected from the following list: greater than 95%, greater than 90%, greater than 80%, greater than 60%, or greater than 20%. In some embodiments, adequate lithium uptake capacity is optionally defined as a percentage of initial uptake capacity such as less than 20%.

In some embodiments, the concentrated lithium solution that is yielded from the ion exchange reactor is further processed into lithium raw materials using methods selected from the following list: solvent extraction, ion exchange, chemical precipitation, electrodialysis, electrowinning, electrolysis, evaporation with direct solar energy, evaporation with concentrated solar energy, evaporation with a heat transfer medium heated by concentrated solar energy, evaporation with heat from a geothermal brine, evaporation with heat from combustion, pH neutralization, or combinations thereof. In some embodiments, the concentrated lithium solution that is yielded from the ion exchange reactor is concentrated using reverse osmosis or membrane technologies.

In some embodiments, the concentrated lithium solution that is yielded from the ion exchange reactor is further processed into lithium chemicals selected from the following list: lithium chloride, lithium carbonate, lithium hydroxide, lithium metal, lithium metal oxide, lithium metal phosphate, lithium sulfide, or combinations thereof. In some embodiments, the concentrated lithium solution that is yielded from the porous ion exchange beads is further processed into lithium chemicals that are solid, liquid, hydrated, or anhydrous.

In some embodiments, the lithium chemicals produced using the ion exchange reactor are used in an industrial application selected from the following list: lithium batteries, metal alloys, glass, grease, or combinations thereof. In some embodiments, the lithium chemicals produced using the coated ion exchange particles are used in an application selected from the following list: lithium batteries, lithium-ion batteries, lithium sulfur batteries, lithium solid-state batteries, and combinations thereof.

In some embodiments, the ion exchange materials are synthesized in a lithiated state with a sublattice fully or partly occupied by lithium. In some embodiments, the ion exchange materials are synthesized in a hydrated state with a sublattice fully or partly occupied by hydrogen.

In some embodiments, the ion exchange material extracts lithium ions from a liquid resource. During the extraction of lithium ions from a liquid resource by the ion exchange material, the pH of the liquid resource optionally decreases. Increasing the pH of the liquid resource in the system by using a pH modulating setup maintains the pH in a range that is suitable for lithium ion uptake by the ion exchange material. In an embodiment, the pH modulating setup comprises measuring the pH of the system and adjusting the pH of the system to an ideal pH range for lithium extraction. In an embodiment, for ion exchange material to absorb lithium from brine, an ideal pH range for the brine is optionally 6 to 9, a preferred pH range is optionally 4 to 9, and an acceptable pH range is optionally 2 to 9. In an embodiment, the pH modulating setup comprises measuring the pH of the system and wherein the pH of the system is less than 6, less than 4, or less than 2, the pH of the system is adjusted to a pH of 2 to 9, a pH of 4 to 9, or a pH of 6 to 9.

Another aspect described herein is a method of extracting lithium ions from a liquid resource, comprising: a) flowing the liquid resource into a system comprising a tank to produce a lithiated ion exchange material, wherein the tank further comprises (i) one or more compartments, (ii) an ion exchange material, (iii) a mixing device, and (iv) a pH modulating setup for changing the pH of the liquid resource in the system; and b) treating the lithiated ion exchange material from a) with an acid solution to produce a hydrogen-rich ion exchange material and a salt solution comprising lithium ions.

In some embodiments, the method further comprises, prior to b), washing the lithiated ion exchange material with an aqueous solution. In some embodiments, the method further comprises, subsequent to b), washing the hydrogen-rich ion exchange material with an aqueous solution. In some embodiments, the aqueous solution is water.

In some embodiments, the method further comprises, prior to b), flowing the lithiated ion exchange material into a washing system. In some embodiments, the method further comprises, prior to b), transferring a suspension comprising the lithiated ion exchange material. In some embodiments, the method further comprises, prior to b), flowing the lithiated ion exchange material into a washing system and washing the lithiated ion exchange material with a solution. In some embodiments, the method further comprises, prior to b), flowing the lithiated ion exchange material into a washing system and washing the lithiated ion exchange material with a solution comprising water. In some embodiments, the method further comprises, prior to b), flowing the lithiated ion exchange material into a washing system and washing the lithiated ion exchange material with an aqueous solution. In some embodiments, the lithiated ion exchange material is washed with an aqueous solution.

In some embodiments, the method further comprises, prior to b), flowing the lithiated ion exchange material into a stripping system. In some embodiments, the method further comprises, prior to b), flowing the lithiated ion exchange material into a stripping system and stripping the lithiated ion exchange material. In some embodiments, the method further comprises, prior to b), flowing the lithiated ion exchange material into a stripping system and stripping volatile components from the lithiated ion exchange material. In some embodiments, the method further comprises, prior to b), flowing the lithiated ion exchange material into a stripping system and stripping volatile components comprising water from the lithiated ion exchange material.

In some embodiments, the pH modulating setup comprises a pH measuring device and an inlet for adding base to the tank. In some embodiments, the pH measuring device is a pH probe. In some embodiments, the inlet is a pipe. In some embodiments, the inlet is an injection port.

In some embodiments, the method further comprises, during a), measuring a change in pH of the liquid resource using the pH modulating setup. In some embodiments, the measured change in pH triggers adding a base to maintain lithium uptake. In some embodiments, a change in pH to below a pH value of about 2 to about 9 triggers the addition of a base to maintain lithium uptake. In some embodiments, a change in pH to below a pH value of about 2, of about 3, of about 4, of about 5, of about 6, of about 7, of about 8, or of about 9 triggers the addition of a base to maintain lithium uptake. In some embodiments, a change in pH to below a pH of about 2 to about 4, of about 3 to about 5, of about 4 to about 6, of about 5 to about 7, of about 6 to about 8, or of about 7 to about 9 triggers the addition of a base to maintain lithium uptake. In some embodiments, base is added to the liquid resource to maintain the pH of the liquid resource in a range of about 2-3, 3-4, 4-5, 5-6, 6-7, 7-8, or 8-9. In some embodiments, base is added to the liquid resource to maintain the pH of the liquid resource in a range of about 4-5, 5-6, 6-7, or 7-8. In some embodiments, base is added to the liquid resource to maintain the pH of the liquid resource in a range of about 4.0-4.5, 4.5-5.0, 5.0-5.5, 5.5-6.0, 6.0-6.5, 6.5-7.0, 7.0-7.5, or 7.5-8.0. In some embodiments, the pH of a liquid resource is maintained in a target range that is high enough to facilitate lithium uptake and low enough to avoid precipitation of metal salts from the liquid resource. In some embodiments, the pH of a liquid resource is maintained below a pH of about 8 to avoid precipitation of Mg salts. In some embodiments, the pH of a liquid resource is maintained below a pH of about 2, below a pH of about 3, below a pH of about 4, below a pH of about 5, below a pH of about 6, below a pH of about 7, below a pH of about 8, or below a pH of about 9 to avoid precipitation of metal salts. In some embodiments, the pH of the liquid resource may drop out of a target pH range due to release of protons from an ion exchange material and a pH modulating setup may adjust the pH of the liquid resource back to within a target pH range. In some embodiments, the pH of the liquid resource may be adjusted above a target pH range prior to the liquid resource entering the system and then protons released from the ion exchange material may decrease the pH of the system into the target range. In some embodiments, the pH of the liquid resource may be controlled in a certain range and the range may be changed over time. In some embodiments, the pH of the liquid resource may be controlled in a certain range and then the pH of the liquid resource may be allowed to drop. In some embodiments, the pH of the liquid resource may be controlled in a certain range and then the pH of the liquid resource may be allowed to drop to solubilize colloids or solids. In some embodiments, base may be added to a liquid resource to neutralize protons without measuring pH. In some embodiments, base may be added to a liquid resource to neutralize protons with monitoring of volumes or quantities of the base. In some embodiments, the pH of the liquid resource may be measured to monitor lithium uptake by an ion exchange material. In some embodiments, the pH of the liquid resource may be monitored to determine when to separate a liquid resource from an ion exchange material. In some embodiments, the rate of change of the pH of the liquid resource may be measured to monitor the rate of lithium uptake. In some embodiments, the rate of change of the pH of the liquid resource may be measured to determine when to separate a liquid resource from an ion exchange material.

In some embodiments, the tank further comprises a porous partition. In some embodiments, the porous partition is a porous polymer partition. In some embodiments, the porous partition is a mesh or membrane. In some embodiments, the porous partition is a polymer mesh or polymer membrane. In some embodiments, the porous partition comprises one or more layers of mesh, membrane, or other porous structure. In some embodiments, the porous partition comprises one or more coarse meshes that provide structural support and one or more fine meshes and/or membranes that provide filtration. In some embodiments, the porous partition comprises a polyether ether ketone mesh, a polypropylene mesh, a polyethylene mesh, a polysulfone mesh, a polyester mesh, a polyamide mesh, a polytetrafluoroethylene mesh, an ethylene tetrafluoroethylene polymer mesh, a stainless steel mesh, a stainless steel mesh coated in polymer, a stainless steel mesh coated in ceramic, or a combination thereof, wherein the mesh is a course mesh, a fine mesh, or a combination thereof. In some embodiments, the porous polymer partition comprises a mesh comprising one or more blends of two or more of a polyether ether ketone, a polypropylene, a polyethylene, a polysulfone, a polyester, a polyamide, a polytetrafluoroethylene, or an ethylene tetrafluoroethylene polymer. In some embodiments, the porous partition comprises a polyether ether ketone membrane, a polypropylene membrane, a polyethylene membrane, a polysulfone membrane, a polyester membrane, a polyamide membrane, a polytetrafluoroethylene membrane, an ethylene tetrafluoroethylene polymer membrane, or combinations thereof.

In some embodiments, the method further comprises, after a), draining the liquid resource through the porous partition after the production of the lithiated ion exchange material.

In some embodiments, the method further comprises, after b), draining the salt solution comprising lithium ions through the porous partition after the production of the hydrogen-rich ion exchange material.

In some embodiments, the method further comprises, subsequent to a), flowing the lithiated ion exchange material into another system comprising a tank to produce the hydrogen-rich ion exchange material and the salt solution comprising lithium ions, wherein the tank of the other system further comprises (i) one or more compartments, and (ii) a mixing device.

In some embodiments, the system comprises a plurality of tanks and each of the plurality of tanks further comprises (i) one or more compartments, (ii) an ion exchange material, (iii) a mixing device, and (iv) a pH modulating setup for changing the pH of the system.

An aspect described herein is a method of extracting lithium ions from a liquid resource, comprising: a) flowing the liquid resource into a first system comprising a tank, wherein the tank of the first system further comprises (i) one or more compartments, (ii) an ion exchange material, (iii) a mixing device, and (iv) a pH modulating setup for changing the pH of the liquid resource in the first system, to produce a lithiated ion exchange material; b) flowing the lithiated ion exchange material of a) into a second system comprising a tank, wherein the tank of the second system further comprises (i) one or more compartments, and (ii) a mixing device; and c) treating the lithiated ion exchange from b) with an acid solution to produce a hydrogen-rich ion exchange material and a salt solution comprising lithium ions.

In some embodiments, the method further comprises, subsequent to a), washing the lithiated ion exchange material with an aqueous solution.

In some embodiments, the method further comprises, prior to b), adding an aqueous solution to the lithiated ion exchange material to form a fluidized lithiated ion exchange material.

In some embodiments, the method further comprises, subsequent to c), washing the hydrogen-rich ion exchange material with an aqueous solution. In some embodiments, the aqueous solution is water.

In some embodiments, the pH modulating setup comprises a pH measuring device and an inlet for adding base. In some embodiments, the pH measuring device is a pH probe. In some embodiments, the inlet is a pipe. In some embodiments, the inlet is an injection port.

In some embodiments, the method further comprises, during a), measuring a change in pH of the liquid resource using the pH modulating setup. In some embodiments, the change in pH triggers adding a base to maintain lithium uptake.

An aspect described herein is a method of extracting lithium ions from a liquid resource, comprising: a) flowing the liquid resource into a first system comprising a plurality of tanks to produce a lithiated ion exchange material, wherein each of the plurality of tanks in the first system is in fluid communication with every other one of the plurality of tanks in the first system and, each of the plurality of tanks in the first system further comprises (i) one or more compartments, (ii) an ion exchange material, (iii) a mixing device, and (iv) a pH modulating setup for changing the pH of each of the plurality of tanks in the first system; b) flowing the lithiated ion exchange material into a second system comprising a plurality of tanks, wherein each of the plurality of tanks in the second system is in fluid communication with every other one of the plurality of tanks in the second system and, each of the plurality of tanks in the second system further comprises (i) one or more compartments, and (ii) a mixing device; and c) treating the lithiated ion exchange material from b) with an acid solution in at least one of the plurality of tanks in the second system to produce a hydrogen-rich ion exchange material and a salt solution comprising lithium ions.

In some embodiments, the method further comprises, subsequent to c), washing the hydrogen-rich ion exchange material with an aqueous solution in at least one of the plurality of tanks in the second system.

In some embodiments, the method is operated in a batch mode. In some embodiments, the method is operated in a continuous mode. In some embodiments, the method is operated in continuous and batch mode. In some embodiments, the method is operated in continuous mode, a batch mode, a semi-continuous mode, or combinations thereof.

In some embodiments, the pH modulating setup comprises a pH measuring device and an inlet for adding base. In some embodiments, the pH measuring device is a pH probe. In some embodiments, the inlet is a pipe. In some embodiments, the inlet is an injection port.

In some embodiments, the method further comprises, during a), measuring a change in pH of the liquid resource using the pH modulating setup. In some embodiments, the change in pH triggers adding a base to maintain lithium uptake.

An aspect described herein is a method of extracting lithium ions from a liquid resource, comprising: a) flowing the liquid resource into a first system comprising a tank to produce a lithiated ion exchange material, wherein the tank further comprises (i) one or more compartments, (ii) ion exchange material, and (iii) a mixing device; b) flowing the lithiated ion exchange material from a) into a second system comprising a tank, wherein the tank further comprises (i) one or more compartments, (ii) an acid solution, and (iii) a mixing device; and c) stripping the lithiated ion exchange material to produce hydrogen-rich ion exchange material and a salt solution comprising lithium ions.

In some embodiments, prior to b), the lithiated ion exchange material is washed. In some embodiments, the lithiated ion exchange material is washed with an aqueous solution.

An aspect described herein is a method of extracting lithium ions from a liquid resource, comprising: a) providing a system comprising an ion exchange material, a tank comprising one or more compartments; and a mixing device, wherein (i) the ion exchange material is oxide-based and exchanges hydrogen ions with lithium ions, and (ii) the mixing device is capable of moving the liquid resource around the tank comprising one or more compartments; b) flowing the liquid resource into the system of a), thereby contacting the liquid resource with the ion exchange material, wherein the ion exchange material exchanges hydrogen ions with lithium ions in the liquid resource to produce lithiated ion exchange material; c) removing the liquid resource from the system of b); d) flowing an acid solution into the system of c) thereby contacting the acid solution with the lithiated ion exchange material, wherein the lithiated ion exchange material exchanges lithium ions with the hydrogen ions in the acid solution to produce the ion exchange material and a salt solution comprising lithium ions from the lithiated ion exchange material; and e) collecting the salt solution comprising the lithium ions for further processing.

In some embodiments, the salt solution comprising lithium ions undergoes crystallization.

A method of extracting lithium ions from a liquid resource, comprising: a) flowing the liquid resource through a system comprising an ion exchange material and a plurality of columns, wherein the plurality of columns is configured to transport the ion exchange material along the length of the column, to produce a lithiated ion exchange material; and b) treating the lithiated ion exchange material from a) with an acid solution to produce a salt solution comprising lithium ions.

In an aspect, described herein is a method of extracting lithium ions from a liquid resource, comprising: a) providing a system comprising an ion exchange material and a plurality of columns, wherein each of the plurality of columns is configured to transport the ion exchange material along the length of the column; b) flowing the liquid resource through a first one of the plurality of columns to produce a lithiated ion exchange material; c) flowing the lithiated ion exchange material from b) into a second one of the plurality of columns; and d) treating the lithiated ion exchange material from c) with an acid solution to produce a hydrogen-rich ion exchange material and a salt solution comprising lithium ions.

In some embodiments, the method further comprises, subsequent to b), flowing the lithiated ion exchange material into another one of the plurality of columns and washing the lithiated ion exchange material with an aqueous solution. In some embodiments, the method further comprises, subsequent to d), flowing the hydrogen-rich ion exchange material into another one of the plurality of columns and washing the hydrogen-rich ion exchange material with an aqueous solution.

In an aspect, described herein is a method of extracting lithium ion from a liquid resource, comprising: a) providing a system comprising an ion exchange material and a plurality of columns, wherein each of the plurality of columns is configured to transport the ion exchange material along the length of the column; b) flowing the liquid resource through a first one of the plurality of columns to produce a lithiated ion exchange material; c) flowing the lithiated ion exchange material from b) into a second one of the plurality of columns; d) washing the lithiated ion exchange material from c) with an aqueous solution; e) flowing the lithiated ion exchange material from d) into a third one of the plurality of columns; and f) treating the lithiated ion exchange material from e) with an acid solution to produce a hydrogen-rich ion exchange material and a salt solution comprising lithium ions.

In some embodiments, the method further comprises: g) flowing the hydrogen-rich ion exchange material into a fourth one of the plurality of columns; and h) washing the hydrogen-rich ion exchange material with an aqueous solution. In some embodiments, each of the plurality of columns is configured to transport the ion exchange material by a pipe system or an internal conveyer system. In some embodiments, each of the plurality of columns is configured to transport the ion exchange material by a pipe system. In some embodiments, each of the plurality of columns is configured to transport the ion exchange material by an internal conveyer system.

In some embodiments of the methods described herein, the liquid resource is a natural brine, a dissolved salt flat, seawater, concentrated seawater, a desalination effluent, a concentrated brine, a processed brine, waste brine from a bromine-extraction process, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof. In some embodiments of the methods described herein, the liquid resource is a brine. In some embodiments of the methods described herein, the liquid resource comprises a natural brine, a synthetic brine, or a mixture of a natural and a synthetic brine. In some embodiments of the methods described herein, the liquid resource is a natural brine, a dissolved salt flat, seawater, concentrated seawater, a desalination effluent, a concentrated brine, a processed brine, waste brine from a bromine-extraction process, an oilfield brine, a liquid from an ion exchange process, or combinations thereof.

In some embodiments of the methods described herein, the acid solution comprises hydrochloric acid, sulfuric acid, phosphoric acid, hydrobromic acid, chloric acid, perchloric acid, nitric acid, formic acid, acetic acid, or combinations thereof. In some embodiments of the methods described herein, the acid solution comprises hydrochloric acid, sulfuric acid, phosphoric acid, nitric acid, or combinations thereof. In some embodiments of the methods described herein, the acid solution comprises hydrochloric acid, sulfuric acid, phosphoric acid, or combinations thereof. In some embodiments of the methods described herein the acid solution comprises hydrochloric acid. In some embodiments of the methods described herein the acid solution comprises sulfuric acid. In some embodiments of the methods described herein the acid solution comprises phosphoric acid.

Continuous Process for Lithium Extraction

Lithium is an essential element for batteries and other technologies. Lithium is found in a variety of liquid resources, including natural and synthetic brines and leachate solutions from minerals, clays, and recycled products. Lithium can be extracted from such liquid resources using an ion exchange process based on inorganic ion exchange materials. These inorganic ion exchange materials absorb lithium from a liquid resource while releasing hydrogen, and then elute lithium in acid while absorbing hydrogen. This ion exchange process can be repeated to extract lithium from a liquid resource and yield a concentrated lithium solution. The concentrated lithium solution can be further processed into chemicals for the battery industry or other industries.

Ion exchange materials are typically small particles, which together constitute a fine powder. Small particle size is required to minimize the diffusion distance that lithium must travel into the core of the ion exchange particles. In some cases, these particles may be coated with protective surface coatings to minimize dissolution of the ion exchange materials while allowing efficient transfer of lithium and hydrogen to and from the particles, as disclosed in U.S. provisional application 62/421,934, filed on Nov. 14, 2016, entitled "Lithium Extraction with Coated Ion Exchange Particles," and incorporated in its entirety by reference.

One major challenge for lithium extraction using inorganic ion exchange particles is the loading of the particles into an ion exchange column in such a way that brine and acid can be pumped efficiently through the column with minimal clogging. The materials can be formed into beads, and the beads can be loaded into the column. This bead loading creates void spaces between the beads, and these void spaces facilitate pumping through the column. The beads hold the ion exchange particles in place and prevent free movement of the particles throughout the column. When the materials are formed into beads, the penetration of brine and acid solutions into the beads may become slow and challenging. A slow rate of convection and diffusion of the acid and brine solutions into the bead slows the kinetics of lithium absorption and release. Such slow kinetics can create problems for column operation. Slow kinetics can require slow pumping rates through the column. Slow kinetics can also lead to low lithium recovery from the brine and inefficient use of acid to elute the lithium.

In one embodiment, an alternate phase is contacted with the ion exchange beads during on ore more of the steps of the process step. In some embodiments, the use of alternate phase speeds up the kinetics of ion exchange, enhances the forming of the ion exchange bed, controls liquid level height in one or more process tanks, or a combination thereof. In some embodiments, contact between the ion exchange beads and the alternate phase is maximized and made possible by the design of this ion exchange device.

In some embodiments, the alternate phase is a liquid or gas. In some embodiments, said alternate phase is a non-aqueous liquid. In some embodiments, the alternate phase is non-aqueous liquid. In some embodiments, the alternate phase is a non-aqueous solution. In some embodiments, the alternate phase is an organic liquid such as an alkane, alcohol, oil, bio-organic oil, ester, ether, hydrocarbon, or a combination thereof. In some embodiments, the alternate phase is butane, pentane, hexane, acetone, diethyl ether, butanol, or combinations thereof. In some embodiments, the alternate is a gas such as air, nitrogen, argon, or a combination thereof. In some embodiments, the alternate phase comprises a compressed or pressurized gas.

In some embodiments, the ion exchange beads are porous ion exchange beads with networks of pores that facilitate the transport into the beads of solutions that are pumped through an ion exchange column. Pore networks can be strategically controlled to provide fast and distributed access for the brine and acid solutions to penetrate into the bead and deliver lithium and hydrogen to the ion exchange particles.

In some embodiments, the ion exchange beads are formed by mixing of ion exchange particles, a matrix material, and a filler material. These components are mixed and formed into a bead. Then, the filler material is removed from the bead to leave behind pores. The filler material is dispersed in the bead in such a way to leave behind a pore structure that enables transport of lithium and hydrogen with fast kinetics. This method may involve multiple ion exchange materials, multiple polymer materials, and multiple filler materials.

Another major challenge for lithium extraction using inorganic ion exchange materials is dissolution and degradation of the materials, especially during lithium elution in acid but also during lithium uptake in liquid resources. To yield a concentrated lithium solution from the ion exchange process, it is desirable to use a concentrated acid solution to elute the lithium. However, concentrated acid solutions dissolve and degrade inorganic ion exchange materials, which decreases the performance and lifespan of the materials. Therefore, the porous ion exchange beads may contain coated ion exchange particle for lithium extraction that are comprised of an ion exchange material and a coating material protecting the particle surface. The coating protects the ion exchange material from dissolution and degradation during lithium elution in acid, during lithium uptake from a liquid resource, and during other aspects of an ion exchange process. This coated particle enables the use of concentrated acids in the ion exchange process to yield concentrated lithium solutions.

In one aspect described herein, the ion exchange material is selected for high lithium absorption capacity, high selectivity for lithium in a liquid resource relative to other ions such as sodium and magnesium, strong lithium uptake in liquid resources including those with low concentrations of lithium, facile elution of lithium with a small excess of acid, and fast ionic diffusion. In one aspect described herein, a coating material is selected to protect the particle from dissolution and chemical degradation during lithium recovery in acid and also during lithium uptake in various liquid resources. In some embodiments, the coating material may also be selected to facilitate one or more of the following objectives: diffusion of lithium and hydrogen between the particles and the liquid resources, enabling adherence of the particles to a structural support, and suppressing structural and mechanical degradation of the particles.

When the porous ion exchange beads are used in an ion exchange column, the liquid resource containing lithium is pumped through the ion exchange column so that the ion exchange particles absorb lithium from the liquid resource while releasing hydrogen. After the beads have absorbed lithium, an acid solution is pumped through the column so that the particles release lithium into the acid solution while absorbing hydrogen. The column may be operated in co-flow mode with the liquid resource and acid solution alternately flowing through the column in the same direction, or the column may be operated in counter-flow mode with a liquid resource and acid solution alternately flowing through the column in opposite directions. Between flows of the liquid resource and the acid solution, the column may be treated or washed with water or other solutions for purposes such as adjusting pH in the column or removing potential contaminants. The beads may form a fixed or moving bed, and the moving bed may move in counter-current to the brine and acid flows. The beads may be moved between multiple columns with moving beds where different columns are used for brine, acid, water, or other flows. Before or after the liquid resource flows through the column, the pH of the liquid may be adjusted with NaOH or other chemicals to facilitate the ion exchange reaction as well as handling or disposal of the spent liquid resource. Before or after the liquid resource flows through the column, the liquid resource may be subjected to other processes including other ion exchange processes, solvent extraction, evaporation, chemical treatment, or precipitation to remove lithium, to remove other chemical species, or to otherwise treat the brine.

When the ion exchange particles are treated with acid, a lithium solution is produced. This lithium solution may be further processed to produce lithium chemicals. These lithium chemicals may be supplied for an industrial application.

In some embodiments, an ion exchange material is selected from the following list: an oxide, a phosphate, an oxyfluoride, a fluorophosphate, or combinations thereof. In some embodiments, an ion exchange material is selected from the following list: $Li_4Mn_5O_{12}$, $Li_4Ti_5O_{12}$, $Li_2MO_3$ (M=Ti, Mn, Sn), $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $LiFePO_4$, $LiMnPO_4$, $Li_2CuP_2O_7$, $Al(OH)_3$, $LiCl \cdot xAl(OH)_3 \cdot yH_2O$, $SnO_2 \cdot xSb_2O_5 \cdot yH_2O$, $TiO_2 \cdot xSb_2O_5 \cdot yH_2O$, solid solutions thereof, or combinations thereof. In some embodiments, an ion exchange material is selected from the following list:

$Li_4Mn_5O_{12}$, $Li_4Ti_5O_{12}$, $Li_{1.6}Mn_{1.6}O_4$, $Li_2MO_3$ (M=Ti, Mn, Sn), $LiFePO_4$, solid solutions thereof, or combinations thereof.

In some embodiments, a coating material for protecting the surface of the ion exchange material is selected from the following list: a carbide, a nitride, an oxide, a phosphate, a fluoride, a polymer, carbon, a carbonaceous material, or combinations thereof. In some embodiments, a coating material is selected from the following list: $TiO_2$, $ZrO_2$, $MoO_2$, $SnO_2$, $Nb_2O_5$, $Ta_2O_5$, $SiO_2$, $Li_2TiO_3$, $Li_2ZrO_3$, $Li_2SiO_3$, $Li_2MnO_3$, $Li_2MoO_3$, $LiNbO_3$, $LiTaO_3$, $AlPO_4$, $LaPO_4$, $ZrP_2O_7$, $MoP_2O_7$, $MO_2P_3O_{12}$, $BaSO_4$, $AlF_3$, SiC, TiC, ZrC, $Si_3N_4$, ZrN, BN, carbon, graphitic carbon, amorphous carbon, hard carbon, diamond-like carbon, solid solutions thereof, or combinations thereof. In some embodiments, a coating material is selected from the following list: $TiO_2$, $ZrO_2$, $MoO_2$, $SiO_2$, $Li_2TiO_3$, $Li_2ZrO_3$, $Li_2SiO_3$, $Li_2MnO_3$, $LiNbO_3$, $AlF_3$, SiC, $Si_3N_4$, graphitic carbon, amorphous carbon, diamond-like carbon, or combinations thereof.

In some embodiments, the ion exchange particles may have an average diameter that is selected from the following list: less than 10 nm, less than 100 nm, less than 1,000 nm, less than 10,000 nm, or less than 100,000 nm. In some embodiments, the ion exchange particles may have an average size that is selected from the following list: less than 200 nm, less than 2,000 nm, or less than 20,000 nm.

In some embodiments, the ion exchange particles may be secondary particles comprised of smaller primary particles that may have an average diameter selected from the following list: less than 10 nm, less than 100 nm, less than 1,000 nm, or less than 10,000 nm.

In some embodiments, the ion exchange particles have a coating material with a thickness selected from the following list: less than 1 nm, less than 10 nm, less than 100 nm, or less than 1,000 nm. In some embodiments, the coating material has a thickness selected from the following list: less than 1 nm, less than 10 nm, or less than 100 nm.

In some embodiments, the ion exchange material and a coating material may form one or more concentration gradients where the chemical composition of the particle ranges between two or more compositions. In some embodiments, the ion exchange materials and the coating materials may form a concentration gradient that extends over a thickness selected from the following list: less than 1 nm, less than 10 nm, less than 100 nm, less than 1,000 nm, less than 10,000 nm, or less than 100,000 nm.

In some embodiments, the ion exchange material is synthesized by a method selected from the following list: hydrothermal, solvothermal, sol-gel, solid state, molten salt flux, ion exchange, microwave, ball milling, precipitation, or vapor deposition. In some embodiments, the ion exchange material is synthesized by a method selected from the following list: hydrothermal, solid state, or microwave.

In some embodiments, a coating material is deposited by a method selected from the following list: chemical vapor deposition, atomic layer deposition, physical vapor deposition, hydrothermal, solvothermal, sol-gel, solid state, molten salt flux, ion exchange, microwave, wet impregnation, precipitation, titration, aging, ball milling, or combinations thereof. In some embodiments, the coating material is deposited by a method selected from the following list: chemical vapor deposition, hydrothermal, titration, solvothermal, wet impregnation, sol-gel, precipitation, microwave, or combinations thereof.

In some embodiments, a coating material is deposited with physical characteristics selected from the following list: crystalline, amorphous, full coverage, partial coverage, uniform, non-uniform, or combinations thereof.

In some embodiments, multiple coatings may be deposited on the ion exchange material in an arrangement selected from the following list: concentric, patchwork, or combinations thereof.

In some embodiments, the matrix is selected from the following list: a polymer, an oxide, a phosphate, or combinations thereof. In some embodiments, a structural support is selected from the following list: polyvinyl fluoride, polyvinylidene difluoride, polyvinyl chloride, polyvinylidene dichloride, polyethylene, polypropylene, polyphenylene sulfide, polytetrafluoroethylene, polytetrofluoroethylene, sulfonated polytetrofluoroethylene, polystyrene, polydivinylbenzene, polybutadiene, sulfonated polymer, carboxylated polymer, Nafion, copolymers thereof, and combinations thereof. In some embodiments, a structural support is selected from the following list: polyvinylidene difluoride, polyvinyl chloride, sulfonated polytetrofluoroethylene, polystyrene, polydivinylbenzene, copolymers thereof, or combinations thereof. In some embodiments, a structural support is selected from the following list: titanium dioxide, zirconium dioxide, silicon dioxide, solid solutions thereof, or combinations thereof. In some embodiments, the matrix material is selected for thermal resistance, acid resistance, and/or other chemical resistance.

In some embodiments, the porous ion exchange bead is formed by mixing the ion exchange particles, the matrix material, and the filler material together at once. In some embodiments, the porous ion exchange bead is formed by first mixing the ion exchange particles and the matrix material, and then mixing with the filler material. In some embodiments, the porous ion exchange bead is formed by first mixing the ion exchange particles and the filler material, and then mixing with the matrix material. In some embodiments, the porous ion exchange bead is formed by first mixing the matrix material and the filler material, and then mixing with the ion exchange particles.

In some embodiments, the porous ion exchange bead is formed by mixing the ion exchange particles, the matrix material, and/or the filler material with a solvent that dissolves once or more of the components. In some embodiments, the porous ion exchange bead is formed by mixing the ion exchange particles, the matrix material, and/or the filler material as dry powders in a mixer or ball mill. In some embodiments, the porous ion exchange bead is formed by mixing the ion exchange particles, the matrix material, and/or the filler material in a spray drier.

In some embodiments, the matrix material is a polymer that is dissolved and mixed with the ion exchange particles and/or filler material using a solvent from the following list: n-methyl-2-pyrrolidone, dimethyl sulfoxide, tetrahydrofuran, dimethylformamide, dimethylacetamide, methyl ethyl ketone, or combinations thereof. In some embodiments, the filler material is a salt that is dissolved and mixed with the ion exchange particles and/or matrix material using a solvent from the following list: water, ethanol, iso-propyl alcohol, acetone, or combinations thereof.

In some embodiments, the filler material is a salt that is dissolved out of the bead to form pores using a solution selected from the following list: water, ethanol, iso-propyl alcohol, a surfactant mixture, an acid, a base, or combinations thereof. In some embodiments, the filler material is a material that thermally decomposes to form a gas at high temperature so that the gas can leave the bead to form pores, where the gas is selected from the following list: water vapor, oxygen, nitrogen, chlorine, carbon dioxide, nitrogen oxides, organic vapors, or combinations thereof.

In some embodiments, the porous ion exchange bead is formed from dry powder using a mechanical press, a pellet press, a tablet press, a pill press, a rotary press, or combinations thereof. In some embodiments, the porous ion exchange bead is formed from a solvent slurry by dripping the slurry into a different liquid solution. The solvent slurry may be formed using a solvent of n-methyl-2-pyrrolidone, dimethyl sulfoxide, tetrahydrofuran, dimethylformamide, dimethylacetamide, methyl ethyl ketone, or combinations thereof. The different liquid solution may be formed using water, ethanol, iso-propyl alcohol, acetone, or combinations thereof.

In some embodiments, the porous ion exchange bead is approximately spherical with an average diameter selected from the following list: less than 10 µm, less than 100 µm, less than 1 mm, less than 1 cm, or less than 10 cm. In some embodiments, the porous ion exchange bead is approximately spherical with an average diameter selected from the following list: less than 200 µm, less than 2 mm, or less than 20 mm.

In some embodiments, the porous ion exchange bead is tablet-shaped with a diameter of less than 1 mm, less than 2 mm, less than 4 mm, less than 8 mm, or less than 20 mm and with a height of less than 1 mm, less than 2 mm, less than 4 mm, less than 8 mm, or less than 20 mm.

In some embodiments, the porous ion exchange bead is embedded in a support structure, which may be a membrane, a spiral-wound membrane, a hollow fiber membrane, or a mesh. In some embodiments, the porous ion exchange bead is embedded on a support structure comprised of a polymer, a ceramic, or combinations thereof. In some embodiments, the porous ion exchange bead is loaded directly into an ion exchange column with no additional support structure.

In some embodiments, the liquid resource is selected from the following list: a natural brine, a dissolved salt flat, a geothermal brine, seawater, concentrated seawater, desalination effluent, a concentrated brine, a processed brine, liquid from an ion exchange process, liquid from a solvent extraction process, a synthetic brine, leachate from ores, leachate from minerals, leachate from clays, leachate from recycled products, leachate from recycled materials, or combinations thereof. In some embodiments, a liquid resource is selected from the following list: a natural brine, a dissolved salt flat, a concentrated brine, a processed brine, a synthetic brine, a geothermal brine, liquid from an ion exchange process, liquid from a solvent extraction process, leachate from minerals, leachate from clays, leachate from recycled products, leachate from recycled materials, or combinations thereof.

In some embodiments, the liquid resource is selected with a lithium concentration selected from the following list: less than 100,000 ppm, less than 10,000 ppm, less than 1,000 ppm, less than 100 ppm, less than 10 ppm, or combinations thereof. In some embodiments, a liquid resource is selected with a lithium concentration selected from the following list: less than 5,000 ppm, less than 500 ppm, less than 50 ppm, or combinations thereof.

In some embodiments, the acid used for recovering lithium from the porous ion exchange beads is selected from the following list: hydrochloric acid, sulfuric acid, phosphoric acid, hydrobromic acid, chloric acid, perchloric acid, nitric acid, formic acid, acetic acid, or combinations thereof. In some embodiments, the acid used for recovering lithium from the porous ion exchange beads is selected from the following list: hydrochloric acid, sulfuric acid, nitric acid, or combinations thereof.

In some embodiments, the acid used for recovering lithium from the porous ion exchange beads has a concentration selected from the following list: less than 0.1 M, less than 1.0 M, less than 5 M, less than 10 M, or combinations thereof.

In some embodiments, the porous ion exchange beads perform the ion exchange reaction repeatedly over a number of cycles selected from the following list: greater than 10 cycles, greater than 30 cycles, greater than 100 cycles, greater than 300 cycles, or greater than 1,000 cycles. In some embodiments, the porous ion exchange beads perform the ion exchange reaction repeatedly over a number of cycles selected from the following list: greater than 50 cycles, greater than 100 cycles, or greater than 200 cycles.

In some embodiments, the concentrated lithium solution that is yielded from the porous ion exchange beads is further processed into lithium raw materials using methods selected from the following list: solvent extraction, ion exchange, chemical precipitation, electrodialysis, electrowinning, evaporation with direct solar energy, evaporation with concentrated solar energy, evaporation with a heat transfer medium heated by concentrated solar energy, evaporation with heat from a geothermal brine, evaporation with heat from combustion, or combinations thereof.

In some embodiments, the concentrated lithium solution that is yielded from the porous ion exchange beads is further processed into lithium chemicals selected from the following list: lithium chloride, lithium carbonate, lithium hydroxide, lithium metal, lithium metal oxide, lithium metal phosphate, lithium sulfide, or combinations thereof. In some embodiments, the concentrated lithium solution that is yielded from the porous ion exchange beads is further processed into lithium chemicals that are solid, liquid, hydrated, or anhydrous.

In some embodiments, the lithium chemicals produced using the porous ion exchange beads are used in an industrial application selected from the following list: lithium batteries, metal alloys, glass, grease, or combinations thereof. In some embodiments, the lithium chemicals produced using the coated ion exchange particles are used in an application selected from the following list: lithium batteries, lithium-ion batteries, lithium sulfur batteries, lithium solid-state batteries, and combinations thereof.

In some embodiments, the ion exchange materials are synthesized in a lithiated state with a sublattice fully or partly occupied by lithium. In some embodiments, the ion exchange materials are synthesized in a hydrated state with a sublattice fully or partly occupied by hydrogen.

Base and Acid Generation

In one embodiment of the disclosure, acid and base are generated using an electrochemical cell. In one embodiment, acid and base are generated using electrodes. In one embodiment, acid and base are generated using a membrane.

In one embodiment, said ion-conducting membrane is a cation-conducting membrane, an anion-conducting membrane or combinations thereof. In one embodiment, said ion-conducting membrane comprises sulfonated tetrafluoroethylene-based fluoropolymer-copolymer, sulfonated tetrafluoroethylene, sulfonated fluoropolymer, MK-40, co-polymers, or combinations thereof. In one embodiment, said anion-conducting membrane comprises a functionalized polymer structure.

In one embodiment, said functionalized polymer structure comprises polyarylene ethers, polysulfones, polyether ketones, polyphenylenes, perfluorinated polymers, polybenzimidazole, polyepichlorohydrins, unsaturated polypropylene, polyethylene, polystyrene, polyvinylbenzyl chlorides, polyphosphazenes, polyvinyl alcohol, polytetrafluoroethylene, polyvinyl chloride, polyvinylidene fluoride, alterations of these polymers or other kinds of polymers, or composites thereof. In one embodiment, said cation-conducting membrane allows for transfer of lithium ions but prevents transfer of anion groups. In one embodiment, said ion-conducting membrane has a thickness from about 1 μm to about 1000 μm. In one embodiment, said ion-conducting membrane has a thickness from about 1 mm to about 10 mm.

In one embodiment, said electrodes are comprised of titanium, niobium, zirconium, tantalum, magnesium, titanium dioxide, oxides thereof, or combinations thereof. In one embodiment, said electrodes further comprise a coating of platinum, $TiO_2$, $ZrO_2$, $Nb_2O_5$, $Ta_2O_5$, $SnO_2$, $IrO_2$, $RuO_2$, mixed metal oxides, graphene, derivatives thereof, or combinations thereof.

In one embodiment of an integrated system, a chlor-alkali setup is used to generate HCl and NaOH from an aqueous NaCl solution. In one embodiment, the HCl is used to elute lithium from an ion exchange system for selective lithium uptake to produce a lithium eluate solution. In one embodiment, the NaOH from the chlor-alkali setup is used to control the pH of the brine in the ion exchange system for selective lithium uptake. In one embodiment, the NaOH is used to precipitate impurities from a lithium eluate solution.

In one embodiment, the system includes one or more electrochemical or electrolysis systems. The terms "electrochemical" and "electrolysis" are used interchangeably in the present specification and these terms are synonymous unless specifically noted to the contrary. In one embodiment, an electrolysis system is comprised of one or more electrochemical cells. In one embodiment, an electrochemical system is used to produce HCl and NaOH. In one embodiment, an electrochemical system converts a salt solution into acid in base. In one embodiment, an electrochemical system converts a salt solution containing NaCl, KCl, and/or other chlorides into a base and an acid. In one embodiment, a salt solution precipitated or recovered from the brine is fed into an electrochemical system to produce acid and base. In one embodiment, an electrolysis system converts a lithium salt solution to form a lithium hydroxide solution, an acidified solution, and optionally a dilute lithium salt solution. In one embodiment, the lithium salt solution is or is derived from a lithium eluate solution, produced by an ion exchange system that has optionally been concentrated and/or purified. In one embodiment, acidified solution from an electrolysis system is returned to an ion exchange system to elute more lithium eluate solution.

In one embodiment of the integrated system, the integrated system includes one or more electrolysis systems. In one embodiment, an electrolysis system is comprised of one or more electrodialysis cells. In one embodiment, an electrolysis system converts a lithium salt solution to form a lithium hydroxide solution, an acidified solution, and optionally a dilute lithium salt solution. In one embodiment, the lithium salt solution is or is derived from a lithium eluate solution, produced by an ion exchange system that has optionally been concentrated and/or purified. In one embodiment, acidified solution from an electrolysis system is returned to an ion exchange system to elute more lithium eluate solution.

In one embodiment, a lithium salt solution contains unreacted acid from the ion exchange system. In one embodiment, unreacted acid in the lithium salt solution from an ion exchange system passes through an electrolysis system and is further acidified to form an acidified solution. In one embodiment, a lithium salt solution derived from an ion exchange system is purified to remove impurities without neutralizing the unreacted acid in the lithium salt solution and is then fed into an electrolysis system.

In one embodiment, an acidified solution produced by an electrolysis system contains lithium ions from the lithium salt solution fed into the electrolysis system. In one embodiment, an acidified solution containing lithium ions leaves the electrolysis system and is fed back to an ion exchange system to elute lithium and produce more lithium salt solution.

In one embodiment of an electrolysis system, the electrolysis cells are electrochemical cells. In one embodiment of a electrochemical cell, the membranes may be cation-conducting and/or anion-conducting membranes. In one embodiment, the electrochemical cell is a two-compartment cell with a cation-conducting membrane that allows for transfer of lithium ions between the chambers but prevents transfer of anion groups such as chloride, sulfate, and hydroxide groups.

In one embodiment of an electrolysis system, the electrolysis cells are electrodialysis cells. In one embodiment of a electrodialysis cell, the membranes may be cation-conducting and/or anion-conducting membranes. In one embodiment, the electrodialysis cell is a two-compartment cell with a cation-conducting membrane that allows for transfer of lithium ions between the chambers but prevents transfer of anion groups such as chloride, sulfate, and hydroxide groups.

In one embodiment of an electrolysis system, the electrolysis cells are membrane electrolysis cells. In one embodiment of a membrane electrolysis cell, the membranes may be cation-conducting and/or anion-conducting membranes. In one embodiment, the membrane electrolysis cell is a two-compartment cell with a cation-conducting membrane that allows for transfer of lithium ions between the chambers but prevents transfer of anion groups such as chloride, sulfate, and hydroxide groups.

In one embodiment, the membrane electrolysis cell is a three-compartment cell with a cation-conducting membrane that allows for transfer of lithium ions separating a compartment with an electrochemically reducing electrode from a central compartment and with an anion-conducting membrane that allows for transfer of anions ions separating a compartment with an electrochemically oxidizing electrode from the central compartment. In one embodiment, the cation-conducting membrane prevents transfer of anions such as chloride, sulfate, or hydroxide. In one embodiment, the anion-conducting membrane prevents transfer of cations such as lithium, sodium, or protons.

In one embodiment of the membrane electrolysis cell, the membranes may be comprised of Nafion®, sulfonated tetrafluoroethylene, sulfonated fluoropolymer, MK-40, co-polymers, other membrane materials, composites, or combinations thereof. In one embodiment of the membrane electrolysis cell, the cation exchange membranes are comprised of a functionalized polymer structure which may be Nafion®, sulfonated tetrafluoroethylene, sulfonated fluoropolymer, co-polymers, different polymers, composites of polymers, or combinations thereof. In one embodiment of the membrane electrolysis cell, the polymer structures of the cation exchange membrane are functionalized with sulfone groups, carboxylic acid groups, phosphate groups, other negatively charged functional groups, or combinations thereof.

In one embodiment of the electrochemical cell, the membranes may be comprised of Nafion®, sulfonated tetrafluoroethylene, sulfonated fluoropolymer, MK-40, co-polymers, other membrane materials, composites, or combinations thereof. In one embodiment of the electrochemical cell, the cation exchange membranes are comprised of a functionalized polymer structure which may be Nafion®, sulfonated tetrafluoroethylene, sulfonated fluoropolymer, co-polymers, different polymers, composites of polymers, or combinations thereof. In one embodiment of the electrochemical cell, the polymer structures of the cation exchange membrane are functionalized with sulfone groups, carboxylic acid groups, phosphate groups, other negatively charged functional groups, or combinations thereof.

In one embodiment of the electrodialysis cell, the membranes may be comprised of Nafion®, sulfonated tetrafluoroethylene, sulfonated fluoropolymer, MK-40, co-polymers, other membrane materials, composites, or combinations thereof. In one embodiment of the electrodialysis cell, the cation exchange membranes are comprised of a functionalized polymer structure which may be Nafion®, sulfonated tetrafluoroethylene, sulfonated fluoropolymer, co-polymers, different polymers, composites of polymers, or combinations thereof. In one embodiment of the electrodialysis cell, the polymer structures of the cation exchange membrane are functionalized with sulfone groups, carboxylic acid groups, phosphate groups, other negatively charged functional groups, or combinations thereof.

In one embodiment of the membrane electrolysis cell, an anion exchange membrane is comprised of a functionalized polymer structure. The polymer structure may be comprised of polyarylene ethers, polysulfones, polyether ketones, polyphenylenes, perfluorinated polymers, polybenzimidazole, polyepichlorohydrins, unsaturated polypropylene, polyethylene, polystyrene, polyvinylbenzyl chlorides, polyphosphazenes, polyvinyl alcohol, polytetrafluoroethylene, polyvinyl chloride, polyvinylidene fluoride, alterations of these polymers or other kinds of polymers, or composites thereof. In one embodiment of the membrane, the functional groups are part of the polymer backbone. In one embodiment of the membrane, functional groups are added using plasma techniques, radiation-grafting, or by other functionalization reactions. In one embodiment of the membrane, the functional group may be benzyltrialkylammonium, alkyl-side-chain quaternary ammonium groups, crosslinking diammonium groups, quinuclidinium-based quaternary ammonium groups, imidazolium groups, pyridinium groups, pentamethylguanidinium groups, alkali stabilised quaternary phosphonium groups, metal containing cation groups, other cation containing groups, or combinations thereof.

In one embodiment of the electrochemical cell, an anion exchange membrane is comprised of a functionalized polymer structure. The polymer structure may be comprised of polyarylene ethers, polysulfones, polyether ketones, polyphenylenes, perfluorinated polymers, polybenzimidazole, polyepichlorohydrins, unsaturated polypropylene, polyethylene, polystyrene, polyvinylbenzyl chlorides, polyphosphazenes, polyvinyl alcohol, polytetrafluoroethylene, polyvinyl chloride, polyvinylidene fluoride, alterations of these polymers or other kinds of polymers, or composites thereof. In one embodiment of the membrane, the functional groups are part of the polymer backbone. In one embodiment of the membrane, functional groups are added using plasma techniques, radiation-grafting, or by other functionalization reactions. In one embodiment of the membrane, the functional group may be benzyltrialkylammonium, alkyl-side-chain quaternary ammonium groups, crosslinking diammonium groups, quinuclidinium-based quaternary ammonium groups, imidazolium groups, pyridinium groups, pentamethylguanidinium groups, alkali stabilised quaternary phosphonium groups, metal containing cation groups, other cation containing groups, or combinations thereof.

In one embodiment of the electrodialysis cell, an anion exchange membrane is comprised of a functionalized polymer structure. The polymer structure may be comprised of polyarylene ethers, polysulfones, polyether ketones, polyphenylenes, perfluorinated polymers, polybenzimidazole, polyepichlorohydrins, unsaturated polypropylene, polyethylene, polystyrene, polyvinylbenzyl chlorides, polyphosphazenes, polyvinyl alcohol, polytetrafluoroethylene, polyvinyl chloride, polyvinylidene fluoride, alterations of these polymers or other kinds of polymers, or composites thereof. In one embodiment of the membrane, the functional groups are part of the polymer backbone. In one embodiment of the membrane, functional groups are added using plasma techniques, radiation-grafting, or by other functionalization reactions. In one embodiment of the membrane, the functional group may be benzyltrialkylammonium, alkyl-side-chain quaternary ammonium groups, crosslinking diammonium groups, quinuclidinium-based quaternary ammonium groups, imidazolium groups, pyridinium groups, pentamethylguanidinium groups, alkali stabilised quaternary phosphonium groups, metal containing cation groups, other cation containing groups, or combinations thereof.

In one embodiment of the membrane electrolysis cell, the membrane may have a thickness of less than 10 µm, less than 50 µm, less than 200 µm, less than 400 µm, or less than 1,000 µm. In one embodiment of the membrane electrolysis cell, the membranes may have a thickness of greater than 1,000 µm. In one embodiment of the membrane electrolysis cell, the membrane may have a thickness of about 1 µm to about 1000 µm, about 1 µm to about 800 µm, about 1 µm to about 600 µm, about 1 µm to about 400 µm, about 1 µm to about 200 µm, about 1 µm to about 100 µm, about 1 µm to about 90 µm, about 1 µm to about 80 µm, about 1 µm to about 70 µm, about 1 µm to about 60 µm, about 1 µm to about 50 µm, about 1 µm to about 40 µm, about 1 µm to about 30 µm, about 1 µm to about 20 µm, about 1 µm to about 15 µm, or about 1 µm to about 10 µm.

In one embodiment of the electrochemical cell, the membrane may have a thickness of less than 10 µm, less than 50 µm, less than 200 µm, less than 400 µm, or less than 1,000 µm. In one embodiment of the electrochemical cell, the membranes may have a thickness of greater than 1,000 µm. In one embodiment of the electrochemical cell, the membrane may have a thickness of about 1 µm to about 1000 µm, about 1 µm to about 800 µm, about 1 µm to about 600 µm, about 1 µm to about 400 µm, about 1 µm to about 200 µm, about 1 µm to about 100 µm, about 1 µm to about 90 µm, about 1 µm to about 80 µm, about 1 µm to about 70 µm, about 1 µm to about 60 µm, about 1 µm to about 50 µm, about 1 µm to about 40 µm, about 1 µm to about 30 µm, about 1 µm to about 20 µm, about 1 µm to about 15 µm, or about 1 µm to about 10 µm.

In one embodiment of the electrodialysis cell, the membrane may have a thickness of less than 10 µm, less than 50 µm, less than 200 µm, less than 400 µm, or less than 1,000 µm. In one embodiment of the electrodialysis cell, the membranes may have a thickness of greater than 1,000 m. In one embodiment of the electrodialysis cell, the membrane may have a thickness of about 1 µm to about 1000 µm, about 1 µm to about 800 µm, about 1 µm to about 600 µm, about 1 µm to about 400 µm, about 1 µm to about 200 µm, about 1 µm to about 100 µm, about 1 µm to about 90 µm, about 1

μm to about 80 μm, about 1 μm to about 70 μm, about 1 μm to about 60 μm, about 1 μm to about 50 μm, about 1 μm to about 40 μm, about 1 μm to about 30 μm, about 1 μm to about 20 μm, about 1 μm to about 15 μm, or about 1 μm to about 10 μm.

In one embodiment, an electrolysis system contains electrolysis cells that may be two-compartment electrolysis cells or three-compartment electrolysis cells.

In one embodiment of a two-compartment electrolysis cell, the cell contains a first compartment that contains an electrochemically oxidizing electrode. A lithium salt solution enters the first compartment and is converted into an acidified solution. In one embodiment of a two-compartment electrolysis cell, the cell contains a second compartment containing an electrochemically reducing electrode. This second compartment takes as an input a water or dilute LiGH solution, and produces as an output a more concentrated LiGH solution. In one embodiment, the compartments are separated by a cation-conducting membrane that limits transport of anions.

In one embodiment of a three-compartment electrolysis cell, the cell contains a first compartment containing an electrochemically oxidizing electrode. The first compartment takes as an input water or a dilute salt solution, and produces as an output an acidified solution. In one embodiment of a three-compartment electrolysis cell, the cell contains a second compartment containing an electrochemically reducing electrode. This second compartment takes as an input a water or dilute hydroxide solution, and produces as an output a more concentrated hydroxide solution. In one embodiment of a three-compartment electrolysis cell, the cell contains a third compartment containing no electrode, which is located between the first and second compartment, and takes as an input a concentrated lithium salt solution, and produces as an output a dilute lithium salt solution. In one embodiment, the first and the third compartments are separated by an anion-conducting membrane that limits transport of cations. In one embodiment, the second and the third compartments are separated by a cation-conducting membrane that limits transport of anions.

In one embodiment of the electrolysis cell, the electrodes may be comprised of titanium, niobium, zirconium, tantalum, magnesium, titanium dioxide, oxides thereof, or combinations thereof. In one embodiment of the electrolysis cell, the electrodes may be coated with platinum, $TiO_2$, $ZrO_2$, $Nb_2O_5$, $Ta_2O_5$, $SnO_2$, $IrO_2$, $RuO_2$, PtOx, mixed metal oxides, graphene, derivatives thereof, or combinations thereof. In one embodiment of the electrolysis cell, the electrodes may be comprised of steel, stainless steel, nickel, nickel alloys, steel alloys, or graphite.

In one embodiment of the electrolysis system, the lithium salt solution is a LiCl solution optionally containing HCl. In one embodiment of the electrolysis system, the electrochemically oxidizing electrode oxides chloride ions to produce chlorine gas.

In one embodiment of the electrolysis system, the lithium salt solution is a $Li_2SO_4$ solution optionally containing $H_2SO_4$. In one embodiment of the electrolysis system, the electrochemically oxidizing electrode oxidizes water, hydroxide, or other species to produce oxygen gas.

In one embodiment of the electrolysis system, the electrochemically reducing electrode reduces hydrogen ions to produce hydrogen gas. In one embodiment of the electrolysis system, the chamber containing the electrochemically reducing electrode produces a hydroxide solution or increases the hydroxide concentration of a solution.

In one embodiment of the electrolysis system, chlorine and hydrogen gas are burned to produce HCl in an HCl burner. In one embodiment, the HCl burner is a column maintained at approximately 100-300 or 300-2,000 degrees Celsius. In one embodiment, HCl produced in the HCl burner is cooled through a heat exchange and absorbed into water in an absorption tower to produce aqueous HCl solution. In one embodiment, the HCl solution produced from the HCl burner is used to elute lithium from an ion exchange system.

In one embodiment, the pH of the acidified solution leaving the electrolysis cell may be 0 to 1, −2 to 0, 1 to 2, less than 2, less than 1, or less than 0. In some embodiments, the membrane electrolysis cell is an electrodialysis cell with multiple compartments. In some embodiments, the electrodialysis cell may have more than about two, more than about five, more than about 10, or more than about twenty compartments.

In one embodiment, the base added to precipitate metals from the liquid resource may be calcium hydroxide or sodium hydroxide. In one embodiment, the base may be added to the liquid resource as an aqueous solution with a base concentration that may be less than 1 N, 1-2 N, 2-4 N, 4-10 N, 10-20 N, or 20-40 N. In one embodiment, the base may be added to the liquid resource as a solid.

In one embodiment, the acid may be added to the precipitated metals to dissolve the precipitated metals before mixing the redissolved metals with the liquid resource. In one embodiment, the acid may be added to the liquid resource to acidify the liquid resource, and the precipitated metals may be combined with the acidified liquid resource to redissolve the precipitated metals.

In some embodiments, acid from the electrochemical cell may be used to elute lithium from the selective ion exchange material. In some embodiments, base from the electrochemical cell may be used to neutralize protons released from the selective ion exchange material.

Methods of Generating a Lithium Eluate

In an aspect, described herein is a method of generating a lithium eluate solution from a liquid resource, comprising: providing an ion exchange reactor comprising a tank, ion exchange particles that selectively absorb lithium from a liquid resource and elute a lithium eluate solution when treated with an acid solution after absorbing lithium ions from said liquid resource, one or more particle traps, and provision to modulate pH of said liquid resource; flowing a liquid resource into said ion exchange reactor thereby allowing said ion exchange particles to selectively absorb lithium from said liquid resource; treating said ion exchange particles with an acid solution to yield said lithium eluate solution; and passing said lithium eluate solution through said one or more particle traps to collect said lithium eluate solution.

In some embodiments, the tank has a conical shape. In some embodiments, the tank has a partial conical shape. In some embodiments, the conical shape allows the ion exchange particles to settle into a settled bed so that liquid can be removed from above the settled bed. In some embodiments, the partial conical shape allows the ion exchange particles to settle into a settled bed so that liquid can be removed from above the settled bed.

In some embodiments, modulation of the pH of the liquid resource occurs in the tank. In some embodiment, modulation of the pH of the liquid resource occurs prior to injection into the tank. In some embodiments, one or more particle traps comprise one or more filters inside the tank. In some embodiments, one or more particle traps comprise one filter.

In some embodiments, one or more particle traps comprise one filter. In some embodiments, one or more particle traps comprise two filters. In some embodiments, one or more particle traps comprise three filters. In some embodiments, one or more particle traps comprise four filters. In some embodiments, one or more particle traps comprise five filters.

In some embodiments, one or more particle traps is located at the bottom of the tank. In some embodiments, one or more particle traps is located close to the bottom of the tank. In some embodiments, one or more particle traps is located above the bottom of the tank.

In some embodiments, one or more particle traps comprise one or more meshes. In some embodiments, one or more particle traps comprises one mesh. In some embodiments, one or more particle traps comprises two meshes. In some embodiments, one or more particle traps comprises three meshes. In some embodiments, one or more particle traps comprises four meshes. In some embodiments, one or more particle traps comprises five meshes. In some embodiments, all the meshes of the one or more particle traps are identical. In some embodiments, at least one of the meshes of the one or more particle traps is not identical to the rest of the meshes of the one or more particle traps.

In some embodiments, one or more meshes comprise a pore space of less than about 200 microns, less than about 175 microns, less than about 150 microns, less than about 100 microns, less than about 75 microns, less than about 50 microns, less than about 25 microns, less than about 10 microns, more than about 1 micron, more than about 5 micron, more than about 10 microns, more than about 20 microns, more than about 30 microns, more than about 40 microns, more than about 50 microns, more than about 60 microns, more than about 70 microns, more than about 80 microns, more than about 90 microns, more than about 100 microns, more than about 125 microns, more than about 150 microns, more than about 175 microns from about 1 micron to about 200 microns, from about 5 microns to about 175 microns, from about 10 microns to about 150 microns, from about 10 microns to about 100 microns, from about 10 microns to about 90 microns, from about 10 microns to about 80 microns, from about 10 microns to about 70 microns, from about 10 microns to about 60 microns, or from about 10 microns to about 50 microns.

In some embodiments, one or more particle traps comprise multi-layered meshes. In some embodiments, the multi-layered meshes comprise at least one finer mesh for filtration and at least one coarser mesh for structural support. In some embodiments, one or more particle traps comprise one or more meshes supported by a structural support. In some embodiments, one or more particle traps comprise one or more polymer meshes. In some embodiments, the one or more polymer meshes are selected from the group consisting of polyetheretherketone, ethylene tetrafluoroethylene, polyethylene terephthalate, polypropylene, and combinations thereof.

In some embodiments, one or more particle traps comprise one or more meshes comprising a metal wire mesh. In some embodiments, the metal wire mesh is coated with a polymer. In some embodiments, the ion exchange reactor is configured to move said ion exchange particles into one or more columns for washing. In some embodiments, the ion exchange reactor is configured to allow the ion exchange particles to settle into one or more columns for washing. In some embodiments, the columns are affixed to the bottom of said tank. In some embodiments, the one or more particle traps comprise one or more filters mounted in one or more ports through the wall of said tank.

In some embodiments, the one or more particle traps comprise one or more filters external to said tank, and with provision for fluid communication between said one or more filters and said tank. In some embodiments, the one or more particle traps comprise one or more gravity sedimentation devices external to said tank, and with provision for fluid communication between said one or more gravity sedimentation devices and said tank.

In some embodiments, one or more particle traps comprise one or more gravity sedimentation devices internal to said tank. In some embodiments, one or more particle traps comprise one or more centrifugal sedimentation devices external to said tank, and with provision for fluid communication between said one or more centrifugal sedimentation devices and said tank In some embodiments, one or more particle traps comprise one or more centrifugal sedimentation devices internal to said tank. In some embodiments, one or more particle traps comprise one or more settling tanks, one or more centrifugal devices, or combinations thereof external to said tank, and with provision for fluid communication between said one or more settling tanks, centrifugal devices, or combinations thereof, and said tank. In some embodiments, one or more particle traps comprise one or more meshes, one or more centrifugal devices, or combinations thereof external to said tank, and with provision for fluid communication between said one or more meshes, centrifugal devices, or combinations thereof, and said tank. In some embodiments, one or more particle traps comprise one or more settling tanks, one or more meshes, or combinations thereof external to said tank, and with provision for fluid communication between said one or more settling tanks, meshes, or combinations thereof, and said tank. In some embodiments, one or more particle traps comprise one or more meshes, one or more settling tanks, one or more centrifugal devices, or combinations thereof external to said tank, and with provision for fluid communication between said one or more meshes, one or more settling tanks, centrifugal devices, or combinations thereof, and said tank.

In some embodiments, the ion exchange particles are stirred. In some embodiments, the ion exchange particles are stirred by a mixer. In some embodiments, the ion exchange particles are stirred by a propeller. In some embodiments, the ion exchange particles are fluidized by pumping solution into the tank near the bottom of the tank. In some embodiments, the ion exchange particles are fluidized by pumping solution from the tank back into the tank near the bottom of the tank. In some embodiments, the ion exchange particles are fluidized by pumping a slurry of the ion exchange particles from near the bottom of the tank to a higher level in the tank.

In some embodiments, the method further comprises one or more staged elution tanks, wherein intermediate eluate solutions comprising mixtures of protons and lithium ions are stored and used further to elute lithium from said ion exchange particles that are freshly lithiated. In some embodiments, the method further comprises one or more staged elution tanks, wherein intermediate eluate solutions comprising mixtures of protons and lithium ions are mixed with additional acid and used further to elute lithium from said ion exchange particles.

In some embodiments, the ion exchange particles further comprise a coating material. In some embodiments, the coating material is a polymer. In some embodiments, the coating of the coating material comprises a chloro-polymer, a fluoro-polymer, a chloro-fluoro-polymer, a hydrophilic polymer, a hydrophobic polymer, co-polymers thereof, mixtures thereof, or combinations thereof.

As disclosed herein, in some embodiments, and for any process of lithium extraction disclosed herein, the pH of the lithium-enriched acidic eluent solution is regulated to control elution of lithium and/or non-lithium impurities. In some embodiments, pH of the lithium-enriched acidic solution is regulated by adding protons, such as an acid and/or an acidic solution, to the lithium-enriched acidic solution. In some embodiments, pH of the lithium-enriched acidic solution is regulated by adding protons, such as an acid and/or an acidic solution, to the impurities-enriched lithiated acidic solution prior to removing impurities.

In some embodiments, the acid comprises sulfuric acid, phosphoric acid, hydrochloric acid, hydrobromic acid, carbonic acid, nitric acid, or combinations thereof. In some embodiments, the acidic solution is the same as the acidic solution originally contacted with the first lithium-enriched ion exchange material. In some embodiments, the acidic solution is the different from the acidic solution originally contacted with the first lithium-enriched ion exchange material.

In some embodiments, more protons are added to the lithium-enriched acidic solution, forming a protonated lithium-enriched acidic solution that is again contacted with a lithium-enriched ion exchange material to elute more lithium into the protonated lithium-enriched acidic solution. In some embodiments, more protons are added to the lithium-enriched acidic solution by adding an acid or acidic solution thereto to form the protonated lithium-enriched acidic solution. In some embodiments, protons are added to a lithium-enriched acidic solution before passing through each vessel in a network of lithium-selective ion exchange vessels, as described herein.

Lithium Production with Volatile Acid

In an aspect, described herein is lithium production plant. This lithium production plant functions to contact a liquid resource with ion exchange particles so that the ion exchange particles can uptake lithium from the liquid resource, separate the ion exchange particles from the liquid resource, wash the particles with aqueous solution, separate the ion exchange particles from the aqueous solution, elute lithium out of the particles using an acid solution, and yield a lithium salt. The plant uses heat to decompose the lithium salt to regenerate the acid a yield a lithium base such as lithium oxide, lithium hydroxide, or lithium carbonate. In some cases, the ion exchange particles are ion exchange beads, ion exchange material, coated ion exchange particles, porous ion exchange material, or other material capable of absorbing lithium from a liquid resource.

In an aspect, described herein is lithium production plant. This lithium production plant functions to contact a liquid resource with ion exchange particles so that the ion exchange particles can uptake lithium from the liquid resource, separate the ion exchange particles from the liquid resource, wash the particles with aqueous solution, separate the ion exchange particles from the aqueous solution, elute lithium out of the particles using a nitric acid solution, and yield lithium nitrate. The plant uses heat to decompose the lithium nitrate into lithium oxide and nitrogen oxide gas which can be recaptured to reform the nitric acid solution. The lithium oxide can optionally be processed into lithium hydroxide by addition of water, or into lithium carbonate by addition of water and carbonate dioxide or sodium carbonate. In some cases, the ion exchange particles are ion exchange beads, ion exchange material, coated ion exchange particles, porous ion exchange material, or other material capable of absorbing lithium from a liquid resource.

In an aspect, described herein is lithium production plant. This lithium production plant functions to contact a liquid resource with ion exchange particles so that the ion exchange particles can uptake lithium from the liquid resource, separate the ion exchange particles from the liquid resource, wash the particles with aqueous solution, separate the ion exchange particles from the aqueous solution, elute lithium out of the particles using a sulfuric acid solution, and yield lithium sulfate. The plant uses heat to decompose the lithium sulfate into lithium oxide and sulfur oxide gas which can be recaptured to reform the sulfuric acid solution. In some embodiments, the sulfur oxide gas comprises sulfur trioxide, sulfur dioxide, sulfur monoxide, oxygen, or combinations thereof. The lithium oxide can optionally be processed into lithium hydroxide by addition of water, or into lithium carbonate by addition of water and carbonate dioxide or sodium carbonate. In some cases, the ion exchange particles are ion exchange beads, ion exchange material, coated ion exchange particles, porous ion exchange material, or other material capable of absorbing lithium from a liquid resource.

In an aspect, described herein is lithium production plant. This lithium production plant functions to contact a liquid resource with ion exchange particles so that the ion exchange particles can uptake lithium from the liquid resource, separate the ion exchange particles from the liquid resource, wash the particles with aqueous solution, separate the ion exchange particles from the aqueous solution, elute lithium out of the particles using a nitric acid solution, and yield lithium nitrate solution. The plant combines the lithium nitrate solution with sulfuric acid and then heats the mixture to distill off nitric acid which can be recaptured to reform the nitric acid solution while yielding lithium sulfate. The lithium sulfate can optionally be in an aqueous, solid, or molten salt form. The lithium sulfate is optionally processed into lithium hydroxide by addition of sodium hydroxide followed by crystallization of lithium hydroxide. The lithium sulfate is optionally processed into lithium carbonate by addition of sodium carbonate to precipitate lithium carbonate. In some cases, the ion exchange particles are ion exchange beads, ion exchange material, coated ion exchange particles, porous ion exchange material, or other material capable of absorbing lithium from a liquid resource.

In an aspect, described herein is lithium production plant. This lithium production plant functions to contact a liquid resource with ion exchange particles so that the ion exchange particles can uptake lithium from the liquid resource, separate the ion exchange particles from the liquid resource, wash the particles with aqueous solution, separate the ion exchange particles from the aqueous solution, elute lithium out of the particles using a hydrochloric acid solution, and yield lithium chloride solution. The plant combines the lithium chloride solution with sulfuric acid and then heats the mixture to distill off hydrochloric acid which can be recaptured to reform the hydrochloric acid solution while yielding lithium sulfate. The lithium sulfate can optionally be in an aqueous, solid, or molten salt form. The lithium sulfate is optionally processed into lithium hydroxide by addition of sodium hydroxide followed by crystallization of lithium hydroxide. The lithium sulfate is optionally processed into lithium carbonate by addition of sodium carbonate to precipitate lithium carbonate. In some cases, the ion exchange particles are ion exchange beads, ion exchange material, coated ion exchange particles, porous ion exchange material, or other material capable of absorbing lithium from a liquid resource.

In some embodiments, the lithium sulfate is processed with an electrochemical cell to produce lithium hydroxide and sulfuric acid. In some embodiments, the lithium sulfate is processed with a membrane cell to produce lithium hydroxide and sulfuric acid. In some embodiments, the lithium sulfate is processed via electrochemical cell to produce lithium hydroxide and sulfuric acid which is reused to mix with a lithium salt and distill off a volatile acid. In some embodiments, the lithium sulfate is processed via electrochemical cell to produce lithium hydroxide and sulfuric acid which is returned to the ion exchange unit for elution of lithium.

In some embodiments, a mixture of a lithium salt and sulfuric acid is spray dried to produce a lithium sulfate solid while evaporating off a volatile acid or a mixture of volatile acids. In some embodiments, a mixture of a lithium salt and sulfuric acid is spray dried to produce a mixture of lithium sulfate and sulfuric acid while evaporating off a volatile acid or a mixture of volatile acids. In some embodiments, a mixture of a lithium salt and sulfuric acid is spray dried to produce a slurry of lithium sulfate and sulfuric acid while evaporating off a volatile acid or a mixture of volatile acids. In some embodiments, a mixture of a lithium salt and sulfuric acid is spray dried to produce a slurry of lithium sulfate while evaporating off a volatile acid or a mixture of volatile acids. In some embodiments, the volatile acids are condensed and used to elute lithium from an ion exchange material. In some embodiments, a mixture of lithium chloride and sulfuric acid is spray dried to produce a lithium sulfate solid while evaporating off hydrochloric acid. In some embodiments, a mixture of lithium nitrate and sulfuric acid is spray dried to produce a lithium sulfate solid while evaporating off nitric acid. In some embodiments, a mixture of lithium salt and acid is spray dried using a spray dryer. In some embodiments, a mixture of lithium salt and acid is heated using a spray, dryer, rotary kiln, or other heating device.

In some embodiments, a mixture of lithium salt and acid is heated under pressure or under vacuum. In some embodiments, a mixture of lithium salt and acid is heated under pressure or under vacuum to produce a volatile gas that is condensed under pressure or under vacuum. In some embodiments, a mixture of lithium salt and acid is heated under vacuum to produce a volatile gas that is condensed under pressure. In some embodiments, a mixture of lithium salt and acid is heated to remove a volatile acid at a pressure of about 0.001 to about 0.01 atm, about 0.01 to about 0.1 atm, about 0.1 to about 1.0 atm, about 1.0 to about 10 atm, about 10 to about 100 atm, or combinations thereof. In some embodiments, a mixture of lithium salt and acid is heated to evaporate or distill off a volatile acid that is condensed at a pressure of about 0.001 to about 0.01 atm, about 0.01 to about 0.1 atm, about 0.1 to about 1.0 atm, about 1.0 to about 10 atm, about 10 to about 100 atm, about 100 atm to about 1,000 atm, or combinations thereof. In some embodiments, a mixture of lithium salt and acid is heated to remove a volatile acid at a temperature of about 0 degrees Celsius to about 50 degrees Celsius, about 50 degrees Celsius to about 100 degrees Celsius, about 100 degrees Celsius to about 150 degrees Celsius, about 150 degrees Celsius to about 200 degrees Celsius, about 200 degrees Celsius to about 300 degrees Celsius, about 300 degrees Celsius to about 500 degrees Celsius, or about 500 degrees Celsius to about 1,000 degrees Celsius. In some embodiments, a mixture of lithium salt and acid is heated to evaporate or distill off a volatile acid that is condensed at a temperature of about −100 degrees Celsius to about −50 degrees Celsius, −50 degrees Celsius to about 0 degrees Celsius, 0 degrees Celsius to about 50 degrees Celsius, about 50 degrees Celsius to about 100 degrees Celsius, about 100 degrees Celsius to about 150 degrees Celsius, about 150 degrees Celsius to about 200 degrees Celsius, about 200 degrees Celsius to about 300 degrees Celsius, about 300 degrees Celsius to about 500 degrees Celsius.

In an aspect, described herein is lithium production plant. This lithium production plant functions to contact a liquid resource with ion exchange particles so that the ion exchange particles can uptake lithium from the liquid resource, separate the ion exchange particles from the liquid resource, wash the particles with aqueous solution, separate the ion exchange particles from the aqueous solution, elute lithium out of the particles using a nitric acid solution, and yield lithium nitrate. The plant optionally combines the lithium nitrate with sodium hydroxide to crystallize lithium hydroxide. The plant optionally combines the lithium nitrate with sodium carbonate to crystallize lithium carbonate. The plant optionally produces a sodium nitrate byproduct for use in agricultural fertilizer or other applications. In some cases, the ion exchange particles are ion exchange beads, ion exchange material, coated ion exchange particles, porous ion exchange material, or other material capable of absorbing lithium from a liquid resource.

In an aspect, described herein is lithium production plant. This lithium production plant functions to contact a liquid resource with ion exchange particles so that the ion exchange particles can uptake lithium from the liquid resource, separate the ion exchange particles from the liquid resource, wash the particles with aqueous solution, separate the ion exchange particles from the aqueous solution, elute lithium out of the particles using a nitric acid solution, and yield lithium nitrate. The plant optionally combines the lithium nitrate with calcium hydroxide to crystallize lithium hydroxide. The plant optionally produces a calcium nitrate byproduct for use in agricultural fertilizer or other applications. In some cases, the ion exchange particles are ion exchange beads, ion exchange material, coated ion exchange particles, porous ion exchange material, or other material capable of absorbing lithium from a liquid resource.

In an aspect, described herein is a method for lithium production using the lithium production plants described above.

In some embodiments, nitric acid is used to elute lithium from ion exchange particles to produce a lithium nitrate eluate. In some embodiments, the lithium nitrate eluate is concentrated and then heated to produce a lithium nitrate molten salt. In some embodiments, the lithium nitrate molten salt is heated above its decomposition temperature to convert the lithium nitrate into lithium oxide and nitrogen oxide gas. In some embodiments, the nitrogen oxide gas is a mixture of nitrogen monoxide, nitrogen dioxide, oxygen, and/or other nitrogen oxide gases. In some embodiments, the lithium nitrate is heated in the presence of a catalyst to aid nitrate decomposition. In some embodiments, the nitrogen oxide gas is absorbed into an aqueous solution to form nitric acid which can be reused to elute the ion exchange particles. In some embodiments, the lithium oxide is reacted with water to form lithium hydroxide. In some embodiments, the lithium is purified to remove sodium, magnesium, calcium, boron, transition metals, or other impurities before or after the nitrate is decomposed into nitrogen oxide gas.

In some embodiments, nitric acid is used to elute lithium from ion exchange particles to produce a lithium nitrate eluate. In some embodiments, the lithium nitrate eluate is mixed with sulfuric acid. In some embodiments, the mixture of lithium nitrate and sulfuric acid is heated to distill off nitric acid, which can be condensed and reused to elute lithium from the ion exchange particles. In some embodiments, the mixture of lithium nitrate and sulfuric acid is heated to distill off nitric acid leaving behind a lithium sulfate. In some embodiments, the lithium sulfate is in a solid form. In some embodiments, the lithium sulfate is combined with water to form an aqueous lithium sulfate solution. In some embodiments, the lithium sulfate is combined with sodium hydroxide to crystallize a lithium hydroxide product. In some embodiments, the lithium sulfate is combined with sodium hydroxide to crystallize a lithium hydroxide product. In some embodiments, this process yields a sodium sulfate byproduct.

In some embodiments, an acid selected from the list of HF, HCl, HBr, or HI is used to elute lithium from ion exchange particles to produce a lithium halide eluate. In some embodiments, the lithium halide eluate is mixed with sulfuric acid. In some embodiments, the mixture of lithium halide and sulfuric acid is heated to distill off HF, HCl, HBr, or HI acid, which can be condensed and reused to elute lithium from the ion exchange particles. In some embodiments, the mixture of lithium halide and sulfuric acid is heated to distill off acid leaving behind a lithium sulfate. In some embodiments, the lithium sulfate is in a solid form. In some embodiments, the lithium sulfate is combined with water to form an aqueous lithium sulfate solution. In some embodiments, the lithium sulfate is combined with sodium hydroxide to crystallize a lithium hydroxide product. In some embodiments, the lithium sulfate is combined with sodium hydroxide to crystallize a lithium hydroxide product. In some embodiments, this process yields a sodium sulfate byproduct.

In some embodiments, nitric acid is used to elute lithium from ion exchange particles to produce a lithium nitrate eluate. In some embodiments, the lithium nitrate eluate is mixed with sodium hydroxide to crystallize a lithium hydroxide product. In some embodiments, the lithium nitrate eluate is mixed with sodium carbonate to precipitate a lithium carbonate product. In some embodiments, the lithium nitrate eluate is mixed with calcium hydroxide to precipitate a lithium hydroxide product. In some embodiments, these processes yield a sodium nitrate or calcium nitrate byproduct that can be used in agricultural fertilizer or other applications.

In some embodiments, the lithium oxide is precipitated along with other oxides such as magnesium oxide, calcium oxide, or sodium oxide. In some embodiments, the lithium oxide contains impurities and is mixed with other to form lithium hydroxide with impurities. In some embodiments, the lithium oxide contains impurities and is mixed with other to form aqueous lithium hydroxide with impurities. In some embodiments, magnesium hydroxide and calcium hydroxide impurities can be removed from a lithium hydroxide solution through filtration.

In some embodiments, the lithium salts may be aqueous, solid, or molten. In some embodiments, the lithium salts may be hydrated. In some embodiments, the lithium hydroxide may be a lithium hydroxide monohydrate powder.

In some embodiments, a lithium salt is heated in a spray dryer to form lithium solids and a volatile acidic gas. In some embodiments, lithium nitrate is decomposed in a spray dryer to form lithium oxide solids and nitrogen oxide gases. In some embodiments, a mixture of lithium nitrate and sulfuric acid is heated in a spray dryer to form lithium sulfate solids and nitric acid gas. In some embodiments, a mixture of lithium chloride and sulfuric acid is heated in a spray dryer to form lithium sulfate solids and hydrochloric acid gas.

In some embodiments, a lithium salt is decomposed in a rotary kiln to form lithium solids and a volatile acidic gas. In some embodiments, lithium nitrate is decomposed in a rotary kiln to form lithium oxide solids and nitrogen oxide gases. In some embodiments, a mixture of lithium nitrate and sulfuric acid is heated in a rotary kiln to form lithium sulfate solids and nitric acid gas. In some embodiments, a mixture of lithium chloride and sulfuric acid is heated in a rotary kiln to form lithium sulfate solids and hydrochloric acid gas.

In some embodiments, lithium hydroxide is crystallized using a series of crystallizers to remove nitrate, sodium, calcium, or other impurities from the lithium hydroxide product.

In some embodiments, nitrate byproduct is converted into a calcium nitrate substance for use in agricultural fertilizer. In some embodiments, sodium nitrate byproduct is converted into a calcium nitrate substance for use in agricultural fertilizer. In some embodiments, nitrate byproduct is converted into an ammonium calcium nitrate substance for use in agricultural fertilizer.

In some cases, a lithium salt solution is produced from an ion exchange unit and impurities are removed from the lithium salt solution before or after distillation of acidic gases. In some cases, a lithium salt solution is produced from an ion exchange unit and impurities are removed from the lithium salt solution before or after concentration of the lithium salt solution. In some cases, impurities are removed from a lithium salt solution using precipitation of hydroxides, precipitation of carbonates, ion exchange resins, or solvent extraction.

In some embodiments, a lithium salt such as lithium nitrate or lithium sulfate is dried using a continuous forced circulation crystallizer, a continuous draft tube crystallizer, a continuous cooling crystallizer, a vacuum crystallizer, a batch scraped surface evaporator, a mechanical vapor recompression system, or combinations thereof.

In some embodiments, a lithium salt such as lithium nitrate or lithium sulfate is decomposed using a batch rotary kiln, a continuous rotary kiln, a knocking system, a kiln with internal agitation, a kiln with internal milling media, a kiln with an internal impeller, an electric kiln, a gas kiln, a continuous pusher furnace, a box furnace with ceramic saggars, a continuous pusher furnace firing through box furnace on ceramic saggars, a continuous conveyer furnace, an Inconel conveyer, an air dehumidification system, a nitrogen blanket system, a catalyst, or combinations thereof. In some embodiments, a lithium salt such as lithium nitrate or lithium sulfate is decomposed using a catalyst selected from the list of platinum, platinum on activated carbon, platinum on silica, transition metal oxide, iron oxide, nickel oxide, cobalt oxide, manganese oxide, iridium, iridium on silica, platinum-copper-aluminum on silica, platinum-zinc-aluminum on silica, or combinations thereof. In some embodiments, nitrates, sulfates, or combinations thereof are decomposed through combustion of hydrogen or a hydrocarbon. In some embodiments, nitrates, sulfates, or combinations thereof are decomposed using microwave energy.

In some embodiments, nitrogen oxide gas is absorbed into a liquid scrubbing solution in a packed bed scrubber, a venturi scrubber, an ejection venturi scrubber, a spray tower, cyclone scrubbers, with addition of hydrogen peroxide into the scrubbing solution, tray columns, or combinations thereof. In some embodiments, the scrubbing solution is water, nitric acid, hydrogen peroxide, oxygen, other oxidants, or combinations thereof.

In some embodiments, sulfur oxide gas is absorbed into a liquid scrubbing solution in a packed bed scrubber, a venturi scrubber, an ejection venturi scrubber, a spray tower, cyclone scrubbers, with addition of hydrogen peroxide into the scrubbing solution, tray columns, or combinations thereof. In some embodiments, the scrubbing solution is water, sulfuric acid, hydrogen peroxide, oxygen, other oxidants, or combinations thereof.

In some embodiments, lithium oxide is converted to lithium hydroxide by addition of water using a continuous stirred tank reactor, a batch stirred tank reactor, or a plug flow reactor.

In some embodiments, sulfuric acid is added to a lithium salt solution to a concentration of over 25 wt % sulfuric acid. In some embodiments, sulfuric acid is added to a lithium salt solution using a batch agitated tank, a continuous agitated mixing tank, an injection quill direct to piping, or combinations thereof.

In some embodiments, volatile acid is removed from a salt solution using fractional distillation, air gap membrane distillation, sulfate descaling chemicals, or combinations thereof.

In some embodiments, water is removed from a salt solution using geothermal energy. In some embodiments, acid is distilled from a salt solution using geothermal energy. In some embodiments, lithium nitrate is melted using geothermal energy. In some embodiments, acid is separated from an aqueous solution using membrane distillation. In some embodiments, acid is separated from an aqueous solution using membrane distillation at temperature of around 40-90 degrees Celsius. In some embodiments, acid is separated from an aqueous solution using flat sheet membranes, capillary membranes, or combinations thereof. In some embodiments, acid is separated from an aqueous solution using membranes comprised of PTFE, polypropylene, PVTMS, or combinations thereof.

In some embodiments, nitric acid is distilled at a temperature of around 100 degrees Celsius to 140 degrees Celsius.

In some embodiments, trace nitrate from the nitric acid elution remains entrained in the ion exchange media and contaminates the brine. In some embodiments, nitrate is removed from the brine using ion exchange, biological remediation, or other methods of nitrate removal. In some embodiments, nitrate is removed from aqueous solution using strong base anion exchange resins, quarternary amine, triethyl amine resin, tributyl amine resin, or combinations thereof. In some embodiments, a nitrate absorbing ion exchange resin is regenerated with hydroxide, chloride, or combinations thereof.

In some embodiments, the redox potential of the ion exchange particles is controlled to minimize degradation of the ion exchange particles. In some embodiments, the redox potential of the brine is controlled to minimize degradation of the ion exchange particles. In some embodiments, the redox potential of the wash water is controlled to minimize degradation of the ion exchange particles. In some embodiments, the redox potential of the acidic solution used for elution is controlled to minimize degradation of the ion exchange particles. In some embodiments, the ion exchange particles are treated with sodium hypochlorite, sodium bisulfate, hydrogen peroxide, reductant, oxidant, or combinations thereof to control the oxidation state of metals in the ion exchange particles. In some embodiments, the ion exchange particles are treated with sodium hypochlorite, sodium bisulfate, hydrogen peroxide, reductant, oxidant, or combinations thereof to limit dissolution of metals from the ion exchange particles.

In some embodiments, the oxidation reduction potential of the brine, acidic solution, and/or wash water are controlled to minimize degradation of the ion exchange particles using additives selected from the following list: ascorbic acid, sodium ascorbate, citric acid, sodium citrate, acetic acid, sodium acetate, ethylenediaminetetraacetic acid, tetrasodium ethylenediaminetetraacetate, hydrogen peroxide, hypochlorous acid, sodium hypochlorite, chlorous acid, sodium chlorite, chloric acid, sodium chlorate, perchloric acid, sodium perchlorate, sodium bisulfate, sodium persulfate, sodium percarbonate, peracetic acid, sodium peracetate, reductants, oxidants, or combinations thereof. In some embodiments, the oxidation reduction potential of the brine, acidic solution, and/or wash water are controlled to minimize degradation of the ion exchange particles via sparging with gases selected from the following list: nitrogen, argon, hydrogen, carbon monoxide, carbon dioxide, air, $Cl_2$, chlorine dioxide, $O_2$, $O_3$, oxidizing gases, reducing gases, or combinations thereof. In some embodiments, the ion exchange particles are treated with ascorbic acid, sodium ascorbate, citric acid, sodium citrate, acetic acid, sodium acetate, ethylenediaminetetraacetic acid, tetrasodium ethylenediaminetetraacetate, hydrogen peroxide, hypochlorous acid, sodium hypochlorite, chlorous acid, sodium chlorite, chloric acid, sodium chlorate, perchloric acid, sodium perchlorate, sodium bisulfate, sodium persulfate, sodium percarbonate, peracetic acid, sodium peracetate, reductants, oxidants, or combinations thereof to control the oxidation state of metals in the ion exchange particles. In some embodiments, the ion exchange particles are treated with ascorbic acid, sodium ascorbate, citric acid, sodium citrate, acetic acid, sodium acetate, ethylenediaminetetraacetic acid, tetrasodium ethylenediaminetetraacetate, hydrogen peroxide, hypochlorous acid, sodium hypochlorite, chlorous acid, sodium chlorite, chloric acid, sodium chlorate, perchloric acid, sodium perchlorate, sodium bisulfate, sodium persulfate, sodium percarbonate, peracetic acid, sodium peracetate, reductants, oxidants, or combinations thereof to limit dissolution of metals from the ion exchange particles.

In some embodiments, nitric acid is used to elute lithium from ion exchange particles to produce a lithium nitrate eluate. In some embodiments, the lithium nitrate eluate is combined with sodium carbonate to crystallize lithium carbonate. In some embodiments, the sodium nitrate byproduct is mixed with sulfuric acid. In some embodiments, the mixture of sodium nitrate and sulfuric acid is heated to distill off nitric acid, which can be condensed and reused to elute lithium from the ion exchange particles. In some embodiments, the mixture of sodium nitrate and sulfuric acid is heated to distill off nitric acid leaving behind a sodium bisulfate which can be used for pH adjustments. In some embodiments, the distillation happens at around 83 degrees Celsius, at around 80-90 degrees Celsius, at around 70-100 degrees Celsius, at around 75-80 degrees Celsius, or combinations thereof. In some embodiments, distillation produces a red fuming nitric acid. In some embodiments, the red fuming nitric acid is converted to the white nitric acid at around 20 to 30 kPa. In some embodiments, the red fuming nitric acid is converted to the white nitric acid at (1) 27 kPa and (2) room temperature subsequently, or concurrently to produce less NOx.

In some embodiments, a metal carbonate form selected from the list of Na, Mg, Ca is combined with sodium carbonate to crystallize lithium carbonate. In some embodiments, the metal nitrate byproduct is mixed with sulfuric acid. In some embodiments, the mixture of metal nitrate and sulfuric acid is heated to distill off nitric acid, which can be condensed and reused to elute lithium from the ion exchange particles. In some embodiments, the mixture of metal nitrate and sulfuric acid is heated to distill off nitric acid leaving behind a metal sulfate compound.

In some embodiments the distillation columns can be composed of seven to fifteen trays. In some embodiments the reboiler uses 30-150 psig saturated steam. In some embodiment, the condenser uses 300-305 Kelvin cooling water. In some embodiments the reboiler uses 10-400 psig saturated steam. In some embodiment, the condenser uses 280-330 Kelvin cooling water. In some embodiments the reboiler will operate at 200-280 Kelvin. In some embodiments, the trays will vary from 190-250 Kelvin or 150-350 Kelvin in operating temperature. In some embodiments the reflux ratio (L/D) will vary from 0.15 up to 0.85. In some embodiments the reflux ratio (L/D) will vary from 0.05 up to 3.0.

In some embodiments, the nitrate from the nitric acid elution remains entrained in the ion exchange media and contaminates the lithium depleted brine. To avoid environmental impacts, nitrates are removed from the lithium depleted brine to a concentration below about 50 mg/L prior to its release or disposal. In some embodiments, nitrate is removed from the brine via nitrate reduction or physical removal. In some embodiments, nitrate reduction methods include biological remediation or chemical denitrification. Both methods of nitrate reduction involve an electron donor reducing nitrate into nitrogen gas or ammonium via a series of redox intermediates. In some embodiments, bioremediation involves adding microorganisms capable of digesting nitrates to the lithium depleted brine. The microorganism uses enzymes to reduce nitrate into nitrogen gas or ammonium via a series of redox intermediates. In some embodiments, bioremediation is accomplished by the heterotrophic anaerobic bacterium *Paracoccus denitrificans* or the autotrophic aerobic Gram-negative bacterium *Thiobacillus denitrificans*. In some embodiments, bioremediation can occur in the form of woodchip bioreactors, electro-biochemical reactors, membrane bioreactors, or moving bed bioreactors.

Chemical remediation involves using an electron donor to reduce nitrate to nitrogen gas or ammonium via a series of redox intermediates. In some embodiments, the possible electron donors include aluminum, zinc, and iron metals, iron (ii), ammonia, hydrazine, glucose, and hydrogen in the presence of a catalyst. In some embodiments, acid is added to the lithium depleted brine to increase the reaction rate, as protons are consumed by nitrate reduction. In some embodiments, chemical nitrate reduction utilizes nanoremediation technology or permeable reactive barrier technology. In nanoremediation, nanoparticles of zerovalent metals are used reduce or adsorb nitrate from the brine. In permeable reactive barrier, the brine flows through a permeable container filled with electron donor material.

In some embodiments, the physical removal of nitrates includes ion exchange, reverse osmosis, electrodialysis, and distillation. Reverse osmosis removes salts indiscriminately using pressure through a membrane. Electrodialysis removes salts relatively indiscriminately using an applied electrical potential through an ion exchange membrane. Distillation removes salts indiscriminately by boiling the solution and collecting the water vapor. Ion exchange selectively removes nitrates from the lithium depleted brine by using anion resins to adsorb nitrates. Selective anion resins have size-selective functional groups that selectively adsorb nitrate. In some embodiments, these functional groups are tributylamine or triethylamine. Ion exchange resins must be replaced, as defined by their cycle life. Physical nitrate removal methods produce a concentrated waste solution that must be disposed of. In some embodiments, the waste solution is treated with the nitrate reduction methods outlined above.

Embodiments for Limiting or Eliminating Precipitation of Impurities in the Eluate Solution In one embodiment, lithium and non-lithium impurities are absorbed from a lithium resource into an ion exchange material. In one embodiment, lithium and non-lithium impurities are eluted from an ion exchange material into an acidic solution. In one embodiment, lithium and non-lithium impurities are eluted from an ion exchange material into an acidic solution containing dissolved species that may precipitate at certain concentrations. In one embodiment, lithium and non-lithium impurities are eluted from an ion exchange material into an acidic solution containing dissolved species that may be reduced in concentration to avoid precipitation. In one embodiment, lithium and non-lithium impurities are eluted from an ion exchange material into an acidic solution where said non-lithium impurities may precipitate at certain concentrations.

In one embodiment, lithium and multivalent impurities are absorbed from a lithium resource into an ion exchange material. In one embodiment, lithium and multivalent impurities are eluted from an ion exchange material into an acidic solution. In one embodiment, lithium and multivalent impurities are eluted from an ion exchange material into an acidic solution containing sulfate anions. In one embodiment, lithium and multivalent impurities are eluted from an ion exchange material into an acidic solution containing sulfate anions such that the multivalent impurities and sulfate anions may react to form insoluble salts that can precipitate. In one embodiment, lithium and multivalent impurities are eluted from an ion exchange material into a solution containing sulfate anions such that the multivalent impurities and sulfate anions that may react to form insoluble salts that can precipitate. In one embodiment, lithium and multivalent cations are eluted from an ion exchange material into a solution containing sulfate anions wherein the concentrations of sulfate anions and multivalent cations are limited to avoid precipitation of insoluble sulfate compounds.

In one embodiment, lithium and multivalent cations are eluted from an ion exchange material into a solution containing sulfate anions wherein the concentrations of multivalent cations are limited to avoid precipitation of insoluble sulfate compounds. In one embodiment, lithium and multivalent cations are eluted from an ion exchange material into a solution containing sulfate anions wherein the concentrations of multivalent cations are limited using nanofiltration to avoid precipitation of insoluble sulfate compounds. In one embodiment, lithium and multivalent cations are eluted from a first ion exchange material into a solution containing sulfate anions wherein the concentrations of multivalent cations are decreased using a second ion exchange material to avoid precipitation of insoluble sulfate compounds. In one embodiment, lithium and multivalent cations are eluted from a first ion exchange material into a solution containing sulfate anions wherein the concentrations of multivalent cations are limited using a second ion exchange material that is selective for multivalent cations to avoid precipitation of insoluble sulfate compounds.

In one embodiment, lithium and multivalent cations are eluted from an ion exchange material into a solution containing sulfate anions wherein the concentrations of multivalent cations are decreased to avoid precipitation of insoluble sulfate compounds. In one embodiment, lithium and multivalent cations are eluted from an ion exchange material into a solution containing sulfate anions and the concentration of multivalent cations in the sulfate solution is decreased to avoid precipitation of insoluble sulfate compounds.

In one embodiment, a sulfate solution is contacted with an ion exchange material to elute lithium along with impurities, the sulfate solution is processed to reduce the concentration of impurities, and the sulfate solution is again contacted with an ion exchange material to elute more lithium along with impurities. In one embodiment, a sulfate solution is contacted with an ion exchange material to elute lithium along with impurities, the sulfate solution is processed to reduce the concentration of multivalent cations, and the sulfate solution is again contacted with an ion exchange material to elute more lithium along with impurities. In one embodiment, a sulfate solution is contacted with an ion exchange material to elute lithium along with impurities, the sulfate solution is processed to reduce the concentration of multivalent cations, the sulfate solution is again contacted with an ion exchange material to elute more lithium along with impurities, and the concentration of multivalent cations is maintained at a sufficiently low level to avoid precipitation of insoluble salts.

In one embodiment, a sulfate solution is contacted with an ion exchange material to elute a target metal along with impurities, the sulfate solution is processed to reduce the concentration of impurities, and the sulfate solution is again contacted with an ion exchange material to elute more of the target metal along with impurities. In one embodiment, a sulfate solution is contacted with an ion exchange material to elute a target metal along with impurities, the sulfate solution is processed to reduce the concentration of multivalent cations, and the sulfate solution is again contacted with an ion exchange material to elute more of the target metal along with impurities. In one embodiment, a sulfate solution is contacted with an ion exchange material to elute a target metal along with impurities, the sulfate solution is processed to reduce the concentration of multivalent cations, the sulfate solution is again contacted with an ion exchange material to elute more of the target metal along with impurities, and the concentration of multivalent cations is maintained at a sufficiently low level to avoid precipitation of insoluble salts.

In one embodiment, an acidic sulfate solution is contacted with an ion exchange material to elute lithium along with impurities, the acidic sulfate solution is processed to reduce the concentration of impurities, and the acidic sulfate solution is again contacted with an ion exchange material to elute more lithium along with more impurities. In one embodiment, the pH of the acidic sulfate solution is regulated to control elution of lithium and/or impurities. In one embodiment, pH of the acidic sulfate solution is regulated by measuring pH with a pH probe and adding sulfuric acid and/or a solution containing sulfuric acid to the acidic sulfate solution. In one embodiment, pH of the acidic sulfate solution is regulated adding sulfuric acid and/or a solution containing sulfuric acid to the acidic sulfate solution.

In one embodiment, the sulfate solution used to elute lithium from the ion exchange material is replaced with a different solution. In one embodiment, the sulfate solution used to elute lithium from the ion exchange material is replaced with a solution comprising sulfate, nitrate, phosphate, chloride, bromide, fluoride, borate, iodide, carbonate, or combinations thereof. In one embodiment, a solution comprising anions is contacted with an ion exchange material to elute lithium along with impurities, the solution is processed to reduce the concentration of impurities, and the solution is again contacted with an ion exchange material to elute more lithium along with impurities, where the anions are selected from a list including sulfate, nitrate, phosphate, chloride, bromide, fluoride, borate, iodide, carbonate, or combinations thereof.

In one embodiment, a fluidized bed of ion exchange material is contacted with brine to absorb lithium from the brine into the ion exchange material, the fluidized bed of ion exchange material is optionally washed to remove residual brine from the ion exchange material, the fluidized bed of ion exchange material is contacted with an acidic solution to elute lithium into the acidic solution, and multivalent impurities are removed from the acidic solution to avoid the formation of precipitates. In one embodiment, a fluidized bed of ion exchange material is contacted with brine to absorb lithium from the brine into the ion exchange material, the fluidized bed of ion exchange material is optionally washed to remove residual brine from the ion exchange material, the fluidized bed of ion exchange material is contacted with an acidic sulfate solution to elute lithium into the acidic solution, and multivalent impurities are removed from the acidic solution to avoid the formation of sulfate precipitates.

In one embodiment, a fluidized bed of ion exchange material is contacted with brine to absorb lithium from the brine into the ion exchange material, the fluidized bed of ion exchange material is optionally washed to remove residual brine from the ion exchange material, the fluidized bed of ion exchange material is contacted with an acidic solution to elute lithium into the acidic solution, and multivalent impurities are removed from the acidic solution by circulating the acidic solution from the fluidized bed to a unit for removing multivalent impurities before the acidic solution is returned to the fluidized bed. In one embodiment, a fluidized bed of ion exchange material is contacted with brine to absorb lithium from the brine into the ion exchange material, the fluidized bed of ion exchange material is optionally washed to remove residual brine from the ion exchange material, the fluidized bed of ion exchange material is contacted with an acidic solution to elute lithium into the acidic solution, and multivalent impurities are removed from the acidic solution by circulating the acidic solution from the fluidized bed to a nanofiltration unit for selective removal of multivalent impurities, and then the acidic solution is returned to the fluidized bed. In one embodiment, a fluidized bed of ion exchange material is contacted with brine to absorb lithium from the brine into the ion exchange material, the fluidized bed of ion exchange material is optionally washed to remove residual brine from the ion exchange material, the fluidized bed of ion exchange material is contacted with an acidic solution to elute lithium into the acidic solution, and multivalent impurities are removed from the acidic solution by circulating the acidic solution from the fluidized bed to a second ion exchange unit containing a second ion exchange material that is selective for removing multivalent impurities, and then the acidic solution is returned to the fluidized bed.

In one embodiment, a fluidized bed of ion exchange material is contacted with brine to absorb lithium from the brine into the ion exchange material, the fluidized bed of ion exchange material is optionally washed to remove residual brine from the ion exchange material, the fluidized bed of ion exchange material is contacted with an acidic solution to elute lithium into the acidic solution, and multivalent impurities are removed from the acidic solution by circulating the acidic solution from the fluidized bed to a unit for removing multivalent impurities before the acidic solution is passed to a second fluidized bed of ion exchange material for elution of more lithium into the acidic solution. In one embodiment, a fluidized bed of ion exchange material is contacted with brine to absorb lithium from the brine into the ion exchange material, the fluidized bed of ion exchange material is optionally washed to remove residual brine from the ion exchange material, the fluidized bed of ion exchange material is contacted with an acidic solution to elute lithium into the acidic solution, and multivalent impurities are removed from the acidic solution by circulating the acidic solution from the fluidized bed to a nanofiltration unit for selective removal of multivalent impurities, and then the acidic solution is passed to a second fluidized bed of ion exchange material for elution of more lithium into the acidic solution. In one embodiment, a fluidized bed of ion exchange material is contacted with brine to absorb lithium from the brine into the ion exchange material, the fluidized bed of ion exchange material is optionally washed to remove residual brine from the ion exchange material, the fluidized bed of ion exchange material is contacted with an acidic solution to elute lithium into the acidic solution, and multivalent impurities are removed from the acidic solution by circulating the acidic solution from the fluidized bed to a second ion exchange unit containing a second ion exchange material that is selective for removing multivalent impurities, and then the acidic solution is passed to a second fluidized bed of ion exchange material for elution of more lithium into the acidic solution. In one embodiment, the acidic solution flows through multiple fluidized beds of ion exchange material for elution of lithium and impurities, and impurities are removed from the acidic solution between the multiple fluidized beds. In one embodiment, the acidic solution flows through multiple fluidized beds of ion exchange material for elution of lithium and impurities, and impurities are removed from the acidic solution between the multiple fluidized beds using nanofiltration. In one embodiment, the acidic solution flows through multiple fluidized beds of a first ion exchange material which is lithium-selective for elution of lithium and impurities, and impurities are removed from the acidic solution between the multiple fluidized beds using a second ion exchange material that is selective for multivalent ions.

In one embodiment, a packed bed of ion exchange material is contacted with brine to absorb lithium from the brine into the ion exchange material, the packed bed of ion exchange material is optionally washed to remove residual brine from the ion exchange material, the packed bed of ion exchange material is contacted with an acidic solution to elute lithium into the acidic solution, and multivalent impurities are removed from the acidic solution to avoid the formation of precipitates. In one embodiment, a packed bed of ion exchange material is contacted with brine to absorb lithium from the brine into the ion exchange material, the packed bed of ion exchange material is optionally washed to remove residual brine from the ion exchange material, the packed bed of ion exchange material is contacted with an acidic sulfate solution to elute lithium into the acidic solution, and multivalent impurities are removed from the acidic solution to avoid the formation of sulfate precipitates.

In one embodiment, a packed bed of ion exchange material is contacted with brine to absorb lithium from the brine into the ion exchange material, the packed bed of ion exchange material is optionally washed to remove residual brine from the ion exchange material, the packed bed of ion exchange material is contacted with an acidic solution to elute lithium into the acidic solution, and multivalent impurities are removed from the acidic solution by circulating the acidic solution from the packed bed to a unit for removing multivalent impurities before the acidic solution is returned to the packed bed. In one embodiment, a packed bed of ion exchange material is contacted with brine to absorb lithium from the brine into the ion exchange material, the packed bed of ion exchange material is optionally washed to remove residual brine from the ion exchange material, the packed bed of ion exchange material is contacted with an acidic solution to elute lithium into the acidic solution, and multivalent impurities are removed from the acidic solution by circulating the acidic solution from the packed bed to a nanofiltration unit for selective removal of multivalent impurities, and then the acidic solution is returned to the packed bed. In one embodiment, a packed bed of ion exchange material is contacted with brine to absorb lithium from the brine into the ion exchange material, the packed bed of ion exchange material is optionally washed to remove residual brine from the ion exchange material, the packed bed of ion exchange material is contacted with an acidic solution to elute lithium into the acidic solution, and multivalent impurities are removed from the acidic solution by circulating the acidic solution from the packed bed to a second ion exchange unit containing a second ion exchange material that is selective for removing multivalent impurities, and then the acidic solution is returned to the packed bed.

In one embodiment, a packed bed of ion exchange material is contacted with brine to absorb lithium from the brine into the ion exchange material, the packed bed of ion exchange material is optionally washed to remove residual brine from the ion exchange material, the packed bed of ion exchange material is contacted with an acidic solution to elute lithium into the acidic solution, and multivalent impurities are removed from the acidic solution by circulating the acidic solution from the packed bed to a unit for removing multivalent impurities before the acidic solution is passed to a second packed bed of ion exchange material for elution of more lithium into the acidic solution. In one embodiment, a packed bed of ion exchange material is contacted with brine to absorb lithium from the brine into the ion exchange material, the packed bed of ion exchange material is optionally washed to remove residual brine from the ion exchange material, the packed bed of ion exchange material is contacted with an acidic solution to elute lithium into the acidic solution, and multivalent impurities are removed from the acidic solution by circulating the acidic solution from the packed bed to a nanofiltration unit for selective removal of multivalent impurities, and then the acidic solution is passed to a second packed bed of ion exchange material for elution of more lithium into the acidic solution. In one embodiment, a packed bed of ion exchange material is contacted with brine to absorb lithium from the brine into the ion exchange material, the packed bed of ion exchange material is optionally washed to remove residual brine from the ion exchange material, the packed bed of ion exchange material is contacted with an acidic solution to elute lithium into the acidic solution, and multivalent impurities are removed from the acidic solution by circulating the acidic solution from the packed bed to a second ion exchange unit containing a second ion exchange material that is selective for removing multivalent impurities, and then the acidic solution is passed to a second packed bed of ion exchange material for elution of more lithium into the acidic solution. In one embodiment, the acidic solution flows through multiple packed beds of ion exchange material for elution of lithium and impurities, and impurities are removed from the acidic solution between the multiple packed beds. In one embodiment, the acidic solution flows through multiple packed beds of ion exchange material for elution of lithium and impurities, and impurities are removed from the acidic solution between the multiple packed beds using nanofiltration. In one embodiment, the acidic solution flows through multiple packed beds of a first ion exchange material which is lithium-selective for elution of lithium and impurities, and impurities are removed from the acidic solution between the multiple packed beds using a second ion exchange material that is selective for multivalent ions.

In some embodiments, the packed beds may be partially or occasionally fluidized. In some embodiments, the fluidized beds may be partially or occasionally packed. In some embodiments, the packed or fluidized beds may be washed before and/or after contracting with brine and/or acid using water or washing solutions containing water, salt, chelating compounds, ethylenediaminetetraacetic acid, salt of ethylenediaminetetraacetate, compounds of ethylenediaminetetraacetate, and/or anti-scalants. In some embodiment, the acidic solution used to elute lithium from the lithium-selective ion exchange material may contain water, salt, chelating compounds, ethylenediaminetetraacetic acid, salt of ethylenediaminetetraacetate, compounds of ethylenediaminetetraacetate, and/or anti-scalants. In some embodiments, dilution water is used to limit and/or prevent formation of insoluble precipitates.

In some embodiments, multivalent impurities may be removed from a lithium salt solution using precipitation. In some embodiments, multivalent impurities may be removed from a lithium salt solution using precipitation through addition of base. In some embodiments, multivalent impurities may be removed from a lithium salt solution using precipitation through addition of sodium hydroxide, sodium carbonate, and/or other compounds.

In some embodiments, a lithium selective ion exchange material is contacted with a liquid resource to load lithium onto the lithium selective ion exchange material, the lithium selective ion exchange material is optionally washed to remove residual liquid resource from the selective ion exchange material, and the lithium selective ion exchange material is contacted with an acidic solution to elute lithium into the acidic solution. In some embodiments, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, more protons are added to the acidic solution, and the acidic solution is again contacted with the lithium selective ion exchange material to elute more lithium into the acidic solution. In some embodiments, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, more acid is added to the acidic solution, and the acidic solution is again contacted with the lithium selective ion exchange material to elute more lithium into the acidic solution. In some embodiments, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution in a first vessel, more protons are added to the acidic solution, and the acidic solution is again contacted with lithium selective ion exchange material to elute more lithium into the acidic solution in a second vessel. In some embodiments, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution in a vessel, more protons are added to the acidic solution, and the acidic solution is again contacted with lithium selective ion exchange material to elute more lithium into the acidic solution in the vessel.

In some embodiments, a lithium selective ion exchange material is contacted with a liquid resource to load lithium onto the lithium selective ion exchange material, the lithium selective ion exchange material is optionally washed to remove residual liquid resource from the selective ion exchange material, lithium selective ion exchange material is contacted with an acidic solution to elute lithium into the acidic solution, impurities are removed from the acidic solution, more protons are added to the acidic solution, and the acidic solution is again contacted with lithium selective ion exchange material to elute more lithium into the acidic solution. In some embodiments, a lithium selective ion exchange material is contacted with a liquid resource to load lithium onto the lithium selective ion exchange material, the lithium selective ion exchange material is optionally washed to remove residual liquid resource from the selective ion exchange material, lithium selective ion exchange material is contacted with an acidic solution to elute lithium into the acidic solution, more protons are added to the acidic solution, impurities are removed from the acidic solution, and the acidic solution is again contacted with lithium selective ion exchange material to elute more lithium into the acidic solution.

In some embodiments, a lithium selective ion exchange material is contacted with a liquid resource to load lithium onto the lithium selective ion exchange material, the lithium selective ion exchange material is optionally washed to remove residual liquid resource from the selective ion exchange material, lithium selective ion exchange material is contacted with an acidic solution to elute lithium into the acidic solution, impurities are removed from the acidic solution using nanofiltration or multivalent-selective ion exchange materials, more protons are added to the acidic solution, and the acidic solution is again contacted with lithium selective ion exchange material to elute more lithium into the acidic solution. In some embodiments, a lithium selective ion exchange material is contacted with a liquid resource to load lithium onto the lithium selective ion exchange material, the lithium selective ion exchange material is optionally washed to remove residual liquid resource from the selective ion exchange material, lithium selective ion exchange material is contacted with an acidic solution to elute lithium into the acidic solution, more protons are added to the acidic solution, impurities are removed from the acidic solution using nanofiltration or multivalent-selective ion exchange materials, and the acidic solution is again contacted with lithium selective ion exchange material to elute more lithium into the acidic solution.

In some embodiments, an acidic solution is contacted with a lithium selective ion exchange material that has previously been loaded with lithium by contacting the lithium selective ion exchange material with a liquid resource, the acidic solution is treated to remove multivalent impurities, and the acidic solutions is again contacted with a lithium selective ion exchange material that has previously been loaded with lithium by contacting the lithium selective ion exchange material with a liquid resource. In some embodiments, an acidic solution is contacted with a lithium selective ion exchange material to elute lithium, the acidic solution is treated to remove multivalent impurities, and the acidic solutions is again contacted with a lithium selective ion exchange material to elute lithium. In some embodiments, an acidic solution is contacted with a lithium selective ion exchange material to elute lithium, the acidic solution is treated to remove multivalent impurities, more protons are added to the acidic solution, and the acidic solutions is again contacted with a lithium selective ion exchange material to elute lithium. In some embodiments, an acidic solution is contacted with a lithium selective ion exchange material to elute lithium, more protons are added to the acidic solution, the acidic solution is treated to remove multivalent impurities, and the acidic solutions is again contacted with a lithium selective ion exchange material to elute lithium. In some embodiments, an acidic solution is contacted with a lithium selective ion exchange material to elute lithium in a vessel, the acidic solution is treated to remove multivalent impurities, and the acidic solutions is contacted with a lithium selective ion exchange material to elute lithium in said vessel. In some embodiments, an acidic solution is contacted with a lithium selective ion exchange material to elute lithium in a first vessel, the acidic solution is treated to remove multivalent impurities, and the acidic solutions is contacted with a lithium selective ion exchange material to elute lithium in a second vessel. In some embodiments, multivalent impurities are removed with a multivalent cation selective ion exchange material. In some embodiments, multivalent impurities are removed using nanofiltration membranes. In some embodiments, the lithium selective ion exchange materials is in a tank, a column, or a stirred tank reactor. In some embodiments, the lithium selective ion exchange material is in a fixed or fluidized bed.

In some embodiments, an acidic solution is flowed through multiple vessels loaded with a lithium selective ion exchange material to elute lithium. In some embodiments, an acidic solution is flowed through multiple vessels loaded with a lithium selective ion exchange material to elute lithium and multivalent cation impurities are removed between the vessels. In some embodiments, an acidic solution is flowed through multiple vessels loaded with a lithium selective ion exchange material to elute lithium. In some embodiments, an acidic solution is flowed through multiple vessels loaded with a lithium selective ion exchange material to elute lithium, multivalent cation impurities are removed between the multiple vessels, and more protons are added to the acid solution between the multiple vessels. In some embodiments, an acidic solution is recirculated through a vessel loaded a lithium selective ion exchange material to elute lithium. In some embodiments, an acidic solution is recirculated through a vessel loaded a lithium selective ion exchange material to elute lithium and multivalent cation impurities are removed between the recirculations. In some embodiments, an acidic solution is recirculated through a vessel loaded a lithium selective ion exchange material to elute lithium, multivalent cation impurities are removed between the recirculations, and more protons are added to the acid solution between the recirculations.

In some embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, and the acidic solution is prepared in an acidic solution mixing unit. In one embodiment, the acidic solution mixing unit is a tank, an in-line mixing device, a stirred tank reactor, another mixing unit, or combinations thereof. In one embodiment, the acid solution mixing tank is used to service one vessel containing lithium selective ion exchange material. In one embodiment, the acid solution mixing tank is used to service multiple vessels containing lithium selective ion exchange material in parallel or series. In one embodiment, the acid solution mixing tank is used to service multiple vessels containing lithium selective ion exchange material in sequence.

In one embodiment, the acidic solution is comprised of sulfuric acid, phosphoric acid, hydrochloric acid, hydrobromic acid, carbonic acid, nitric acid, or combinations thereof. In one embodiment, lithium is eluted from a lithium selective ion exchange material using sulfuric acid, phosphoric acid, hydrochloric acid, nitric acid, or combinations thereof. In one embodiment, lithium is eluted from a lithium selective ion exchange material using an acid solution comprising sulfate, phosphate, nitrate, borate, or combinations thereof.

In some embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are removed using a combination of nanofiltration, multivalent cation selective ion exchange material, other methods of removing multivalent impurities, or combinations thereof. In one embodiment, impurities are removed from an acidic lithium solutions using combinations of nanofiltration, multivalent cation selective ion exchange material, other methods of removing multivalent impurities in parallel, series, or combinations thereof.

In some embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are removed from the acidic solution using nanofiltration membrane units arranged in series and/or parallel, more protons are added to the acidic solution, and the acid solutions is contacted with lithium selective ion exchange material to elute more lithium into the acidic solution. In one embodiment, anti-scalants, chelants, or other means of anti-scaling are used to avoid scaling in the nanofiltration membrane units.

In some embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are removed from the acidic solution using multivalent cation selective ion exchange materials, more protons are added to the acidic solution, and the acid solutions is contacted with lithium selective ion exchange material to elute more lithium into the acidic solution. In some embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are removed from the acidic solution using multivalent cation selective ion exchange material in a packed bed, more protons are added to the acidic solution, and the acid solutions is contacted with lithium selective ion exchange material to elute more lithium into the acidic solution. In some embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are removed from the acidic solution using multivalent cation selective ion exchange material arranged in a network of columns, more protons are added to the acidic solution, and the acid solutions is contacted with lithium selective ion exchange material to elute more lithium into the acidic solution. In some embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are removed from the acidic solution using multivalent cation selective ion exchange material arranged in a network of columns with a first absorption column position for absorbing impurities and a last absorption column position for absorbing trace amounts of impurities, more protons are added to the acidic solution, and the acid solutions is contacted with lithium selective ion exchange material to elute more lithium into the acidic solution. In some embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are removed from the acidic solution using multivalent cation selective ion exchange material arranged in a lead-lag configuration, and the acid solutions is contacted with lithium selective ion exchange material to elute more lithium into the acidic solution. In one embodiment, a multivalent cation selective ion exchange material is arranged in a variation of a lead-lag setup. In one embodiment, a multivalent cation selective ion exchange material is eluted using a second acidic solution. In one embodiment, a multivalent cation selective ion exchange material is eluted using hydrochloric acid. In one embodiment, a multivalent cation selective ion exchange material is regenerated using sodium hydroxide. In one embodiment, a multivalent cation selective ion exchange material is operated in stirred tank reactors, fluidized beds, or packed beds arranged in series and/or parallel. In one embodiment, a lithium selective ion exchange material is operated in stirred tank reactors, fluidized beds, or packed beds arranged in series and/or parallel.

In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are removed from the acidic solution by adding phosphate to precipitate phosphate compounds, more protons are added to the acidic solution, and the acid solutions is contacted with lithium selective ion exchange material to elute more lithium into the acidic solution. In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are removed from the acidic solution by adding phosphoric acid to precipitate phosphate compounds, more protons are added to the acidic solution, and the acid solutions is contacted with lithium selective ion exchange material to elute more lithium into the acidic solution. In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, Ca, Mg, Sr, and/or Ba are removed from the acidic solution by adding phosphoric acid to precipitate Ca, Mg, Sr, and/or Ba phosphate compounds, more protons are added to the acidic solution, and the acid solutions is contacted with lithium selective ion exchange material to elute more lithium into the acidic solution.

In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, multivalent impurities are precipitated from the acidic solution by adding oxalate, oxalic acid, citrate, citric acid, or combinations thereof, more protons are added to the acidic solution, and the acid solutions is contacted with lithium selective ion exchange material to elute more lithium into the acidic solution. In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, multivalent impurities are precipitated from the acidic solution by adding a precipitant comprising oxalate, oxalic acid, citrate, citric acid, or combinations thereof, the precipitant concentration is decreased by adding cations to the acidic solution, more protons are added to the acidic solution, and the acid solutions is contacted with lithium selective ion exchange material to elute more lithium into the acidic solution.

In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, multivalent impurities are precipitated and removed from the acidic solution by adding oxalate, oxalate anions are precipitated and removed from the acidic solution by adding zinc, iron, manganese, other transition metals, other cations, or combinations thereof, more protons are added to the acidic solution, and the acid solutions is contacted with lithium selective ion exchange material to elute more lithium into the acidic solution. In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, multivalent impurities are precipitated and removed from the acidic solution by adding citrate, citrate anions are precipitated and removed from the acidic solution by adding cations, more protons are added to the acidic solution, and the acid solutions is contacted with lithium selective ion exchange material to elute more lithium into the acidic solution.

In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, cation impurities are precipitated from the acidic solution by adding anion precipitants, more protons are added to the acidic solution, and the acid solutions is contacted with lithium selective ion exchange material to elute more lithium into the acidic solution. In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, cation impurities are precipitated and removed from the acidic solution by adding anion precipitants, the anions precipitants are precipitated and removed from the acidic solution by adding cation precipitants, more protons are added to the acidic solution, and the acid solutions is contacted with lithium selective ion exchange material to elute more lithium into the acidic solution.

In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are precipitated by temporarily reducing the temperature of the acidic solution, more protons are added to the acidic solution, and the acid solutions is contacted with lithium selective ion exchange material to elute more lithium into the acidic solution. In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are precipitated by changing the temperature of the acidic solution, more protons are added to the acidic solution, and the acid solutions is contacted with lithium selective ion exchange material to elute more lithium into the acidic solution. In one embodiment, a lithium selective ion exchange material is contacted with a liquid resource to load lithium onto the lithium selective ion exchange material, the lithium selective ion exchange material is optionally washed to remove residual liquid resource from the selective ion exchange material, the lithium selective ion exchange material is contacted with an acidic solution to elute lithium into the acidic solution, impurities are precipitated by decreasing the temperature of the acidic solution, protons are added to the acidic solution and the acidic solution is heated or allowed to warm, and the acid solutions is contacted with lithium selective ion exchange material to elute more lithium into the acidic solution.

In one embodiment, a chelating agent or anti-scalant is used to form a soluble complex to avoid precipitation in an acidic lithium solution. In one embodiment, a chelating agent or anti-scalant is used to form a soluble complex to avoid or redissolve precipitates. In one embodiment, a chelating agent or anti-scalants is used to limit or reduce precipitation of multivalent cations and the chelating agent or antiscalant is selected from the list of ethylenediaminetetraacetic acid (EDTA), disodium EDTA, calcium disodium EDTA, tetrasodium EDTA, citric acid, maleic acid, silicate compounds, amorphous silicate compounds, crystalline layered silicate compounds, phosphonic acid compounds, aminotris(methylenephosphonic acid) (ATMP), nitrilotrimethylphosphonic acid (NTMP), ethylenediamine tetra (methylene phosphonic acid) (EDTMP), diethylenetriamine penta(methylene phosphonic acid) (DTPMP), polyphosphonate, polyacrylate, polyacrylic acid, nitrilotriacetic acid (NTA), sodium hexametaphosphate (SHMP), or combinations thereof. In one embodiment, a threshold inhibitor is used to block development of nuclei in an acidic lithium solution. In one embodiment, a retarded is used to block the growth of precipitates in an acidic lithium solution. In one embodiment, compounds are used to limit, control, eliminate, or redissolve precipitates including phosphinopolycarboxylic acid, sulfonated polymer, polyacrylic acid, p-tagged sulfonated polymer, diethylenetriamine penta, bis-hexamethylene triamine, compounds thereof, modifications thereof, or combinations thereof.

In one embodiment, the acidic solution comprises lithium sulfate, lithium hydrogen sulfate, sulfuric acid, or combinations thereof. In one embodiment, the acidic solution comprises lithium sulfate, lithium hydrogen sulfate, sulfuric acid, lithium chloride, hydrochloric acid, lithium nitrate, nitric acid, lithium phosphate, lithium hydrogen phosphate, lithium dihydrogen phosphate, phosphoric acid, lithium bromide, bromic acid, or combinations thereof.

In some embodiments, lithium and other metals are recovered from the liquid resource. In some embodiments, the methods described for lithium recovery are applied to recover other metals.

Some Embodiments of the Disclosure

Herein are provided some embodiments of the disclosure that should not be construed as limiting with respect to the scope of the present disclosure.

Embodiment 1: A system for extracting lithium from a liquid resource, comprising:
  a. a first subsystem configured to contact an ion exchange material to a liquid resource, wherein said ion exchange material absorbs lithium ions from said liquid resource;
  b. a second subsystem configured to contact an acidic solution to said ion exchange material, wherein said ion exchange material releases the absorbed lithium into the acidic solution to yield a lithium eluate;
  c. a third subsystem configured to contact a chemical additive with said liquid resource, a wash solution, said acidic solution, said ion exchange material, or any combination thereof;
  d. an optional fourth system configured to contact said wash solution to said ion exchange material.

Embodiment 2: The system of Embodiment 1, wherein the chemical additive adjusts the oxidation-reduction potential of said liquid resource, said wash solution, said acidic solution, said ion exchange material, or any combination thereof.

Embodiment 3: The system of Embodiment 1, wherein the chemical additive adjusts the oxidation-reduction potential of said liquid resource.

Embodiment 4: The system of Embodiment 1, wherein the chemical additive adjusts the oxidation-reduction potential of said aqueous wash solution.

Embodiment 5: The system of Embodiment 1 wherein the chemical additive adjusts the oxidation-reduction potential of said acidic solution.

Embodiment 6: The system of any one of Embodiments 1-5, wherein the chemical additive contacts said ion exchange material.

Embodiment 7: The system of Embodiment 6, wherein the chemical additive is an oxidant.

Embodiment 8: The system of Embodiment 7, wherein said oxidant comprises oxygen, air, ozone, hydrogen peroxide, fluorine, chlorine, bromine, iodine, a nitrate compound, sodium hypochlorite, bleach, a chlorite, a chlorate, a perchlorate, potassium permanganate, a permanganate, sodium perborate, a perborate, or combinations thereof.

Embodiment 9: The system of Embodiment 8, wherein said oxidant comprises oxygen, air, ozone, hydrogen peroxide, fluorine, chlorine, bromine, iodine, sodium hypochlorite, sodium chlorate, sodium perchlorate, potassium permanganate, sodium permanganate, sodium perborate, potassium perborate, or combinations thereof.

Embodiment 10: The system of Embodiment 9, wherein said oxidant comprises oxygen, ozone, hydrogen peroxide, fluorine, chlorine, bromine, iodine, sodium hypochlorite, potassium permanganate, a permanganate, sodium perborate, or combinations thereof.

Embodiment 11: The system of Embodiment 10, wherein said oxidant comprises oxygen, air, hydrogen peroxide, or sodium hypochlorite.

Embodiment 12: The system of Embodiment 11, wherein said oxidant comprises sodium hypochlorite.

Embodiment 13: The system of any of the Embodiments 1-6, wherein the redox agent in a reductant.

Embodiment 14: The system of Embodiment 13, wherein said reductant comprises sodium bisulfite, sodium metabisulfite, sodium borohydride, formic acid, ascorbic acid, oxalic acid, potassium iodide, hydrogen, lithium aluminum hydride, calcium hydride, sodium bicarbonate, manganese, zinc, or combinations thereof.

Embodiment 15: The system of Embodiment 13, wherein said reductant comprises sodium bisulfite, sodium metabisulfite, sodium borohydride, formic acid, ascorbic acid, oxalic acid, lithium aluminum hydride, calcium hydride, sodium bicarbonate, magnesium powder, zinc powder, or combinations thereof.

Embodiment 16: The system of Embodiment 13, wherein said reductant comprises sodium bisulfite, sodium metabisulfite, sodium borohydride, or combinations thereof.

Embodiment 17: The system of Embodiment 13, wherein said reductant comprises sodium metabisulfite.

Embodiment 18: The system of any of the Embodiments 1-17, wherein the third subsystem is an electrochemical system.

Embodiment 19: The system of Embodiment 18, wherein the oxidation-reduction potential of said liquid resource is adjusted in said electrochemical system.

Embodiment 20: The system of Embodiment 18, wherein the oxidation-reduction potential of said wash solution is adjusted in said electrochemical system.

Embodiment 21: The system of Embodiment 18, wherein the oxidation-reduction potential of said acidic solution is adjusted in said electrochemical system.

Embodiment 22: The system of any of the Embodiments 18-21, wherein said electrochemical system comprises an electrolysis cell.

Embodiment 23: The system of any of the Embodiments 18-22, wherein said electrochemical system produces an oxidant, a reductant, or a combination thereof.

Embodiment 24: The system of Embodiment 23, wherein said electrochemical system produces sodium hypochlorite.

Embodiment 25: The system of Embodiment 23, wherein said electrochemical system produces ozone.

Embodiment 26: The system of Embodiment 23, wherein said electrochemical system comprises an electrochlorination cell.

Embodiment 27: The system of Embodiment 23, wherein said electrochemical system comprises a chlor-alkali cell.

Embodiment 28: The system of any of the Embodiments 1-27, wherein said ion exchange material comprises $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, modifications thereof, solid solutions thereof, or a combination thereof.

Embodiment 29: The system of Embodiment 28, wherein said ion exchange material is a coated ion exchange material with a coating that is selected from an oxide, a polymer, or combinations thereof.

Embodiment 30: The system of any of the Embodiments 28 or 29, wherein said ion exchange material is a coated ion exchange material with a coating that is selected from $SiO_2$, $TiO_2$, $ZrO_2$, polyvinylidene difluoride, polyvinyl chloride, polystyrene, polybutadiene, polydivinylbenzene, or combinations thereof.

Embodiment 31 The system of any of the Embodiments 1-30, wherein the chemical additive increases the oxidation state of the metals in said ion exchange material.

Embodiment 32: The system of any of the Embodiments 1-30 wherein the chemical additive decreases the oxidation state of the metals in said ion exchange material.

Embodiment 33: The system of any of the Embodiments 1-30, wherein the chemical additive modulates the oxidation state of metals in said ion exchange material to decrease the solubility of said metals.

Embodiment 34: The system of any of the Embodiments 1-30, wherein the chemical additive modulates the oxidation state of metals in said ion exchange material to decrease the rate of dissolution of said metals.

Embodiment 35: The system of any of the Embodiments 1-34, wherein the liquid resource is a natural brine, a pretreated brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

Embodiment 36: The system of any of the Embodiments 1-35, wherein the acidic solution comprises hydrochloric acid, sulfuric acid, nitric acid, phosphoric acid, hydrobromic acid, hydroiodic acid, perchloric acid, acetic acid, or a combination thereof.

Embodiment 37: The system of any of the Embodiments 1-36, wherein the liquid resource that has contacted the ion exchange material is contacted with a chemical additive.

Embodiment 38: The system of Embodiment 37, wherein said contact adjusts the oxidation-reduction potential of the liquid resource.

Embodiment 39: The system of any of the Embodiments 1-38, wherein the aqueous wash solution that has contacted the ion exchange material is contacted with a chemical additive.

Embodiment 40: The system of Embodiment 39, wherein said contact adjusts the oxidation-reduction potential of the aqueous wash solution.

Embodiment 41: The system of any of the Embodiments 1-40, wherein the acidic solution that has contacted the ion exchange material is contacted with a chemical additive.

Embodiment 42: The system of Embodiment 41, wherein said contact adjusts the oxidation-reduction potential of the acidic solution.

Embodiment 43: The system of any of the Embodiments 1-42, wherein the liquid resource is contacted with the chemical additive prior to contact with the ion exchange material, and the liquid resource is treated to remove at least a portion of the chemical additive added prior to contact with the ion exchange material.

Embodiment 44: The system of any of the Embodiments 1-42, wherein the aqueous wash solution is contacted with the chemical additive prior to contact with the ion exchange material, and the aqueous wash solution is treated to remove at least a portion of the chemical additive added prior to contact with the ion exchange material.

Embodiment 45: The system of any of the Embodiments 1-42, wherein the acidic solution is contacted with the chemical additive prior to contact with the ion exchange material, and the acidic solution is treated to remove at least a portion of the chemical additive added prior to contact with the ion exchange material.

Embodiment 46: The system of any of the Embodiments 1-42, wherein the chemical additive is sodium hypochlorite, and at least a portion of the sodium hypochlorite is removed by contacting said liquid resource with granular activated carbon.

Embodiment 47: The system of any of the Embodiments 1-46, wherein the chemical additive is sodium hypochlorite, and at least a portion of the sodium hypochlorite is removed by treatment with sodium metabisulfite, sodium bisulfite, ascorbic acid, air, ultraviolet light, heat, or any combinations thereof.

Embodiment 48: The system of any of the Embodiments 42-45, wherein said removal occurs by contacting granular activated carbon.

Embodiment 49: The system of any of the Embodiments 42-45, wherein said removal occurs by contacting a transition metal.

Embodiment 50: The system of Embodiment 49, wherein said transition metal comprises an oxide of cobalt, nickel, manganese, iron, copper, palladium, platinum, rubidium, lead, or a combination thereof in solution.

Embodiment 51: The system of Embodiment 49, wherein said transition metal comprises a solution of cobalt, nickel, manganese, iron, copper, palladium, platinum, rubidium, lead or a combination thereof.

Embodiment 52: The system of any of the Embodiments 1-51, wherein the liquid resource is treated in an agitated vessel.

Embodiment 53: The system of any of the Embodiments 1-51, wherein the liquid resource is treated in a pond.

Embodiment 54: The system of any of the Embodiments 1-51, wherein the liquid resource is treated in a container that maximizes the surface area of the liquid.

Embodiment 55: The system of any of the Embodiments 1-54, wherein the ion exchange material exhibits greater selectivity for lithium in the presence of the chemical additive.

Embodiment 56: The system of any of the Embodiments 1-54, wherein the ion exchange material exhibits enhanced durability, longer service life, longer cycle life, or combinations thereof in the presence of the chemical additive.

Embodiment 57: The system of any of the Embodiments 1-54, wherein the ion exchange material exhibits a higher lithium ion exchange capacity in the presence of the chemical additive.

Embodiment 58: The system of any of the Embodiments 1-57, wherein the addition of the chemical additive in said third subsystem adjusts the value of the oxidation-reduction potential to a value greater than about 0 mV and less than about 100 mV.

Embodiment 59: The system of any of the Embodiments 1-57, wherein the addition of the chemical additive in said third subsystem adjusts the value of the oxidation-reduction potential to a value greater than about 0.0 mV and less than about 1,000 mV.

Embodiment 60: The system of any of the Embodiments 1-57, wherein the addition of the chemical additive in said third subsystem adjusts the value of the oxidation-reduction potential to a value greater than about 0.0 mV and less than about 300 mV.

Embodiment 61: The system of any of the Embodiments 1-57, wherein the addition of the chemical additive in said third subsystem adjusts the value of the oxidation-reduction potential to a value greater than about 300 mV and less than about 600 mV.

Embodiment 62: The system of any of the Embodiments 1-57, wherein the addition of the chemical additive in said third subsystem adjusts the value of the oxidation-reduction potential to a value greater than about 600 mV and less than about 1,000 mV.

Embodiment 63: A process for extracting lithium from a liquid resource, comprising:
a. contacting an ion exchange material to a liquid resource, wherein said ion exchange material absorbs lithium ions from said liquid resource;
b. contacting an acidic solution to said ion exchange material, wherein said ion exchange material releases the absorbed lithium into the acidic solution to yield a lithium eluate;
c. contacting a chemical additive with said liquid resource, a wash solution, said acidic solution, said ion exchange material. or any combination thereof;
d. optionally contacting said aqueous wash solution to said ion exchange material or lithiated ion exchange material.

Embodiment 64: The process of Embodiment 63, wherein the chemical additive adjusts the oxidation-reduction potential of said liquid resource, said wash solution, said acidic solution, said ion exchange material, or any combination thereof.

Embodiment 65: The process of any of the Embodiments 63-64, wherein the chemical additive is an oxidant.

Embodiment 66: The process of Embodiment 65, wherein said oxidant comprises oxygen, air, ozone, hydrogen peroxide, fluorine, chlorine, bromine, iodine,—a nitrate compound, sodium hypochlorite, bleach, a chlorite, a chlorate, a perchlorate, potassium permanganate, a permanganate, sodium perborate, a perborate, mixtures thereof or combinations thereof.

Embodiment 67: The process of Embodiment 65, wherein said oxidant comprises sodium hypochlorite.

Embodiment 68: The process of any of the Embodiments 63-64, wherein the chemical additive is a reductant.

Embodiment 69: The process of Embodiment 68, wherein said reductant comprises sodium bisulfite, sodium metabisulfite, sodium borohydride, formic acid, ascorbic acid, oxalic acid, potassium iodide, other reducing species, mixtures thereof, or combinations thereof.

Embodiment 70: The process of any of the Embodiments 63-69, wherein the chemical additive is produced by applying an electric voltage to said liquid resource.

Embodiment 71: The process of any of the Embodiments 63-69, wherein the chemical additive is produced by applying an electric voltage to said wash solution.

Embodiment 72: The process of any of the Embodiments 63-69, wherein the chemical additive is produced by applying an electric voltage to said acidic solution.

Embodiment 73: The process of Embodiment 65, wherein the oxidant is produced by applying an electric voltage to said liquid resource.

Embodiment 74: The process of Embodiment 68, wherein the reductant is produced by applying an electric voltage to said liquid resource.

Embodiment 75: The process of any of Embodiments 63-74, wherein the chemical additive is produced in an electrochemical system.

Embodiment 76: The process of Embodiment 75, wherein said electrochemical system comprises an electrolysis cell.

Embodiment 77: The process of Embodiment 75, wherein said electrochemical cell produces sodium hypochlorite.

Embodiment 78: The process of Embodiment 75, wherein said electrochemical cell produces ozone.

Embodiment 79: The process of Embodiment 75, wherein said electrochemical cell comprises an electro*chlorination cell.

Embodiment 80: The process of Embodiment 75, wherein said electrochemical cell comprises a chlor-alkali cell.

Embodiment 81: The process of any of the Embodiments 63-80, wherein said ion exchange material comprises $LiFePO_4$, $LiMnPO_4$, $Li_2MO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $Li_7Ti_{11}O_{24}$, $Li_3VO_4$, $Li_2Si_3O_7$, $Li_2CuP_2O_7$, modifications thereof, solid solutions thereof, or a combination thereof.

Embodiment 82: The process of Embodiment 81, wherein said ion exchange material is a coated ion exchange material with a coating that is selected from an oxide, a polymer, or combinations thereof.

Embodiment 83: The process of any of the Embodiments 81 to 82, wherein said ion exchange material is a coated ion exchange material with a coating that is selected from $SiO_2$, $TiO_2$, $ZrO_2$, polyvinylidene difluoride, polyvinyl chloride, polystyrene, polybutadiene, polydivinylbenzene, or combinations thereof.

Embodiment 84: The process of any of the Embodiments 63-83, wherein the chemical additive increases the oxidation state of the metals in said ion exchange material.

Embodiment 85: The process of any of the Embodiments 63-83, wherein the chemical additive decreases the oxidation state of the metals in said ion exchange material.

Embodiment 86: The process of any of the Embodiments 63-83, wherein said chemical additive modulates the oxidation state of metals in said ion exchange material to decrease the solubility of said metals.

Embodiment 87: The process of any of the Embodiments 63-83, wherein said chemical additive modulates the oxidation state of metals in said ion exchange material to decrease the rate of dissolution of said metals.

Embodiment 88: The process of any of the Embodiments 63-87, wherein the liquid resource is a natural brine, a pretreated brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, or combinations thereof.

Embodiment 89: The process of any of the Embodiments 63-88, wherein the acidic solution comprises hydrochloric acid, sulfuric acid, nitric acid, phosphoric acid, hydrobromic acid, hydroiodic acid, perchloric acid, acetic acid, or a combination thereof.

Embodiment 90: The process of any of the Embodiments 63-89, wherein the liquid resource is contacted with the chemical additive prior to contact with the ion exchange material, and the liquid resource is treated to remove at least a portion of the chemical additive added prior to contact with the ion exchange material.

Embodiment 91: The process of Embodiment 90, wherein the liquid resource having contacted said ion exchange material is then treated with granular activated carbon.

Embodiment 92: The process of any of the Embodiments 90-91, wherein the liquid resource having contacted said ion exchange material is then treated with sodium metabisulfite, sodium bisulfite, ascorbic acid, air, ultraviolet light, heat, or combinations thereof.

Embodiment 93: The process of any of the Embodiments 90-92, wherein the chemical additive is sodium hypochlorite, and at least a portion of the sodium hypochlorite is removed from the liquid resource 1 by contacting said liquid resource with granular activated carbon.

Embodiment 94: The process of any of the Embodiments 90-93, wherein the chemical additive is sodium hypochlorite, and at least a portion of the sodium hypochlorite is removed from the liquid resource by contacting said liquid resource with sodium metabisulfite, sodium bisulfite, ascorbic acid, air, ultraviolet light, heat, or combinations thereof.

Embodiment 95: The process of Embodiment 90, wherein said removal occurs by contacting the liquid resource having contacted said ion exchange material with a transition metal.

Embodiment 96: The process of Embodiment 95, wherein said transition metal comprises an oxide of cobalt, nickel, manganese, iron, copper, palladium, platinum, rubidium, lead, or a combination thereof in solution.

Embodiment 97: The process of Embodiment 95, wherein said transition metal comprises an oxide of cobalt, nickel, manganese, iron, copper, palladium, platinum, rubidium, lead or a combination thereof in solution.

Embodiment 98: The process of any of the Embodiments 63-97, wherein the liquid resource is treated in an agitated vessel.

Embodiment 99: The process of any of the Embodiments 63-97, wherein the liquid resource is treated in a pond.

Embodiment 100: The process of any of the Embodiments 63-97, wherein the liquid resource is treated in a container that maximizes the surface area of the liquid.

Embodiment 101: The process of any of the Embodiments 63-100, wherein the ion exchange material exhibits greater selectivity for lithium when the ion exchange material has contacted said chemical additive.

Embodiment 102: The process of any of the Embodiments 63-100, wherein the ion exchange material exhibits longer lifetime when the ion exchange material has contacted said chemical additive.

Embodiment 103: The process of any of the Embodiments 63-100, wherein the ion exchange material exhibits a higher absorption capacity when the ion exchange material has contacted said chemical additive.

Embodiment 104: The process of any of the Embodiments 63-103, wherein the oxidation-reduction potential of the liquid resource contacting the ion exchange material is greater than about 0 mV and less than about 100 mV.

Embodiment 105: The process of any of the Embodiments 63-103, wherein the oxidation-reduction potential of the liquid resource contacting the ion exchange material is greater than about 0.0 mV and less than about 1,000 mV.

Embodiment 106: The process of any of the Embodiments 63-103, wherein the oxidation-reduction potential of the liquid resource contacting the ion exchange material is greater than about 0.0 mV and less than about 300 mV.

Embodiment 107: The process of any of the Embodiments 63-103, wherein the oxidation-reduction potential of the liquid resource contacting the ion exchange material is greater than about 300 mV and less than about 600 mV.

Embodiment 108: The process of any of the Embodiments 63-103, wherein the oxidation-reduction potential of the liquid resource contacting the ion exchange material is greater than about 600 mV and less than about 1,000 mV.

Embodiment 109: The process of any of the Embodiments 63-103, wherein the oxidation-reduction potential of the aqueous wash solution contacting the ion exchange material is greater than about 0 mV and less than about 100 mV.

Embodiment 110: The process of any of the Embodiments 63-103, wherein the oxidation-reduction potential of the aqueous wash solution contacting the ion exchange material is greater than about 0.0 mV and less than about 1,000 mV.

Embodiment 111: The process of any of the Embodiments 63-103, wherein the oxidation-reduction potential of the aqueous wash solution contacting the ion exchange material is greater than about 0.0 mV and less than about 300 mV.

Embodiment 112: The process of any of the Embodiments 63-103, wherein the oxidation-reduction potential of the aqueous wash solution contacting the ion exchange material is greater than about 300 mV and less than about 600 mV.

Embodiment 113: The process of any of the Embodiments 63-103, wherein the oxidation-reduction potential of the aqueous wash solution contacting the ion exchange material is greater than about 600 mV and less than about 1,000 mV.

Embodiment 114: The process of any of the Embodiments 63-103, wherein the oxidation-reduction potential of the acidic solution contacting the ion exchange material is greater than about 0 mV and less than about 100 mV.

Embodiment 115: The process of any of the Embodiments 63-103, wherein the oxidation-reduction potential of the acidic solution contacting the ion exchange material is greater than about 0.0 mV and less than about 1,000 mV.

Embodiment 116: The process of any of the Embodiments 63-103, wherein the oxidation-reduction potential of the acidic solution contacting the ion exchange material is greater than about 0.0 mV and less than about 300 mV.

Embodiment 117: The process of any of the Embodiments 63-103, wherein the oxidation-reduction potential of the acidic solution contacting the ion exchange material is greater than about 300 mV and less than about 600 mV.

Embodiment 118: The process of any of the Embodiments 63-103, wherein the oxidation-reduction potential of the acidic solution contacting the ion exchange material is greater than about 600 mV and less than about 1,000 mV.

Embodiment 119: Use of a system of any one of Embodiments 1-62 for the extraction of lithium ions from a liquid resource.

EXAMPLES

Example 1: Lithium Extraction from a Brine Treated with Sodium Metabisulfite With reference to FIG. 1, a liquid resource comprising a natural brine is pumped from a natural reservoir. The brine contains 75,000 mg/L Na, 500 mg/L Ca, 5,000 mg/L Mg, 100 mg/L Li, and other dissolved species, and has an oxidation-reduction potential of 225 mV. This brine is pumped to and from treatment system 101, comprising a mixing tank where sodium metabisulfite is dosed to reach a concentration of 1200 mg/L, resulting in an adjusted value of oxidation-reduction potential of about 100 mV.

A lithium-selective ion exchange material comprising olivine $LiFePO_4$ coated with a 10 nm layer of $SiO_2$ is loaded into a vessel (102), consisting of a bed of ion exchange material with fitted with a retaining screen at the outlet. Brine flows into this vessel and the lithium is absorbed from the brine into the lithium-selective ion exchange material, as the lithium-selective ion exchange material releases protons into the brine. After the lithium-selective ion exchange material is loaded with lithium, the brine is removed from vessel 102, and contains 75,000 mg/L Na, 500 mg/L Ca, 5,000 mg/L Mg, 20 mg/L Li, and other dissolved species.

This brine is aerated with air spargers in pond 103, thereby reducing the final concentration of sodium metabisulfite to below 1 mg/L.

Residual brine is washed from the lithium-selective ion exchange material in vessel 102 with water. An acidic chloride solution is flowed into the vessel to elute lithium from the lithium-selective ion exchange material, while the lithium-selective ion exchange material absorbs protons. The lithium-selective ion exchange material releases lithium and into the acidic chloride solution at a concentration of 1,500 mg/L of lithium.

The cycle of lithium loading with the liquid resource and lithium release with acid is repeated to produce lithium chloride. The presence of the reductant ensures that the oxidation state of Fe in $LiFePO_4$ remains $Fe^{2+}$, preventing its oxidation to $Fe^{3+}$, thus protecting the olivine crystal structure of $LiFePO_4$.

Example 2: Lithium Extraction from a Brine Treated with Sodium Hypochlorite

Figure 2:
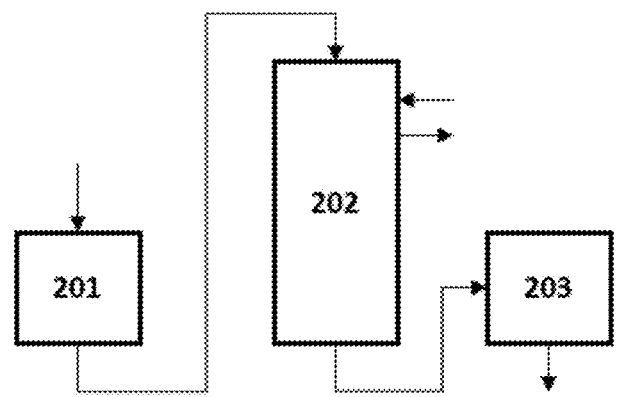
FIG. 2 illustrates a lithium extraction system, wherein a liquid resource comprising lithium is treated with sodium hypochlorite.
Figure 2:
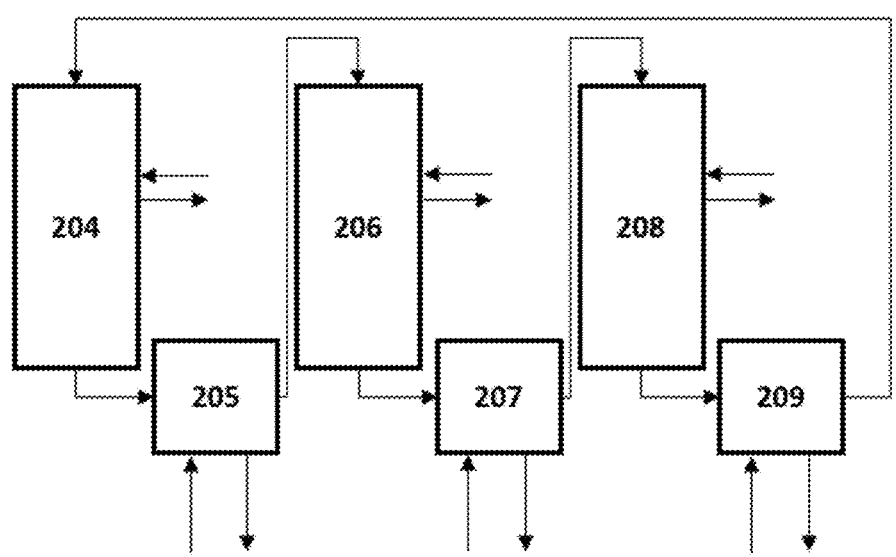

With reference to FIG. 2, a liquid resource comprising a natural brine is pumped from a natural reservoir. The brine contains 80,000 mg/L Na, 500 mg/L Ca, 2,000 mg/L Mg, 300 mg/L Li, and other dissolved species, and has an oxidation-reduction potential of 210 mV. This brine is pumped to and from treatment system 201, comprising an electrochlorination cell, which produces sodium hypochlorite in the brine. This treatment results in a hypochlorite concentration in the brine of 500 mg/L on a sodium hypochlorite equivalent basis, and an adjusted value of oxidation-reduction potential of about 550 mV.

Figure 9:
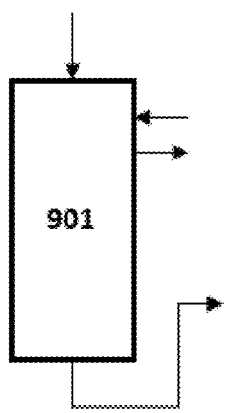
FIG. 9 illustrates a lithium extraction system, wherein a lithium-selective ion exchange material loaded with lithium is contacted with an aqueous solution containing sodium hypochlorite.

A lithium-selective ion exchange material comprising $Li_4Ti_5O_{12}$ is loaded into a ion exchange system (202), consisting of a plurality of agitated tanks fitted with a screen at the outlet. Three such tanks are connected to form a network. The vessels are connected via tanks where the pH of the brine is adjusted, as illustrated in FIG. 9. The network consists of ion exchange vessels (204, 206, 208), and mixing tanks for base and brine (205, 207, 209). For the mixing tanks in the brine circuit (205, 207, 209), an aqueous base solution of NaOH is added to increase the pH of the brine to 7.5. The pH of the brine is monitored before and after each mixing tank in the brine circuit to control the rate of addition of aqueous base solution. For the purposes of this example, a flow configuration would be: a liquid resource flows into tank 205, then into vessel 206, into tank 207, into vessel 208, into tank 209 from which it leaves the system. Acid is concurrently flowed through vessel 204 to elute lithium.

Brine flows into this system (202) and the lithium is absorbed from the brine into the lithium-selective ion exchange material, as the lithium-selective ion exchange material releases protons into the brine. After the lithium-selective ion exchange material is loaded with lithium, the brine is removed from system 202, and contains 80,000 mg/L Na, 500 mg/L Ca, 2,000 mg/L Mg, 50 mg/L Li, and other dissolved species. This brine is contacted with granular activated carbon in a pressure filter (203), thereby reducing the final concentration of sodium hypochlorite to below 1 mg/L.

Residual brine is washed from the lithium-selective ion exchange material in system 202 with water. An acidic sulfate solution is flowed into the system to elute lithium from the lithium-selective ion exchange material, while the lithium-selective ion exchange material absorbs protons. The lithium-selective ion exchange material releases lithium and into the acidic sulfate solution at a concentration of 3,000 mg/L of lithium.

The cycle of lithium loading with the liquid resource and lithium release with acid is repeated to produce lithium sulfate. The molar cation purity of said lithium sulfate solution is 90%. If the liquid resource is not subject to electrochlorination prior to ion exchange in system 202, the purity of the resulting lithium sulfate solution is only 80%, illustrating the importance of this treatment for enhancing lithium extraction by ion exchange.

Example 3: Lithium Extraction from a Brine Treated with Ozone

Figure 3:
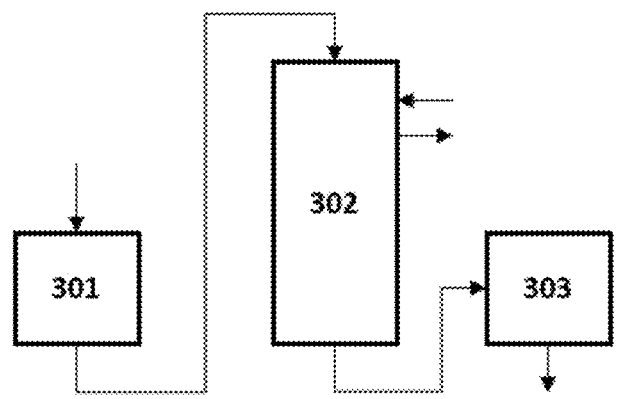
FIG. 3 illustrates a lithium extraction system, wherein a liquid resource comprising lithium is treated with ozone.

With reference to FIG. 3, a liquid resource comprising a natural brine is pumped from a natural reservoir. The brine contains 100,000 mg/L Na, 1,000 mg/L Ca, 3,000 mg/L Mg, 350 mg/L Li, and other dissolved species, and has an oxidation-reduction potential of 245 mV. This brine is pumped to and from treatment system 301, comprising a mixing tank where ozone is dosed to reach a concentration of 10 mg/L using gas sparger, resulting in an adjusted value of oxidation-reduction potential of about 400 mV. The ozone is produced using an ozone generator powered by electricity.

A lithium-selective ion exchange material comprising $Li_4Mn_5O_{12}$ is loaded into a vessel (302), consisting of bed of ion exchange material with fitted with a retaining screen at the outlet. Brine flows into this vessel and the lithium is absorbed from the brine into the lithium-selective ion exchange material, as the lithium-selective ion exchange material releases protons into the brine. After the lithium-selective ion exchange material is loaded with lithium, the brine is removed from vessel 302, and contains 100,000 mg/L Na, 1,000 mg/L Ca, 3,000 mg/L Mg, 50 mg/L Li, and other dissolved species. This brine is treated in agitated vessel 303 with sodium metabisulfite, thereby reducing the concentration of ozone to below 0.1 mg/L.

Residual brine is washed from the lithium-selective ion exchange material in vessel 302 with water. An acidic chloride solution is flowed into the vessel to elute lithium from the lithium-selective ion exchange material, while the lithium-selective ion exchange material absorbs protons. The lithium-selective ion exchange material releases lithium and into the acidic chloride solution at a concentration of 6,500 mg/L of lithium.

The cycle of lithium loading with the liquid resource and lithium release with acid is repeated to produce lithium chloride. The quantity of lithium carbonate produced by the ion exchange material is 75 kg of lithium-carbonate equivalents per kg of ion exchange material, as compared to 40 kg of lithium-carbonate equivalents per kg of ion exchange material if the liquid resource is not subject to ozonation.

Example 4: Lithium Extraction from a Brine Treated with Sodium Hypochlorite

Figure 4:
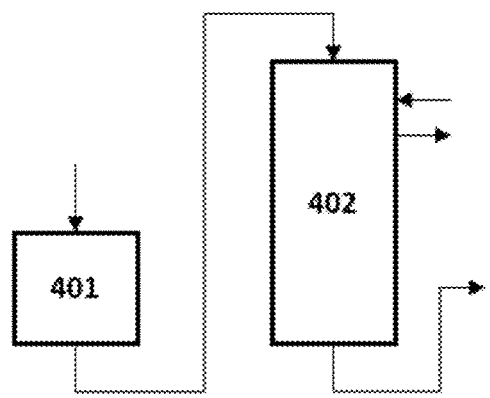
FIG. 4 illustrates a lithium extraction system, wherein a liquid resource comprising lithium is treated with ozone.

With reference to FIG. 4, a liquid resource comprising a natural brine is pumped from a natural reservoir. The brine contains 75,000 mg/L Na, 500 mg/L Ca, 15,000 mg/L Mg, 2,000 mg/L Li, and other dissolved species, and has an oxidation-reduction potential of 245 mV. This brine is pumped to and from treatment system 401, comprising a mixing tank where sodium hypochlorite is dosed to reach a concentration of 600 mg/L oxidation-reduction potential of about 600 mV.

A lithium-selective ion exchange material comprising $Li_2Mn_2O_5$ is loaded into a vessel (402), consisting of an agitated tank fitted with a screen at the outlet. Brine flows into this vessel and the lithium is absorbed from the brine into the lithium-selective ion exchange material, as the lithium-selective ion exchange material releases protons into the brine. The protons that are released into the brine are neutralized by addition of NaOH solution to tank 602 to maintain the pH of the brine near 7. After the lithium-selective ion exchange material is loaded with lithium, the brine is removed from vessel 402, and contains 75,000 mg/L Na, 500 mg/L Ca, 15,000 mg/L Mg, 200 mg/L Li, and other dissolved species.

Residual brine is washed from the lithium-selective ion exchange material in vessel 402 with water. An acidic chloride solution is flowed into the vessel to elute lithium from the lithium-selective ion exchange material, while the lithium-selective ion exchange material absorbs protons. The lithium-selective ion exchange material releases lithium and into the acidic chloride solution at a concentration of 3,000 mg/L of lithium.

The cycle of lithium loading with the liquid resource and lithium release with acid is repeated to produce lithium chloride. The quantity of ion exchange material in the eluate is less than 10 mg/L on a Mn basis, as compared to 50 mg/L on a Mn basis when the brine is not treated with sodium hypochlorite. Thus, the presence of the sodium hypochlorite chemical additive prevents dissolution of the ion exchange material and extends their lifetime.

Figure 5:
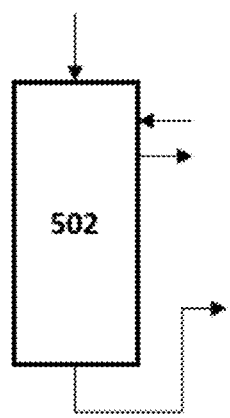
FIG. 5 illustrates a lithium extraction system, wherein process water used in ion exchange is treated with hydrogen peroxide.

Example 5: Lithium Extraction from a Brine with Process Water Treated with Hydrogen Peroxide With reference to FIG. 5, a liquid resource comprising a natural brine is pumped from a natural reservoir. The brine contains 85,000 mg/L Na, 35,000 mg/L Ca, 3,000 mg/L Mg, 300 mg/L Li, and other dissolved species, and has an oxidation-reduction potential of 220 mV.

A lithium-selective ion exchange material comprising $Li_4Ti_5O_{12}$ is loaded into a vessel (502), consisting of an agitated tank fitted with a screen at the outlet. Brine flows into this vessel and the lithium is absorbed from the brine into the lithium-selective ion exchange material, as the lithium-selective ion exchange material releases protons into the brine. The protons that are released into the brine are neutralized by addition of NaOH solution to tank 502 to maintain the pH of the brine near 7. After the lithium-selective ion exchange material is loaded with lithium, the brine is removed from vessel 502, and contains 85,000 mg/L Na, 35,000 mg/L Ca, 3,000 mg/L Mg, 100 mg/L Li, and other dissolved species.

Residual brine is washed from the lithium-selective ion exchange material in vessel 502 with water. Prior to being used in washing of the lithium-selective ion exchange material, the process water is treated with hydrogen peroxide at a concentration of 50 mg/L, and an adjusted value of oxidation-reduction potential of about 500 mV. Following said washing, the water is contacted with a bed of $MnO_2$ to reduce the final concentration of hydrogen peroxide to below 0.1 mg/L.

An acidic nitrate solution is flowed into the vessel to elute lithium from the lithium-selective ion exchange material, while the lithium-selective ion exchange material absorbs protons. The lithium-selective ion exchange material releases lithium and into the acidic nitrate solution at a concentration of 1,000 mg/L of lithium.

The cycle of lithium loading with the liquid resource and lithium release with acid is repeated to produce lithium nitrate. The quantity of lithium produced by the ion exchange material is 50 kg of lithium-carbonate equivalents per kg of ion exchange material, as compared to 35 kg of lithium-carbonate equivalents per kg of ion exchange material if the water is not subject to treatment with hydrogen peroxide.

Example 6: Lithium Extraction from a Brine Treated with Ascorbic Acid

Figure 6:
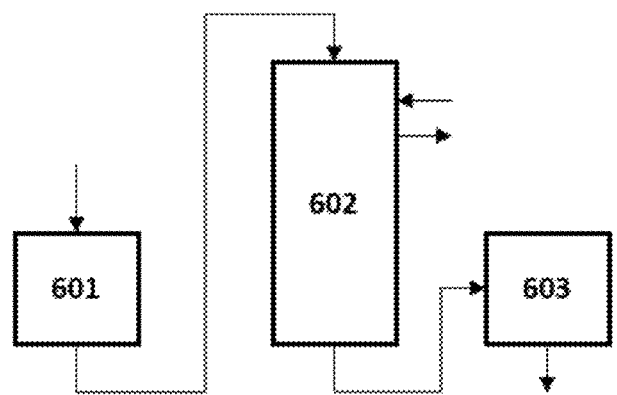
FIG. 6 illustrates a lithium extraction system, wherein a liquid resource comprising lithium is treated with ascorbic acid.

With reference to FIG. 6, a liquid resource comprising a natural brine is pumped from a natural reservoir. The brine contains 3,000 mg/L Na, 50 mg/L Ca, 200,000 mg/L Mg, 2,500 mg/L Li, and other dissolved species, and has an oxidation-reduction potential of 200 mV. This brine is pumped to and from treatment system 601, comprising a mixing tank where ascorbic acid is dosed to reach a concentration of 500 mg/L oxidation-reduction potential of about 120 mV.

A lithium-selective ion exchange material comprising $Li_2TiO_3$ particles embedded in a polymer matrix is loaded into a vessel (602), consisting of an agitated tank fitted with a screen at the outlet. Brine flows into this vessel and the lithium is absorbed from the brine into the lithium-selective ion exchange material, as the lithium-selective ion exchange material releases protons into the brine. The protons that are released into the brine are neutralized by addition of $MgOH_2$ slurry to tank 602 to maintain the pH of the brine near 7. After the lithium-selective ion exchange material is loaded with lithium, the brine is removed from vessel 602, and contains 3,000 mg/L Na, 50 mg/L Ca, 200,000 mg/L Mg, 500 mg/L Li, and other dissolved species. This brine is aerated with air spargers in pond 603, thereby reducing the final concentration of ascorbic acid to below 1 mg/L.

Residual brine is washed from the lithium-selective ion exchange material in vessel 602 with water. An acidic chloride solution is flowed into the vessel to elute lithium from the lithium-selective ion exchange material, while the lithium-selective ion exchange material absorbs protons. The lithium-selective ion exchange material releases lithium and into the acidic chloride solution at a concentration of 3,000 mg/L of lithium.

The cycle of lithium loading with the liquid resource and lithium release with acid is repeated to produce lithium chloride. The presence of the reductant prevents the oxidation of the polymer matrix, thereby extending the lifetime of the ion exchange material.

Figure 7:
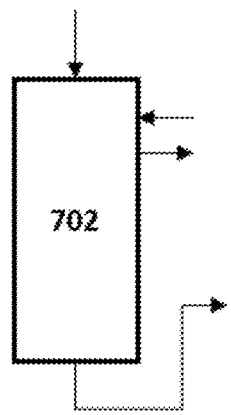
FIG. 7 illustrates a lithium extraction system, wherein process water used in ion exchange is treated with sodium borohydride.

Example 7: Lithium Extraction from a Brine with Process Water Treated with Lithium Borohydride With reference to FIG. 7, a liquid resource comprising a natural brine is pumped from a natural reservoir. The brine contains 50,000 mg/L Na, 5,000 mg/L Ca, 10,000 mg/L Mg, 1,000 mg/L Li, and other dissolved species, and has an oxidation-reduction potential of 200 mV.

A lithium-selective ion exchange material comprising $Li_2Mn_2O_5$ is loaded into a vessel (702), consisting of bed of ion exchange material with fitted with a retaining screen at the outlet. Brine flows into this vessel and the lithium is absorbed from the brine into the lithium-selective ion exchange material, as the lithium-selective ion exchange material releases protons into the brine. After the lithium-selective ion exchange material is loaded with lithium, the brine is removed from vessel 702, and contains 50,000 mg/L Na, 5,000 mg/L Ca, 10,000 mg/L Mg, 100 mg/L Li, and other dissolved species.

Residual brine is washed from the lithium-selective ion exchange material in vessel 702 with water. Prior to being used in washing of the lithium-selective ion exchange material, the process water is treated with sodium borohydride at a concentration of 50 mg/L, and an adjusted value of oxidation-reduction potential of about 100 mV. Following said washing, the water is aerated to remove any traces of sodium borohydride.

An acidic sulfate solution is flowed into the vessel to elute lithium from the lithium-selective ion exchange material, while the lithium-selective ion exchange material absorbs protons. The lithium-selective ion exchange material releases lithium and into the acidic sulfate solution at a concentration of 8,000 mg/L of lithium.

The cycle of lithium loading with the liquid resource and lithium release with acid is repeated to produce lithium sulfate. The process of contacting the $Li_2Mn_2O_5$ ion exchange material with a reductant preserves the $Mn^{4+}$ oxidation state in the ion exchange material, preventing its oxidation into soluble Mn species of higher valance. Such species would dissolve into liquid process streams, and result in loss of the ion exchange material and therefore loss of the ion exchange capacity of the system. The net effect is an increase in the service life of the ion exchange material.

Figure 8:
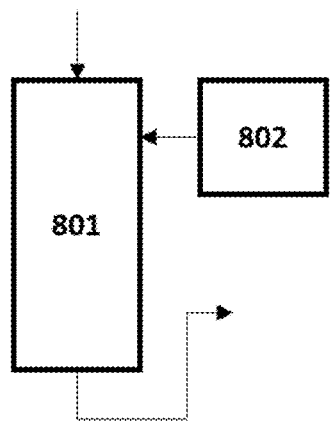
FIG. 8 illustrates a lithium extraction system, wherein an acidic sulfate solution treated with hydrogen peroxide is used to elute lithium.

Example 8: Lithium Extraction from a Brine Treated with an Acidic Sulfate Solution Treated with Hydrogen Peroxide With reference to FIG. 8, a liquid resource comprising a natural brine is pumped from a natural reservoir. The brine contains 50,000 mg/L Na, 500 mg/L Ca, 50,000 mg/L Mg, 1,500 mg/L Li, and other dissolved species, and has an oxidation-reduction potential of 150 mV.

A lithium-selective ion exchange material comprising $Li_2TiO_3$ is loaded into a vessel (801), consisting of bed of ion exchange material with fitted with a retaining screen at the outlet. Brine flows into this vessel and the lithium is absorbed from the brine into the lithium-selective ion exchange material, as the lithium-selective ion exchange material releases protons into the brine. After the lithium-selective ion exchange material is loaded with lithium, the brine is removed from vessel 801, and contains 50,000 mg/L Na, 500 mg/L Ca, 50,000 mg/L Mg, 500 mg/L Li, and other dissolved species.

An acidic sulfate solution is treated with hydrogen peroxide in mixing tank 802. The concentration of peroxide is 50 mg/L, and the value of oxidation-reduction potential of about 450 mV. This acidic sulfate solution is flowed into the vessel 801 to elute lithium from the lithium-selective ion exchange material, while the lithium-selective ion exchange material absorbs protons. The lithium-selective ion exchange material releases lithium and into the acidic sulfate solution at a concentration of 2,500 mg/L of lithium.

The cycle of lithium loading with the liquid resource and lithium release with acid is repeated to produce lithium sulfate. The quantity of lithium produced by the ion exchange material is 50 kg of lithium-carbonate equivalents per kg of ion exchange material, as compared to 40 kg of lithium-carbonate equivalents per kg of ion exchange material if the acidic sulfate solution is not subject to treatment with hydrogen peroxide.

Example 9: Lithium Extraction from a Brine, Wherein the Ion Exchange Material is Contacted with Sodium Hypochlorite With reference to FIG. 9, a liquid resource comprising a natural brine is pumped from a natural reservoir. The brine contains approximately 100,000 mg/L Na, 200 mg/L Ca, 5,000 mg/L Mg, 200 mg/L Li, and other dissolved species.

A lithium-selective ion exchange material comprising $Li_4Mn_5O_{12}$ in a polyethylene matrix is loaded into a vessel (901), comprising a packed bed of ion exchange material fitted with a retaining screen at the outlet. The packed bed is approximately 35 mm in length.

The lithium extraction cycle proceeds as follows. Brine flows into and out of vessel 901, and the lithium is absorbed from the brine into the lithium-selective ion exchange material, as the lithium-selective ion exchange material releases protons into the brine. After the lithium-selective ion exchange material is loaded with lithium, the lithium-selective ion exchange material is contacted with an aqueous solution containing 10,000 mg/L of sodium hypochlorite, wherein the volume of treatment solution to volume of ion exchange beads exceeds a ratio of 5:1. Immediately following, the ion exchange material is washed with water to remove said aqueous solution from the bed of ion exchange material. After this washing procedure, an acidic chloride solution is flowed into the vessel to elute lithium from the lithium-selective ion exchange material, while the lithium-selective ion exchange material absorbs protons. The ion exchange cycle is thus complete, and the material is ready for a new cycle of lithium absorption and elution.

The cycle of lithium loading with the liquid resource and lithium release with acid is repeated over 1,000 times, to produce lithium chloride. The process of contacting the ion exchange material with the aqueous solution containing 10,000 mg/L of sodium hypochlorite preserves the ion exchange material in its active state. The quantity of ion exchange material that dissolves into the acidic eluent solution is less than 0.001% per cycle, as opposed to more than 0.04% per cycle if the ion exchange material is not contacted with the sodium hypochlorite solution prior to lithium elution. The net effect is an increase in the service life of the ion exchange material.

Figure 10:
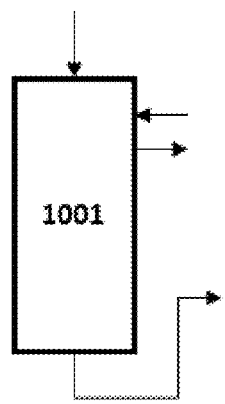
FIG. 10 illustrates a lithium extraction system, wherein a lithium-selective ion exchange material loaded with lithium is contacted with an aqueous solution containing sodium hypochlorite.

Example 10: Lithium Extraction from a Brine, Wherein the Ion Exchange Material is Contacted with Sodium Hypochlorite With reference to FIG. 10, a liquid resource comprising a natural brine is pumped from a natural reservoir. The brine contains approximately 110,000 mg/L Na, 300 mg/L Ca, 10,000 mg/L Mg, 500 mg/L Li, and other dissolved species.

A lithium-selective ion exchange material comprising $Li_2TiO_3$ in a polyvinyl chloride matrix is loaded into a vessel (1001), comprising an agitated tank fitted with a retaining screen at the outlet.

The lithium extraction cycle proceeds as follows. Brine flows into vessel 1001 and is agitated to suspend the ion exchange material in the brine; the lithium is absorbed from the brine into the lithium-selective ion exchange material, as the lithium-selective ion exchange material releases protons into the brine. After the lithium-selective ion exchange material is loaded with lithium, the brine is drained from vessel 1001. Immediately following, the lithium-selective ion exchange material is suspended in an aqueous solution containing 2,000 mg/L of sodium hypochlorite, wherein the volume of treatment solution to volume of ion exchange beads exceeds a ratio of 40:1. The aqueous hypochlorite solution is drained, from the vessel, and the ion exchange material is washed with water to remove any remaining hypochlorite from the vessel. After this washing procedure, an acidic chloride solution is flowed into the vessel to elute lithium from the lithium-selective ion exchange material, while the lithium-selective ion exchange material absorbs protons. The ion exchange cycle is thus complete, and the material is ready for a new cycle of lithium absorption and elution.

The aqueous hypochlorite solution is treated prior to being discarded from the system. Said hypochlorite solution is treated with a 25 wt % solution of sodium sulfite, until the levels of hypochlorite in said solution were undetectable.

The cycle of lithium loading with the liquid resource and lithium release with acid is repeated over 400 times, to produce lithium chloride. The process of contacting the ion exchange material with the aqueous solution containing sodium hypochlorite preserves the ion exchange material in its active state. The quantity of ion exchange material that dissolves into the acidic eluent solution is less than 0.002% per cycle, as opposed to more than 0.05% per cycle if the ion exchange material is not contacted with the sodium hypochlorite solution prior to lithium elution. The preservation of the active state results in a lithium recovery above 85% after 400 cycles of lithium extraction, as compared to a recovery that drops below 80% after 200 cycles in the absence of hypochlorite treatment. The net effect is an increase in the service life of the ion exchange material.

Figure 11:
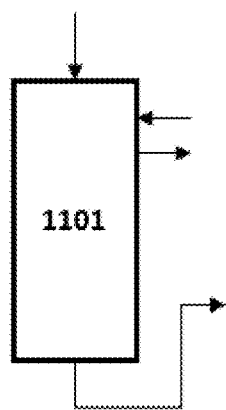
FIG. 11 illustrates a lithium extraction system, wherein a lithium-selective ion exchange material loaded with lithium is contacted with an aqueous solution containing a compound of iodine (e.g., potassium triiodide).

Example 11: Lithium Extraction from a Brine, Wherein the Ion Exchange Material is Contacted with a Compound of Iodine With reference to FIG. 11, a liquid resource comprising a natural brine is pumped from a natural reservoir. The brine contains approximately 70,000 mg/L Na, 700 mg/L Ca, 1,500 mg/L Mg, 300 mg/L Li, and other dissolved species.

A lithium-selective ion exchange material comprising $Li_2TiO_3$ in a polyvinyl chloride matrix is loaded into an ion exchange device (1101), comprising an ion exchange device with 150 filter banks, wherein the liquid flows to and from each filter bank in parallel. Each filter bank contains a packed bed of the lithium-selective ion exchange material, with a flow path that is approximately 30 mm in length.

The lithium extraction cycle proceeds as follows. Brine flows into and out of vessel 1101, and the lithium is absorbed from the brine into the lithium-selective ion exchange material, as the lithium-selective ion exchange material releases protons into the brine. After the lithium-selective ion exchange material is loaded with lithium, the lithium-selective ion exchange material is contacted with an aqueous solution containing 5,000 mg/L of potassium triiodide, wherein the volume of treatment solution to volume of ion exchange beads exceeds a ratio of 3:1. Immediately following, the ion exchange material is washed with water to remove said aqueous solution from the bed of ion exchange material. After this washing procedure, an acidic sulfate solution is flowed into the vessel to elute lithium from the lithium-selective ion exchange material, while the lithium-selective ion exchange material absorbs protons. The ion exchange cycle is thus complete, and the material is ready for a new cycle of lithium absorption and elution.

The cycle of lithium loading with the liquid resource and lithium release with acid is repeated over 1000 times, to produce lithium sulfate. The process of contacting the ion exchange material with the aqueous solution containing potassium triiodide preserves the ion exchange material in its active state. The quantity of ion exchange material that dissolves into the acidic eluent solution is less than 0.001% per cycle, as opposed to more than 0.04% per cycle if the ion exchange material is not contacted with the potassium triiodide solution prior to lithium elution. The net effect is an increase in the service life of the ion exchange material.

Figure 12:
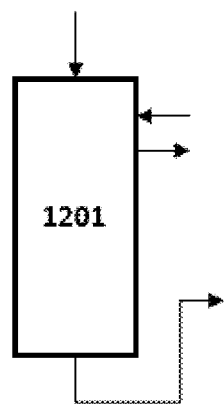
FIG. 12 illustrates a lithium extraction system, wherein a lithium-selective ion exchange material is contacted with a liquid resource to which sodium persulfate is added.

Example 12: Lithium Extraction from a Brine, Wherein the Ion Exchange Material is Contacted with Sodium Persulfate With reference to FIG. 12, a liquid resource comprising a natural brine is pumped from a natural reservoir. The brine contains approximately 100,000 mg/L Na, 700 mg/L Ca, 1,500 mg/L Mg, 2,000 mg/L Li, and other dissolved species.

A lithium-selective ion exchange material comprising $Li_2Mn_2O_5$ in a PTFE matrix is loaded into an ion exchange device (1201), comprising an agitated tank fitted with a retaining screen at the outlet.

The lithium extraction cycle proceeds as follows. Brine flows into vessel 1201 and is agitated to suspend the ion exchange material in the brine; the lithium is absorbed from the brine into the lithium-selective ion exchange material, as the lithium-selective ion exchange material releases protons into the brine. When the vessel is initially loaded with brine, sodium persulfate is added as a solid powder into the vessel, in a ratio of 6 g of sodium persulfate:1 L of brine. Thus, sodium persulfate contacts the ion exchange material.

After the lithium-selective ion exchange material is loaded with lithium, the brine treated with sodium persulfate is drained from vessel 1201. Immediately following, the ion exchange material is washed with water to remove any remaining brine from the vessel. After this washing procedure, an acidic chloride solution is flowed into the vessel to elute lithium from the lithium-selective ion exchange material, while the lithium-selective ion exchange material absorbs protons. The ion exchange cycle is thus complete, and the material is ready for a new cycle of lithium absorption and elution.

The cycle of lithium loading with the liquid resource and lithium release with acid is repeated over 500 times, to produce lithium chloride. The process of contacting the ion exchange material with sodium persulfate preserves the ion exchange material in its active state. The quantity of ion exchange material that dissolves into the acidic eluent solution is less than 0.001% per cycle, as opposed to more than 0.03% per cycle if the ion exchange material is not contacted with the sodium persulfate. The net effect is an increase in the service life of the ion exchange material.

Example 13: Lithium Extraction from a Brine Treated with Ozone

Figure 13:
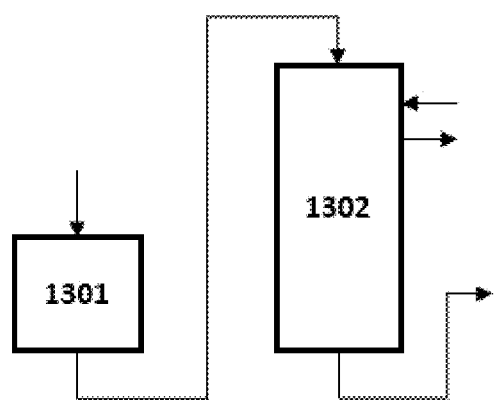
FIG. 13 illustrates a lithium extraction system, wherein a lithium-selective ion exchange material is contacted with a liquid resource treated with ozone.

With reference to FIG. 13, a liquid resource comprising a natural brine is pumped from a natural reservoir. The brine contains approximately 90,000 mg/L Na, 500 mg/L Ca, 15,000 mg/L Mg, 2,000 mg/L Li, and other dissolved species, and has an oxidation-reduction potential of less than 300 mV. This brine is pumped to and from treatment system 1301, comprising a mixing tank where ozone is sparged into the tank using a sparging stone, resulting in an adjusted value of oxidation-reduction potential of about 600 mV. The ozone is produced using an ozone generator powered by electricity, and the brine is treated at a dosage of 10 gallons of brine per 8000 mg of ozone over a total of 16 hours.

A lithium-selective ion exchange material comprising Li$_4$Mn$_5$O$_{12}$ is loaded into a vessel (1302), comprising an agitated tank fitted with a retaining screen at the outlet. Brine flows into this vessel and the lithium is absorbed from the brine into the lithium-selective ion exchange material, as the lithium-selective ion exchange material releases protons into the brine. After the lithium-selective ion exchange material is loaded with lithium, the brine is removed from vessel 1302. Residual brine is washed from the lithium-selective ion exchange material in vessel 1302 with water. An acidic chloride solution is flowed into the vessel to elute lithium from the lithium-selective ion exchange material, while the lithium-selective ion exchange material absorbs protons. The ion exchange cycle is thus complete, and the material is ready for a new cycle of lithium absorption and elution.

The cycle of lithium loading with the liquid resource and lithium release with acid is repeated hundreds of times, to produce lithium chloride. The process of treating the brine with ozone prior to contact with the ion exchange material preserves the ion exchange material in its active state. The quantity of ion exchange material that dissolves into the acidic eluent solution is less than 0.02% per cycle, as opposed to more than 0.04% per cycle if the ion exchange material is not contacted with the sodium persulfate. The net effect is an increase in the service life of the ion exchange material.

Figure 14:
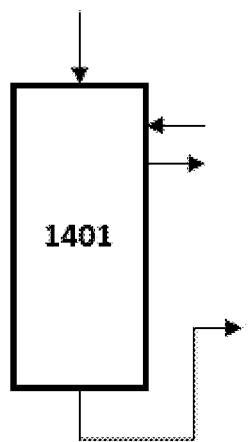
FIG. 14 illustrates a lithium extraction system, wherein a lithium-selective ion exchange material is contacted with a liquid resource to which an aqueous solution of bromine is added.

Example 14: Lithium Extraction from a Brine, Wherein the Ion Exchange Material is Contacted with a Compound of Bromine With reference to FIG. 14, a liquid resource comprising a natural brine is pumped from a natural reservoir. The brine contains approximately 90,000 mg/L Na, 500 mg/L Ca, 15,000 mg/L Mg, 2,000 mg/L Li, and other dissolved species, and has an oxidation-reduction potential of less than 300 mV.

A lithium-selective ion exchange material comprising Li$_2$TiO$_3$ is loaded into an ion exchange device (1301), comprising a packed bed of ion exchange material fitted with a retaining screen at the outlet. The packed bed is approximately 35 mm in length.

The lithium extraction cycle proceeds as follows. Brine flows into and out of vessel 1301, and the lithium is absorbed from the brine into the lithium-selective ion exchange material, as the lithium-selective ion exchange material releases protons into the brine. After five minutes of lithium extraction, the flow of brine is interrupted, and a flow of an aqueous solution containing 5,000 mg/L of bromine is directed into the device; this solution has an oxidation-reduction potential higher than 900 mV. This flow continues until the volume of treatment solution to volume of ion exchange material exceeds a ratio of 5:1. Immediately following, the flow of the treatment solution is interrupted, and the flow of brine into the device is resumed, until the ion exchange material reaches an optimal lithium capacity. Subsequently, the ion exchange material is washed with water to remove said aqueous solution from the bed of ion exchange material. After this washing procedure, an acidic sulfate solution is flowed into the vessel to elute lithium from the lithium-selective ion exchange material, while the lithium-selective ion exchange material absorbs protons. The ion exchange cycle is thus complete, and the material is ready for a new cycle of lithium absorption and elution.

The cycle of lithium loading with the liquid resource and lithium release with acid is repeated over 1000 times, to produce lithium sulfate. The process of contacting the ion exchange material with the aqueous solution containing bromine preserves the ion exchange material in its active state. The quantity of ion exchange material that dissolves into the acidic eluent solution is less than 0.001% per cycle, as opposed to more than 0.05% per cycle if the ion exchange material is not contacted with the bromine solution prior to lithium elution. The net effect is an increase in the service life of the ion exchange material.

Figure 15:
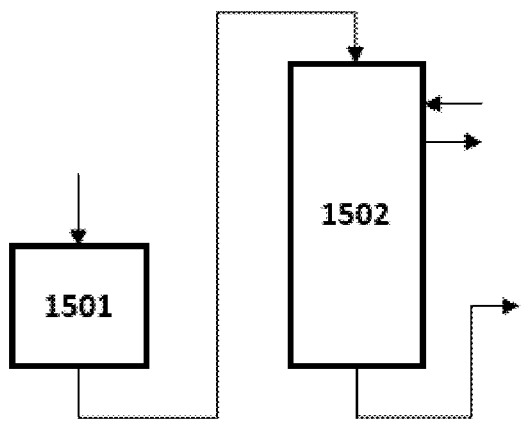
FIG. 15 illustrates a lithium extraction system, wherein a lithium-selective ion exchange material is contacted with a liquid resource treated with an oxidant (air, which comprises gaseous oxygen) to chemically remove a reductant (hydrogen sulfide) from the liquid resource.
Figures 16A, 16B, 16C:
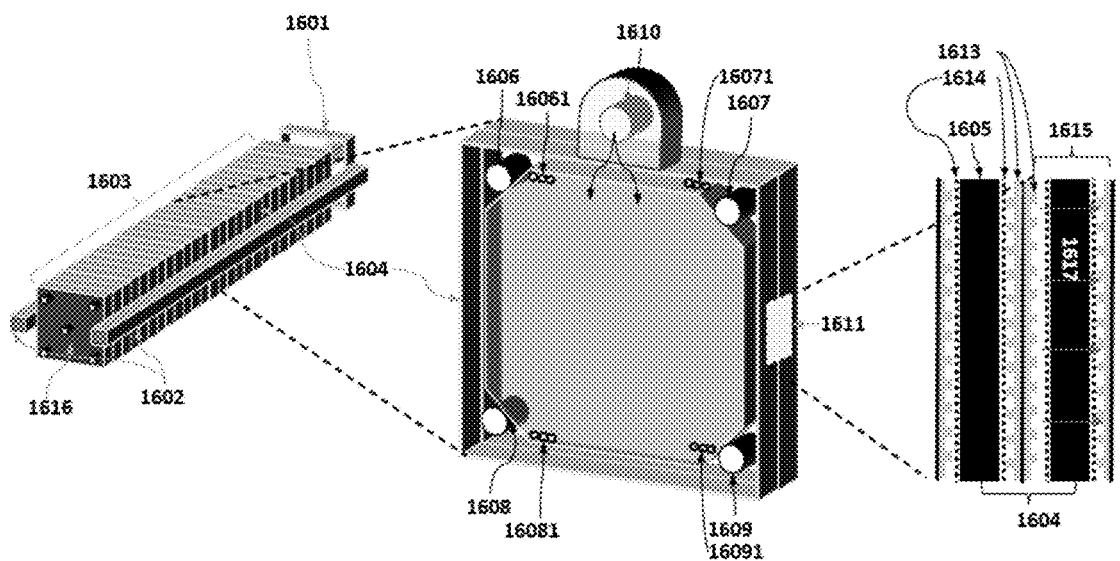
FIG. 16A-16C illustrates a filter press and the filter banks that comprise said filter press, wherein contact of a chemical additive with an ion exchange material, liquid resource, wash solution, or acidic solution contained that is contained therein or passed therethrough can lead to at least greater lithium recovery from a liquid resource according to the processes and systems disclosed herein.

Example 15: Lithium Extraction from a Brine, Wherein a Reductant is Removed from a Brine with Air With reference to FIG. 15, a liquid resource comprising a natural brine is pumped from a natural reservoir. The brine contains Li, and other dissolved species, and has an oxidation-reduction potential of less than −100 mV. The brine contains hydrogen sulfide.

The brine is pumped to and from treatment system 1501, where the brine is cooled to ambient temperature, is filtered, and hydrogen sulfide is removed. Hydrogen sulfide is removed by sparging an air chemical additive into a tank containing said brine, with a characteristic residence time of 48 hours.

Lithium is extracted from this treated brine in device 1502. A lithium-selective ion exchange material comprising Li$_2$Mn$_2$O$_5$ is loaded into a vessel (1502), comprising an agitated tank fitted with a retaining screen at the outlet.

The lithium extraction cycle proceeds as follows. Brine flows into vessel 1502 and is agitated to suspend the ion exchange material in the brine; the lithium is absorbed from the brine into the lithium-selective ion exchange material, as the lithium-selective ion exchange material releases protons into the brine. After the lithium-selective ion exchange material is loaded with lithium, the brine is drained from vessel 1502, and the ion exchange material is washed with water to remove entrained brine. After this washing procedure, an acidic chloride solution is flowed into the vessel to elute lithium from the lithium-selective ion exchange material, while the lithium-selective ion exchange material absorbs protons. The ion exchange cycle is thus complete, and the material is ready for a new cycle of lithium absorption and elution.

The cycle of lithium loading with the liquid resource and lithium release with acid is repeated over 500 times, to produce lithium chloride. The process of removing hydrogen sulfide from the brine using an air chemical additive preserves the ion exchange material in its active state. The quantity of ion exchange material that dissolves into the acidic eluent solution is less than 0.2% per cycle, as opposed to more than 0.5% per cycle if the hydrogen sulfide is not removed from the brine. The net effect is an increase in the service life of the ion exchange material.

While preferred embodiments of the present disclosure have been shown and described herein, it will be obvious to those skilled in the art that such embodiments are provided by way of example only. It is not intended that the disclosure be limited by the specific examples provided within the specification. While the disclosure has been described with reference to the aforementioned specification, the descriptions and illustrations of the embodiments herein are not meant to be construed in a limiting sense. Numerous variations, changes, and substitutions will now occur to those skilled in the art without departing from the disclosure. Furthermore, it shall be understood that all aspects of the disclosure are not limited to the specific depictions, configurations or relative proportions set forth herein which depend upon a variety of conditions and variables. It should be understood that various alternatives to the embodiments of the disclosure described herein may be employed in practicing the disclosure. It is therefore contemplated that the disclosure shall also cover any such alternatives, modifications, variations or equivalents. It is intended that the following claims define the scope of the disclosure and that methods and structures within the scope of these claims and their equivalents be covered thereby.

What is claimed is:

1. A process for extracting lithium from a liquid resource, comprising:
    (a) contacting a chemical additive with said liquid resource, a wash solution used to contact an ion exchange material, an acidic solution, or any combination thereof;
    (b) contacting said ion exchange material to said liquid resource, wherein said ion exchange material absorbs lithium ions from said liquid resource to provide a lithiated ion exchange material; and
    (c) contacting said acidic solution to said lithiated ion exchange material, wherein said lithiated ion exchange material releases the absorbed lithium into the acidic solution to yield a lithium eluate,
    wherein dissolution of said ion exchange material into said liquid resource, said acidic solution, or said wash solution is reduced while (a), (b), and (c) are carried out as compared to when only (b) and (c) are carried out.

2. The process of claim 1, wherein the chemical additive is contacted with the liquid resource before said liquid resource contacts the ion exchange material.

3. The process of claim 1, wherein the chemical additive is contacted with the wash solution before said wash solution contacts the ion exchange material or the lithiated ion exchange material.

4. The process of claim 1, wherein the chemical additive is contacted with the acidic solution before said acidic solution contacts the lithiated ion exchange material.

5. The process of claim 1, wherein the chemical additive adjusts the oxidation-reduction potential of said liquid resource, said wash solution, said acidic solution, or any combination thereof, to a value that is about-500 mV to about 1,300 mV versus standard hydrogen electrode.

6. The process of claim 1, wherein a ratio of the amount of ion exchange material dissolved into said liquid resource, said acidic solution, or said wash solution while (a), (b), and (c) are carried out as compared to the amount when only (b) and (c) are carried out is at least 1:2.

7. The process of claim 1, wherein the dissolution of the ion exchange material while (a), (b), and (c) are carried out is less than about 0.01% by mass.

8. The process of claim 1, wherein the dissolution of the ion exchange material while (a), (b), and (c) are carried out is less than about 0.001% by mass.

9. The process of claim 1, wherein the dissolution of the ion exchange material while (b) and (c) are carried out is more than about 0.01% by mass, wherein (a) is not carried out.

10. The process of claim 1, wherein the dissolution of the ion exchange material while (b) and (c) are carried out is more than about 0.1% by mass, wherein (a) is not carried out.

11. The process of claim 1, wherein the molar purity of lithium in the lithium eluate is increased by between 1% and 20% as compared to the molar purity of lithium in the lithium eluate when (a) is not carried out.

12. The process of claim 1, wherein the chemical additive comprises an oxidant.

13. The process of claim 12, wherein the oxidant comprises oxygen, air, ozone, hydrogen peroxide, fluorine, chlorine, bromine, iodine, a nitrate compound, sodium hypochlorite, sodium persulfate, bleach, a chlorite, a chlorate, a perchlorate, potassium permanganate, a permanganate, sodium perborate, a perborate, mixtures thereof or combinations thereof.

14. The process of claim 12, wherein the oxidant comprises chlorine, bleach, sodium hypochlorite, mixtures thereof or combinations thereof.

15. The process of claim 1, wherein the chemical additive comprises sodium bisulfite, sodium metabisulfite, sodium sulfite, sodium thiosulfate, sodium borohydride, formic acid, ascorbic acid, oxalic acid, potassium iodide, other reducing species, mixtures thereof, or combinations thereof.

16. The process of claim 1, wherein the concentration of the chemical additive in said liquid resource, said wash solution, said acidic solution, or any combination thereof is from 1 to 10,000 mg/L.

17. The process of claim 1, wherein said ion exchange material or said lithiated ion exchange material comprises $LiFePO_4$, $LiMnPO_4$, $LizMO_3$ (M=Ti, Mn, Sn), $Li_4Ti_5O_{12}$, $Li_4Mn_5O_{12}$, $LiMn_2O_4$, $Li_{1.6}Mn_{1.6}O_4$, $LiMO_2$ (M=Al, Cu, Ti), $Li_4TiO_4$, $LizTi_{11}O_{24}$, $Li_3VO_4$, $Li_2Si_3O_7$, $Li_2CuP_2O_7$, modifications thereof, solid solutions thereof, or a combination thereof.

18. The process of claim 1, wherein said ion exchange material is a coated ion exchange material with a coating that is selected from $SiO_2$, $TiO_2$, $ZrO_2$, polyvinylidene difluoride, polyvinyl chloride, polystyrene, polybutadiene, polydivinylbenzene, or combinations thereof.

19. The process of claim 1, wherein said chemical additive modulates the oxidation state of metals in said ion exchange material or said lithiated ion exchange material to decrease the rate of dissolution of said metals.

20. The process of claim 1, wherein said ion exchange material or said lithiated ion exchange material comprises a lithium manganese oxide or lithium titanium oxide, and wherein contact of the chemical additive with the ion exchange material or said lithiated ion exchange material results in an increase in the oxidation state of manganese in said lithium manganese oxide or titanium in said lithium titanium oxide.

21. The process of claim 1, wherein the liquid resource is a natural brine, a pretreated brine, a dissolved salt flat, seawater, concentrated seawater, a desalination effluent, a concentrated brine, a processed brine, an oilfield brine, a liquid from an ion exchange process, a liquid from a solvent extraction process, a synthetic brine, a leachate from an ore or combination of ores, a leachate from a mineral or combination of minerals, a leachate from a clay or combination of clays, a leachate from recycled products, a leachate from recycled materials, a mother liquor, or combinations thereof.

22. The process of claim 1, wherein the acidic solution comprises hydrochloric acid, sulfuric acid, nitric acid, phosphoric acid, hydrobromic acid, hydroiodic acid, perchloric acid, acetic acid, or a combination thereof.

23. The process of claim 1, further comprising a removal of the chemical additive from the liquid resource, wash solution, or acidic solution; wherein said removal removes at least a portion of the chemical additive present in the liquid resource, wash solution, or acidic solution; wherein said removal takes place following contact of the liquid resource, wash solution or acidic solution with the ion exchange material or lithiated ion exchange material.

24. The process of claim 23, wherein said removal is conducted by at least one of i) contacting the liquid resource, wash solution, or acidic solution with granular activated carbon, ii) contacting the liquid resource, wash solution, or acidic solution with sodium metabisulfite, sodium sulfite, sodium thiosulfate, sodium bisulfite, ascorbic acid, air, ultraviolet light, heat, or combinations thereof, or iii) contacting the liquid resource, wash solution, or acidic solution with a catalyst.

25. The process of claim 1, wherein the ion exchange material exhibits an absorption capacity that is about 1% to about 20% higher relative to the absorption capacity of the ion exchange material if (a) were not conducted.

26. The process of claim 1, wherein the chemical additive is produced in an electrochemical system.

27. The process of claim 26, wherein said electrochemical system produces a chemical compound comprising hypochlorite.

28. The process of claim 1, wherein the chemical additive is contacted with said liquid resource, said wash solution, or said acidic solution by treating said liquid resource, said wash solution, or said acidic solution in an electrochemical system that produces the chemical additive.

* * * * *